US012051782B2

(12) United States Patent
Hirakawa et al.

(10) Patent No.: US 12,051,782 B2
(45) Date of Patent: Jul. 30, 2024

(54) METHOD FOR PRODUCING NON-AQUEOUS ALKALI METAL ELECTRICITY STORAGE ELEMENT

(71) Applicant: Asahi Kasei Kabushiki Kaisha, Tokyo (JP)

(72) Inventors: Yuichiro Hirakawa, Tokyo (JP); Koichi Hiraoka, Tokyo (JP); Hitoshi Morita, Tokyo (JP); Yuima Kimura, Tokyo (JP); Kazuteru Umetsu, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 474 days.

(21) Appl. No.: 17/439,874

(22) PCT Filed: Mar. 23, 2020

(86) PCT No.: PCT/JP2020/012766
§ 371 (c)(1),
(2) Date: Sep. 16, 2021

(87) PCT Pub. No.: WO2020/203421
PCT Pub. Date: Oct. 8, 2020

(65) Prior Publication Data
US 2022/0190380 A1 Jun. 16, 2022

(30) Foreign Application Priority Data

| Mar. 29, 2019 | (JP) | 2019-068692 |
| Mar. 29, 2019 | (JP) | 2019-068741 |
| Mar. 29, 2019 | (JP) | 2019-068803 |
| Mar. 29, 2019 | (JP) | 2019-069041 |
| Mar. 29, 2019 | (JP) | 2019-069084 |
| Mar. 29, 2019 | (JP) | 2019-069179 |

(51) Int. Cl.
H01M 10/058 (2010.01)
H01M 4/04 (2006.01)
H01M 10/0525 (2010.01)

(52) U.S. Cl.
CPC .......... H01M 10/058 (2013.01); H01M 4/04 (2013.01); H01M 4/0471 (2013.01); H01M 10/0525 (2013.01)

(58) Field of Classification Search
CPC .... H01M 4/04; H01M 10/058; H01M 10/052; H01M 4/14
See application file for complete search history.

(56) References Cited

U.S. PATENT DOCUMENTS

| 6,667,000 B1 | 12/2003 | Nakazato et al. |
| 2008/0274403 A1* | 11/2008 | Kim .................. D01D 5/0007 977/948 |
| 2009/0110806 A1 | 4/2009 | Cai et al. |
| 2011/0141661 A1 | 6/2011 | Muthu et al. |
| 2011/0311866 A1 | 12/2011 | Lim et al. |
| 2012/0050950 A1 | 3/2012 | Kim et al. |
| 2014/0093761 A1 | 4/2014 | Sakanaka et al. |
| 2014/0193709 A1 | 7/2014 | Okada et al. |
| 2015/0004498 A1 | 1/2015 | Cheng et al. |
| 2015/0340737 A1 | 11/2015 | Kako et al. |
| 2016/0079007 A1 | 3/2016 | Otsuka et al. |
| 2016/0093880 A1 | 3/2016 | Song et al. |
| 2017/0346087 A1 | 11/2017 | Watanabe et al. |
| 2018/0197691 A1 | 7/2018 | Song et al. |
| 2018/0261399 A1 | 9/2018 | Umetsu et al. |
| 2019/0020030 A1 | 1/2019 | Umetsu et al. |
| 2019/0027321 A1 | 1/2019 | Kusuzaka et al. |
| 2019/0027754 A1 | 1/2019 | Kamijo et al. |
| 2019/0035560 A1 | 1/2019 | Umetsu et al. |
| 2019/0131079 A1 | 5/2019 | Tsumeda et al. |
| 2020/0220222 A1 | 7/2020 | Watarai et al. |

FOREIGN PATENT DOCUMENTS

| CN | 103762385 A | 4/2014 |
| CN | 104037418 A | 9/2014 |
| CN | 105098240 A | 11/2015 |
| JP | H10-334884 A | 12/1998 |
| JP | H11-283615 A | 10/1999 |
| JP | 2002-289256 A | 10/2002 |
| JP | 2007-096048 A | 4/2007 |

(Continued)

OTHER PUBLICATIONS

Barrett et al., "The Determination of Pore Volume and Area Distributions in Porous Substances. I. Computations from Nitrogen Isotherms," Journal of The American Chemical Society, 73: 373-380 (1951).
Lippens et al., "Studies on Pore Systems in Catalysts V. The t Method," Journal of Catalysis, 4: 319-323 (1965).
Mikhail et al., "Investigations of a Complete Pore Structure Analysis I. Analysis of Micropores," Journal of Colloid and Interface Science, 26: 45-53 (1968).
International Search Report issued in corresponding International Patent Application No. PCT/JP2020/012766 dated Jun. 16, 2020.
International Preliminary Report on Patentability and Written Opinion issued in corresponding International Patent Application No. PCT/JP2020/012766 dated Oct. 14, 2021.
Supplementary European Search Report issued in corresponding European Patent Application No. 20784304.6 dated May 2, 2022.

Primary Examiner — Kenneth J Douyette
(74) Attorney, Agent, or Firm — Morgan, Lewis & Bockius LLP

(57) ABSTRACT

Provided herein is a method for producing a non-aqueous alkali metal electricity storage element, comprising a voltage application step of applying a voltage to a non-aqueous alkali metal electricity storage element precursor comprising a positive electrode precursor, a negative electrode, a separator, and a non-aqueous electrolytic solution, housed in a casing, wherein a positive electrode active material layer of the positive electrode precursor comprises a positive electrode active material and an alkali metal compound other than the positive electrode active material.

31 Claims, No Drawings

(56) References Cited

FOREIGN PATENT DOCUMENTS

| | | |
|---|---|---|
| JP | 2007-227831 A | 9/2007 |
| JP | 2007-288017 A | 11/2007 |
| JP | 2010-225291 A | 10/2010 |
| JP | 2010-244818 A | 10/2010 |
| JP | 2012-015297 A | 1/2012 |
| JP | 2013-073670 A | 4/2013 |
| JP | 2013-125650 A | 6/2013 |
| JP | 2013-149451 A | 8/2013 |
| JP | 2014-107342 A | 6/2014 |
| JP | 2014-179288 A | 9/2014 |
| JP | 2014-241233 A | 12/2014 |
| JP | 2015-070245 A | 4/2015 |
| JP | 2015-109223 A | 6/2015 |
| JP | 2015-219971 A | 12/2015 |
| JP | 2016-012620 A | 1/2016 |
| JP | 2016-507055 A | 3/2016 |
| JP | 2016-120473 A | 7/2016 |
| JP | 2016-164918 A | 9/2016 |
| JP | 2017-103225 A | 6/2017 |
| JP | 2018-056419 A | 4/2018 |
| JP | 2018-056430 A | 4/2018 |
| JP | 2018-061019 A | 4/2018 |
| JP | 2019-021775 A | 2/2019 |
| JP | 2019-029110 A | 2/2019 |
| JP | 2019-029393 A | 2/2019 |
| JP | 2019-029406 A | 2/2019 |
| JP | 2019-029411 A | 2/2019 |
| JP | 2019-029420 A | 2/2019 |
| KR | 10-1243906 B1 | 3/2013 |
| KR | 10-2015-0062822 A | 6/2015 |
| WO | 02/054510 A1 | 7/2002 |
| WO | 2012/176895 A1 | 12/2012 |
| WO | 2014/007142 A1 | 1/2014 |
| WO | 2014/123487 A1 | 8/2014 |
| WO | 2014/157715 A1 | 10/2014 |
| WO | 2015/173623 A1 | 11/2015 |
| WO | 2016/098212 A1 | 6/2016 |
| WO | 2017/126687 A1 | 7/2017 |
| WO | 2017/126689 A1 | 7/2017 |
| WO | 2017/126697 A1 | 7/2017 |
| WO | 2017/126698 A1 | 7/2017 |
| WO | 2018/030280 A1 | 2/2018 |
| WO | 2018/180167 A1 | 10/2018 |
| WO | 2019/059365 A1 | 3/2019 |

\* cited by examiner

METHOD FOR PRODUCING NON-AQUEOUS ALKALI METAL ELECTRICITY STORAGE ELEMENT

FIELD

The present invention relates to a method for producing a non-aqueous alkali metal electricity storage element.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive electricity storage systems based on solar power generation technology, and electricity storage systems for electric vehicles, etc.

The number one requirement for batteries used in such electricity storage systems is high energy density. The development of lithium ion batteries is advancing at a rapid pace, as an effective strategy for batteries with high energy density that can meet this requirement.

The second requirement is a high output characteristic. A high power discharge characteristic is required for an electricity storage system during acceleration in, for example, a combination of a high efficiency engine and an electricity storage system (such as in a hybrid electric vehicle), or a combination of a fuel cell and an electricity storage system (such as in a fuel cell electric vehicle).

Electrical double layer capacitors and nickel metal hydride batteries, etc., are currently under development as high output electricity storage devices.

Among the electrical double layer capacitors, electrical double layer capacitors that employ activated carbon in the electrodes have output characteristics of about 0.5 to 1 kW/L. Such electrical double layer capacitors have high durability (cycle characteristics and elevated temperature storage characteristics) and have been considered optimal devices in fields where the high output mentioned above is required. However, their energy densities are no greater than about 1 to 5 Wh/L. A need therefore exists for even higher energy density.

On the other hand, nickel metal hydride batteries employed in existing hybrid electric vehicles exhibit high output equivalent to electrical double layer capacitors, and have energy densities of about 160 Wh/L. Research is being actively pursued toward further increasing their energy density and output and increasing their durability (particularly stability at elevated temperatures).

Moreover, research is also advancing toward increased outputs for lithium ion batteries as well. For example, lithium ion batteries are being developed that yield high output exceeding 3 kW/L at 50% depth of discharge (a value representing the state of the percentage of discharge of the service capacity of an electricity storage element). However, the energy density is 100 Wh/L or lower, and the design is such that the high energy density, which is the major feature of a lithium ion battery, is intentionally reduced. Moreover, the durability (especially cycle characteristic and elevated temperature storage characteristic) is inferior to that of an electrical double layer capacitor. Therefore, research is actively being pursued toward further increasing the durability of lithium ion batteries. In order to provide practical durability, these are used with a depth of discharge in a narrower range than 0 to 100%. The usable capacity is even lower.

There is a strong demand for implementation of electricity storage elements exhibiting high energy density, high output characteristics and durability. Nevertheless, the existing electricity storage elements mentioned above have their advantages and disadvantages. New electricity storage elements are therefore desired that can meet these technical requirements. Promising candidates are electricity storage elements known as lithium ion capacitors, which are being actively developed in recent years.

A lithium ion capacitor is a type of electricity storage element by using a non-aqueous electrolytic solution comprising a lithium salt (or, "non-aqueous lithium electricity storage element"), wherein charge-discharge is accomplished by: non-Faraday reaction by adsorption/desorption of anions similar to an electrical double layer capacitor at about 3 V or higher, at the positive electrode; and Faraday reaction by intercalation/release of lithium ions similar to a lithium ion battery, at the negative electrode.

To summarize these electrode materials and their characteristics described above: when charge-discharge is carried out by using a material such as activated carbon as an electrode and by adsorption and desorption of ions on the activated carbon surface (non-Faraday reaction), it is possible to obtain high output and high durability, but with lower energy density (for example, 1×). When charge/discharge is carried out by Faraday reaction by using oxide or a carbon material as the electrode, the energy density is higher (for example, 10 times that of non-Faraday reaction by using activated carbon), but then durability and output characteristic become issues.

Electrical double layer capacitors that combine these electrode materials employ activated carbon as the positive electrode and negative electrode (energy density: 1x), and carry out charge/discharge by non-Faraday reaction at both the positive and negative electrodes, and are characterized by having high output and high durability, but also low energy density (positive electrode: 1x×negative electrode: 1x=1).

Lithium ion secondary batteries use lithium transition metal oxide for the positive electrode (energy density: 10x) and a carbon material (energy density: 10x) for the negative electrode, carrying out charge/discharge by Faraday reaction at both the positive and negative electrodes, and have high energy density (positive electrode: 10x×negative electrode: 10x=100), but have issues in terms of output characteristic and durability. Further, the depth of discharge must be restricted in order to satisfy the high durability required for hybrid electric vehicles, and with lithium ion secondary batteries only 10 to 50% of the energy can be utilized.

A lithium ion capacitor is a new type of asymmetric capacitor that employs activated carbon (energy density: 1x) for the positive electrode and a carbon material (energy density: 10x) for the negative electrode, and it is characterized by carrying out charge/discharge by non-Faraday reaction at the positive electrode and Faraday reaction at the negative electrode, and thus having the characteristics of both an electrical double layer capacitor and a lithium ion secondary battery. A lithium ion capacitor exhibits high output and high durability, while also having high energy density (positive electrode: 1x×negative electrode: 10x=10) and requiring no restrictions on depth of discharge as with a lithium ion secondary battery.

Applications of the lithium ion capacitor include, for example, electricity storages for railways, construction machines, and vehicles. In these applications, the capacitors used are required to have excellent input/output characteristics, high durability at elevated temperatures, and high load charge/discharge cycle characteristics at the same time due to the harsh operating environment. In addition, since high reliability of the capacitor is also required, it is common to carry out defect inspection in the fabrication process of the electricity storage element, but there is a problem of causing a defect due to a micro short circuit to lower the productivity.

A technique for reducing resistance of a capacitor and improving rapid charge/discharge cycle characteristics in an electrochemical capacitor by using graphite for a negative electrode by the fabrication method that limits the range of use of the negative electrode to a second stage as a countermeasure technology for such demands, has been known (Patent Literature 1). Moreover, Patent Literature 2 proposes a non-aqueous lithium electricity storage element, wherein the non-aqueous lithium electricity storage element inhibits excessive decomposition of the remaining lithium compound, which minimizes gas generation under high voltage by controlling the coverage of the fluorine compound that coats the surface of the lithium compound in the positive electrode.

The technique described in Patent Literature 1 improves input/output and cycle characteristics by limiting the range of use of the negative electrode. However, the technique described in Patent Literature 1 has room for improvement because lithium ions intercalated in a negative electrode are deactivated at elevated temperatures, the negative electrode potential is increased, and a resistance of the electricity storage element increases remarkably.

The technique described in Patent Literature 2 also has room for improvement on yield in the manufacturing since when lithium compounds remain in a positive electrode, the lithium compounds existing on the surface penetrates a separator and causes a micro short circuit in the manufacturing process. Moreover, since this technology has an effect of inhibiting decomposition of the lithium compound in the positive electrode, however, the lithium compound remains in the positive electrode and acts as a resistance component, causing decrease in input and output, the technology thus leaves room for improvement on input/output characteristics.

As described above, there has not been found a technology that employs all of the high input/output characteristics by improving the positive electrode or negative electrode, durability against high load charge/discharge cycles at elevated temperatures, and inhibition of micro short circuit upon the manufacture of non-aqueous alkali metal electricity storage elements.

Moreover, for example, Patent Literature 3 discloses a method for being capable of pre-doping a negative electrode in a short time and producing a non-aqueous hybrid capacitor that has satisfactory elevated temperature durability, by promoting decomposition of an alkali metal compound in a positive electrode precursor. Patent Literature 4 discloses a non-aqueous secondary battery that enables to inhibit occurrence of micro short circuit and have favorable rapid charge characteristics and productivity. Patent Literature 5 discloses a method for providing anon-aqueous lithium metal electricity storage element by using a lithium compound for a positive electrode precursor which has a low resistant and is excellent in high load charge/discharge cycle characteristics by controlling a pressurization method of the electricity storage element in a step of decomposing a lithium compound in a positive electrode precursor to dope uniformly a negative electrode active material layer with lithium. Patent Literature 6 discloses a technique for improving decomposability of a lithium compound in a lithium doping step to achieve both high input/output and high load charge/discharge cycle characteristics of a non-aqueous lithium electricity storage element by using a lithium compound for a positive electrode precursor, by adjusting a specific surface area and a fine pore volume of the lithium compound contained in the positive electrode precursor within specific ranges.

However, the literatures neither specifies a technique for inhibiting a micro short circuit occurring in a non-aqueous alkali metal electricity storage element by using an alkali metal compound for a positive electrode precursor to improve the productivity thereof, nor refers to inhibition of gas generation by decomposition of the alkali metal compound in the positive electrode that remained without being decomposed in a doping step, when a completed electricity storage element is under elevated temperatures and high voltages.

Moreover, Patent Literature 3 discloses a method that enables to pre-dope a negative electrode in a short time by accelerating decomposition of an alkali metal compound in a positive electrode precursor and to produce a non-aqueous hybrid capacitor having a favorable elevated temperature durability. Patent Literature 4 discloses a non-aqueous secondary battery that can inhibit occurrence of a micro short circuit and has favorable rapid charge characteristics and productivity.

However, neither of the literatures considers a production method for being capable of inhibiting a micro short circuit occurring in a non-aqueous alkali metal electricity storage element by using an alkali metal compound for a positive electrode precursor, and achieving both low resistance and favorable elevated temperature durability.

Moreover, Patent Literature 3 discloses a method that enables to pre-dope the negative electrode in a short time by accelerating decomposition of the alkali metal compound in the positive electrode precursor and to produce the non-aqueous hybrid capacitor having favorable elevated temperature durability. Patent Literature 4 discloses the non-aqueous secondary battery that can inhibit occurrence of micro short circuit and has favorable rapid charge characteristics and productivity.

However, neither of the literatures considers a production method for being capable of inhibiting a micro short circuit occurring in the non-aqueous alkali metal electricity storage element by using the alkali metal compound for the positive electrode precursor, and achieving both low resistance and favorable elevated temperature durability.

Further, Patent Literature 3 discloses the method for being capable of pre-doping the negative electrode in a short time by accelerating decomposition of the alkali metal compound in the positive electrode precursor and producing the non-aqueous hybrid capacitor having favorable elevated temperature durability. Patent Literature 4 discloses the non-aqueous secondary battery that can inhibit occurrence of a micro short circuit and has favorable rapid charge characteristics and productivity.

However, neither of Patent Literatures 3 and 4 describes a method for producing a non-aqueous alkali metal electricity storage element by using the alkali metal compound for the positive electrode precursor, which can inhibit a micro short circuit and provide low resistance and favorable elevated temperature durability.

CITATION LIST

Patent Literature

[PTL 1] Japanese Unexamined Patent Publication No. 2007-288017
[PTL 2] WO2017/126689
[PTL 3] WO2017/126687
[PTL 4] Japanese Unexamined Patent Publication No. 2010-244818
[PTL 5] Japanese Unexamined Patent Publication No. 2019-29411
[PTL 6] Japanese Unexamined Patent Publication No. 2019-29110

SUMMARY

Technical Problem

In view of the above background, in one embodiment, the problem to be solved by the present invention is to provide a method for producing a non-aqueous alkali metal electricity storage element having excellent input/output characteristics and durability against a high load charge/discharge cycle at an elevated temperature by efficiently decomposing an alkali metal compound existing in a positive electrode precursor when producing the non-aqueous alkali metal electricity storage element, to inhibit a micro short circuit.

Moreover, in one embodiment, the problem to be solved by the present invention is to provide a method for producing a non-aqueous alkali metal electricity storage element and a precursor thereof that enable to improve production efficiency, reduce a micro short circuit of the completed alkali metal electricity storage element as well, and inhibit gas generation when the completed non-aqueous alkali metal electricity storage element is used under an elevated temperature and high voltage, by reducing a micro shirt circuit of the alkali metal electricity storage element precursor having a positive electrode precursor comprising an alkali metal compound.

Moreover, in one embodiment, the problem to be solved by the present invention is to provide a method for producing a non-aqueous alkali metal electricity storage element that enables to achieve low resistance and favorable elevated temperature durability, by inhibiting a micro short circuit that occurs in the non-aqueous alkali metal electricity storage element by using an alkali metal compound other than a positive electrode active material for a positive electrode precursor.

Further, in one embodiment, an object of the present invention is to provide a method for producing a non-aqueous alkali metal electricity storage element that can inhibit a micro short circuit of the obtained non-aqueous alkali metal battery, reduce a resistance thereof, and enhance elevated temperature durability thereof.

Solution to Problem

The present inventors have found, as a result of diligently and repeatedly carrying out experimentation in order to solve the aforementioned problems, that efficient doping of negative electrode with alkali metal ions and inhibition of micro short circuit were achieved in the production of a non-aqueous alkali metal electricity storage element, by pressurizing and heating the cell before or during a doping step and controlling a voltage and current during the doping step, to enable to provide a non-aqueous alkali metal electricity storage element having excellent input/output characteristics and excellent durability against high load charge/discharge cycles at elevated temperatures, and the present inventors have thus completed the present invention.

Moreover, in one embodiment, the present inventors have found that production efficiency of an alkali metal electricity storage element precursor can be improved, and the micro short circuit ratio of the non-aqueous alkali metal electricity storage element can be reduced to improve durability thereof, by depressurizing the inside of a casing including a positive electrode precursor, a negative electrode, and a separator and injecting a non-aqueous electrolytic solution into the casing.

Further, in one embodiment, the present inventors have found that the above problems can be solved by drying the positive electrode precursor comprising the alkali metal compound other than the positive electrode active material by heating under reduced pressure or infrared heating in a drying furnace filled with a gas containing nitrogen as a main component.

One aspect of the present invention will be exemplified below.

[1]

A method for producing a non-aqueous alkali metal electricity storage element comprising a casing, and a positive electrode, a negative electrode, a separator, and a non-aqueous electrolytic solution, housed in the casing, comprising a housing step of housing a positive electrode precursor, the negative electrode, and the separator in the casing;

a solution injection step of injecting the non-aqueous electrolytic solution into the casing to obtain a non-aqueous alkali metal electricity storage element precursor;

a voltage application step of applying a voltage to the non-aqueous alkali metal electricity storage element precursor; and a completion step of obtaining a non-aqueous alkali metal electricity storage element from the non-aqueous alkali metal electricity storage element precursor; wherein the positive electrode precursor has a positive electrode current collector and a positive electrode active material layer disposed on one side or both sides of the positive electrode current collector, and the positive electrode active material layer comprises a positive electrode active material and an alkali metal compound other than the positive electrode active material, the negative electrode has a negative electrode current collector and a negative electrode active material layer disposed on one side or both sides of the negative electrode current collector, and the negative electrode active material layer comprises a negative electrode active material that enables to intercalate and release alkali metal ions, the non-aqueous electrolytic solution comprises the alkali metal ions, the alkali metal compound oxidatively decomposes by the voltage application step to release the alkali metal ions into the non-aqueous electrolytic solution, and the negative electrode active material intercalates the alkali metal ions by the voltage application step, and wherein (1) a pressurization step of pressurizing the non-aqueous alkali metal electricity storage element precursor from outside at 0.1 kgf/cm$^2$ or more and 1,000 kgf/cm$^2$ or less is carried out before the voltage application step or during the voltage application step, (2) a heating step of heating the non-aqueous alkali metal electricity storage element precursor to adjust a temperature of the casing to 30° C. or higher and 70° C. or lower is carried out before the voltage application step or during the voltage application step, (3) in the voltage application step, after constant current charge of the non-aqueous alkali metal electricity storage element precursor is carried out, constant voltage charge of the non-aqueous alkali metal electricity storage element precursor is carried out, (4) a C rate of the constant current charge is 1.0 to 100.0 times as large as an electric discharging capacity (Ah) of the non-aqueous alkali metal electricity storage element after the completion step, and (5) a voltage value of the constant voltage charge is 4.20 V or more.

[2]

The method for producing a non-aqueous alkali metal electricity storage element according to [1], wherein the C rate of the constant current charge is 1 to 30 times as large as the electric discharging capacity (Ah) of the non-aqueous alkali metal electricity storage element after the completion step.

[3]

The method for producing a non-aqueous alkali metal electricity storage element according to [1] or [2], wherein the voltage value of the constant voltage charge is 4.40 V or more and 4.80 V or less.

[4]

The method for producing a non-aqueous alkali metal electricity storage element according to any one of [1] to [3], wherein time spent for the constant voltage charge is 0.25 hours or more and 24 hours or less.

[5]

The method for producing a non-aqueous alkali metal electricity storage element according to any one of [1] to [4], wherein time spent for the constant voltage charge is 0.5 hours or more and 4 hours or less.

[6]

The method for producing a non-aqueous alkali metal electricity storage element according to any one of [1] to [5], wherein the pressurization step is carried out by using a pressurizing jig, and the heating step is carried out by using a thermostatic bath.

[7]

The method for producing a non-aqueous alkali metal electricity storage element according to any one of [1] to [6], wherein the positive electrode is formed from the positive electrode precursor in the voltage application step.

[8]

The method for producing a non-aqueous alkali metal electricity storage element according to any one of [1] to [7], wherein the solution injection step is carried out by adjusting an internal pressure of the casing to −5 kPa to −101.32 kPa based on the atmospheric pressure.

[9]

The method for producing a non-aqueous alkali metal electricity storage element according to [8], wherein the internal pressure of the casing is adjusted to −10 kPa to −101.30 kPa based on atmospheric pressure in the solution injection step.

[10]

The method for producing a non-aqueous alkali metal electricity storage element according to [8] or [9], wherein the internal pressure of the casing is adjusted to −50 kPa to −101.00 kPa based on the atmospheric pressure in the solution injection step.

[11]

The method for producing a non-aqueous alkali metal electricity storage element according to any one of [8] to [10], wherein a temperature of the non-aqueous electrolytic solution is 15° C. to 45° C. in the solution injection step.

[12]

The method for producing a non-aqueous alkali metal electricity storage element according to any one of [8] to [11], wherein a pressure of 0.05 kgf/cm$^2$ or more to 500 kgf/cm$^2$ or less is applied to the casing from outside thereof before the solution injection step or in the solution injection step.

[13]

The method for producing a non-aqueous alkali metal electricity storage element according to any one of [8] to [12], comprising
after the solution injection step,
(a1) a re-depressurization step of adjusting an internal pressure of the casing in an opened state to −50 kPa to −100.00 kPa based on the atmospheric pressure, and
(a2) a restoration step of returning an internal pressure of the casing in an opened state to the atmospheric pressure.

[14]

The method for producing a non-aqueous alkali metal electricity storage element according to any one of [8] to [13], wherein impregnating the positive electrode precursor, the negative electrode, and the separator with the non-aqueous electrolytic solution is carried out, during the solution injection step or after the solution injection step, to obtain the non-aqueous alkali metal electricity storage element precursor.

[15]

The method for producing a non-aqueous alkali metal electricity storage element according to [14], wherein comprising
after the solution injection step,
a doping step of applying a voltage to the non-aqueous alkali metal electricity storage element precursor to form the positive electrode from the positive electrode precursor by decomposition of the alkali metal compound, and to dope the negative electrode with the alkali metal ions;
an aging step of subjecting the non-aqueous alkali metal electricity storage element precursor to aging;
a gas venting step of removing a gas from the non-aqueous alkali metal electricity storage element precursor; and
a sealing step of sealing the non-aqueous alkali metal electricity storage element precursor.

[16]

The method for producing a non-aqueous alkali metal electricity storage element according to any one of [1] to [15], comprising a charge/discharge cycle step of charging and discharging the non-aqueous alkali metal electricity storage element precursor, wherein
the charge/discharge cycle step comprises steps of
heating the non-aqueous alkali metal electricity storage element precursor to a temperature of 30° C. or higher and 100° C. or lower and
carrying out the charge/discharge within a range of an upper limit voltage and a lower limit voltage, and wherein
the upper limit voltage is 3.8V or more and 4.8V or less, and
the lower limit voltage is 1.5V or more and 3.5V or less.

[17]
The method for producing a non-aqueous alkali metal electricity storage element according to [16], wherein heating the non-aqueous alkali metal electricity storage element precursor to a temperature of 35° C. or higher and 85° C. or lower in the charge/discharge cycle step.

[18]
The method for producing a non-aqueous alkali metal electricity storage element according to [16] or [17], wherein heating the non-aqueous alkali metal electricity storage element precursor to a temperature of 35° C. or higher and 75° C. or lower in the charge/discharge cycle step.

[19]
The method for producing a non-aqueous alkali metal electricity storage element according to any one of [16] to [18], wherein the upper limit voltage is 4.0 V or more and 4.7 V or less.

[20]
The method for producing a non-aqueous alkali metal electricity storage element according to any one of [16] to [19], wherein the upper limit voltage is 4.1 V or more and 4.6 V or less.

[21]
The method for producing a non-aqueous alkali metal electricity storage element according to any one of [16] to [20], wherein the lower limit voltage is 1.6 V or more and 3.4 V or less.

[22]
The method for producing a non-aqueous alkali metal electricity storage element according to any one of [16] to [21], wherein the lower limit voltage is 1.7 V or more and 3.3 V or less.

[23]
The method for producing a non-aqueous alkali metal electricity storage element according to any one of [16] to [22], wherein the non-aqueous alkali metal electricity storage element precursor is preliminarily pressurized from outside at a pressure of 0.1 kgf/cm$^2$ or more and 1,000 kgf/cm$^2$ in the charge/discharge cycle step.

[24]
The method for producing a non-aqueous alkali metal electricity storage element according to any one of [16] to [23], wherein when charge and discharge are carried out as one cycle, the number of cycles is 1 or more and 10 or less in the charge/discharge cycle step.

[25]
The method for producing a non-aqueous alkali metal electricity storage element according to [24], wherein the number of cycles is 2 or more and 8 or less.

[26]
The method for producing a non-aqueous alkali metal electricity storage element according to any one of [1] to [25], comprising an elevated temperature aging step of heating the non-aqueous alkali metal electricity storage element precursor, wherein the elevated temperature aging step comprises:
a high voltage storage step of adjusting a voltage of the non-aqueous alkali metal electricity storage element precursor to 4.03 V or more and 5.0 V or less, and then storing the non-aqueous alkali metal electricity storage element precursor at a temperature of 45° C. or higher and 100° C. or lower.

[27]
The method for producing a non-aqueous alkali metal electricity storage element according to [26], wherein the non-aqueous alkali metal electricity storage element precursor is stored at a temperature of 50° C. or higher and 85° C. or lower in the high voltage storage step.

[28]
The method for producing a non-aqueous alkali metal electricity storage element according to [26] or [27], wherein the non-aqueous alkali metal electricity storage element precursor is stored at a temperature of 55° C. or higher and 75° C. or lower in the high voltage storage step.

[29]
The method for producing a non-aqueous alkali metal electricity storage element according to any one of [26] to [28], wherein the non-aqueous alkali metal electricity storage element precursor is stored in the high voltage storage step by adjusting a voltage of the non-aqueous alkali metal electricity storage element precursor to 4.05 V or more and 4.8 V or less.

[30]
The method for producing a non-aqueous alkali metal electricity storage element according to any one of [26] to [29], wherein the non-aqueous alkali metal electricity storage element precursor is stored in the high voltage storage step by adjusting a voltage of the non-aqueous alkali metal electricity storage element precursor to 4.1 V or more and 4.5 V or less.

[31]
The method for producing a non-aqueous alkali metal electricity storage element according to any one of [26] to [30], wherein
the elevated temperature aging step further comprises
a low voltage storage step of adjusting a voltage of the non-aqueous alkali metal electricity storage element precursor to 1.5 V or more and 2.8 V or less, and then storing the non-aqueous alkali metal electricity storage element precursor at a temperature of 45° C. or higher and 100° C. or lower.

[32]
The method for producing a non-aqueous alkali metal electricity storage element according to [31], wherein the non-aqueous alkali metal electricity storage element precursor is stored at a temperature of 50° C. or higher and 85° C. or lower in the low voltage storage step.

[33]
The method for producing a non-aqueous alkali metal electricity storage element according to [31] or [32], wherein the non-aqueous alkali metal electricity storage element precursor is stored at a temperature of 55° C. or higher and 75° C. or lower in the low voltage storage step.

[34]
The method for producing a non-aqueous alkali metal electricity storage element according to any one of [31] to [33], wherein the non-aqueous alkali metal electricity storage element precursor is stored in the low voltage storage step by adjusting a voltage of the non-aqueous alkali metal electricity storage element precursor to 1.6 V or more and 2.7 V or less.

[35]
The method for producing a non-aqueous alkali metal electricity storage element according to any one of [31] to [34], wherein the non-aqueous alkali metal electricity storage element precursor is stored in the low voltage storage step by adjusting a voltage of the non-aqueous alkali metal electricity storage element precursor to 1.7 V or more and 2.5 V or less.

[36]
The method for producing a non-aqueous alkali metal electricity storage element according to any one of [26] to [35], wherein the non-aqueous alkali metal electricity storage element precursor is preliminarily pressurized from outside at a pressure of 0.1 kgf/cm$^2$ or more and 1,000 kgf/cm$^2$ or less in the elevated temperature aging step.

[37]

The method for producing a non-aqueous alkali metal electricity storage element according to any one of [1] to [36], comprising:
- a step of disposing the positive electrode active material layer on one side or both sides of the positive electrode current collector to provide the positive electrode precursor, wherein the positive electrode active material layer comprises the positive electrode active material, the alkali metal compound, a binder comprising a water-soluble polymer and a solvent, and the positive electrode active material comprises a carbon material; and
- a drying step of heating the positive electrode precursor by heating under reduced pressure or infrared heating, to reduce an amount of a solvent in the positive electrode active material layer.

[38]

The method for producing a non-aqueous alkali metal electricity storage element according to [37], wherein
the drying step is carried out by heating under reduced pressure, a temperature of the heating under reduced pressure is 50° C. or higher and 200° C. or lower, and the heating time is 1 hour or longer and 24 hours or shorter.

[39]

The method for producing a non-aqueous alkali metal electricity storage element according to [37] or [38], wherein
the drying step is carried out by heating under reduce pressure, and an atmospheric pressure in the heating under reduced pressure is 10$^{-5}$ Pa or more and 1,000 Pa or less.

[40]

The method for producing a non-aqueous alkali metal electricity storage element according to [37], wherein
the drying step is carried out by infrared heating, a temperature of the infrared heating is 80° C. or higher and 200° C. or lower, and
the heating time is 1 minute or longer and 5 minutes or shorter.

[41]

The method for producing a non-aqueous alkali metal electricity storage element according to [37] or [40], wherein
carrying out the drying step by infrared heating, and
further comprising a winding step of winding up the positive electrode precursor after the infrared heating.

[42]

The method for producing a non-aqueous alkali metal electricity storage element according to [41], wherein a tension of the positive electrode precursor in the winding step is 0.050 N/mm or more and 1.5 N/mm or less in the mechanical direction.

[43]

The method for producing a non-aqueous alkali metal electricity storage element according to any one of [37] to [42], wherein the solvent comprises water, and the drying step is carried out so that an amount of the solvent comprised in the positive electrode active material layer is reduced to 7.0% by weight or less based on a total weight of the positive electrode active material layer.

[44]

The method for producing a non-aqueous alkali metal electricity storage element according to any one of [1] to [36], being a step of disposing the positive electrode active material layer on one side or both sides of the positive electrode current collector to provide the positive electrode precursor, wherein comprising
- a step of comprising the positive electrode active material, the alkali metal compound, a binder, and a solvent in the positive electrode active material layer and comprising a carbon material in the positive electrode active material;
- a drying step of heating the positive electrode precursor by infrared heating in a drying furnace filled with a gas comprising nitrogen as a main component to reduce an amount of the solvent comprised in the positive electrode active material layer; and
- a winding step of winding up the positive electrode precursor.

[45]

The method for producing a non-aqueous alkali metal electricity storage element according to [44], wherein
a temperature inside the drying furnace is 100° C. or higher and 300° C. or lower, and
a time of the heating is 1 minute or longer and 5 minutes or shorter.

[46]

The method for producing a non-aqueous alkali metal electricity storage element according to [44] or [45], wherein the drying furnace has an air flow therein for supplying and exhausting a gas comprising nitrogen as a main component, and a velocity of the air flow is 10 cm$^3$/min or more and 1,000 cm$^3$/min or less.

[47]

The method for producing a non-aqueous alkali metal electricity storage element according to any one of [44] to [46], wherein an oxygen concentration in the drying furnace is less than 1,500 ppm.

[48]

The method for producing a non-aqueous alkali metal electricity storage element according to any one of [44] to [47], wherein a tension of the positive electrode precursor in the winding step is 0.050 N/mm or more and 1.5 N/mm or less in the mechanical direction.

[49]

The method for producing a non-aqueous alkali metal electricity storage element according to any one of [44] to [48], wherein the solvent comprises an organic solvent, and the drying step is carried out so that an amount of the solvent in the positive electrode active material layer is reduced to 0.10% by weight or more and 10% by weight or less based on a total weight of the positive electrode active material layer.

[50]

The method for producing a non-aqueous alkali metal electricity storage element according to any one of [1] to [49], wherein the non-aqueous electrolytic solution comprises a non-aqueous solvent and an alkali metal salt.

[51]

The method for producing a non-aqueous alkali metal electricity storage element according to any one of [1] to [50], wherein the alkali metal compound is a carbonate, a hydroxide or an oxide, of an alkali metal.

[52]

The method for producing a non-aqueous alkali metal electricity storage element according to [51], wherein the alkali metal is lithium.

[53]

The method for producing a non-aqueous alkali metal electricity storage element according to [51] or [52], wherein the alkali metal compound is at least one selected from the group consisting of lithium carbonate, sodium carbonate and potassium carbonate.

[54]

The method for producing a non-aqueous alkali metal electricity storage element according to any one of [1] to [53], wherein the positive electrode current collector is a non-porous aluminum foil.

[55]

The method for producing a non-aqueous alkali metal electricity storage element according to any one of [1] to [54], wherein the non-aqueous alkali metal electricity storage element is a non-aqueous lithium electricity storage element.

Moreover, other aspects of the present invention are exemplified below.

[56]

A method for producing a non-aqueous alkali metal electricity storage element comprising a charge/discharge cycle step of charging and discharging a non-aqueous alkali metal electricity storage element precursor provided with a positive electrode precursor, a negative electrode, a separator, and a non-aqueous electrolytic solution, wherein the positive electrode precursor has a positive electrode current collector and a positive electrode active material layer on one side or both sides of the positive electrode current collector, and the positive electrode active material layer has a positive electrode active material and an alkali metal compound other than the positive electrode active material, the negative electrode has a negative electrode current collector and a negative electrode active material layer on one side or both sides of the negative electrode current collector, the negative electrode active material layer has a negative electrode active material that can intercalates and releases alkali metal ions, and the non-aqueous electrolytic solution comprises the alkali metal ions, wherein
the charge/discharge cycle step comprises steps of
heating the non-aqueous alkali metal electricity storage element precursor to a temperature of 30° C. or higher and 100° C. or lower by means of heating, and
carrying out the charge/discharge within a range of an upper limit voltage and a lower limit voltage, and wherein
the upper limit voltage is 3.8V or more and 4.8V or less, and
the lower limit voltage is 1.5V or more and 3.5V or less.

[57]

A method for producing a non-aqueous alkali metal electricity storage element comprising an elevated temperature aging step of heating a non-aqueous alkali metal electricity storage element precursor provided with a positive electrode precursor, a negative electrode, a separator, and a non-aqueous electrolytic solution, wherein
the positive electrode precursor has a positive electrode current collector and a positive electrode active material layer on one side or both sides of the positive electrode current collector, and the positive electrode active material layer has a positive electrode active material and an alkali metal compound other than the positive electrode active material,
the negative electrode has a negative electrode current collector and a negative electrode active material layer on one side or both sides of the negative electrode current collector, the negative electrode active material layer has a negative electrode active material that can intercalates and releases alkali metal ions, and the non-aqueous electrolytic solution comprises the alkali metal ions, and wherein
the elevated temperature aging step comprises
a high voltage storage step of adjusting a voltage of the non-aqueous alkali metal electricity storage element precursor to 4.03 V or more and 5.0 V or less, and then storing the non-aqueous alkali metal electricity storage element precursor at 45° C. or higher and 100° C. or lower.

[58]

A method for producing a positive electrode precursor, being a step of disposing a positive electrode active material layer on one or both sides of a positive electrode current collector to provide the positive electrode precursor, wherein comprising a step of comprising a positive electrode active material comprising a carbon material, an alkali metal compound other than an positive electrode active material, a binder, and a solvent in the positive electrode active material layer;
a drying step of heating the positive electrode precursor by infrared heating in a drying furnace filled with a gas comprising nitrogen as a main component to reduce an amount of solvent comprised in the positive electrode active material layer, and
a winding step of winding up the positive electrode.

[59]

A method for producing a positive electrode precursor, being a step of disposing a positive electrode active material layer on one or both sides of a positive electrode current collector to provide the positive electrode precursor, wherein comprising a step of comprising a positive electrode active material comprising a carbon material, an alkali metal compound other than the positive electrode active material, a binder comprising a water-soluble polymer, and a solvent in the positive electrode active material layer; and
a drying step of heating the positive electrode precursor by heating under reduced pressure or infrared heating to reduce an amount of solvent comprised in the positive electrode active material layer.

[60]

A method for producing a non-aqueous alkali metal electricity storage element comprising a casing, and a positive electrode, a negative electrode, a separator, and a non-aqueous electrolytic solution, housed in the casing, wherein comprising
a housing step of housing a positive electrode precursor, the negative electrode, and the separator in the casing;
a solution injection step of injecting the non-aqueous electrolytic solution into the casing to obtain a non-aqueous alkali metal electricity storage element precursor;
a voltage application step of applying a voltage to the non-aqueous alkali metal electricity storage element precursor; and
a completion step of obtaining a non-aqueous alkali metal electricity storage element from the non-aqueous alkali metal electricity storage element precursor; wherein
the positive electrode precursor has a positive electrode current collector and a positive electrode active material layer disposed on one side or both sides of the positive electrode current collector, and the positive electrode active material layer comprises a positive electrode active material and an alkali metal compound other than a positive electrode active material,
the negative electrode has a negative electrode current collector and a negative electrode active material layer disposed on one side or both sides of the negative electrode current collector, and the negative electrode active material layer comprises a negative electrode active material that can intercalate and release alkali metal ions, the non-aqueous electrolytic solution comprises the alkali metal ions, the alkali metal compound oxidatively decomposes by the voltage application step to release the alkali metal ions into the non-aqueous electrolytic solution, and the negative electrode active material intercalates the alkali metal ions by the voltage application step, and wherein (1) a pressurization step of pressurizing the non-aqueous alkali metal electricity storage element precursor from outside is carried out before the voltage application step or during the voltage application step, (2) a heating step of heating the non-aqueous alkali metal electricity storage element precursor is carried out before the voltage application step or during the voltage application step, (3) in the voltage application step, after constant current charge of the non-aqueous alkali metal electricity storage element precursor is carried out, constant voltage charge of the non-aqueous alkali metal electricity storage element precursor is carried out, (4) a C rate of the constant current charge is 1.0 to 100.0 times as large as an electric discharging capacity (Ah) of the non-aqueous alkali metal electricity storage element after the completion step, and (5) a voltage value of the constant voltage charge is 4.20 V or more.

[61]

A method for producing a non-aqueous alkali metal electricity storage element comprising a casing, and a positive electrode, a negative electrode, a separator, and a non-aqueous electrolytic solution, housed in the casing, wherein comprising a housing step of housing a positive electrode precursor, the negative electrode, and the separator in the casing; and a solution injection step of adjusting an inner pressure of the casing to −5 kPa to −101.32 kPa based on the atmospheric pressure and injecting the non-aqueous electrolytic solution into the casing, and wherein the positive electrode precursor has a positive electrode current collector and a positive electrode active material layer disposed on one side or both sides of the positive electrode current collector, and the positive electrode active material layer comprises a positive electrode active material and an alkali metal compound other than a positive electrode active material, the negative electrode has a negative electrode current collector and a negative electrode active material layer disposed on one side or both sides of the negative electrode current collector, and the negative electrode active material layer comprises a negative electrode active material that can intercalate and release alkali metal ions, and the non-aqueous electrolytic solution comprises the alkali metal ions.

Advantageous Effects of Invention

According to the present invention, a method for efficiently producing a non-aqueous alkali metal electricity storage element that inhibits occurrence of a micro short circuit in the production of the non-aqueous alkali metal electricity storage element and has excellent input/output characteristics as well as durability against a high load charge/discharge cycle at elevated temperatures, can be provided.

Moreover, in one embodiment, since improvement on decomposability of the alkali metal compound and an effect of eliminating uneven lithium doping for the negative electrode active material layer can be obtained in the doping step by injecting the non-aqueous electrolytic solution so as to render the inside of the casing of the alkali metal electricity storage element precursor under the atmospheric pressure in the solution injection step of the alkali metal electricity storage element precursor having the positive electrode precursor containing the alkali metal compound, therefore the micro short circuit of the alkali metal electricity storage element can be reduced, and both the excellent input/output characteristics and the elevated temperature durability can be achieved.

Moreover, in one embodiment, a method for producing a non-aqueous alkali metal electricity storage element that can inhibit a micro short circuit occurring in the non-aqueous alkali metal electricity storage element by using the alkali metal compound other than the positive electrode active material for the positive electrode precursor, and achieve low resistance and favorable elevated temperature durability, can be provided.

Moreover, in one embodiment, it is possible to improve efficiency of drying treatment of the positive electrode precursor to reduce a micro short circuit rate and electric resistance of the obtained non-aqueous alkali metal battery, and to improve the durability and safety.

Further, in one embodiment, a method for producing a non-aqueous alkali metal electricity storage element that can inhibit the micro short circuit of the obtained non-aqueous alkali metal electricity storage element, can be provided.

DESCRIPTION OF EMBODIMENTS

Details of the embodiment of the present invention (hereunder referred to as "the present embodiment") will be explained below and it is to be understood, however, that the invention is not limited to the embodiments below. The present invention can be modified within the scope that does not deviate from the gist of the present invention.

In the present description, the positive electrode material before the doping step is referred to as a "positive electrode precursor", and the positive electrode material after the doping step is referred to as a "positive electrode".

Moreover, in the present description, the electricity storage element material before the "gas venting and sealing step" is referred to as an "electricity storage element precursor", and the electricity storage element material after the "gas venting and sealing step" is referred to as "an electricity storage element".

Moreover, in the present description, the upper limits and lower limits of the range of various numerals can be arbitrarily combined with each other.

Further, "to" in the present description means that the numerical values described at both ends thereof are included as the upper limits and the lower limits unless otherwise specified.

A positive electrode precursor is used in the present embodiment. A non-aqueous alkali metal electricity storage element obtained by using this positive electrode precursor is generally provided with a positive electrode, a negative electrode, a separator, a non-aqueous electrolytic solution, and a casing as main components. As the non-aqueous electrolytic solution, for example, an organic solvent in which a lithium salt is dissolved is used.

<<Positive Electrode>>

The positive electrode has a positive electrode current collector and a positive electrode active material layer on one side or both sides thereof. Moreover, a positive electrode precursor before a doping step is characterized by containing an alkali metal compound. As will be described later, in the present embodiment, a negative electrode is preferably pre-doped with an alkali metal ion. The pre-doping method is preferred, for assembling an electricity storage element precursor by using the positive electrode precursor containing the alkali metal compound, the negative electrode, the separator, the casing, and the non-aqueous electrolytic solution, and then applying a voltage between the positive electrode precursor and the negative electrode. The alkali metal compound is preferably comprised in the positive electrode active material layer formed on the positive electrode current collector of the positive electrode precursor.

<Positive Electrode Active Material Layer>

The positive electrode active material layer comprises a positive electrode active material. Moreover, the positive electrode active material layer is characterized in that the alkali metal compound other than the positive electrode active material is comprised in the positive electrode active material layer of the positive electrode precursor.

[Positive Electrode Active Material]

The positive electrode active material preferably contains a carbon material. As the carbon material, carbon nanotubes, graphene, graphene oxide, a conductive polymer, or a porous carbon material (for example, activated carbon), are more preferably used, and activated carbon is further preferably used. Two or more types of the positive electrode active materials may be mixed for use, and a composite oxide of a material other than the carbon material, for example, lithium (Li), and a transition metal (lithium transition metal oxide), etc., may be used.

The content of the carbon material relative to the total amount of the positive electrode active material is preferably 50% by weight or more, and more preferably 60% by weight or more. The content of the carbon material can be 100% by weight, however, it is preferably for example, 95% by weight or less, or it may be 90% or less in order to obtain a satisfactory effect of combining other materials for use.

When the activated carbon is used as the positive electrode active material, there are no particular restrictions on a type of activated carbon or a starting material thereof. The fine pores of the activated carbon are preferably controlled to achieve both high input/output characteristics and high energy density. Specifically, when $V_1$ (cm$^3$/g) is a mesopore volume due to fine pores with diameters of 20 Å or larger and 500 Å or smaller (2.0 nm or larger and 50 nm or smaller) as calculated by the BJH method, and $V_2$ (cm 3/g) is a micropore volume due to fine pores with diameters of smaller than 20 Å (less than 2 nm) as calculated by the MP method, (1) in order to obtain high input/output characteristics, activated carbon satisfying $0.3<V_1\leq0.8$ and $0.5\leq V_2\leq1.0$ and having a specific surface area of 1,500 m$^2$/g or grater and 3,000 m$^2$/g or less as measured by the BET method (hereunder also referred to as "activated carbon 1") is preferred, and (2) in order to obtain high energy density, activated carbon satisfying $0.8<V_1\leq2.5$ and $0.8<V_2\leq3.0$ and having a specific surface area of 2,300 m$^2$/g or grater and 4,000 m$^2$/g or less as measured by the BET method (hereunder also referred to as "activated carbon 2"), is preferred.

Hereinafter, (1) activated carbon 1 and (2) activated carbon 2 will each be explained in order.

(1) Activated Carbon 1

The mesopore volume $V_1$ of activated carbon 1 is preferably larger than 0.3 cm$^3$/g, from the viewpoint of greater input/output characteristics when the positive electrode is incorporated into an electricity storage element. On the other hand, the mesopore volume $V_1$ of activated carbon 1 is preferably no greater than 0.8 cm$^3$/g from the viewpoint of minimizing reduction in the bulk density of the positive electrode. $V_1$ is more preferably 0.35 cm$^3$/g or greater and 0.7 cm$^3$/g or less and even more preferably 0.4 cm$^3$/g or greater and 0.6 cm$^3$/g or less.

The micropore volume $V_2$ of activated carbon 1 is preferably 0.5 cm$^3$/g or greater in order to increase the specific surface area of the activated carbon and to increase a capacity. On the other hand, from the viewpoint of reducing the bulk of the activated carbon, increasing the density as an electrode and increasing the capacity per unit volume, the micropore volume $V_2$ of the activated carbon 1 is preferably no greater than 1.0 cm$^3$/g. $V_2$ is more preferably 0.6 cm$^3$/g or greater and 1.0 cm$^3$/g or less and even more preferably 0.8 cm$^3$/g or greater and 1.0 cm$^3$/g or less.

The ratio of the mesopore volume $V_1$ to the micropore volume $V_2$ of activated carbon 1 ($V_1/V_2$) is preferably in the range of $0.3\leq V_1/V_2\leq0.9$. Namely, $V_1/V_2$ is preferably 0.3 or greater from the viewpoint of increasing the ratio of the mesopore volume to the micropore volume to a degree allowing reduction in the output characteristics to be minimized while maintaining high capacity. On the other hand, from the viewpoint of increasing the proportion of the micropore volume with respect to the mesopore volume to an extent allowing reduction in capacity to be minimized while maintaining high output characteristics, $V_1/V_2$ is preferably no greater than 0.9. The range of $V_1/V_2$ is more preferably $0.4\leq V_1/V_2\leq0.7$ and even more preferably $0.55\leq V_1/V_2\leq0.7$.

From the viewpoint of maximizing the output of the obtained electricity storage element, the mean fine pore diameter of activated carbon 1 is preferably 17 Å or greater (1.7 nm or greater), more preferably 18 Å or greater (1.8 nm or greater) and most preferably 20 Å or greater (2.0 nm or greater). From the viewpoint of maximizing the capacity, the mean fine pore diameter of activated carbon 1 is preferably no greater than 25 Å (no greater than 2.5 nm).

The BET specific surface area of activated carbon 1 is preferably 1,500 m$^2$/g or greater and 3,000 m$^2$/g or lower and more preferably 1,500 m$^2$/g or greater and 2,500 m$^2$/g or lower. When the BET specific surface area is 1,500 m$^2$/g or greater, satisfactory energy density is facilitated to be obtained. On the other hand, when the BET specific surface area is 3,000 m$^2$/g or lower there will be no need to add large amounts of a binder to maintain the strength of the electrode, and therefore the performance per volume of the electrode will be higher.

Activated carbon 1 can be obtained, for example, by using the starting material and treatment method described below.

In the present embodiment, the carbon source to be used as the starting material for activated carbon 1 includes, for example, plant-based starting materials, such as wood, wood dust, coconut shell, by-products of pulp production, bagasse and molasses, etc.; fossil-based starting materials, such as peat, lignite, brown coal, bituminous coal, anthracite, petroleum distillation residue components, petroleum pitch, coke, coal tar, etc.; various synthetic resins, such as a phenol resin, a vinyl chloride resin, a vinyl acetate resin, a melamine resin, a urea resin, a resorcinol resin, celluloid, an epoxy resin, a polyurethane resin, a polyester resin, a polyamide resin, etc.; synthetic rubbers, such as polybutylene, polybutadiene, polychloroprene, etc.; other synthetic wood or synthetic pulp materials, etc., and carbides thereof. From the viewpoint of suitability for mass-production and of cost, the starting materials preferred among them are plant-based starting materials, such as coconut shell and wood dust, etc., and carbides thereof, with coconut shell carbides being particularly preferred.

The system employed for carbonization and activation of these starting materials to obtain activated carbon 1 may be publicly known systems, such as a fixed bed system, moving bed system, fluidized bed system, slurry system or rotary kiln system.

The carbonization method for these starting materials includes a method in which inert gases, such as nitrogen, carbon dioxide, helium, argon, xenon, neon, carbon monoxide, a combustion exhaust gas, or a mixed gas composed mainly of such inert gases with other gases, are used for calcinating at about 400 to 700° C. (preferably 450 to 600° C.), over a period of about 30 minutes to 10 hours.

The activation method of the carbide obtained by such a carbonization method is preferably a gas activation method in which activating gases, such as water vapor, carbon dioxide, and oxygen, is used for calcination. A method using water vapor or carbon dioxide as the activating gas is preferred among them.

In this activation method, while the activating gas is supplied at a rate of 0.5 to 3.0 kg/h (preferably 0.7 to 2.0 kg/h), the temperature of the carbide is preferably raised to 800 to 1,000° C. for 3 to 12 hours (preferably 5 to 11 hours and even more preferably 6 to 10 hours), for activation.

Further, the carbide may be subjected to a primary activation prior to the activation treatment of the carbide. In the primary activation, a method of calcinating the carbon material at a temperature of below 900° C. by using an activating gas, such as water vapor, carbon dioxide or oxygen for gas activation, is usually preferred.

By appropriate combinations of the calcination temperature and calcination time for the carbonization method, and of the activating gas supply amount, temperature-elevating rate and maximum activation temperature in the activation method, it is possible to meet the conditions for producing activated carbon 1.

The mean particle diameter of activated carbon 1 is preferably 2 to 20 μm. When the mean particle diameter is 2 μm or greater, the capacity per electrode volume will tend to be higher due to facilitation of the higher density of the active material layer. A small mean particle diameter may lead to the disadvantage of low durability of the obtained positive electrode active material layer, but a mean particle diameter of at least 2 μm or greater will help avoid this disadvantage. A mean particle diameter of no greater than 20 μm, on the other hand, will tend to be more suitable for rapid charge/discharge. The mean particle diameter is more preferably 2 to 15 μm and even more preferably 3 to 10 μm.

(2) Activated Carbon 2

The mesopore volume $V_1$ of activated carbon 2 is preferably greater than 0.8 $cm^3/g$, from the viewpoint of the greater output characteristic when the positive electrode material is incorporated into an electricity storage element. On the other hand, $V_1$ is also preferably no greater than 2.5 $cm^3/g$ from the viewpoint of minimizing reduction in the capacity of the electricity storage element. $V_1$ is more preferably 1.00 $cm^3/g$ or greater and 2.0 $cm^3/g$ or less and even more preferably 1.2 $cm^3/g$ or greater and 1.8 $cm^3/g$ or less.

The micropore volume $V_2$ of activated carbon 2 is preferably greater than 0.8 $cm^3/g$ for a larger specific surface area of the activated carbon and an increase in the capacity. On the other hand, $V_2$ is also preferably no greater than 3.0 $cm^3/g$ to increase the density of activated carbon as an electrode, and to increase the capacity per unit volume. $V_2$ is more preferably greater than 1.0 $cm^3/g$ and no greater than 2.5 $cm^3/g$, and even more preferably 1.5 $cm^3/g$ or greater and 2.5 $cm^3/g$ or less.

Activated carbon 2 having the mesopore volume and micropore volume described above has a higher BET specific surface area than activated carbon used in conventional electrical double layer capacitors or lithium ion capacitors. The specific value of the BET specific surface area of activated carbon 2 is preferably 3,000 $m^2/g$ or greater and 4,000 $m^2/g$ or lower and more preferably 3,200 $m^2/g$ or greater and 3,800 $m^2/g$ or lower. When the BET specific surface area is 3,000 $m^2/g$ or greater, a satisfactory energy density is facilitated to be obtained. When the BET specific surface area is 4,000 $m^2/g$ or lower, on the other hand, there will be no need to add an enormous amount of a binder to maintain the strength of the electrode, and therefore the performance per volume of the electrode will be higher.

Activated carbon 2 can be obtained, for example, by using the starting material and treatment method described below.

The carbon source used as the starting material for activated carbon 2 includes, for example, plant-based starting materials, such as wood, wood dust, coconut shell; fossil-based starting materials, such as petroleum pitch, and coke; and various synthetic resins, such as a phenol resin, a furan resin, a vinyl chloride resin, a vinyl acetate resin, a melamine resin, a urea resin, and a resorcinol resin. Among these starting materials, the phenol resin and furan resin are particularly preferred, which are suitable for fabrication of activated carbon with a high specific surface area.

The system used for carbonization and activation of these starting materials to obtain activated carbon 2 may be publicly known systems, such as a fixed bed system, moving bed system, fluidized bed system, slurry system or rotary kiln system.

As the carbonization method of these starting materials, a method for using inert gases, such as nitrogen, carbon dioxide, helium, argon or a mixed gas composed mainly of such inert gases with other gases. The method for calcinating these starting materials at the carbonization temperature of about 400 to 700° C. over a period of about 0.5 to about 10 hours, is generally employed.

The activation method for the carbide obtained by such a carbonization method includes a gas activation method for calcinating a carbide by using activating gases, such as water vapor, carbon dioxide, and oxygen, or an alkali metal activation method for mixing an alkali metal compound and a carbide and then carrying out heating treatment thereof, however, the alkali metal activation method is preferred in order to fabricate activated carbon with a high specific surface area.

In the alkali metal activation method, after a carbide and an alkali metal compound such as KOH, NaOH, etc., are mixed so that the weight ratio is 1≤1 (the amount of the alkali metal compound is equal to or greater than the amount of the carbide), heat treatment is carried out in a range of 600 to 900° C. for 0.5 to 5 hours under an inert gas atmosphere. Then the alkali metal compound is cleaned with an acid or water and removed followed by drying of the carbide.

In order to increase the micropore volume and not increase the mesopore volume, the amount of carbide may be increased during activation, and mixed with KOH. In order to increase both the micropore volume and mesopore volume, a large amount of KOH may be used during activation. Moreover, in order to increase mainly the mesopore volume, steam-activation is preferably carried out after alkaline activation treatment.

The mean particle diameter of activated carbon 2 is preferably 2 μm or larger and 20 μm or smaller and more preferably 3 μm or larger and 10 μm or smaller.

Usage Form of Activated Carbon

Activated carbons 1 and 2 may each be a single type of activated carbon, or a mixture of two or more different types of activated carbons, such that the mixture as a whole exhibit the characteristic values described above.

Either of activated carbon 1 or 2 may be used as the positive electrode active material, or both in admixture may be used as the positive electrode active material.

The positive electrode active material may include materials other than activated carbons 1 and 2 (for example, activated carbon without the $V_1$ and/or $V_2$ in the above preferred range, or materials other than activated carbon (such as a composite oxide of lithium and a transition metal, etc.). The content of activated carbon 1, the content of activated carbon 2, or the total content of activated carbons 1 and 2 each is preferably greater than 50% by weight of the whole positive electrode material, more preferably 70% by weight or more, and still more preferably 90% by weight or more, and most preferably 100% by weight.

Lithium Transition Metal Oxide

The lithium transition metal oxide contains a transition metal oxide that enables to intercalate and release lithium ions. The transition metal oxide comprised as the positive electrode active material as necessary, includes, for example, oxides containing at least one element selected from the group consisting of cobalt (Co), nickel (Ni), manganese (Mn), iron (Fe), vanadium (V), and chromium (Cr).

The transition metal oxide includes, specifically, compounds represented by the formulae:

$Li_xCoO_2$ wherein, in the formula, x satisfies $0 \leq x \leq 1$ $Li_xNiO_2$ wherein, in the formula, x satisfies $0 \leq x \leq 1$ $Li_xNi_yM_{(1-y)}O_2$ wherein, in the formula, M is at least one element selected from the group consisting of Co, Mn, aluminum (Al), Fe, Mg and titanium (Ti), x satisfies $0 \leq x \leq 1$, and y satisfies $0.02 < y < 0.97$, $Li_xNi_{1/3}Co_{1/3}Mn_{1/3}O_2$ wherein in the formula, x satisfies $0 \leq x \leq 1$ $Li_xMnO_2$ wherein, in the formula, x satisfies $0 \leq x \leq 1$, α-$Li_xFeO_2$ wherein, in the formula, x satisfies $0 \leq x \leq 1$ $Li_xVO_2$ wherein, in the formula, x satisfies $0 \leq x \leq 1$ $Li_xCrO_2$ wherein, in the formula, x satisfies $0 \leq x \leq 1$ $Li_xFePO_4$ wherein, in the formula, x satisfies $0 \leq x \leq 1$ $Li_xMnPO_4$ wherein, in the formula, x satisfies $0 \leq x \leq 1$ $Li_xV_2(PO_4)_3$ wherein, in the formula, x satisfies $0 \leq x \leq 3$, $Li_xMn_2O_4$ wherein, in the formula, x satisfies $0 \leq x \leq 1$, $Li_xM_yMn_{(2-y)}O_4$ wherein, in the formula, M is at least one element selected from the group consisting of Co, Mn, Al, Fe, Mg and Ti, x satisfies $0 \leq x \leq 1$, and y satisfies $0.02 < y < 0.97$, $Li_xNi_aCo_bAl_{(1-a-b)}O_2$ wherein, in the formula, x satisfies $0 \leq x \leq 1$, a satisfies $0.02 < a < 0.97$ and b satisfies $0.02 < b < 0.97$, and $Li_xNi_cCo_dMn_{(1-c-d)}O_2$ wherein, in the formula, x satisfies $0 \leq x \leq 1$, c satisfies $0.02 < c < 0.97$, and d satisfies $0.02 < d < 0.97$. Among these compounds, from the viewpoints of high capacity, low resistance, cycle characteristics, promotion of decomposition of alkali metal compounds, and inhibition of sliding off of the positive electrode active material during pre-doping, the compounds represented by $Li_xNi_aCo_bAl_{(1-a-b)}O_2$, $Li_xNi_cCo_dMn_{(1-c-d)}O_2$, $Li_xCoO_2$, $Li_xMn_2O_4$, $Li_xFePO_4$, $Li_xMnPO_4$ or $Li_xV_2(PO_4)_3$ are preferred.

In the present embodiment, if an alkali metal compound different from than the positive electrode active material is contained in the positive electrode coating solution, the alkali metal compound becomes a dopant source of the alkali metal in doping step to enable to pre-dope the negative electrode, and even if lithium ions are not preliminarily contained (i.e., even if x=0 in the above formulae) in the transition metal compound, electrochemical charge and discharge can be carried out as a non-aqueous alkali metal electricity storage element.

The mean particle diameter of the lithium transition metal oxide is preferably 0.1 to 20 μm, more preferably 0.5 to 15 μm, and still more preferably 1 to 10 μm, When the mean particle diameter of the lithium transition metal oxide is 0.1 μm or more, the capacity per electrode volume tends to be increased due to the high density of the obtained positive electrode active material layer. Here, an excessively small mean particle diameter may lead to the disadvantage of lower durability of the obtained positive electrode active material layer, but a mean particle diameter of 0.1 μm or larger will help avoid such disadvantage. On the other hand, the mean particle diameter of 20 μm or less tends to facilitate adaption for rapid charge/discharge.

The mean particle diameter of the lithium transition metal oxide is preferably smaller than the mean particle diameter of the carbon material. If the mean particle diameter of the lithium transition metal oxide is small, the lithium transition metal oxide can be arranged in a void formed by the carbon material having a relatively larger mean particle diameter, which enables to lower the resistance.

The lithium transition metal oxide may be a single type or a mixture of two or more types of materials, or such that the mixture as a whole exhibit the characteristic values described above.

The positive electrode active material may include a material other than the aforementioned lithium transition metal oxide, for example, a conductive polymer, etc.

When the content of the lithium transition metal oxide occupied in the whole solid content of the positive electrode coating solution is $A_2$, $A_2$ is preferably 5% by weight or more and 35% by weight or less and more preferably 10% by weight or more and 30% by weight or less.

The ratio of the content of the aforementioned lithium transition metal oxide $A_2$ to the content of the aforementioned carbon material $A_1$ ($A_2/A_1$) is preferably 0.1 or more and 10.0 or less and more preferably 0.2 or more and 5.0 or less. When $A_2/A_1$ is 0.1 or greater, the bulk density of the obtained positive electrode active material layer is increased, and the increased capacity can be obtained. When $A_2/A_1$ is 10.0 or less, the resistance can be reduced due to the high electron conduction between activated carbons, and decomposition of the alkali metal compound can be promoted due to increase in the contact area between the activated carbon and the alkali metal compound.

[Alkali Metal Compound]

In the present embodiment, the alkali metal compound is a compound other that the positive electrode active material. The alkali metal compound may be at least one compound selected from the group consisting of lithium carbonate, sodium carbonate, potassium carbonate, rubidium carbonate, cesium carbonate, lithium oxide, lithium hydroxide, lithium fluoride, lithium chloride, lithium bromide, lithium iodide, lithium nitride, lithium oxalate and lithium acetate. Such alkali metal compounds are decomposed in the positive electrode precursor to release cations and reduced in the negative electrode to enable to pre-dope the negative electrode with alkali metal ions, and therefore the alkali metal compounds are preferably at least one selected from the group consisting of lithium carbonate, sodium carbonate, potassium carbonate, rubidium carbonate, and cesium carbonate, and more preferably at least one selected from the group consisting of lithium carbonate, sodium carbonate, and potassium carbonate. Among them, lithium carbonate is favorably used from the viewpoint of the high capacity thereof per unit weight. One type or two or more types of alkali metal compounds may be contained in the positive electrode coating solution.

From the energy density point of view, the lithium compound is desired among the alkali metal compounds. Lithium compounds, such as lithium carbonate, lithium oxide and lithium hydroxide are preferred, and lithium carbonate is particularly preferred from the viewpoint of the handleability in air, low hygroscopicity, or production facilitation.

Moreover, in the present embodiment, the positive electrode active material layer may contain at least one type of alkali metal compound, and it may also contain one or more from among the compounds represented by the following formulae: oxides such as $M_2O$, hydroxides such as MOH, halides such as MF or MCl, and carboxylates such as RCOOM, wherein in the formula, R is H, an alkyl group or an aryl group, etc., where M is one or more elements selected from among Li, sodium (Na), potassium (K), rubidium (Rb), and cesium (Cs). Moreover, in the present embodiment, the positive electrode active material layer may contain at least one alkaline earth metal carbonate selected from the group consisting of $BeCO_3$, $MgCO_3$, $CaCO_3$, $SrCO_3$, and $BaCO_3$. Further, in the present embodiment, the positive electrode active material layer may also contain one or more of alkaline earth metal oxides, alkaline earth metal hydroxides, alkaline earth metal halides, and alkaline earth metal carboxylates.

A weight ratio $A_3$ of the alkali metal compound occupied in the positive electrode active material layer of the positive electrode precursor is preferably 10% by weight or more and 50% by weight or less. If $A_3$ is 10% by weight or more, the negative electrode can be pre-doped with a sufficient amount of alkali metal ions, and the capacity of the non-aqueous alkali metal electricity storage element is increased. If $A_3$ is 50% by weight or less, the electron conduction in the positive electrode precursor can be enhanced, so that the alkali metal compound can be efficiently decomposed.

When the positive electrode precursor contains two or more types of alkali metal compounds or alkaline earth metal compounds, the positive electrode precursor is preferably fabricated so that the total amount of the alkali metal compound and the alkaline earth metal compound is 10% by weight or more and 50% by weight or less relative to the positive electrode active material layer of the positive electrode precursor.

[Optional Components of Positive Electrode Active Material Layer]

The positive electrode active material layer in the present embodiment may also contain optional components, such as a conductive filler, a binder, a dispersion stabilizer, a pH regulator, etc., if necessary, in addition to the positive electrode active material and the alkali metal compound.

The conductive filler includes a conductive carbonaceous material having higher conductivity than the positive electrode active material. As such a conductive filler, for example, Ketjen black, acetylene black, vapor grown carbon fibers, graphite, scaly graphite, carbon nanotubes, graphene, graphene oxide, and mixtures thereof are preferred. The mixed amount of conductive filler to the positive electrode active material layer of the positive electrode precursor is preferably 0 parts by weight or greater and 20 parts by weight or less and more preferably 1 parts by weight or greater and 15 parts by weight or less with respect to 100 parts by weight of the positive electrode active material. From the viewpoint of the high input, the conductive filler is preferably mixed with the positive electrode active material layer. When the mixing amount is 20 parts by weight or less, the content proportion of the positive electrode active material in the positive electrode active material layer becomes appropriate, and the energy density per volume of the positive electrode active material layer is ensured, which is preferred.

The binder, such as, for example, PVdF (polyvinylidene difluoride), PTFE (polytetrafluoroethylene), a polyimide, latex, a styrene-butadiene copolymer, fluororubber, an acrylic copolymer, a polyacrylic acid, a polyglutamic acid, etc., can be used. The amount of the binder for use is preferably 1 part by weight or more and 30 parts by weight or less, more preferably 3 parts by weight or more and 27 parts by weight or less, and still more preferably 5 parts by weight or more and 25 parts by weight or less with respect to 100 parts by weight of the positive electrode active material. When the amount of the binder is 1 part by weight or more, sufficient electrode strength is exhibited. When the amount of the binder is 30 parts by weight or less, on the other hand, high input/output characteristics are exhibited without preventing ion movement and diffusion in and from the positive electrode active material.

In one embodiment, the binder preferably contains a water-soluble polymer. The water-soluble polymer includes, for example, celluloses, such as carboxymethyl cellulose (CMC), methyl cellulose, ethyl cellulose, hydroxymethyl cellulose, hydroxypropyl methyl cellulose, and hydroxyethyl methyl cellulose; polycarboxylic acid-based compounds, such as polyacrylic acid and sodium polyacrylate; compounds having a vinylpyrrolidone structure, such as polyvinylpyrrolidone; polyacrylic amide, polyethylene oxide, polyvinyl alcohol, sodium alginate, xanthan gum, carrageenan, guar gum, agar, starch, etc. The amount of the binder is preferably 1 part by weight or more and 30 parts by weight or less, more preferably 3 parts by weight or more and 27 parts by weight or less, and still more preferably 5 parts by weight or more and 25 parts by weight or less with respect to 100 parts by weight of the positive electrode active material. When the amount of the binder is 1 part by weight or more, the electrode strength is increased. When the amount of the binder is 30 parts by weight or less, on the other hand, the input/output characteristics are enhanced without preventing ion movement and diffusion in and from the positive electrode active material. The binder is preferably carboxymethyl cellulose (CMC).

Moreover, in another embodiment, the binder, such as, for example, PVdF (polyvinylidene difluoride), PTFE (polytetrafluoroethylene), polyimide, latex, a styrene-butadiene copolymer, fluororubber, an acrylic copolymer, a polyacrylic acid, a polyglutamic acid, etc., can be preferably used. The amount of the binder for use is preferably 1 part by weight or more and 30 parts by weight or less, more preferably 3 parts by weight or more and 27 parts by weight or less, and still more preferably 5 parts by weight or more and 25 parts by weight or less with respect to 100 parts by weight of the positive electrode active material. When the amount of the binder is 1 part by weight or more, sufficient electrode strength is exhibited. When the amount of the binder is 30 parts by weight or less, on the other hand, high input/output characteristics are exhibited without preventing the ion movement and diffusion in and from the positive electrode active material. The binder is preferably PVdF (polyvinylidene difluoride).

The dispersion stabilizer, such as, for example, PVP (polyvinylpyrrolidone), PVA (polyvinyl alcohol), cellulose derivatives, etc., may be used. The amount of the dispersion stabilizer for use is preferably 0 parts by weight or greater and no greater than 10 parts by weight with respect to 100 parts by weight of the positive electrode active material. When the amount of dispersion stabilizer is no greater than 10 parts by weight, high input/output characteristics will be exhibited without preventing movement and diffusion of ions in and from the positive electrode active material.

When water is used as the solvent for the coating solution, the coating solution may become alkaline by adding an alkali metal compound, and therefore, a pH regulator may be added to the positive coating solution, as necessary. The pH regulator includes, for example, hydrogen halides, such as hydrogen fluoride, hydrogen chloride and hydrogen bromide, halogen oxoacids, such as hypochlorous acid, chlorous acid and chloric acid, carboxylic acids, such as formic acid, acetic acid, citric acid, oxalic acid, lactic acid, maleic acid and fumaric acid, sulfonic acids, such as methanesulfonic acid, benzenesulfonic acid and p-toluenesulfonic acid, and acids, such as nitric acid, sulfuric acid, phosphoric acid, boric acid and carbon dioxide.

<Positive Electrode Current Collector>

The material constituting the positive electrode current collector according to the present embodiment includes a material that has high electron conductivity and does not undergo deterioration elution into the electrolytic solution or reaction with the electrolyte or ion. The positive electrode current collector in the non-aqueous alkali metal electricity storage element is preferably a metal foil and more preferably an aluminum foil. The metal foil may be a common metal foil without ruggedness or through-holes, or it may be a metal foil having ruggedness formed by embossing, chemical etching, electrolytic deposition, blasting, etc., or it may be a metal foil having through-holes, such as an expanded metal, punching metal, etching foil, etc. From the viewpoint of the doping treatment to be described below, a nonporous aluminum foil is further preferred, and the surface thereof is particularly preferably roughened.

It is conjectured that in the drying step of the positive electrode precursor, by using the nonporous aluminum foil, heat conduction to the positive electrode active material layer is uniformly carried out and the drying spots of the solvent in the positive electrode active material layer can be inhibited, which leads to inhibition of the reaction spots (mottles) in the positive electrode surface of the alkali metal electricity storage element, improving the elevated temperature durability.

The thickness of the positive electrode current collector is preferably a thickness that enables to sufficiently maintain the shape and strength of the positive electrode, for example, 1 to 100 µm.

Further, an anchor layer containing a conductive material, such as graphite, scaly graphite, carbon nanotubes, graphene, Ketjen black, acetylene black, or vapor-grown carbon fibers is preferably arranged on the surface (for example, both sides) of the metal foil. The electrical conduction between the positive electrode current collector and the positive electrode active material can be improved by arranging the anchor layer, and the resistance can be lowered. The thickness of the anchor layer is preferably 0.1 µm or more and 5 µm or less per one side of the positive electrode current collector.

<<Production Method of Positive Electrode Precursor>>

The method for producing the positive electrode precursor of the present embodiment preferably includes a step of providing the positive electrode precursor and a drying step of drying the positive electrode precursor. Further, a winding step of winding up the positive electrode precursor is preferably included.

In the present embodiment, the positive electrode precursor can be produced by publicly known production techniques for electrodes of alkali metal batteries, for example, lithium ion batteries, electrical double layer capacitors, etc. The positive electrode precursor can be produced by disposing the positive electrode active material layer on one side or both sides of the positive electrode current collector. The positive electrode active material layer preferably contains a positive electrode active material containing a carbon material, an alkali metal compound other than the positive electrode active material, a binder, and a solvent. The binder preferably contains a water-soluble polymer. For example, the positive electrode active material and the alkali metal compound, the binder, as well as the other optional components that are used as necessary, may be dispersed and dissolved in a solvent (water or an organic solvent) to prepare a slurry-like coating solution (positive electrode coating solution), and one or both sides of the positive electrode current collector is coated with the coating solution to form a coating film, which is dried to obtain a positive electrode precursor. The obtained positive electrode precursor may be pressed to adjust the film thickness or bulk density of the positive electrode active material layer. An alternative method may also be used, in which the positive electrode active material and the alkali metal compound, as well as the other optional components used as necessary, are mixed in a dry state without using a solvent, and the obtained mixture is subjected to press molding, after which a conductive adhesive is used for attachment to the positive electrode current collector, or an alternative method in which the obtained mixture is hot-pressed on the positive electrode current collector to form a positive electrode active material layer, may be employed.

The coating solution of the positive electrode precursor may also be prepared by dry blending all or a portion of the various material powders containing the positive electrode active material, and then adding water or an organic solvent, and/or adding thereto a liquid or slurry-like substance containing a binder, dispersion stabilizer, or pH regulator dissolved or dispersed in them. Moreover, the coating solution may also be prepared by adding various material powders containing the positive electrode active material, to a liquid or slurry-like substance containing a binder, dispersion stabilizer, or pH regulator dissolved or dispersed in water or an organic solvent. The method of dry blending may be premixing in which, for example, a ball mill, etc., is used to premix the positive electrode active material and alkali metal compound, and a conductive filler if necessary, and the low-conductivity alkali metal compound is coated with the conductive material. This will facilitate the alkali metal compound to decompose in the positive electrode precursor in the doping step described below.

The solvent used in the coating solution of the positive electrode precursor may be water or an organic solvent. The organic solvent includes nitrogen-containing organic solvents, such as N-methylpyrrolidone, dimethylformamide, and dimethylacetamide; ketone solvents, such as acetone, methyl ethyl ketone, cyclohexanone, and methyl isobutyl ketone; ester-based solvents, such as ethyl acetate and butyl acetate; ether-based solvents, such as tetrahydrofuran and dioxane; and mixed solvents thereof. In one embodiment, the solvent preferably contains water, and it is more preferably water. As another embodiment, an organic solvent is preferably used as the solvent, and a nitrogen-containing organic solvent selected from the group consisting of N-methylpyrrolidone, dimethylformamide, and dimethylacetamide is preferred, and N-methylpyrrolidone is more preferred.

When preparing the coating solution of the positive electrode precursor, dispersing machines such as a homodisperser or multiscrew dispersing machine, planetary mixer, thin-film rotating-type high speed mixer, etc., may be suitably used. In order to obtain a coating solution in a satisfactorily dispersed state, it is preferred for the dispersion to be at a peripheral velocity of 1 m/s or greater and 50 m/s or less. The peripheral velocity of 1 m/s or greater is preferred because this will facilitate each material to satisfactorily dissolve or disperse. The peripheral velocity of no greater than 50 m/s is also preferred because each material will not be broken down by heat or shear force during dispersion, and reaggregation will not take place.

The degree of dispersion of the coating solution is preferably to a granularity of 0.1 m or greater and 100 μm or smaller, as measured with a fineness gauge. The upper limit for the degree of dispersion is more preferably to a granularity of no greater than 80 μm, and more preferably to a granularity of no greater than 50 μm. It is preferred when the granularity is 0.1 μm or greater, because the size will be no less than the particle diameter of each material powder containing the positive electrode active material, which can inhibit crushing of the materials during preparation of the coating solution. Further, when the granularity is no greater than 100 μm, there will be no clogging during discharge of the coating solution or formation of streaks in the coating film, etc., which allows more stable coating.

The viscosity ($\eta b$) of the coating solution of the positive electrode precursor is preferably 100 mPa·s or higher and 10,000 mPa·s or lower, and more preferably 500 mPa·s or higher and 7,000 mPa·s or lower, and still more preferably 1,000 mPa·s or higher and 4,000 mPa·s or lower. When the viscosity ($\eta b$) is 100 mPa·s or higher, liquid dripping during formation of the coating film will be inhibited, and the coating film width and thickness can be satisfactorily controlled. When it is no higher than 10,000 mPa·s, there will be less pressure loss in the flow channel of the coating solution when a coating machine is used, which facilitates stable coating to be carried out, and allows control to less than the prescribed coating film thickness.

Moreover, the TI value (thixotropy index value) of the coating solution is preferably 1.1 or greater, more preferably 1.2 or greater, and even more preferably 1.5 or greater. When the TI value is 1.1 or greater, the coating film width and thickness can be satisfactorily controlled.

In order to form a coating film of the positive electrode precursor, a coating machine, such as a die coater or comma coater, knife coater, gravure coating machine, etc., may be used. The coating film may be formed by monolayer coating or by multilayer coating. In the case of multilayer coating, the coating solution compositions may be adjusted so that the alkali metal compound content differs within each layer of the coating film. When the positive electrode current collector is coated with a coating film, multiple coating, intermittent coating, or multiple intermittent coating may be carried out. Moreover, a sequential coating in which one side of the positive electrode current collector may be coated and dried, and then the other surface may be coated and dried in sequence, may be carried out or double-sided simultaneous coating in which both sides of the positive electrode current collector may be simultaneously coated with the coating solution, may be carried out.

The coating speed is preferably 0.1 m/minute or faster and 100 m/minute or slower, more preferably 0.5 m/minute or faster and 70 m/minute or slower, and still more preferably 1 m/minute or faster and 50 m/minute or slower. When the coating speed is 0.1 m/minute or faster, stable coating will be possible. When it is 100 m/minute or slower, on the other hand, the coating precision can be adequately ensured.

[Primary Drying Step]

Drying of the coating film of the positive electrode precursor is preferably carried out with far infrared rays, near infrared rays, or hot air at 80° C. or higher, by preferably employing a drying method, such as hot air drying, infrared (IR) drying, etc. Drying of the coating film may be drying at a single temperature, or it may be drying while varying the temperature in different stages. Several drying methods may also be used in combination for drying. The drying temperature is preferably 25° C. or higher and 200° C. or lower, more preferably 40° C. or higher and 180° C. or lower, and still more preferably 50° C. or higher and 160° C. or lower. When the drying temperature is 25° C. or higher, it will be possible to adequately volatilize off the solvent in the coating film. When it is no higher than 200° C., on the other hand, it will be possible to reduce cracking of the coating film by rapid volatilization of the solvent or maldistribution of the binder by migration, and oxidation of the positive electrode current collector or positive electrode active material layer.

The residual solvent in the positive electrode precursor can further be reduced by secondary drying. The secondary drying is preferably carried out by a method such as hot air drying, infrared (IR) drying, drying under reduced pressure, etc., and more preferably far infrared rays drying, hot air drying, vacuum drying, etc. The secondary drying is preferably carried out by a method such as hot air drying, infrared (IR) drying, drying under reduced pressure, etc., and more preferably far infrared rays drying, hot air drying or vacuum drying. Further, in the secondary drying, several drying methods may also be used in combination for drying, and the drying may be drying at a single temperature, or it may be drying while varying the temperature in different stages. In the case of hot air drying or infrared (IR) drying, the roll-to-roll method saves the trouble of individually transporting long electrodes and improves mass productivity.

Moreover, since in infrared (IR) drying, the energy radiated from the heat source goes directly to the object to be dried, unlike the heat transfer through the atmosphere such as convection, drying can be efficiently carried out in a short time. Further, there is no need to fill the inside of the drying furnace with the air, facilitating the object to be dried to be prevented from oxidization thereof by filling an inert gas. From the viewpoint of preventing oxidation and removing elements of ignition and explosion, the oxygen concentration in the drying furnace is preferably maintained at less than 20% by supplying and exhausting an inert gas.

Moreover, in the case of drying under reduced pressure, the boiling point of the solvent is lowered, and the evaporation rate is accelerated in a reduced pressure environment. The degree of reduced pressure is preferably $10^{-5}$ Pa or more and 1,000 Pa or less, and more preferably 0.1 Pa or more and 10 Pa or less. If it is $10^{-5}$ Pa or more, the equipment cost can be inhibited. If it is 1,000 Pa or less, on the other hand, the boiling point of the solvent is lowered and the evaporation rate is sufficiently accelerated, so that the solvent can be dried efficiently.

The secondary drying temperature of the positive electrode precursor is preferably 60° C. or higher and 250° C. or lower, more preferably 65° C. or higher and 240° C. or lower, and still more preferably 70° C. or higher and 235° C. or lower. When the drying temperature is 60° C. or higher, the solvent remaining in the positive electrode active material layer can be efficiently reduced. When the drying temperature is 250° C. or lower, on the other hand, the sliding off of the positive electrode active material layer due to the embrittlement of the binder can be inhibited.

<Another Mode of Drying and Primary Drying: Case of Using Binder Containing Water-Soluble Polymer>

The drying and primary drying of the positive electrode precursor by using the binder containing the water-soluble polymer will be described below.

<Drying of Positive Electrode Precursor>

In the present embodiment, drying of the positive electrode precursor preferably comprises carrying out heating under reduced pressure or infrared heating for the positive electrode precursor. The drying step is preferably carried out by the heating under reduced pressure. The alkali metal electricity storage element having the positive electrode active material and the positive electrode precursor comprising an alkali metal compound other than the positive electrode active material as a alkali metal electricity storage element precursor, has a problem of a high micro short circuit rate and a low product yield. However, this problem is solved by carrying out the drying step of the present embodiment. The reason is not clear, and not bound by theory, however, when the positive electrode precursor has the alkali metal compound other than the positive electrode active material, the amount of impurities comprised in the alkali metal electricity storage element precursor is reduced by vacuum heating or infrared heating, resulting in inhibition of lithium precipitation on the negative electrode. Moreover, alkali metal compounds other than the positive electrode active material play a role as a binder that forms a favorable network between the active materials, which enables to inhibit deterioration and sliding off of the active material against a large drying load, such as elevated temperatures and/or long time. At least for the above reasons, the alkali metal electricity storage element having the low micro short circuit rate can be considered to be provided.

When the drying step is heating under reduced pressure, the residual solvent in the positive electrode active material layer can be efficiently reduced by reducing the pressure. If foreign substances adhere to the positive electrode precursor, it may cause a micro short circuit, however the foreign substances can be removed by reducing the pressure. In the case of heating under reduced pressure, the temperature is preferably 50° C. or higher, more preferably 50° C. or higher and 200° C. or lower, or 60° C. or higher and 200° C. or lower, and still more preferably 80° C. or higher and 200° C. or lower. When the drying temperature of the heating under reduced pressure is 50° C. or higher, the residual solvent in the vicinity of the alkali metal compound can be efficiently reduced. When the drying temperature of the heating under reduced pressure is 200° C. or lower, the sliding off of the positive electrode active material layer due to the embrittlement of the binder can be inhibited, and in particular the embrittlement of the alkali metal compound can be prevented, which is preferred in terms of improving the micro short circuit rate and improving the elevated temperature durability. The drying time of heating under reduced pressure is preferably 1 hour or longer and 24 hours or shorter, and if it is 1 hour or longer, foreign substances can be sufficiently removed. If the drying time of heating under reduced pressure is 24 hours or shorter, damage on the surface of the positive electrode precursor due to winding misalignment or deformation can be prevented. The atmospheric pressure in heating under reduced pressure is preferably $10^{-5}$ Pa or higher and 1,000 Pa or lower.

In the case of infrared heating, since it is almost unnecessary to employ a wind flow in the drying oven, an external force is unlikely to be applied, and there is extremely low risk of damage to the positive electrode precursor. In the case of infrared heating, the wind velocity in the drying oven may be, for example, 10 cm$^3$/min or less. Therefore, scratches and wrinkles on the electrode surface that can cause a micro short circuit, are unlikely to be produced. For the infrared heating, the drying temperature is preferably 80° C. or higher and 200° C. or lower. When the drying temperature of infrared heating is 80° C. or higher, the residual solvent in the vicinity of the alkali metal compound can be efficiently reduced. When the drying temperature of infrared heating is 200° C. or lower, the sliding off of the positive electrode active material layer due to the embrittlement of the binder can be more effectively inhibited. In particular the embrittlement of the alkali metal compound can be prevented, and therefore improvement on the micro short circuit rate of the non-aqueous alkaline electricity storage element and improvement on the elevated temperature durability can be realized. The drying time by infrared heating is preferably 1 minute or longer and 5 minutes or shorter, and if it is 1 minute or longer, the positive electrode precursor is sufficiently raised to a predetermined temperature, leading to efficient reduction of the residual solvent. If it is 5 minutes or shorter, the positive electrode active material layer is less likely to be denatured, which is also advantageous from the viewpoint of production efficiency. If the production efficiency is improved, the risk of foreign substances being mixed in that is one of the causes of micro short circuit, will be reduced.

When the solvent contains an organic solvent, the amount of the solvent contained in the positive electrode active material layer after the drying step is preferably 0.1% by weight or more and 10% by weight or less and more preferably 0.5% by weight or more and 6% by weight or less, based on the total weight of the positive electrode active material layer. When the amount of the solvent is 0.1% by weight or more, the positive electrode active material layer is less likely to peel off, and an appropriate strength can be maintained. When the amount of the solvent is 10% by weight or less, a favorable energy density can be obtained.

The dried positive electrode precursor is preferably stored in a dry environment with a dew point of −30° C. or lower in order to avoid adsorption of moisture in the atmosphere.

The drying step may be carried out only once or may be divided into a plurality of times. The drying step includes a primary drying step and a secondary drying step, and in the secondary drying step, the positive electrode precursor is preferably subjected to infrared heating in a drying furnace filled with a gas containing nitrogen as a main component.

[Primary Drying Step]

The primary drying of the positive electrode precursor is preferably carried out with far infrared rays, near infrared rays, or hot air at 80° C. or higher, preferably by employing a drying method, such as hot air drying or infrared (IR) drying.

The primary drying may be drying at a constant temperature, or it may be drying while varying the temperature in different stages. Several drying methods may also be used in combination for drying. The temperature in the drying furnace in the primary drying is preferably 25° C. or higher and 200° C. or lower, more preferably 40° C. or higher and 180° C. or lower, and still more preferably 50° C. or higher and 160° C. or lower. When the drying temperature is 25° C. or higher, the solvent in the coating film can be sufficiently volatilized off. When the temperature is 200° C. or lower, on the other hand, cracks in the coating film due to rapid volatilization of the solvent, maldistribution of the binder due to migration, and oxidation of the positive electrode current collector or positive electrode active material layer, can be inhibited.

The drying and primary drying of the positive electrode precursor by using the binder containing the water-soluble polymer as the binder has been described above.

<Further Another Mode of Drying and Primary Drying: Case of Containing Organic Solvent as Solvent>

The drying and primary drying of the positive electrode precursor containing an organic solvent as a solvent will be described below.

<Drying of Positive Electrode Precursor>

In the present embodiment, drying of the positive electrode precursor preferably comprises carrying out infrared heating for the positive electrode precursor in a drying furnace filled with a gas composed of nitrogen as a main component. The alkali metal electricity storage element having the positive electrode active material and the positive electrode precursor containing an alkali metal compound other than the positive electrode active material as an alkali metal electricity storage element precursor, has a high micro short circuit rate and a low product yield. However, the micro short circuit of the obtained non-aqueous alkali metal battery can be inhibited by carrying out the drying step of the present embodiment. The reason is not clear, and not bound by theory, however, when the positive electrode precursor has an alkali metal compound other than the positive electrode active material, the amount of impurities comprised in the alkali metal electricity storage element precursor is reduced by infrared heating, resulting in inhibition of lithium precipitation on the negative electrode. Moreover, alkali metal compounds other than the positive electrode active material also play a role as a binder that forms a favorable network between the active materials, which enables to inhibit embrittlement and sliding off of the active material against large drying loads, such as elevated temperatures and/or long time. At least for the above reasons, the micro short circuit rate of the alkali metal electricity storage element is considered to be reduced.

The temperature in the drying furnace in the drying step is preferably 100° C. or higher and 300° C. or lower, more preferably 150° C. or higher and 280° C. or lower, and still more preferably 200° C. or higher and 250° C. or lower. When the drying temperature is 100° C. or higher, the residual solvent in the vicinity of the alkali metal compound can be efficiently reduced. When the temperature is 300° C. or lower, on the other hand, the positive electrode active material layer is less likely to be denatured, and air supply and exhaust in the furnace can be sufficiently carried out. When the drying temperature is 100° C. or higher, the solvent remaining in the positive electrode active material layer can be efficiently reduced. When the drying temperature is 300° C. or lower, on the other hand, the sliding off of the positive electrode active material layer due to the embrittlement of the binder can be inhibited.

The drying time is preferably 1 minute or longer and 5 minutes or shorter, more preferably 1 minute or longer and 4 minutes or shorter, and still more preferably 1 minute or longer and 3 minutes or shorter. If the drying time is 1 minute or longer, the residual solvent in the vicinity of the alkali metal compound can be efficiently reduced. If it is 5 minutes or shorter, on the other hand, the positive electrode active material layer is less likely to be denatured, which is also advantageous from the viewpoint of production efficiency. If the production efficiency is improved, the risk of foreign substances being mixed in that is one of the causes of micro short circuit, can be reduced. Therefore, a non-aqueous alkali metal electricity storage element that furthermore inhibits micro short circuits and has excellent elevated temperature durability, can be provided.

The inside of the drying furnace is filled with a gas containing nitrogen as a main component. "Containing nitrogen as a main component" means that 50% by volume or more of the gas in the furnace is nitrogen. The gas containing nitrogen as a main component can inhibit oxidation of the positive electrode current collector and the positive electrode active material layer. The gas containing nitrogen as the main component may contain oxygen, however, the amount of oxygen is preferably smaller. When the gas contains oxygen, the oxygen concentration in the drying furnace is preferably less than 1,500 ppm, more preferably 1,300 ppm or less, and still more preferably 1,000 ppm or less. When the oxygen concentration of the gas is less than 1,500 ppm, the oxidation of the positive electrode current collector and the positive electrode active material layer can be further inhibited.

The drying furnace preferably has an air flow that supplies and exhausts a gas containing nitrogen as a main component. In this case, the velocity of the air flow is preferably 10 $cm^3$/min or more and 1,000 $cm^3$/min or less, more preferably 20 $cm^3$/min or more and 500 $cm^3$/min or less, and still more preferably 50 $cm^3$/min or more and 200 $cm^3$/min or less. When the velocity of the airflow is 10 $cm^3$/min or more, the gas evaporated from the positive electrode active material layer can be efficiently exhausted, which can inhibit the denaturation of the alkali metal compound. When the air velocity is 1,000 $cm^3$/min or less, the wind velocity in the drying furnace can be inhibited, so that the unevenness of the drying velocity generated on the surface of the positive electrode precursor can be reduced, which can enhance uniform decomposition of the alkali metal compound. Therefore, a non-aqueous alkali metal electricity storage element that further inhibits micro short circuit and is more excellent in elevated temperature durability, can be provided.

When the solvent contains an organic solvent, the amount of the solvent contained in the positive electrode active material layer after the drying step is preferably 0.1% by weight or more and 10% by weight or less and more preferably 0.5% by weight or more and 6% by weight or less based on the total weight of the positive electrode active material layer. When the amount of the solvent is 0.1% by weight or more, the positive electrode active material layer is less likely to peel off, and an appropriate strength can be maintained. When the amount of the solvent is 10% by weight or less, a favorable energy density can be obtained.

The dried positive electrode precursor is preferably stored in a dry environment with a dew point of −30° C. or lower in order to avoid adsorption of moisture in the atmosphere.

The drying step may be carried out only once or may be divided into a plurality of times. The drying step comprises a primary drying step and a secondary drying step, and in the secondary drying step, the positive electrode precursor is preferably subjected to infrared heating in a drying furnace filled with a gas containing nitrogen as a main component.

[Primary Drying Step]

The primary drying of the positive electrode precursor is preferably carried out with far infrared rays, near infrared rays or hot air of 80° C. or higher by a drying method such as hot air drying or infrared (IR) drying.

The primary drying may be drying at a constant temperature, or it may be drying while varying the temperature in different stages. Several drying methods may also be used in combination for drying. The temperature in the drying furnace in the primary drying is preferably 25° C. or higher and 200° C. or lower, more preferably 40° C. or higher and 180° C. or lower, and still more preferably 50° C. or higher and 160° C. or lower. When the drying temperature is 25° C. or higher, the solvent in the coating film can be sufficiently volatilized off. When the temperature is 200° C. or lower, on the other hand, cracks in the coating film due to rapid volatilization of the solvent, maldistribution of the binder due to migration, and oxidation of the positive electrode current collector or positive electrode active material layer, can be inhibited.

The drying and the primary drying of the positive electrode precursor containing an organic solvent as a solvent have been described above.

[Pressing Step]

The film thickness and bulk density of the positive electrode active material layer can be adjusted by arbitrarily pressing the positive electrode precursor after the primary drying. A pressing machine such as a hydraulic press or vacuum pressing machine, etc., may be suitably used for pressing the positive electrode precursor. The film thickness, bulk density and electrode strength of the positive electrode active material layer can be adjusted by the pressing pressure, the gap between the press rolls, and the surface temperature of the pressed portion, as described below. The pressing pressure is preferably 0.5 kN/cm or greater and 20 kN/cm or less, more preferably 1 kN/cm or greater and 10 kN/cm less, and still more preferably 2 kN/cm or greater and 7 kN/cm or less. When the pressing pressure is 0.5 kN/cm or greater, it will be possible to adequately increase the electrode strength. When it is no greater than 20 kN/cm, on the other hand, distortion or wrinkles will not be produced in the positive electrode precursor, and adjustment can be made to the desired film thickness and bulk density for the positive electrode active material layer. The gap between the press rolls may be set to a desired value depending on the film thickness of the dried positive electrode precursor so that the desired film thickness and bulk density of the positive electrode active material layer is obtained. Further, the pressing speed may also be set to the desired speed so as to avoid distortion and wrinkles in the positive electrode precursor.

Furthermore, the surface temperature of the pressed portion may be room temperature, or it may be heated instead, if necessary. In the case of heating, the lower limit for the surface temperature of the pressed portion is preferably at least the melting point of the binder used minus 60° C. (the melting point−60° C.), more preferably at least the melting point minus 45° C. and even more preferably at least the melting point minus 30° C. On the other hand, in the case of heating, the upper limit for the surface temperature of the pressed portion is preferably no higher than the melting point of the binder used plus 50° C. (the melting point+50° C.), more preferably no higher than the melting point plus 30° C. and still more preferably no higher than the melting point plus 20° C. For example, when PVdF (polyvinylidene difluoride: melting point=150° C.) is used as the binder, heating the surface of the pressed portion to 90° C. or higher and 200° C. or lower is preferred, and more preferably heating to 105° C. or higher and 180° C. or lower and still more preferably 120° C. or higher and 170° C. or lower. Moreover, when a styrene-butadiene copolymer (melting point: 100° C.) is used as the binder, the surface of the pressed portion is preferably heated to 40° C. or higher and 150° C. or lower, or heated to more preferably 55° C. or higher and 130° C. or lower and still more preferably 70° C. or higher and 120° C. or lower.

The melting point of the binder can be determined by the endothermic peak position in DSC (Differential Scanning Calorimetry). For example, by using a "DSC7" differential scanning calorimeter manufactured by Perkin-Elmer, Inc., when 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation, can be obtained.

Moreover, pressing may also be carried out multiple times while varying the conditions including the pressing pressure, gap, speed, and pressed portion surface temperature. When carrying out multiple coating of the positive electrode precursor, it is preferably slit before pressing. If the positive electrode precursor after having carried out multiple coating, is slit and then pressed, it is possible to prevent stress from being applied to the current collector portion which was not coated with the positive electrode active material layer, and also possible to prevent the occurrence of wrinkles. Moreover, it is also possible to slit the positive electrode precursor again after pressing.

The thickness of the positive electrode active material layer obtained by the primary drying and arbitrary pressing according to the present embodiment is preferably 10 μm or greater and 200 μm or less for each side of the positive electrode current collector. The thickness of the positive electrode active material layer per side is more preferably 20 μm or greater and 100 μm or less, and still more preferably 30 μm or greater and 80 μm or less, for each side. When the thickness is 10 μm or greater, sufficient charge/discharge capacity can be produced. When the thickness is 200 μm or less, on the other hand, the ion diffusion resistance in the electrode can be maintained low. Therefore, not only a sufficient output characteristic can be obtained but also the cell volume can be reduced, which accordingly enables to increase the energy density. Incidentally, when the current collector has through-holes or ruggedness, the thickness of the positive electrode active material layer is the mean value of the thickness for each side at the sections of the current collector without through-holes or ruggedness.

<Amount of Solvent and Mode of Secondary Drying: Case of Using Binder Containing Water-Soluble Polymer>

The amount of solvent contained in the positive electrode active material obtained by the primary drying and arbitrary pressing of the positive electrode precursor by using a binder containing a water-soluble polymer and the secondary drying, will be described below.

The primary drying and arbitrary pressing is carried out so that the amount of the solvent contained in the positive electrode active material layer obtained thereby is reduced to preferably 7.0% by weight or more and 15% by weight or less, more preferably 7.5% by weight or more and 14% by weight or less, and still more preferably 8.0% by weight or more and 13% by weight or less based on the total weight of the positive electrode active material layer.

[Secondary Drying Step]

The amount of residual solvent of the positive electrode precursor can further be reduced by secondary drying. In the secondary drying, the positive electrode precursor can be heated by heating under reduced pressure or infrared heating. The secondary drying may be drying at a single temperature, or it may be drying while varying the temperature in different stages. In the case of heating under reduced pressure, the residual solvent in the positive electrode active material layer can be efficiently reduced by reducing the pressure. If foreign substances adhere to the positive electrode precursor, it may cause a micro short circuit, however, the foreign substances can be removed by reducing the pressure.

When the drying step in the secondary drying step is heating under reduced pressure, the temperature is preferably 60° C. or higher and 200° C. or lower and more preferably 80° C. or higher and 200° C. or lower. When the drying temperature of heating under reduced pressure is 60° C. or higher, the residual solvent in the vicinity of the alkali metal compound can be efficiently reduced. When the drying temperature of the heating under reduced pressure is 200° C. or lower, the sliding off of the positive electrode active material layer due to the embrittlement of the binder can be inhibited, and in particular the embrittlement of the alkali metal compound can be prevented, which is preferred in terms of improving the micro short circuit ratio and the elevated temperature durability of the non-aqueous alkali metal electricity storage element. The drying time of the heating under reduced pressure is preferably 1 hour or longer and 24 hours or shorter, and if it is 1 hour or longer, foreign substances can be sufficiently removed. If the drying time of the heating under reduced pressure is 24 hours or shorter, damage to the surface of the positive electrode precursor due to winding misalignment or deformation can be prevented. The atmospheric pressure in the heating under reduced pressure is preferably $10^{-5}$ Pa or higher and 1,000 Pa or lower.

When the drying step in the secondary drying step is infrared heating, there is almost no need to employ a wind flow in the drying oven, therefore the external force is unlikely to be applied, and the risk of damage to the positive electrode precursor is extremely low. In the case of infrared heating, the wind velocity in the drying oven may be, for example, 50 cm$^3$/min or less. Therefore, scratches and wrinkles on the electrode surface, which can cause a micro short circuit, are unlikely to be produced. In the case of infrared heating, the drying temperature is preferably 80° C. or higher and 200° C. or lower. When the drying temperature of infrared heating is 80° C. or higher, the residual solvent in the vicinity of the alkali metal compound can be efficiently reduced. When the drying temperature of infrared heating is 200° C. or lower, the sliding off of the positive electrode active material layer due to the embrittlement of the binder can be more effectively inhibited. In particular, since the embrittlement of the alkali metal compound can be prevented, it is possible to improve the micro short circuit rate and the elevated temperature durability of the non-aqueous alkaline electricity storage element. The drying time by infrared heating is preferably 1 minute or longer and 5 minutes or shorter, and 1 minute or longer is sufficient to increase the temperature of the positive electrode precursor to a predetermined temperature, which leads to the efficient reduction of the residual solvent. If it is 5 minutes or shorter, the positive electrode active material layer is less likely to be denatured, which is also advantageous from the viewpoint of production efficiency. If the production efficiency is improved, the risk of foreign substances being mixed in that is one of the causes of micro short circuit, is reduced.

When the solvent contains water or it is water, the amount of the solvent contained in the positive electrode active material layer after the secondary drying step is preferably 7.0% by weight or less, more preferably 0.0010% by weight or more and 7.0% by weight or less, and still more preferably 0.005% by weight or more and 3.0% by weight or less, based on the total weight of the positive electrode active material layer. When the amount of water is 0.0010% by weight or more, the positive electrode active material layer is less likely to peel off, and an appropriate strength can be maintained. If the water content is 7.0% by weight or less, a favorable energy density can be obtained.

The positive electrode precursor after the secondary drying is preferably stored in a dry environment with a dew point of −30° C. or lower in order to avoid adsorption of moisture in the atmosphere.

<Winding of Positive Electrode Precursor>

After the drying step or after arbitrary pressing step, a winding step of winding up the positive electrode precursor may be further included. The winding step is more preferred when the drying step is carried out by infrared heating. The tension in the winding step is preferably 0.050 N/mm or more and 1.5 N/mm or less, more preferably 0.070 N/mm or more and 1.3 N/mm or less, and still more preferably 0.10 N/mm and 1.2 N/mm or less in the mechanical direction. When the tension is 0.050 N/mm or more, it is possible to prevent winding misalignment during winding, which enables to prevent damage to the alkali metal compound in the positive electrode active material layer. When the tension is 1.5 N/mm or less, wrinkles produced in the positive electrode precursor during winding can be inhibited, so that sliding off of the positive electrode active material and damage to the alkali metal compound can be prevented. Therefore, almost no damage is produced for the alkali metal compound, side reactions are unlikely to occur, and excess products can be inhibited. As a result, it is possible to provide a non-aqueous alkali metal electricity storage element that further inhibits micro short circuit and has excellent elevated temperature durability.

The above described the amount of the solvent contained in the positive electrode active material obtained by the primary drying and arbitrary pressing of the positive electrode precursor by using the binder containing the water-soluble polymer as the binder, and the secondary drying.

<Amount of Solvent and Another Mode of Secondary Drying: Case of Using Solvent Containing Organic Solvent>

The following will describe the amount of the solvent contained in the positive electrode active material obtained by the primary drying and arbitrary pressing of the positive electrode precursor by using the solvent containing the organic solvent, and the secondary drying.

The primary drying and arbitrary pressing is carried out so that the amount of the solvent contained in the positive electrode active material layer obtained thereby is reduced to preferably 10% by weight or more and 20% by weight or less, more preferably 110% by weight or more and 19% by weight or less, and still more preferably 12% by weight or more and 18% by weight or less based on the total weight of the positive electrode active material layer.

[Secondary Drying Step]

The positive electrode precursor can further reduce the residual solvent by the secondary drying. The secondary drying can be carried out by heating the positive electrode precursor with infrared heating in a drying oven filled with a gas containing nitrogen as a main component. The secondary drying may be drying at a single temperature, or it may be drying while varying the temperature in different stages. Drying by infrared heating may be a roll-to-roll method. The roll-to-roll method is preferred because it saves the trouble of individually transporting the electrodes and improves mass productivity. Since in the infrared drying the energy radiated from the heat source goes directly to the object to be dried, unlike the heat transfer through the atmosphere such as convection, the drying can be efficiently carried out in a short time.

The temperature in the drying furnace in the secondary drying step is preferably 100° C. or higher and 300° C. or lower, more preferably 150° C. or higher and 280° C. or lower, and still more preferably 200° C. or higher and 250° C. or lower. When the drying temperature is 100° C. or higher, the residual solvent in the vicinity of the alkali metal compound can be efficiently reduced. When the temperature is 300° C. or lower, on the other hand, the positive electrode active material layer is less likely to be denatured, and air supply and exhaust in the furnace can be sufficiently carried out. When the drying temperature is 100° C. or higher, the solvent remaining in the positive electrode active material layer can be efficiently reduced. When the drying temperature is 300° C. or lower, on the other hand, the sliding off of the positive electrode active material layer due to the embrittlement of the binder can be inhibited.

The drying time of the secondary drying is preferably 1 minute or longer and 5 minutes or shorter, more preferably 1 minute or longer and 4 minutes or shorter, and still more preferably 1 minute or longer and 3 minutes or shorter. If the drying time is 1 minute or longer, the residual solvent in the vicinity of the alkali metal compound can be efficiently reduced. If it is 5 minutes or shorter, on the other hand, the positive electrode active material layer is less likely to be denatured, which is also advantageous from the viewpoint of production efficiency. If the production efficiency is improved, the risk of foreign substances being mixed in, which is one of the causes of micro short circuit, can be reduced. Therefore, it is possible to provide a non-aqueous alkali metal electricity storage element that further inhibits micro short circuit and has excellent elevated temperature durability.

The inside of the drying furnace in the secondary drying is preferably filled with a gas containing nitrogen as a main component. When the gas contains oxygen, the oxygen concentration in the drying furnace is preferably less than 1,500 ppm, more preferably 1,300 ppm or less, and still more preferably 1,000 ppm or less. When the oxygen concentration of the gas is less than 1,500 ppm, the oxidation of the positive electrode current collector and the positive electrode active material layer can be further inhibited.

The inside of the drying furnace in the secondary drying preferably has an air flow for supplying and exhausting a gas containing nitrogen as a main component. In this case, the velocity of the air flow is preferably 10 $cm^3$/min or more and 1,000 $cm^3$/min or less, more preferably 20 $cm^3$/min or more and 500 $cm^3$/min or less, and still more preferably 50 $cm^3$/min or more and 200 $cm^3$/min or less. When the airflow velocity is 10 $cm^3$/min or more, the gas evaporated from the positive electrode active material layer can be efficiently exhausted, so that the denaturation of the alkali metal compound can be inhibited. When the velocity of air flow is 1,000 $cm^3$/min or less, the air velocity in the drying furnace can be inhibited, and therefore the unevenness of the drying velocity generated in the surface of the positive electrode precursor can be reduced, and the alkali metal compound can be uniformly decomposed. Therefore, it is possible to provide a non-aqueous alkali metal electricity storage element which inhibits micro short circuit and is more excellent in elevated temperature durability.

When the solvent contains an organic solvent, the amount of the solvent contained in the positive electrode active material layer after the secondary drying step is preferably 0.10% by weight or more and 10% by weight or less and more preferably 0.5% by weight or more and 6% by weight or less based on the total weight of the positive electrode active material layer. When the amount of the solvent is 0.1% by weight or more, the positive electrode active material layer is less likely to peel off, and an appropriate strength can be maintained. When the amount of the solvent is 10% by weight or less, a favorable energy density can be obtained.

The positive electrode precursor after secondary drying is preferably stored in a dry environment with a dew point of −30° C. or lower in order to avoid adsorption of moisture in the atmosphere.

<Winding of Positive Electrode Precursor>

After the drying step or after arbitrary pressing step, the positive electrode precursor is wound up. The tension in the winding step is preferably 0.050 N/mm or more and 1.5 N/mm or less, more preferably 0.070 N/mm or more and 1.3 N/mm or less, and still more preferably 0.10 N/mm and 1.2 N/mm or less in the mechanical direction. When the tension is 0.050 N/mm or more, it is possible to prevent winding misalignment during winding, which enables to prevent damage to the alkali metal compound in the positive electrode active material layer. When the tension is 1.5 N/mm or less, wrinkles produced in the positive electrode precursor during winding can be inhibited, so that the positive electrode active material can be prevented from sliding-off and the alkali metal compound can be prevented from being damaged. Therefore, almost no damage to the alkali metal compound is produced, side reactions are unlikely to occur, and excess products can be inhibited. As a result, it is possible to provide a non-aqueous alkali metal electricity storage element that further inhibits micro short circuit and has excellent elevated temperature durability.

The above described the amount of the solvent contained in the positive electrode active material obtained by the primary drying and the arbitrary pressing of the positive electrode precursor in which the solvent containing the organic solvent was used, and the secondary drying.

<<Negative Electrode>>

The negative electrode has a negative electrode current collector, and a negative electrode active material layer present on one or both sides thereof.

<Negative Electrode Active material Layer>

The negative electrode active material layer contains a negative electrode active material that can intercalate and release alkali metal ions and it may contain optional components such as a conductive filler, binder, dispersion stabilizer, etc., as necessary.

[Negative Active Material]

The negative electrode active material including, specifically, carbon materials, titanium oxides, silicon, silicon oxides, silicon alloys, silicon compounds, tin, tin compounds, etc., are exemplified. Preferably, the content of the carbon material with respect to the total amount of the negative electrode active material is 50% by weight or greater and more preferably 70% by weight or greater. The carbon material content may be 100% by weight, but in order to obtain a satisfactory effect by combined use with other materials, it is preferably, for example, no greater than 90% by weight and it may even be 80% by weights or less. The combination of the lower limits and the upper limits is optional.

The carbon materials include, for example, hardly graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials, etc.; carbonaceous materials obtained by heat treatment of carbonaceous precursors such as petroleum-based pitch, coal-based pitch, mesocarbon microbeads, coke, synthetic resins (for example, phenol resins, etc.), etc.; thermal decomposition products of furfuryl alcohol resins or novolac resins; fullerenes; carbon nanohoms; and carbon materials that are composites of the foregoing.

Composite Carbon Material

The BET specific surface area of the composite carbon material is preferably 100 $m^2/g$ or more and 350 $m^2/g$ or less, and more preferably 150 $m^2/g$ or more and 300 $m^2/g$ or less. When the BET specific surface area is 100 $m^2/g$ or more, the amount of pre-doping of alkali metal ions can be sufficiently increased, so that the negative electrode active material layer can be made sufficiently thin. Further, when the BET specific surface area is 350 $m^2/g$ or less, the coatability of the negative electrode coating solution for forming the negative electrode active material layer becomes excellent.

The initial charging capacity when constant voltage charge is carried out until the current value reaches 0.01 $mA/cm^2$ after the constant current charge is carried out with the current value of 0.5 $mA/cm^2$ at a measurement temperature of 25° C. until the voltage value reaches 0.01 V by using a lithium metal in the counter electrode, is preferably 300 mAh/g or more and 1,600 mAh/g or less per unit weight of the composite carbon material, more preferably 400 mAh/g or more and 1,500 mAh/g or less, and still more preferably 500 mAh/g or more and 1,450 mAh/g or less. When the initial charging capacity is 300 mAh/g or more, the amount of pre-doping of alkali metal ions can be sufficiently increased, so that high output characteristics can be obtained even when the negative electrode active material layer is made thin. Further, when the initial charging capacity is 1,600 mAh/g or less, the swelling/shrinkage of the composite carbon material when the composite carbon material is doped/dedoped with alkali metal ions are reduced, and the strength of the negative electrode is maintained.

The aforementioned negative electrode active material is particularly preferably a composite porous material that satisfies the following conditions (1) and (2) from the viewpoint of obtaining a favorable internal resistance value.

(1) The mesopore volume (the volume of fine pores having a diameter of 2 nm or more and 50 nm or less) Vm1 ($cm^3/g$) calculated by the aforementioned BJH method, satisfies the condition of $0.01 \leq Vm1 < 0.10$.

(2) The micropore volume (the volume of fine pores having a diameter of less than 2 nm) Vm2 ($cm^3/g$) calculated by the aforementioned MP method, satisfies the condition of $0.01 \leq Vm2 < 0.30$.

The lithium compound is preferably in particulate form. The mean particle size of silicon, silicon oxide, silicon alloy and silicon compound, and tin and tin compound as the negative electrode active material is preferably 0.1 μm or more and 30 μm or less. When the mean particle size is 0.1 μm or more, the contact area with the electrolytic solution increases, which enables to reduce the resistance of the non-aqueous alkali metal electricity storage element. Further, when the mean particle size is 30 μm or less, the swelling/shrinkage of the negative electrode due to the doping/dedoping of the negative electrode with alkali metal ions accompanied by the charge/discharge, are reduced, and the strength of the negative electrode is maintained.

Silicon, silicon oxide, silicon alloy and silicon compound, and tin and tin compound can be made into fine particles by pulverizing them using a jet mill with a classifier, a stirring ball mill, etc. The pulverizer is provided with a centrifugal force classifier, and fine particles pulverized in an inert gas environment such as nitrogen and argon can be collected by a cyclone or a dust collector.

The content proportion of the negative electrode active material in the negative electrode active material layer is preferably 70% by weight or more and more preferably 80% by weight or more, based on the total weight of the negative electrode active material layer.

[Other Optional Components of Negative Electrode Active Material Layer]

The negative electrode active material layer of the present embodiment may contain optional components, such as a binder, conductive filler, dispersion stabilizer, etc., as necessary, in addition to the negative electrode active material.

The binder, for example, polyvinylidene difluoride (PVdF), polytetrafluoroethylene (PTFE), a polyimide, fluororubber, latex, a styrene-butadiene copolymer, fluorine rubber, or an acrylic copolymer, etc., may be used. The amount of binder used in the negative electrode active material layer is preferably 1 part by weight or greater and 30 parts by weight or less and more preferably 2 parts by weight or greater and 25 parts by weight or less with respect to 100 parts by weight of the negative electrode active material. When the amount of binder used is 1 part by weight or greater with respect to 100 parts by weight of the negative electrode active material, the sufficient adhesion between the current collector in the negative electrode (precursor) and the negative electrode active material layer can be ensured, and the increase in interfacial resistance between the current collector and the active material layer can be prevented. When the amount of binder used is no greater than 30 parts by weight with respect to 100 parts by weight of the negative electrode active material, on the other hand, the case in which the binder excessively covers the active material surface of the negative electrode (precursor) can be avoided, which enables to prevent the diffusion resistance of ions in the fine pores of the active material from being increased.

The conductive filler is preferably composed of a carbonaceous material that has higher conductivity than the negative electrode active material. Such a conductive filler, for example, Ketjen black, acetylene black, vapor grown carbon fibers, graphite, scaly graphite, carbon nanotubes, graphene, graphene oxide, as well as mixtures thereof, etc. The mixed amount of conductive filler in the negative electrode active material layer is preferably 20 parts by weight or less and more preferably 1 to 15 parts by weight with respect to 100 parts by weight of the negative electrode active material. The conductive filler is preferably mixed with the negative electrode active material layer in terms of the high input. When the mixed amount of the conductive filler is 20 parts by weight or less, the content of the negative electrode active material in the negative electrode active material layer can be ensured, and reduction of the energy density per volume of the negative electrode active material layer is prevented, which is preferred.

The dispersion stabilizer, for example, PVP (polyvinylpyrrolidone), PVA (polyvinyl alcohol), cellulose derivatives, etc., may be used. The amount of dispersion stabilizer used is preferably greater than 0 parts by weight and no greater than 10 parts by weight, with respect to 100 parts by weight of the negative electrode active material. When the amount of dispersion stabilizer used is no greater than 10 parts by weight, high input/output characteristics will be exhibited without preventing movement of lithium ions into and from the negative electrode active material.

<Negative Electrode Current Collector>

The material constituting the negative electrode current collector of the present embodiment is preferably a metal foil with high electron conductivity and without deterioration by elution into the non-aqueous electrolytic solution or reaction with the electrolyte or ion, etc. Such metal foils include, for example, aluminum foils, copper foils, nickel foils, stainless steel copper foils, etc. The negative electrode current collector in the non-aqueous alkali metal electricity storage element is preferably a copper foil. The metal foil may be a common metal foil without ruggedness or through-holes, or it may be a metal foil having ruggedness formed by embossing, chemical etching, electrolytic deposition, blasting, etc., or it may be a metal foil having through-holes, such as an expanded metal, punching metal, etching foil, etc.

The thickness of the negative electrode current collector may be a thickness that allows the shape and strength of the negative electrode to be sufficiently maintained, and is 1 to 100 μm, for example.

<<Production Method of Negative Electrode>>

The negative electrode comprises a negative electrode active material layer on one or both sides of a negative electrode current collector. According to a typical mode, the negative electrode active material layer is anchored to the negative electrode current collector.

The negative electrode can be produced by publicly known electrode production techniques for alkali metal batteries, for example, lithium ion batteries, electrical double layer capacitors, etc. For example, various materials containing the negative electrode active materials each may be dispersed and dissolved in a solvent (water or an organic solvent) to prepare a slurry-like coating solution (negative electrode coating solution), and one or both sides of a negative electrode current collector is coated with the coating solution to form a coating film, which is dried to obtain a negative electrode. The obtained negative electrode may also be pressed to adjust the thickness or bulk density of the negative electrode active material layer.

The coating solution may also be prepared by dry blending all or a portion of each of the starting material powders containing the negative electrode active materials, and then adding water or an organic solvent, and/or adding thereto a liquid or slurry-like substance comprising a binder or dispersion stabilizer dissolved or dispersed in them. Moreover, the coating solution may also be prepared by adding various starting powders containing the negative electrode active materials, to a liquid or slurry-like substance comprising a binder or dispersion stabilizer dissolved or dispersed in water or an organic solvent. When preparing the coating solution, a disperser such as a homodisperser or multiscrew disperser, planetary mixer, thin-film revolving high-speed mixer, etc., may be suitably used. In order to obtain a coating solution in a satisfactory dispersed state, it is preferred for the dispersion to be at a peripheral velocity of 1 m/s or greater and 50 m/s or less. It is preferred when the peripheral velocity is 1 m/s or greater, because each material will satisfactorily dissolve or disperse. It is also preferred when the peripheral velocity is no greater than 50 m/s, because each material will be unlikely to be broken down by heat or shear force during dispersion, and reaggregation will be unlikely to take place.

The viscosity ($\eta b$) of the coating solution is preferably 500 mPa·s or higher and 20,000 mPa·s or lower, more preferably 1,000 mPa·s or higher and 10,000 mPa·s or lower, and still more preferably 1,500 mPa·s or higher and 5,000 mPa·s or lower. When the viscosity ($\eta b$) is 500 mPa·s or higher, liquid dripping during formation of the coating film will be minimized, and the coating film width and thickness can be satisfactorily controlled. When the viscosity ($\eta b$) is no higher than 20,000 mPa·s, there will be less pressure loss in the flow channel of the coating solution when a coating machine is used, which allows stable coating to be carried out, and allows control to less than the prescribed coating film thickness.

The TI value (thixotropy index value) of the coating solution is preferably 1.1 or greater, more preferably 1.2 or greater and still more preferably 1.5 or greater. When the TI value is 1.1 or greater, the coating film width and thickness can be satisfactorily controlled.

In order to form the coating film, a coating machine such as a die coater, comma coater, knife coater, gravure coating machine, etc., may be suitably used. The coating film may be formed by monolayer coating or by multilayer coating. The coating speed is preferably 0.1 m/minute or greater and 100 m/minute or lower, more preferably 0.5 m/minute or greater and 70 m/minute or lower, and still more preferably 1 m/minute or greater and 50 m/minute or lower. When the coating speed is 0.1 m/minute or greater, stable coating will be possible. When the coating speed is 100 m/minute or lower, on the other hand, the coating precision can be adequately ensured.

<Primary Drying of Negative Electrode>

For the primary drying of the negative electrode, a drying method such as hot air drying or infrared (IR) drying, etc., may be suitably employed. Drying of the coating film may be drying at a single temperature, or it may be drying while varying the temperature in different stages. Several drying methods may also be used in combination for drying. The drying temperature is preferably 25° C. or higher and 200° C. or lower, more preferably 40° C. or higher and 180° C. or lower, and still more preferably 50° C. or higher and 160° C. or lower. When the drying temperature is 25° C. or higher, it will be possible to adequately volatilize off the solvent in the coating film. When it is no higher than 200° C., on the other hand, it will be possible to reduce cracking of the coating film by rapid volatilization of the solvent or maldistribution of the binder by migration, and oxidation of the negative electrode current collector or negative electrode active material layer.

In order to press the negative electrode a pressing machine such as a hydraulic press, vacuum pressing machine, etc., may be suitably used. The thickness, bulk density and electrode strength of the negative electrode active material layer can be adjusted by the pressing pressure, gap, and surface temperature of the pressed section, as described below. The pressing pressure is preferably 0.5 kN/cm or greater and 20 kN/cm or less, more preferably 1 kN/cm or greater and 10 kN/cm or less, and still more preferably 2 kN/cm or greater and 7 kN/cm or less. When the pressing pressure is 0.5 kN/cm or greater, it will be possible to adequately increase the electrode strength. When the pressing pressure is no greater than 20 kN/cm, on the other hand, distortion or wrinkling will be less likely to be produced in the negative electrode, and adjustment can be made to the desired layer thickness or bulk density for the negative electrode active material layer. Moreover, the gap between the press rolls can be set to a desired value depending on the thickness of the dried negative electrode so that the desired thickness or bulk density of the negative electrode active material layer is obtained. Furthermore, the pressing speed can be set as desired, so as to minimize distortion and wrinkles in the negative electrode. Moreover, the surface temperature of the pressed section may be room temperature, or the pressed section may be heated instead, if necessary. In the case of heating, the lower limit for the surface temperature of the pressed section is preferably at least the melting point of the binder minus 60° C. (the melting point−60° C.), more preferably at least the melting point of the binder minus 45° C., and still more preferably at least the melting point of the binder minus 30° C. On the other hand, the upper limit for the surface temperature of the pressed section in the case of heating is also preferably no higher than the melting point of the binder used plus 50° C. (the melting point+50° C.), more preferably no higher than the melting point of the binder plus 30° C., and still more preferably no higher than the melting point of the binder plus 20° C. For example, when PVdF (polyvinylidene difluoride: melting point=150° C.) is used as the binder, it may be preferably heated at 90° C. or higher and 200° C. or lower, more preferably at 105° C. or higher and 180° C. or lower, and still more preferably at 120° C. or higher and 170° C. or lower. Further, when a styrene-butadiene copolymer (melting point=100° C.) is used as the binder, it may be preferably heated at 40° C. or higher and 150° C. or lower, more preferably at 55° C. or higher and 130° C. or lower, and still more preferably at 70° C. or higher and 120° C. or lower.

The thickness of the negative electrode active material layer is preferably 5 μm or more and 100 μm or less and more preferably 10 μm or more and 60 μm or less, per one side. When this thickness is 5 μm or more, satisfactory charge/discharge capacity can be exhibited. When this thickness is 100 μm or less, on the other hand, the cell volume can be reduced, and the energy density can be increased. When the current collector has pores, the thickness of the negative electrode active material layer refers to the average value of the thickness per side of the portion of the negative electrode current collector that does not have holes. Moreover, the porosity (%) (porosity=(1−true density/actual volume)×100) that is calculated from the true density (cm$^3$/g) represented by a solid content (% by weight)/a material true density (g/cm$^3$) and the actual volume (cm$^3$/g) represented by 1/an electrode bulk density (g/cm$^3$), is preferably 50% or more.

<Secondary Drying of Negative Electrode>

The residual solvent in the negative electrode can further be reduced by secondary drying. The secondary drying is preferably carried out by a method such as hot air drying, infrared (IR) drying, drying under reduced pressure, etc., and more preferably far infrared ray drying, hot air drying, or drying under reduced pressure. In the secondary drying, several drying methods may also be used in combination for drying, and the drying may be drying at a single temperature, or it may be drying while varying the temperature in different stages. In the case of hot air drying or infrared (IR) drying, the roll-to-roll method saves the trouble of individually transporting long electrodes and improves mass productivity. In infrared (IR) drying, since the energy radiated from the heat source goes directly to the object to be dried, unlike the heat transfer through the atmosphere such as convection, the drying can be efficiently carried out in a short time. Further, there is no need to fill the inside of the drying furnace with the air, facilitating the object for drying to be prevented from oxidization thereof by filling an inert gas. From the viewpoint of preventing oxidation and removing elements of ignition and explosion, the oxygen concentration in the drying furnace is preferably maintained at less than 20% by supplying and exhausting an inert gas. In the case of drying under reduced pressure, the boiling point of the solvent is lowered, and the evaporation rate is accelerated in a reduced pressure environment. The degree of reduced pressure is preferably $10^{-5}$ Pa or more and 1,000 Pa or less, and more preferably 0.1 Pa or more and 10 Pa or less. If it is $10^{-5}$ Pa or more, the equipment cost can be inhibited. If it is 1,000 Pa or less, on the other hand, the boiling point of the solvent is lowered and the evaporation rate is sufficiently accelerated, so that the drying can be efficiently carried out.

The secondary drying temperature of the negative electrode is preferably 60° C. or higher and 200° C. or lower, more preferably 65° C. or higher and 190° C. or lower, and still more preferably 70° C. or higher and 180° C. or lower. When the drying temperature is 60° C. or higher, the solvent remaining in the negative electrode active material layer can be efficiently reduced. When the drying temperature is 200° C. or lower, on the other hand, the sliding off of the negative electrode active material layer due to the embrittlement of the binder and oxidation of the negative electrode current collector foil, can be inhibited.

The dried negative electrode after the secondary drying is preferably stored in a dry environment with a dew point of −30° C. or lower in order to avoid adsorption of moisture in the atmosphere.

When the solvent is water, the amount of residual solvent is preferably 0.0010% by weight or more and 7.0% by weight or less and more preferably 0.005% by weight or more and 3.0% by weight or less. If it is 0.0010% by weight or more, the negative electrode can maintain an appropriate strength without peeling off of the negative electrode active material layer. If it is 7.0% by weight or less, on the other hand, a satisfactory energy density can be obtained. When the solvent contains an organic solvent, the amount of residual solvent is preferably 0.1% by weight or more and 10% by weight or less and more preferably 0.5% by weight or more and 6% by weight or less. If it is 0.1% by weight or more, the negative electrode can maintain an appropriate strength without peeling off of the negative electrode active material layer. If it is 10% by weight or less, on the other hand, a satisfactory energy density can be obtained.

<<Electrolytic Solution>>

The electrolytic solution of the present embodiment is a non-aqueous electrolytic solution. Namely, the electrolytic solution contains the non-aqueous solvent described below. The non-aqueous electrolytic solution preferably comprises an alkali metal salt dissolved at a concentration of 0.5 mol/L or greater based on the total amount of the non-aqueous electrolytic solution. Namely, the non-aqueous electrolytic solution preferably contains an alkali ion as an electrolyte. The alkali metal ion is preferably a lithium ion.

<Lithium Salt>

For example, $LiN(SO_2F)_2$, $LiN(SO_2CF_3)_2$, $LiN(SO_2C_2F_5)_2$, $LiN(SO_2CF_3)(SO_2C_2F_5)$, $LiN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$, $LiBF_4$, etc., may be used alone or mixtures of two more may be combined for use as lithium salts in the non-aqueous electrolytic solution of the present embodiment. From the viewpoint of producing a high ion conductivity, the non-aqueous electrolytic solution preferably contains at least one selected from the group consisting of $LiPF_6$, $LiN(SO_2F)_2$, and $LiBF_4$ and more preferably contains $LiPF_6$ and/or $LiBF_4$ and $LiN(SO_2F)_2$.

The alkali metal salt concentration in the non-aqueous electrolytic solution is preferably 0.5 mol/L or greater and more preferably in the range of 0.5 mol/L or greater and 2.0 mol/L or less, based on the total amount of the non-aqueous electrolytic solution. When the lithium salt concentration is 0.5 mol/L or greater, anions will be sufficiently present to allow sufficiently high capacity of the electricity storage element. Moreover, the alkali metal salt concentration is preferably 2.0 mol/L or lower because it can prevent precipitation of the undissolved alkali metal salt in the non-aqueous electrolytic solution, prevent the viscosity of the electrolytic solution from becoming too high and will avoid lowering of the conductivity or reduction in the output characteristic as well.

The non-aqueous electrolytic solution of the present embodiment preferably contains $LiN(SO_2F)_2$ at a concentration of 0.1 mol/L or greater and 1.5 mol/L or less, based on the total amount of the non-aqueous electrolytic solution, and the concentration of $LiN(SO_2F)_2$ is more preferably 0.4 mol/L or greater and 1.2 mol/L or less. When the concentration of $LiN(SO_2F)_2$ is 0.1 mol/L or greater, the ionic conductance of the electrolytic solution is enhanced, an appropriate amount of an electrolyte layer is deposited at the interface surface between the electrolytic solution and the negative electrode, and preferably a solid electrolyte interface (SEI) is formed, which thereby reduces the gas due to decomposition of the electrolytic solution and improves the durability of the non-aqueous alkali metal electricity storage element. On the other hand, when the concentration is 1.5 mol/L or less, the electrolyte salt does not precipitate upon charge and discharge, and the viscosity of the non-aqueous electrolytic solution does not increase even after a long period of time.

<Non-Aqueous Solvent>

The non-aqueous electrolytic solution of the present embodiment preferably comprises a cyclic carbonate as a non-aqueous solvent. Containing cyclic carbonate in the non-aqueous electrolytic solution will be advantageous from the viewpoint of dissolving the alkali metal salt to the desired concentration and depositing an appropriate amount of the alkali metal compound on the positive electrode active material layer. Cyclic carbonate includes, for example, ethylene carbonate (EC), propylene carbonate, butylene carbonate, vinylene carbonate, fluoroethylene carbonate, etc.

The total content of the cyclic carbonate is preferably 15% by weight or greater and more preferably 20% by weight or greater, based on the total amount of the non-aqueous electrolytic solution. When the total content is 15% by weight or greater, an alkali metal salt having a desired concentration can be dissolved, and high alkali metal ion conductance can be produced. Further, it becomes possible to deposit an appropriate amount of the alkali metal compound on the positive electrode active material layer, and to inhibit oxidative decomposition of the electrolytic solution.

The non-aqueous electrolytic solution of the present embodiment preferably comprises dimethyl carbonate (DMC) and ethyl methyl carbonate (EMC), which are chain carbonate compounds, as the non-aqueous solvents. The volume ratio of dimethyl carbonate to ethyl methyl carbonate (DMC/EMC) is preferably 0.5 or greater and 8.0 or less, more preferably 0.8 or greater and 6.0 or less, and further-more preferably 1.0 or greater and 4.0 or less. When DMC/EMC is 0.5 or greater, the viscosity of the electrolytic solution can be reduced, and high alkali metal ion conductance can be exhibited. When DMC/EMC is 8.0 or less, the melting point of the mixed solvent can be maintained low, and high input/output characteristics can be exhibited even in a lowered temperature environment.

Moreover, the non-aqueous electrolytic solution of the present embodiment may contain other chain carbonate as the non-aqueous solvent. Other chain carbonate includes dialkyl carbonate compounds represented by diethyl carbonate, dipropyl carbonate, dibutyl carbonate, etc. The dialkyl carbonate compounds are typically unsubstituted.

The total content of the chain carbonates is preferably 30% by weight or greater, more preferably 35% by weight or greater and preferably 95% by weight or less, more preferably 90% by weight or less, based on the total amount of the non-aqueous electrolytic solution. When the content of the linear carbonate is 30% by weight or greater, the viscosity of the electrolytic solution can be reduced, and high alkali metal ion conductance can be exhibited. When the total concentration is 95% by weight or less, the electrolytic solution can further contain additives described below.

<Additive>

The non-aqueous electrolytic solution of the present embodiment may further comprise an additive. The additive, for example, a sulfur-containing compound, phosphate ester compound, acyclic fluorine-containing ether, cyclic phosphazene, fluorine-containing cyclic carbonate, cyclic carbonate, cyclic carboxylate ester, cyclic acid anhydride, etc., may be used alone, and two or more types thereof may be mixed and used.

Among them, the sulfur-containing compounds selected from among the compounds represented by the following chemical formulae (1-2) to (1-6), the phosphate ester compounds selected from among the compounds represented by the following chemical formulas (2), and the compounds selected from among the acyclic fluorine-containing ethers represented by the following formula (3), are preferably comprised as additives.

For Example, the sulfur-containing compounds selected from among the compounds represented by formulae (1-2) to (1-6):

[Chemical Formula 1]

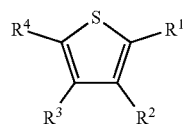

(1-2)

wherein in the formula, $R^1$ to $R^4$ each independently represents at least one selected from the group consisting of a hydrogen atom, a halogen atom, a formyl group, an acetyl group, a nitrile group, acetyl group, an alkyl group having 1 to 6 carbon atoms, an alkoxy group having 1 to 6 carbon atoms, and an alkyl ester having 1 to 6 carbon atoms,

[Chemical Formula 2]

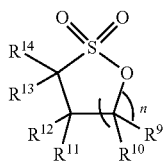

(1-3)

wherein in the formula, $R^9$ to $R^{14}$ represent any selected from the group consisting of a hydrogen atom, a halogen atom, an alkyl group having 1 to 12 carbon atoms, and an alkyl halide group having 1 to 12 carbon atoms, may be the same or different with each other, and n is an integer from 0 to 3,

[Chemical Formula 3]

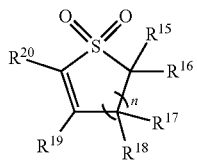

(1-4)

wherein in the formula, $R^{15}$ to $R^{20}$ represent any selected from the group consisting of a hydrogen atom, a halogen atom, an alkyl group having 1 to 12 carbon atoms, and an alkyl halide group having 1 to 12 carbon atoms, may the same or different with each other, and n is an integer from 0 to 3.

[Chemical Formula 4]

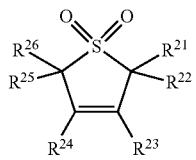

(1-5)

wherein in the formula, $R^{21}$ to $R^{26}$ represent any selected from the group consisting of a hydrogen atom, a halogen atom, an alkyl group having 1 to 12 carbon atoms, and an alkyl halide group having 1 to 12 carbon atoms, and may be the same or different with each other,

[Chemical Formula 5]

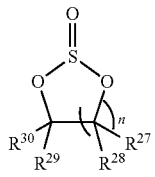

(1-6)

wherein in the formula, $R^{27}$ to $R^{30}$ represent any selected from the group consisting of a hydrogen atom, a halogen atom, an alkyl group having 1 to 12 carbon atoms, and an alkyl halide group having 1 to 12 carbon atoms, may be the same or different with each other, and n is an integer from 0 to 3, are preferably comprised in the non-aqueous electrolytic solution. For example, the compounds represented by formula (1-2) are thiophene, 2-methylthiophene, 3-methylthiophene, 2-cyanothiophene, 3-cyanothiophene, 2,5-dimethylthiophene, 2-methoxythiophene, 3-methoxythiophene, 2-chlorothiophene, 3-chlorothiophene, 2-acetylthiophene, or 3-acetylthiophene, and the sultone compounds represented by formula (1-3) are 1,3-propane sultone, 2,4-butane sultone, 1,4-butane sultone, 1,3-butane sultone or 2,4-pentane sultone, the sultone compounds represented by formula (1-4) are 1,3-propensultone or 1,4-butensultone, the compounds represented by formula (1-5) are 3-sulfolene, and the cyclic sulfite compounds represented by formula (1-6) are ethylene sulfite, 1,2-propylene sulfite, 1,3-propylene sulfite, and one or more compounds selected from among them are further preferably comprised in the non-aqueous electrolytic solution.

The total content of the sulfur-containing compound in the non-aqueous electrolytic solution of the non-aqueous alkali metal electricity storage element is preferably 0.1% by weight or more and 5% by weight or less based on the total amount of the non-aqueous electrolytic solution. When the total content of the sulfur-containing compound in the non-aqueous electrolytic solution is 0.10% by weight or more, the decomposition of the non-aqueous electrolytic solution at elevated temperatures can be inhibited, allowing inhibition of the gas generation. When the total content is 5% by weight or less, on the other hand, the reduction of ionic conductivity of the non-aqueous electrolytic solution can be inhibited, and high input/output characteristics can be maintained. Further, the content of the sulfur-containing compound present in the non-aqueous electrolytic solution of the non-aqueous alkali metal electricity storage element is preferably 0.3% by weight or more and 4% by weight or less and more preferably 0.5% by weight or more and 3% by weight or less from the viewpoint of achieving both high input/output characteristics and durability.

<Phosphate Ester Compound>

The phosphate ester compounds selected from the compounds represented by the following formula (2):

[Chemical Formula 6]

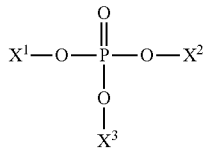

(2)

wherein in the formula, $X^1$ to $X^3$ each independently represents a monovalent organic group, are preferably comprised in the non-aqueous electrolytic solution. The compound represented by formula (2) includes, for example, trimethyl phosphate, triethyl phosphate, tributyl phosphate, tris(trimethylsilyl) phosphate, tri tolyl phosphate, triphenyl phosphate, dioctyl phosphate, trioctylphosphate and tris(4-nitrophenyl) phosphate, etc., and one or more selected from them are preferred.

The content of the phosphate ester compound is preferably 0.10% by weight or more and 3% by weight or less and more preferably 0.3% by weight or more and 2.5% by weight or less, based on the total amount of the non-aqueous electrolytic solution. When the content of the phosphate ester compound is 0.10% by weight or more, the stability of the non-aqueous electrolytic solution for oxidative decomposition is enhanced, and the capacity deterioration at elevated temperatures can be inhibited. When the content of the phosphate ester compound is 3% by weight or less, on the contrary, the reaction resistance at the interface between the positive electrode and the non-aqueous electrolytic solution can be maintained low, and therefore high input/output characteristics can be exhibited. Incidentally, the phosphate ester compound may be used alone or in combination of two or more.

<Acyclic Fluorine-Containing Ethers>

The acyclic fluorine-containing ethers selected from the compounds represented by the following formula (3):

[Chemical Formula 7]

$$R^1\text{—}O\text{—}R^2 \tag{3}$$

wherein in the formula, $R^1$ is a halogen atom or an alkyl halide having 1 to 12 carbon atoms, and $R^2$ is a hydrogen atom, a halogen atom, an alkyl group having 1 to 12 carbon atoms, or a alkyl halide group having 1 to 12 carbon atoms, are preferably comprised in the non-aqueous electrolytic solution. The compound represented by formula (3) includes, for example, $C_2F_5OC_2F_5$, $C_3F_7OC_3F_7$, $C_4F_9OC_4F_9$, $C_6F_{13}OC_6F_{13}$, $C_2F_5OCH_3$, $C_3F_7OCH_3$, $C_4F_9OCH_3$, $C_6F_{13}OCH_3$, $C_2F_5OCH_5$, $C_3F_7OCH_5$, $C_4F_9OC_2H_5$, $C_2F_5CF(OCH_3)C_3F_7$, $CF_3CH_2OCF_2CF_2H$, $CHF_2CF_2OCH_2CF_3$, $CHF_2CF_2CH_2OCF_2CF_2H$, $CF_3CF_2CH_2OCF_2CHF_2$, $CF_3CH_2OCF_2CHFCF_3$, $C_3HF_6CH(CH_3)OC_3HF_6$, etc., and one or more selected from among them are preferred.

The content of the acyclic fluorine-containing ether is preferably 0.1% by weight or more and 3% by weight or less and more preferably 0.3% by weight or more and 2.5% by weight or less, based on the total amount of the non-aqueous electrolytic solution. When the content of the acyclic fluorine-containing ether is 0.1% by weight or more, the stability of the non-aqueous electrolytic solution for oxidative decomposition is enhanced, and the capacity deterioration at elevated temperature can be inhibited. Further, when an aluminum foil is used as the positive electrode current collector of the non-aqueous alkaline electricity storage element, a fluorine-containing protective film having high corrosion resistance is formed on the surface of the positive electrode current collector, which prevents elution of aluminum to the non-aqueous electrolytic solution and enables to inhibit deterioration of the non-aqueous electrolytic solution. When the content of the acyclic fluorine-containing ether is 3% by weight or less, on the other hand, the solubility of the electrolyte salt can be maintained favorable and the ionic conductivity of the non-aqueous electrolytic solution can be maintained high, which thus allow high level input/output characteristics to be exhibited. Incidentally, the acyclic fluorine-containing ether may be used alone or in combination of two or more.

<Cyclic Phosphazene>

Cyclic phosphazene includes, for example, ethoxypentafluorocyclotriphosphazene, diethoxytetrafluorocyclotriphosphazene, phenoxypentafluorocyclotriphosphazene, etc., and preferably one or more selected from them are used.

The content of the cyclic phosphazene in the non-aqueous electrolytic solution is preferably 0.5% by weight or greater and 20% by weight or less based on the total amount of the non-aqueous electrolytic solution. When the value is 0.5% by weight or greater, the decomposition of the electrolytic solution at elevated temperatures will be inhibited, allowing the gas generation to be inhibited. When the value is no greater than 20% by weight, on the other hand, it will be possible to inhibit the ionic conductance of the electrolytic solution from being lowered, and to maintain high input/output characteristics. The cyclic phosphazene content is more preferably 2% by weight or greater and 15% by weight or less and furthermore preferably 4% by weight or greater and 12% by weight or less. Incidentally, these cyclic phosphazenes each can be used alone or in mixtures of two or more.

<Fluorine-Containing Cyclic Carbonate>

The fluorine-containing cyclic carbonate (cyclic carbonate comprising a fluorine atom) used is preferably one selected from among fluoroethylene carbonate (FEC) and difluoroethylene carbonate (dFEC), from the viewpoint of compatibility with other non-aqueous solvents.

The content of the fluorine-containing cyclic carbonate is preferably 0.5% by weight or higher and 10% by weight or lower and more preferably 1% by weight or higher and 5% by weight or lower, with respect to the total amount of the non-aqueous electrolytic solution. When the fluorine-containing cyclic carbonate content is 0.5% by weight or higher, it will be possible to form a satisfactory coating layer on the negative electrode, and reductive decomposition of the electrolytic solution on the negative electrode will be inhibited to obtain an electricity storage element with high durability at elevated temperatures. Moreover, when an aluminum foil is used as the positive electrode current collector of the non-aqueous alkaline electricity storage element, a fluorine-containing protective film having high corrosion resistance is formed on the surface of the positive electrode current collector, which prevents elution of aluminum to the non-aqueous electrolytic solution and enables to inhibit deterioration of the non-aqueous electrolytic solution. When the fluorine-containing cyclic carbonate content is 10% by weight or lower, on the other hand, the electrolyte salt solubility will be maintained satisfactory and the ionic conductance of the non-aqueous electrolytic solution will be maintained high, which thus allows high input/output characteristics to be exhibited. Incidentally, the fluorine-containing cyclic carbonate may be used as a single carbonate or as a mixture of two or more types.

<Cyclic Carbonate>

The cyclic carbonate is preferably vinylene carbonate.

The content of the cyclic carbonate is preferably 0.5% by weight % or higher and 10% by weight or lower and more preferably 1% by weight or higher and 5% by weight or lower with respect to the total amount of the non-aqueous electrolytic solution. When the cyclic carbonate content is 0.5% by weight or higher, the satisfactory coating layer can be formed on the negative electrode, and reductive decomposition of the electrolytic solution on the negative electrode will be inhibited, to obtain an electricity storage element with high durability at elevated temperatures. When the cyclic carbonate content is 10% by weight or lower, on the other hand, the electrolyte salt solubility will be kept satisfactory and the ionic conductance of the non-aqueous electrolytic solution will be maintained high, which thus allows high input/output characteristics to be exhibited.

<Cyclic Carboxylates>

Cyclic carboxylate includes, for example, γ-butyrolactone, γ-valerolactone, γ-caprolactone, ε-caprolactone, etc., and preferably at least one selected from them is used. More preferred among them is γ-butyrolactone, from the viewpoint of improving the cell characteristic due to improved alkali metal ion dissociation.

The content of the cyclic carboxylate is preferably 0.5% by weight or higher and 15% by weight or lower and more preferably 1% by weight or higher and 5% by weight or lower, with respect to the total amount of the non-aqueous electrolytic solution. When the cyclic carboxylate content is 0.5% by weight or higher, the satisfactory coating film can be formed on the negative electrode, and reductive decomposition of the electrolytic solution on the negative electrode will be inhibited, to obtain an electricity storage element with high durability upon elevated temperatures. When the cyclic carboxylate content is 15% by weights or lower, on the other hand, the electrolyte salt solubility will be kept favorable and high ionic conductance of the non-aqueous electrolytic solution will be maintained, which thus allows high input/output characteristics to be exhibited. Incidentally, the cyclic carboxylate may be used as a single carboxylate or as a mixture of two or more types.

<Cyclic Acid Anhydrides>

The cyclic acid anhydride is preferably one or more selected from among succinic anhydride, maleic anhydride, citraconic anhydride and itaconic anhydride. Among them, succinic anhydride and maleic anhydride are preferably selected from the viewpoint of industrial availability to reduce production cost of the electrolytic solution, and from the viewpoint of facilitation of dissolution in the non-aqueous electrolytic solution.

The content of the cyclic acid anhydride is preferably 0.5% by weight or higher and 15% by weight or lower and more preferably 1% by weight or higher and 10% by weight or lower, with respect to the total amount of the non-aqueous electrolytic solution. When the cyclic acid anhydride content is 0.5% by weight or higher, the satisfactory coating layer can be formed on the negative electrode, and reductive decomposition of the electrolytic solution on the negative electrode will be inhibited, to obtain an electricity storage element with high durability during periods of elevated temperatures. When the cyclic acid anhydride content is 15% by weight or lower, on the other hand, the electrolyte salt solubility will be kept favorable and high ionic conductance of the non-aqueous electrolytic solution will be maintained, which thus allows high input/output characteristics to be exhibited. Incidentally, these cyclic acid anhydrides each may be used alone, or two or more may be used in admixture.

<<Separator>>

The positive electrode precursor and negative electrode may be laminated, or laminated and wound via a separator, to form an electrode laminated body or electrode wound body comprising a positive electrode precursor, negative electrode and separator.

The separator in the present embodiment can be suitably used as a separator used in an alkali metal battery, for example, a lithium ion secondary battery, an electric double layer capacitor, a lithium ion capacitor, etc.

The separator in the present embodiment is preferably a separator containing at least one selected from the group consisting of a polyolefin, cellulose, and aramid resin. The separator in the present embodiment is, for example, a separator containing a microporous polyolefin membrane, a separator that is a laminate having a membrane composed of inorganic fine particles on at least one side of the microporous polyolefin membrane, a separator that is a laminate having a coating layer containing an aramid resin on at least one side of a microporous polyolefin membrane, a separator containing a non-woven paper made of cellulose, etc., can be exemplified. The polyolefin contained in the microporous polyolefin membrane includes, for example, polyethylene, polypropylene, etc. Organic or inorganic fine particles may be contained inside the separator.

<<Production Method of Non-Aqueous Alkali Metal Electricity Storage Element>>

The method for producing the non-aqueous alkali metal electricity storage element of the present embodiment relates to a non-aqueous alkali metal electricity storage element configured of the electrode laminated body or the electrode wound body as described below, which is housed in a casing together with the non-aqueous electrolytic solution.

<Assembly Step>

In the assembly step, typically, a positive electrode precursor and negative electrode cut into the form of sheets are laminated with a separator interposed therebetween to obtain an electrode laminated body, and a positive electrode terminal and a negative electrode terminal are connected to the electrode laminated body. Alternatively, a positive electrode precursor and negative electrode are laminated and wound with a separator interposed therebetween to obtain an electrode wound body, and a positive electrode terminal and a negative electrode terminal are connected to the electrode wound body. The shape of the electrode wound body may be a cylindrical shape or a flat type.

The positive electrode terminal and negative electrode terminal are connected by a method such as resistance welding or ultrasonic welding.

<Housing in Casing Step>

The electrode laminated body or electrode wound body is preferably housed in a casing typically represented by a metal can or laminated packaging material and then sealed while leaving only one opening. As a sealing method of the casing, a method such as heat sealing or impulse sealing, etc., can be used in the case of using a laminated packaging material.

<Drying Step>

The electrode laminated body or electrode wound body housed in the casing is preferably removed of residual solvent by drying. The drying method includes vacuum drying, etc. The amount of residual solvent per weight of the positive electrode active material layer or negative electrode active material layer is preferably 1.5% by weight or less. When the amount of residual solvent is 1.5% by weight or less, self-discharging characteristics or cycle characteristics are unlikely to be reduced, which is preferred.

<Pressurization Step>

Pressure is preferably applied from the outside of the casing in which the dried electrode laminated body or electrode wound body is housed, from both sides of the casing in the direction perpendicular to the surface of the electrode. The pressure is preferably 0.01 kgf/cm$^2$ or higher and 1,000 kgf/cm$^2$ or lower. The lower limit of the pressure is more preferably 0.05 kgf/cm$^2$. The upper limit of the pressure is more preferably 500 kgf/cm$^2$, still more preferably 100 kgf/cm$^2$, more preferably 30 kgf/cm$^2$, and particularly preferably 10 kgf/cm$^2$. When the pressure is 0.01 kgf/cm$^2$ or higher, the strains of the positive electrode precursor and the negative electrode are corrected by the pressure, and the distance between the opposite positive electrode precursor and the negative electrode becomes uniform in the plane, and therefore the doping is uniformly carried out in the plane in the alkali metal doping step, which is preferred because the durability is improved. Moreover, the reactions in the charge/discharge cycle step and the elevated temperature aging step as will be described later, also proceed uniformly, which is preferred because the durability is improved. When the pressure is 1,000 kgf/cm$^2$ or lower, a space for the non-aqueous electrolytic solution to permeate into the electrode laminated body or the electrode wound body is secured, and the permeation rate of the non-aqueous electrolytic solution into the electrode laminated body or the electrode wound body is improved, which is preferred.

This pressurization step can be carried out by using a pressurizing jig, or may be continuously carried out during the solution injection step described later.

A means for applying pressure from the outside of the casing in which the dried electrode laminated body or electrode wound body is housed, may be any jig that can apply pressure. For example, a pair of flat metal plates is prepared, then the electrode laminated body can be sandwiched therebetween along the surface of the electrode laminated body, and the four corners of the metal plate are fixed by screws, allowing pressurization of the body.

[Pressure Measurement Method]

The surface pressure distribution measurement system I-SCAN (manufactured by Nitta Corporation) is used for pressure measurement. The sensor sheet for measuring a surface pressure preferably has an area covering the entire pressurized surface. For example, if the pressurized surface is 60 mm in length×100 mm in width, an I-SCAN100 sensor (measurement surface dimensions: 112 mm×112 mm) can be used.

The sensor sheet is arranged between the main surface of the casing and the pressurized surface with the pair of jigs.

The maximum pressure of the sensor sheet measured is preferably equal to or greater than the maximum pressurization force applied to the casing and not greater than three times the maximum pressurization force. For example, if the maximum pressurization force applied to the casing is 5 kgf/cm$^2$, the maximum pressure of the sensor sheet measured is preferably 5 kgf/cm$^2$ or greater and 15 kgf/cm$^2$ or less, and therefore, for example, the sensor sheet that is I-SCAN100 (R) (maximum measurement pressure: 13 kgf/cm$^2$) is preferably used. When the maximum pressure of the sensor sheet measured is equal to or greater than the maximum pressurization force applied to the casing and not greater than three times the maximum pressurization force, the in-plane pressurization force applied to the casing can be accurately measured, which is preferred.

The number of sensor points on the sensor sheet is preferably 400 points (20 points in length×20 point in width) or more and more preferably 900 points or more (30 in length×30 in width). For example, when the pressurized area $S_1$ is 60 mm in length×100 mm in width (60 cm$^2$), the I-SCAN100 sensor (measurement area $S_s$: 112 mm×112 mm=125.44 cm$^2$, number of sensor points 1936 points) can be applied, and the number of sensor points used on the entire pressurized surface is $(S_1/S_s)\times1936$ points=926 points, which is preferred.

In the present description, kgf/cm$^2$ is used as an example of the unit of pressure, but the unit may be any unit provided that it indicates pressure, and may be, for example, Pa, mmHg, Bar, atm, etc.

Among the data acquired by the I-SCAN obtained above, the data not related to the actual pressurization force are not used for evaluating in-plane pressure irregularities because excessive pressure is facilitated to be detected at the side or corner of the sheet near the edge of the jig due to the influence of the burr of the jig, etc. Specifically, the pressure data at the first and last three points for each of the four sides are not used as data among the total pressure data in the pressurized surface measured. For example, if the data in the pressurized surface consist of 44 points in length×30 points in width, the column of the first 3 points and the column of the last 3 points for the 44 points in length are deleted, and the column of the first 3 points and the columns of the last 3 points for the 30 points in width are deleted, and the in-plane pressure distribution is acquired. The average value of the obtained pressure distribution is calculated by the following expression:

$$P_{avg.}=\Sigma_{x=1,y=1}^{m,n}P(x,y)/(m\times n) \quad \text{[Expression 1]}$$

wherein in the equation, x and y refer to the coordinates of the pressure distribution, and m and n indicate the maximum number of points for each of x and y, and the average value obtained is recorded as the pressure applied to the casing.

<Solution Injection, Impregnation and Sealing Steps>

Following completion of the assembly step, the non-aqueous electrolytic solution is injected into the electrode laminated body or electrode wound body housed in the casing. The method used for the solution injection consists of injecting the solution to the electrode laminated body or electrode wound body under the atmospheric pressure or reduced pressure, and the solution injection under reduced pressure is preferred. In one embodiment, the pressure can be reduced so that the internal pressure of the casing becomes −5 kPa to −101.32 kPa based on the atmospheric pressure. The time for the solution injection step can be shortened and the production efficiency is improved by injecting the solution under reduced pressure. Moreover, the positive electrode precursor, the negative electrode, and the separator can be uniformly immersed in the non-aqueous electrolytic solution.

In the state in which at least a portion of the positive electrode, negative electrode and separator is not immersed in the non-aqueous electrolytic solution, the lithium compound present in a portion of the positive electrode precursor that is not immersed in the non-aqueous electrolytic solution, or in portions of the positive electrode precursor facing the negative electrode and the separator, which are not immersed in the non-aqueous electrolytic solution, remains undecomposed in the alkali metal doping step described below. As a result, when the electricity storage element in which the non-aqueous electrolytic solution sufficiently permeates to the inside of the fine pores of the positive electrode, the negative electrode, and the separator, is exposed to an elevated temperature and a high voltage, a decomposition reaction of the lithium compound occurs, and gas is generated. Moreover, since the doping unevenly proceeds, in-plane doping irregularities or local precipitation of lithium (Li) is produced, which may increase the resistance of the obtained non-aqueous alkali metal electricity storage element and reduce the durability, yield, etc., thereof. Therefore, preferably the non-aqueous electrolytic solution is uniformly permeated to the inside of the fine pores of the positive electrode precursor, the negative electrode, and the separator. The electricity storage element in which the non-aqueous electrolytic solution is sufficiently permeated to the inside of the fine pores of the positive electrode, the negative electrode, and the separator is, for example, the completed non-aqueous alkali metal electricity storage element defined above, or the non-aqueous alkali metal electricity storage element that has been used for a long period of time.

In the solution injection step, the non-aqueous electrolytic solution is preferably injected into the casing in a state where the inside of the casing is depressurized to −5 kPa to −101.32 kPa based on the atmospheric pressure (normal pressure), and it is depressurized more preferably to −10 kPa to −101.32 kPa or −10 kPa to −101.30 kPa, and still more preferably to −30 kPa to −101.10 kPa, −50 kPa to −101.00 kPa, or −50 kPa to −100.00 kPa. The positive electrode precursor, the negative electrode, and the separator can be uniformly immersed in the non-aqueous electrolytic solution by injecting it in an environment of −5 kPa or lower based on the atmospheric pressure. If the inside of the casing is in an environment of −101.32 kPa or higher based on the atmospheric pressure, on the other hand, the characteristics of the obtained non-aqueous alkali metal electricity storage element can be stabilized by inhibiting vaporization of the non-aqueous solvent in the non-aqueous electrolytic solution upon the solution injection and preventing the composition change of the non-aqueous electrolytic solution.

The temperature of the non-aqueous electrolytic solution upon the solution injection is preferably 5° C. to 60° C., more preferably 15° C. to 45° C. When the temperature of the non-aqueous electrolytic solution upon the solution injection is 5° C. or higher, it is possible to inhibit the increase in viscosity of the non-aqueous electrolytic solution and to immerse uniformly the positive electrode precursor, the negative electrode, and the separator in the non-aqueous electrolytic solution. If the temperature of the non-aqueous electrolytic solution upon the solution injection is 60° C. or lower, on the other hand, the characteristics of the obtained non-aqueous alkali metal electricity storage element can be stabilized by inhibiting vaporization of the non-aqueous solvent in the non-aqueous electrolytic solution upon the solution injection and preventing the compositional change of the non-aqueous electrolytic solution.

Following the completion of the solution injection step, it is desired to further carry out an impregnation step of immersing sufficiently the positive electrode precursor, the negative electrode, and the separator in the non-aqueous electrolytic solution. A method of impregnation, such as installing the electrode laminated body or the electrode wound body after the solution injection in the decompression chamber while the casing being open, depressurizing the inside of the chamber by using a vacuum pump, and then returning to the atmospheric pressure, etc., can be used. From such a point of view, in the present embodiment, after the solution injection step, preferably the following steps:
- (a1) a re-depressurization step of adjusting the internal pressure of the casing in the opened state to −50 kPa to −100.00 kPa based on the atmospheric pressure, and
- (a2) a restoration step of returning the internal pressure of the casing to the atmospheric pressure, are further carried out. In re-depressurization step (a1), the internal pressure of the casing is preferably adjusted to −60.00 kPa to −100.00 kPa based on the atmospheric pressure. Following completion of the solution injection step and the impregnation step, the sealing step can be carried out. When a laminated packaging material is used in the sealing step, the electrode laminated body or electrode wound body in a state of the casing being open is sealed while reducing the pressure. When using a metal can, a sealing means such as welding or caulking is used.

<Improvement on Micro Short Circuit Ratio by Solution Injection Step>

The alkali metal electricity storage element comprising the positive electrode active material and the positive electrode precursor comprising the alkali metal compound other than the positive electrode active material, as the alkali metal electricity storage element precursor, has a problem of a high micro short circuit ratio and a low product yield. However, this problem can be solved by injecting a non-aqueous electrolytic solution while the inside of the casing is kept below the atmospheric pressure in the solution injection step.

The reason is not clear, however, when the positive electrode precursor has an alkali metal compound other than the positive electrode active material, in a state where at least a portion of the positive electrode, the negative electrode, and the separator is not immersed in the non-aqueous electrolytic solution, the oxidative decomposition reaction of the alkali metal compound in the doping step does not proceed and doping the negative electrode active material layer is likely to proceed unevenly. Consequently, it is conjectured that uneven potential distribution occurs in the negative electrode accompanied by the extremely low electric potential in a portion of the negative electrode, resulting in the precipitation of lithium that brings about micro short circuit between the positive electrode and the negative electrode. It is also conjectured that by injecting the non-aqueous electrolytic solution while the inside of the casing is kept below the atmospheric pressure in the solution injection step, the non-aqueous electrolytic solution can be homogeneously distributed to the positive electrode, the negative electrode, and even into the fine pores of the separator, which eliminates the uneven doping and inhibits the lithium precipitation in the negative electrode to reduce the micro short circuit.

On the other hand, the factor causing micro short circuit in the alkali metal electricity storage element by using the positive electrode precursor not comprising the alkali metal compound other than the positive electrode active material is different from the factor by using the positive electrode precursor comprising the aforementioned alkali metal compound, and for example, the factor is considered to be attributable to short circuit between the positive and negative electrodes due to the sliding off of the active materials of the positive electrode and negative electrode. Therefore, even if the solution injection step is introduced, the effect of improving the micro short circuit ratio is not exhibited.

<Repressurization Step>

The pressure applied from the outside of the casing is preferably increased after the solution injection step. As used herein, the step of pressurizing from the outside of the casing after the solution injection step is referred to as "repressurization step" when the pressurization step described above is carried out at least once after the housing step and before the solution injection step, and it is simply referred to as "pressurization step" when the pressurization step described above is not carried out after the housing step and before the solution injection step. The pressure is preferably 0.1 kgf/cm$^2$ or more and 1,000 kgf/cm$^2$ or less, more preferably 0.5 kgf/cm$^2$ or more and 100 kgf/cm$^2$ or less, and still more preferably 1 kgf/cm$^2$ or more and 10 kgf/cm$^2$ or less. When the pressure is 0.1 kgf/cm$^2$ or more, the strains of the positive electrode precursor and the negative electrode are corrected by the pressure, and the distance between the opposite positive electrode precursor and the negative electrode becomes uniform in the plane, therefore the doping is homogeneously carried out in the plane in the alkali metal doping step, improving the durability, which is preferred. When the pressure is 1,000 kgf/cm$^2$ or less, excessive pressure is not applied to the electrode laminated body or the electrode wound body, and the positive electrode precursor, the negative electrode, and the separator that are constituent materials, are not damaged, which is preferred. The pressurization step or repressurization step can be continuously carried out during the doping step described below. The pressurization step or the repressurization step can be carried out by using a pressurizing jig.

<Doping Step (Voltage Application Step)>

A preferred operation of alkali metal doping includes a method for applying a voltage between the positive electrode precursor and the negative electrode to decompose the alkali metal compound in the positive electrode precursor and to release alkali metal ions, and reducing the alkali metal ions in the negative electrode to pre-dope the negative electrode active material layer with the alkali metal ions (for example, lithium ions, etc.). As used herein, the step of applying a voltage to a non-aqueous alkali metal electricity storage element precursor including the positive electrode precursor, the negative electrode, the separator, the non-aqueous electrolytic solution, and the casing to dope the negative electrode with alkali metal ions is referred to as a "doping step", a "pre-doping step" or a "voltage application step". In the present embodiment, from the viewpoint of inhibiting the occurrence of micro short circuit, the non-aqueous alkali metal electricity storage element precursor is charged with a constant current and then charged with a constant voltage in the voltage application step. From such point of view, as a preferred operation of alkali metal doping, specifically, a constant current is applied to the electricity storage element precursor in the initial stage of alkali metal doping, to raise the voltage, and after reaching a predetermined voltage, a constant voltage can be applied to the electricity storage element precursor.

The voltage applied under the constant voltage in the alkali metal doping is 4.20 V or more from the viewpoint of inhibiting the occurrence of micro short circuit. The voltage value at the constant voltage charge is preferably 4.21 V or more and 4.82 V or less, more preferably 4.40 V or more and 4.80 V or less, and still more preferably 4.40 V or more and 4.60 V or less. When the voltage applied in the alkali metal doping is 4.20 V or more, the alkali metal compound contained in the positive electrode precursor can be efficiently decomposed and the alkali metal ions can be released into the non-aqueous electrolytic solution, which is preferable. The voltage of 4.82 V or less is preferred because the voltage resistance of the separator is superior to the potential difference between the positive and negative electrodes, which enables to inhibit a micro short circuit in the alkali metal doping.

From the viewpoint of inhibiting the occurrence of micro short circuit, current value (A) under a constant current imparted to the positive and negative electrodes in the alkali metal doping is, in terms of C rate, 1.0 C to 100.0 C (i.e., 1.0 to 100.0 times) with respect to the discharging electric capacity (A) of the completed non-aqueous alkali metal electricity storage element. The C rate at the constant current charge is preferably 1 C or more and 30 C or less and more preferably 1 C or more and 10 C or less. When the current value is 1.0 C or more, the alkali metal doping can be carried out quickly, and the workability can be improved. When the current value is 100.0 C or less, an overvoltage is not applied to the positive electrode precursor, and corrosion of the positive electrode current collector can be inhibited.

The temperature of the casing at the time of the alkali metal doping is preferably 30° C. or higher and 70° C. or lower, and more preferably 30° C. or higher and 55° C. or lower. When the temperature of the casing is 30° C. or higher, the alkali metal compound contained in the positive electrode precursor can be efficiently decomposed, and alkali metal ions can be released into the non-aqueous electrolytic solution, which is preferable. When the temperature of the casing is 70° C. or lower, decomposition of the non-aqueous electrolytic solution can be inhibited and the resistance of the non-aqueous alkali metal electricity storage element can be lowered, which is preferable. As used herein, the step of heating the non-aqueous alkali metal electricity storage element precursor is referred to as a "heating step". The heating step can be carried out, for example, by setting a non-aqueous alkali metal electricity storage element precursor in a thermostatic bath and adjusting the temperature of the casing to 30° C. or higher. Moreover, the heating step can also be carried out before the doping step.

The time for carrying out alkali metal doping is preferably 0.5 hours or longer and 30 hours or shorter and more preferably 1 hour or longer and 5 hours or shorter. When the alkali metal doping time is 0.5 hours or longer, the alkali metal doping can be carried out quickly and workability is improved, which is preferred. The alkali metal doping time is preferably 30 hours or shorter because the decomposition of the non-aqueous electrolytic solution can be inhibited and the resistance of the non-aqueous alkali metal electricity storage element can be lowered. From the same viewpoint, the constant voltage charge described above is preferably carried out over a period of 0.25 hours or longer and 24 hours or shorter and more preferably 0.5 hours or longer and 4 hours or shorter.

In the alkali metal doping step, gas such as $CO_2$ is generated due to oxidative decomposition of the alkali metal compound in the positive electrode precursor. Therefore, when applying a voltage, it is preferred to take measures to release the generated gas to the outside of the casing. The means includes, for example, a method for applying a voltage while a portion of the casing being open; and a method for applying a voltage in a state where an appropriate gas release means such as a gas vent valve or a gas permeable film is arranged in advance at a portion of the casing.

<Improvement on Micro Short Circuit Ratio in Doping Step>

The alkali metal electricity storage element, having the positive electrode precursor comprising the positive electrode active material and the alkali metal compound other than the positive electrode active material, as the alkali metal electricity storage element precursor, has a problem of a high micro short circuit ratio and a low product yield. However, this problem can be solved by carrying out the doping step under appropriate conditions (temperature, pressurization, voltage, rate).

Although the reason is not clear, when the positive electrode precursor has the alkali metal compound other than the positive electrode active material, the oxidative decomposition reaction of the alkali metal compound in the doping step does not proceed uniformly, and the negative electrode active material layer is likely to be unevenly doped. Consequently, it is conjectured that uneven electric potential distribution in the negative electrode occurs accompanied by the partially low electric potential therein, resulting in the precipitation of lithium that brings about micro short circuit between the positive electrode and the negative electrode, however, that the inhomogeneous doping is eliminated by carrying out the doping step under the appropriate conditions (temperature, pressurization, voltage, and rate) and the lithium precipitation of the negative electrode is inhibited to lower the micro short circuit ratio.

On the other hand, the factor causing micro short circuit in the alkali metal electricity storage element by using the positive electrode precursor not comprising the alkali metal compound other than the positive electrode active material is different from the factor by using the positive electrode precursor comprising the aforementioned alkali metal compound, and for example, the factor is considered to be attributable to short circuit between the positive and negative electrodes due to the sliding off of the active materials of the positive electrode and negative electrode. Therefore, even if the doping step under the appropriate conditions is introduced, the effect of improving the micro short circuit ratio is not exhibited.

<Charge/Discharge Cycle Step>

The electrode laminated body, or the electrode wound body is preferably subjected to a cycle step that repeats charge and discharge (as used herein, it is also referred to as a "charge/discharge cycle step"). The effects of the cycle step are as follows: (1) the effect that the cations, anions, and the solvent coordinated with the anions in the non-aqueous electrolytic solution enter and leave the fine pores of the activated carbon by repeating charge and discharge, so that unstable functional groups on the surface of in particular the activated carbon that is the positive electrode active material, is stabilized to improve the cyclic durability; (2) the effect that the alkali metal compound that could not be completely decomposed in the doping step, is completely decomposed by exposing the positive electrode to an high potential to improve the elevated temperature durability; and (3) the effect of improving the elevated temperature durability by consuming a by-product of the oxidative decomposition reaction of the alkali metal compound produced in the doping step. If the cycle step is carried out with a load more than necessary, the resistance of the non-aqueous alkali metal electricity storage element increases, and therefore, it is necessary to carry out the charge/discharge cycle step under appropriate conditions (temperature, voltage, number of charge/discharge, etc.).

The method of the charge/discharge cycle step includes a method for repeating charge/discharge within the range of the target voltage of the non-aqueous alkali metal electricity storage element precursor by the charging method represented as constant current charge, constant current and constant voltage charge, pulse charge, etc., or a discharging method represented as constant current discharge, constant current and constant voltage discharge, pulse discharge, etc.

The current rate in the constant current charge/discharge and pulse charge/discharge is preferably 0.2 C or more and 50 C or less based on the capacity at 4.2 V described below. If it is 0.2 C or more, the time required for charge/discharge can be shortened, so that the equipment load can be inhibited, and the production efficiency is improved. If it is 50 C or less, the current distribution becomes uniform, and therefore the above effect of the cycle step can be remarkably obtained.

The holding time of the constant voltage in the constant current and constant voltage charge/discharge is preferably 0.5 minutes or longer and 120 minutes or shorter. If it is 0.5 minutes or longer, the aforementioned effect of the cycle step can be remarkably obtained. If it is 120 minutes or shorter, the time required for charge/discharge can be shortened, so that the equipment load can be inhibited, and the production efficiency is improved.

In the charge/discharge cycle step, the charge/discharge is preferably carried out within the range of the upper limit voltage and the lower limit voltage described below. The upper limit voltage is preferably 3.8 V or more and 4.8 V or less, more preferably 4.0 V or more and 4.7 V or less, and particularly preferably 4.1 V or more and 4.6 V or less. When the upper limit voltage is 3.8 V or more, the alkali metal compound that could not be completely decomposed in the doping step can be decomposed, and the elevated temperature durability can be improved. When the upper limit voltage is 4.8 V or less, the resistance of the non-aqueous alkali metal electricity storage element can be maintained low. The lower limit voltage is preferably 1.5 V or more and 3.5 V or less, more preferably 1.6 V or more and 3.4 V or less, particularly preferably 1.7 V or more and 3.3 V or less, and most preferably 1.75 V or more and 3.0 V or less. When the lower limit voltage is 1.5 V or more, elution of copper that is a current collector of the negative electrode, can be inhibited, and the resistance of the non-aqueous alkali metal electricity storage element can be maintained low. When the lower limit voltage is 3.5 V or less, the resistance of the non-aqueous alkali metal electricity storage element can be kept low, and the ratio of increase in resistance after the elevated temperature and high load cycle test can be inhibited.

The temperature in the charge/discharge cycle step is preferably 30° C. or higher and 100° C. or lower, more preferably 35° C. or higher and 85° C. or lower, and particularly preferably 35° C. or higher and 75° C. or lower. If the temperature is 30° C. or higher, the durability is improved. When the temperature is 100° C. or lower, the resistance of the non-aqueous alkali metal electricity storage element can be maintained low, and the equipment load required for elevating the temperature can be inhibited, and therefore the production efficiency is improved. By controlling the temperature in the charge/discharge cycle step, the temperature of the non-aqueous alkali metal electricity storage element precursor can be controlled (for example, heating). The heating of the non-aqueous alkali metal electricity storage element precursor can be adjusted (heated) by, for example, a heating means. The means for heating specifically includes, for example, a heat exchanger using a heater, hot water, hot air, etc.

When the temperature of the non-aqueous alkali metal electricity storage element precursor is already within the desired temperature range (for example, 30° C. or higher and 100° C. or lower) before adjusting the temperature in the charge/discharge cycle step, it can be deemed that the step of heating the non-aqueous alkali metal electricity storage element precursor has already been carried out.

The number of cycles in the charge/discharge cycle step is preferably once or more and 10 times or less and more preferably twice or more and 8 times or less, when carrying out charge and discharge as one cycle. Carrying the charge/discharge cycle once or more has an effect of minimize the ratio of increase in resistance after the elevated temperature and high load cycle test. If it is 10 times or less, the resistance of the non-aqueous alkali metal electricity storage element can be maintained low. Moreover, if the number of times is 10 or less, the equipment load required can be inhibited, which is preferred from the viewpoint of production efficiency.

In the charge/discharge cycle step described before, pressure is preferably applied from the outside of the casing. The pressure is preferably 0.1 kgf/cm$^2$ or more and 1,000 kgf/cm$^2$ or less, more preferably 0.5 kgf/cm$^2$ or more and 100 kgf/cm$^2$ or less, and still more preferably 1 kgf/cm$^2$ or more and 10 kgf/cm$^2$ or less.

When the pressure is 0.1 kgf/cm$^2$ or more, the strains of the positive electrode precursor and the negative electrode are corrected by the pressure, the distance between the opposite positive electrode precursor and the negative electrode becomes uniform in the plane, and therefore the reaction in the charge/discharge cycle step is homogeneously carried out, which is preferred because the durability of the elevated temperature and high load cycle is improved. When the pressure is 1,000 kgf/cm$^2$ or less, a space for the non-aqueous electrolytic solution to permeate into the electrode laminated body or the electrode wound body is secured, and the durability for the elevated temperature and high load cycle is improved, which is preferred.

The same methods as in the above <Pressurization Step> can be employed for the means of pressurization of the non-aqueous alkali metal electricity storage element precursor, the measurement of the pressure, etc.

Effect of Charge/Discharge Cycle Step

1. Micro Short Circuit Ratio Inhibition Effect

Conventionally, it has been recognized that the alkali metal electricity storage element precursor comprising the positive electrode precursor having an alkali metal compound other than the positive electrode active material has a problem of the high micro short circuit ratio and low product yield of the obtained alkali metal electricity storage element. The inventors have found, on the contrary, that the inhibition effect on the micro short circuit ratio is exhibited by introducing a charge/discharge cycle step into the production step.

Namely, although the reason is not clear, it is conjectured that when the positive electrode precursor has an alkali metal compound other than the positive electrode active material, the oxidative decomposition reaction of the alkali metal compound in the doping step facilitates to unevenly proceed in the plane of the positive electrode precursor, consequently, the alkali metal ions undergo inhomogeneous doping reactions in the negative electrode plane, which causes uneven electric potential distribution in the negative electrode plane, lowering the electric potential in a portion thereof excessively, resulting in the precipitation of alkali metal (for example, lithium) that brings about micro short circuit between the positive electrode and the negative electrode. However, it is conjectured that by introducing the charge/discharge cycle step in the present embodiment, the uneven electric potential in the negative electrode plane is eliminated and the precipitation of the alkali metal is inhibited to reduce the micro short circuit ratio.

On the other hand, when using the alkali metal electricity storage element precursor comprising the positive electrode precursor not comprising the alkali metal compound other than the positive electrode active material, the factor causing micro short circuit in the obtained alkali metal electricity storage element is different from the factor by using the positive electrode precursor comprising the aforementioned alkali metal compound, and for example, the factor is considered to be attributable to short circuit between the positive and negative electrodes due to the sliding off of the active materials of the positive electrode and negative electrode. Therefore, even if the charge/discharge cycle step is introduced, the effect of improving the micro short circuit ratio is not exhibited.

2. Elevated Temperature and High Voltage Float Gas Inhibition Effects

Conventionally, it has been recognized that the alkali metal electricity storage element precursor comprising the positive electrode precursor having an alkali metal compound other than the positive electrode active material has a problem of gas generation of the obtained alkali metal electricity storage element upon the elevated temperature and high voltage float. The inventors have found, on the contrary, that the effect of inhibiting the generation of gas upon the elevated temperature and high voltage float is exhibited by introducing a charge/discharge cycle step into the production step.

Namely, although the reason is not clear, it is conjectured that when the positive electrode precursor has the alkali metal compound other than the positive electrode active material, a by-product of the decomposition reaction of the alkali metal compound is generated in the doping step to have an adverse effect during the elevated temperature and high voltage float test, and a gas is generated, however that by introducing the charge/discharge cycle step in the present embodiment, the remaining by-products are consumed accompanied by the ion adsorption and desorption reaction at the positive electrode, and/or the insertion/desorption reaction of the alkali metal (for example, lithium) at the negative electrode during the charge/discharge cycle, therefore, the gas generation of the completed non-aqueous alkali metal electricity storage element upon the elevated temperature and high voltage float test is inhibited.

On the other hand, it is conjectured that when using the alkali metal electricity storage element precursor provided with the positive electrode precursor not comprising the alkali metal compound other than the positive electrode active material, the factor causing gas generation in the obtained alkali metal electricity storage element upon the elevated temperature and high voltage float test is different from the factor by using the positive electrode precursor comprising the aforementioned alkali metal, and for example, it is derived from an oxidation reaction of the electrolytic solution solvent at the positive electrode or a reduction reaction at the negative electrode. Therefore, even if the charge/discharge cycle step is introduced, the gas inhibition effect upon the elevated temperature and high voltage float is not exhibited. In other words, the effects of the charge/discharge cycle step in the above 1. and 2. according to the present embodiment, can be achieved owing to the provision of the positive electrode precursor comprising the alkali metal compound other than the positive electrode active material.

3. Conditions for Exhibiting Effects

The present embodiment having the charge/discharge cycle step exhibits the effects of the charge/discharge cycle steps of the above 1. and 2., when the charge/discharge step consists of the steps of heating the non-aqueous alkali metal electricity storage element precursor to 30° C. or higher and 100° C. or lower, and charging and discharging within the range of the upper limit voltage and the lower limit voltage, wherein the upper limit voltage is 3.8V or more and 4.8V or less, and the lower limit voltage is 1.5V or more and 3.5V or less.

<Elevated Temperature Aging Step>

The electrode laminated body or the electrode wound body is subjected to an elevated temperature aging step of heating them (as used herein, also referred to as "aging step"). The effects of the elevated temperature aging step include: (1) the effect of improving durability by decomposing the solvent or additive in the non-aqueous electrolytic solution to form an organic film or an inorganic film on the surface of the positive electrode or the negative electrode; 2) the effect of improving cycle durability by chemically reacting and stabilizing unstable functional groups on the surface of activated carbon that is the positive electrode active material, and impurities contained in the positive electrode, negative electrode, separator, and electrolytic solution. The organic film or the inorganic film has the effect of improving elevated temperature durability, but if an excessive film is formed, the resistance of the non-aqueous alkali metal electricity storage element increases, which therefore necessitates to carry out the elevated temperature aging step under the appropriate conditions (temperature, voltage, time, etc.).

The method of the elevated temperature aging step includes a method for adjusting the voltage of the non-aqueous alkali metal electricity storage element precursor within the target range, then terminating charge/discharge, and storing it in an elevated temperature environment for a certain period of time by the charging method represented as constant current charge, constant current and constant voltage charge, pulse charge, etc., or the discharging method represented as constant current discharge, constant current and constant voltage discharge, pulse discharge, etc.

The elevated temperature aging step comprises (1) High-voltage storage step: After adjusting the voltage of the non-aqueous alkali metal electricity storage element precursor to a high voltage, the non-aqueous alkali metal electricity storage element precursor is stored at 45° C. or higher and 100° C. or lower. The voltage is preferably 4.03 V or more and 5.0 V or less, more preferably 4.05 V or more and 4.8 V or less, and particularly preferably 4.1 V or more and 4.5 V or less. If it is 4.03 V or more, the ratio of increase in resistance after the elevated temperature and high load cycle test, can be inhibited. The voltage of 5.0 V or less can prevent a film from being formed more than necessary, and therefore the resistance of non-aqueous alkali metal electricity storage element can be kept low.

The elevated temperature aging step may further comprise (2) the following low-voltage storage step in addition to (1) the high-voltage storage step.

(2) Low voltage storage step: After adjusting the voltage of the non-aqueous alkali metal electricity storage element precursor to a low voltage, the non-aqueous alkali metal storage element precursor is stored at 45° C. or higher and 100° C. or lower. The voltage is preferably 1.5 V or more and 2.8 V or less, more preferably 1.6 V or more and 2.7 V or less, and particularly preferably 1.7 V or more and 2.5 V or less. If it is 2.8 V or less, the capacity retention ratio after the elevated temperature and high load cycle test can be improved. If it is 1.5 V or more, the elution of copper that is a current collector of the negative electrode, can be inhibited and the resistance can be maintained low.

The order of the high voltage storage step and the low voltage storage step is not particularly restricted.

The temperature of the non-aqueous alkali metal electricity storage element precursor in the high voltage storage step and the low voltage storage step is 45° C. or higher and 100° C. or lower, preferably 50° C. or higher and 85° C. or lower, and more preferably 55° C. or higher and 75° C. or lower. The temperature of 45° C. or higher has an effect of inhibiting the ratio of increase in resistance after the elevated temperature and high load cycle test or an effect of improving the capacity retention ratio after the elevated temperature and high load cycle test. When the temperature is 100° C. or lower, the non-aqueous alkali metal electricity storage element can be maintained at a low resistance, and the equipment load required for elevating the temperature can be inhibited, improving the production efficiency. The temperature may be constant during the aging step, or may be varied in multiple steps in order to form a coating film stepwisely or to form a uniform film.

The temperature of the non-aqueous alkali metal electricity storage element precursor can be controlled by, for example, a heat exchanger using a heater, warm water, warm air, etc.

The time for the aging step is preferably 0.25 hours or longer and 340 hours or shorter, more preferably 0.5 hours or longer and 100 hours or shorter, and still more preferably 1 hour or longer and 50 hours or shorter. The time of 0.25 hours or longer has an effect of inhibiting the ratio of increase in resistance after the elevated temperature and high load cycle test or an effect of improving the capacity retention ratio after the elevated temperature and high load cycle test. If it is 340 hours or shorter, the non-aqueous alkali metal electricity storage element can be maintained at a low resistance, and the time required for the aging and the number of facilities can be inhibited, improving the production efficiency.

In the high voltage storage step and/or the low voltage storage step, after adjusting the voltage applied to the non-aqueous alkali metal electricity storage element precursor, the application of the voltage may be terminated, or the temperature of the non-aqueous alkali metal electricity storage element precursor may be controlled while continuing the application of the voltage.

In the elevated temperature aging step, the non-aqueous alkali metal electricity storage element precursor is preferably pressurized from the outside in advance at a pressure of 0.1 kgf/cm$^2$ or more and 1,000 kgf/cm$^2$ or less. The pressure can be applied from both sides of the casing in the direction perpendicular to the surface of the electrode from the outside of the casing in which the non-aqueous alkali metal electricity storage element precursor is housed. When the pressure is 0.1 kgf/cm$^2$ or more, the strain of the non-aqueous alkali metal electricity storage element precursor is corrected by the pressure, which facilitates the reaction in the elevated temperature aging step to proceed uniformly and improves the durability, which is preferred. The pressure of 1,000 kgf/cm$^2$ or less is preferred because a space for the non-aqueous electrolytic solution to permeate into the electrode laminated body or the electrode wound body is secured, and the permeation rate of the non-aqueous electrolytic solution into the electrode laminated body or the electrode wound body is improved.

The same method as in the above <Pressurization Step> can be employed for the means of pressurizing the non-aqueous alkali metal electricity storage element precursor, the measurement of the pressure, etc.

In the aging step, pressure is preferably applied from the outside of the casing. The pressure is preferably 0.1 kgf/cm$^2$ or more and 1,000 kgf/cm$^2$ or less, more preferably 0.5 kgf/cm$^2$ or more and 100 kgf/cm$^2$ or less, and still more preferably 1 kgf/cm$^2$ or more and 10 kgf/cm$^2$ or less.

When the pressure is 0.1 kgf/cm$^2$ or more, the strains of the positive electrode precursor and the negative electrode are corrected by the pressure, and the distance between the opposite positive electrode precursor and the negative electrode becomes uniform in the plane, and therefore the reaction in the elevated temperature aging step uniformly proceeds, which is preferred because the durability of the elevated temperature and high load cycle is improved. When the pressure is 1,000 kgf/cm$^2$ or less, a space for the non-aqueous electrolytic solution to permeate into the electrode laminated body or the electrode wound body is secured, which is preferred because the durability of the elevated temperature and high load cycle is improved.

Effect of Elevated Temperature Aging Step

1. Micro Short Circuit Ratio Inhibition Effect

Conventionally, it has been recognized that the alkali metal electricity storage element precursor provided with the positive electrode precursor having an alkali metal compound other than a positive electrode active material has the problem of the high micro short circuit ratio and low product yield of the obtained alkali metal electricity storage element.

The inventors have found on the contrary that the effect of inhibiting the micro short circuit ratio is exhibited by introducing a charge/discharge cycle step into the production step.

Namely, although the reason is not clear, it is conjectured that when the positive electrode precursor has the alkali metal compound other than the positive electrode active material, the oxidative decomposition reaction of the alkali metal compound in the doping step facilitates to unevenly proceed in the plane of the positive electrode precursor, consequently, the doping reaction of the alkali metal ions in the negative electrode unevenly proceeds in plane of the negative electrode, which causes uneven electric potential distribution in plane of the negative electrode accompanied by the extremely low electric potential in a portion thereof, resulting in the precipitation of lithium that brings about micro short circuit between the positive electrode and the negative electrode. However, it is conjectured that by introducing the elevated temperature aging step in the present embodiment, the uneven electric potential distribution in the negative electrode plane is eliminated and the precipitation of the alkali metal is inhibited to reduce the micro short circuit ratio.

On the other hand, it is conjectured that when using the alkali metal electricity storage element precursor provided with a positive electrode precursor not comprising the alkali metal compound other than the positive electrode active material, the factor causing the micro short circuit in the obtained alkali metal electricity storage element is different from the factor by using the positive electrode precursor comprising the aforementioned alkali metal compound, and for example, the factor is attributable to the sliding off of the active materials of the positive electrode and negative electrode that brings about a short circuit between the positive and negative electrodes. Therefore, even if the aforementioned elevated temperature aging step is introduced, the effect of improving the micro short-circuit ratio is not exhibited.

2. Elevated Temperature and High Voltage Float Gas Inhibition Effects

Conventionally, it has been recognized that the alkali metal electricity storage element precursor provided with the positive electrode precursor having an alkali metal compound other than the positive electrode active material has the problem of generation of gas in the obtained alkali metal electricity storage element upon the elevated temperature and high voltage float. The inventors have found, on the contrary, that the effect of inhibiting the generation of gas upon the elevated temperature and high voltage float is exhibited by introducing the elevated temperature aging step into the production step.

Namely, although the reason is not clear, it is conjectured that when the positive electrode precursor has the alkali metal compound other than the positive electrode active material, a by-product of the decomposition reaction of the alkali metal compound is generated in the doping step to have an adverse effect during the elevated temperature and high voltage float test, and a gas is generated, however that by introducing the elevated temperature aging step in the present embodiment, the remaining by-products are decomposed and consumed on the positive electrode that is exposed at the elevated temperature and high voltage, therefore, the gas generation of the completed non-aqueous alkali metal electricity storage element upon the elevated temperature and high voltage float test is inhibited.

On the other hand, it is conjectured that when using the alkali metal electricity storage element precursor provided with the positive electrode precursor not comprising the alkali metal compound other than the positive electrode active material, the factor causing generation of gas in the obtained alkali metal electricity storage element upon the elevated temperature and high voltage float test is different from the factor by using the positive electrode precursor comprising the aforementioned alkali metal, and for example, it is derived from an oxidation reaction of the electrolytic solution solvent at the positive electrode or a reduction reaction at the negative electrode. Therefore, even if the elevated temperature aging step is introduced, the gas generation inhibition effect during the elevated temperature and high voltage float is not exhibited. In other words, the effects of the elevated temperature aging steps in the above 1. and 2. according to the present embodiment, can be achieved owing to the provision of the positive electrode precursor comprising the alkali metal compound other than the positive electrode active material.

3. Conditions for Exhibiting Effects

The present embodiment comprising the elevated temperature aging step exhibits the effects of the elevated temperature aging steps of the above 1. and 2., when the elevated temperature aging step comprises:

a high voltage storage step of adjusting the voltage of the non-aqueous alkali metal electricity storage element precursor to 4.03 V or more and 5.0 V or less, and then storing the non-aqueous alkali metal electricity storage element precursor at a temperature of 45° C. or higher and 100° C. or lower.

Incidentally, in the case of a method of maintaining a high voltage at an elevated temperature instead of the high voltage storage, for example, a method for continuing to charge with a constant voltage charge, the effects of the elevated temperature aging steps of the above 1. and 2. are not exhibited. Continuous constant voltage charge facilitates precipitation of the alkali metal (for example, lithium) and occurrence of the micro short circuit, therefore the micro short circuit inhibition effect is not exhibited. When the constant voltage charge is continued at an elevated temperature, the alkali metal cannot be completely decomposed in the doping step, and the remaining alkali metal compounds undergo an oxidative decomposition reaction to regenerate by-products, therefore, gas generation upon the elevated temperature and high voltage float test of the completed non-aqueous alkali metal electricity storage element is not inhibited.

<Order of Doping Step, Cycle Step, and Aging Step>

Moreover, the doping step is desirably carried out first among the doping step, the cycle step, and the aging step. Following the doping step, the order and number of times of carrying out the cycle step or the aging step are not particularly limited. Moreover, the doping step may be carried out a plurality of times.

<Gas Venting Step and Sealing Step>

Following completion of the doping step, the cycle step, and the aging step, gas venting step may be carried out to reliably remove gas remaining in the non-aqueous electrolytic solution, positive electrode and negative electrode. The durability is improved by carrying out the gas venting step. The method of the gas venting consists of installing the electrode laminated body or electrode wound body in a decompression chamber with the casing left open and then reducing pressure inside the chamber by using a vacuum pump, etc. After the gas venting step, the opening portion of the casing is sealed.

<<Measurement and Evaluation Methods>>
<BET Specific Surface Area and Mean Fine Pore Diameter, Meso Pore Volume, and Micro Pore Volume>

The BET specific surface area and mean fine pore diameter, mesopore volume and micropore volume according to the present embodiment each is a value determined by the following respective methods. A sample is vacuum dried at 200° C. for a day and a night, and the adsorption/desorption isotherm is measured by using nitrogen as the adsorbate. By using the obtained isotherm on the adsorption side, the BET specific surface area is calculated by the multipoint BET method or single point BET method, the mean fine pore diameter is calculated by dividing the total pore volume per weight by the BET specific surface area, the mesopore volume is calculated by the BJH method, and the micropore volume is calculated by the MP method, respectively.

The BJH method is a method of calculation commonly used for analysis of mesopores, and it was advocated by Barrett, Joyner, Halenda et al. (E. P. Barrett, L. G. Joyner and P. Halenda, J. Am. Chem. Soc., 73, 373 (1951)).

Moreover, the MP method is a method in which the "t-plot method" (B. C. Lippens, J. H. de Boer, J. Catalysis, 4319 (1965)) is utilized to determine micropore volume, micropore area and micropore distribution, and it is the method proposed by R. S. Mikhail, Brunauer and Bodor (R. S. Mikhail, S. Brunauer, E. E. Bodor, J. Colloid Interface Sci., 26, 45 (1968)).

<Mean Particle Diameter>

The mean particle diameter for the present embodiment is the particle diameter at the point where, when the particle size distribution is measured by using a particle size distribution analyzer, and a cumulative curve with 100% as the total volume is determined, the cumulative curve is at 50% (i.e., the 50% diameter (Median diameter)). The mean particle diameter can be measured by using a commercially available laser diffraction particle size distribution analyzer.

<Doping Amount of Alkali Metal Ion in Negative Electrode>

The doping amount of the alkali metal ion in the negative electrode active material of the non-aqueous alkali metal electricity storage element, during shipping and after use, can be determined in the following manner, for example.

First, after washing the negative electrode active material layer in the present embodiment with ethyl methyl carbonate or dimethyl carbonate and drying it in air, it is extracted with a mixed solvent comprising methanol and isopropanol, to obtain the extract and the extracted negative electrode active material layer. The extraction will typically be carried out in an Ar box at an environmental temperature of 23° C.

The alkali metal amounts in the extract obtained in this manner and the extracted negative electrode active material layer are each quantified by using ICP-MS (Inductively Coupled Plasma-Mass Spectrometry), for example, and the total is calculated to determine the alkali metal ion doping amount in the negative electrode active material. Then, the obtained value may be compared to the amount of negative electrode active material supplied for extraction, to calculate a value having the above units.

The primary particle diameter can be obtained by a method in which the powder is photographed with an electron microscope in several visual fields, the particle diameters are calculated for 2,000 to 3,000 particles in the visual fields by using a fully automatic image processing device, etc., and the value of the arithmetic mean is recorded as the primary particle diameter.

<Degree of Dispersion>

Throughout the present description, the degree of dispersion is the value determined based on a dispersion evaluation test by using a fineness gauge conforming to JIS K5600. Specifically, a sufficient amount of sample can flow into the tip of a fineness gauge having a groove with the prescribed depth corresponding to the particle size, through the deep part of the groove, and is allowed to slightly spill over from the groove. Next, with the long side of a scraper parallel to the widthwise direction of the gauge, and placed with the blade edge in contact with the deep tip of the groove of the fineness gauge, the scraper is held on the surface of the gauge, the surface of the gauge is pulled at an even speed perpendicular to the long side direction of the groove to a groove depth of 0 for a period of 1 to 2 seconds, observation is made with light irradiated at an angle of 20° or greater and 300 or less within 3 seconds after the pulling has ended, and the depth at which particles appear in the groove of the fineness gauge is read off.

<Viscosity ($\eta$b) and TI Value>

The viscosity ($\eta$b) and TI value are the values determined by the following respective methods. First, an E-type viscometer is used to determine the viscosity ($\eta$a) stabilized after measurement for 2 minutes or longer under conditions with a temperature of 25° C. and a shear rate of 2 $s^{-1}$. Next, the viscosity ($\eta$b) is determined as measured under the same conditions except for changing the shear rate to 20 $s^{-1}$. The viscosity values as obtained above are used to calculate the TI value as: TI value=$\eta$a/$\eta$b. When increasing the shear rate from 2 $s^{-1}$ to 20 $s^{-1}$, it may be increased in a single stage, or the shear rate may be increased in stages within the range specified above, while appropriately determining the viscosity at each shear rate.

<Quantification of Carbon Material, Lithium Transition Metal Oxide, and Alkali Metal Compound, in Positive Electrode Active Material Layer>

The carbon material content $A_1$, the lithium transition metal oxide content $A_2$, and the alkali metal compound weight ratio $A_3$, of the positive electrode active material layer can be quantified by, for example, the following methods.

The area of the positive electrode precursor to be measured is preferably 5 $cm^2$ or more and 200 $cm^2$ or less, more preferably 25 $cm^2$ or more and 150 $cm^2$ or less, from the viewpoint of minimizing occurrence of variations in measurement. If the area is 5 $cm^2$ or more, the reproducibility of measurements is ensured. If the area is 200 $cm^2$ or less, the handleability of the sample for measurement becomes excellent.

First, the positive electrode precursor is cut into the above area and vacuum dried. The conditions for vacuum drying are, for example, temperature: 100 to 200° C., pressure: 0 to 10 kPa, and time: 5 to 20 hours, and the residual water content in the positive electrode precursor is preferably reduced to 1% by weight or less. The residual amount of water can be quantified by the Karl Fischer method.

The weight of the obtained positive electrode precursor after vacuum drying ($M_0$) is measured. Subsequently the positive electrode precursor is thoroughly immersed for 3 days or longer in distilled water at a 100- to 150-fold amount with respect to the weight of the positive electrode precursor to elute the alkali metal compound in the water. During the procedure, the vessel is preferably capped so that the distilled water does not volatilize off. After immersed for 3 days or longer, the positive electrode precursor is then removed from the distilled water and subjected to vacuum drying as in the same manner described above. The obtained weight of the positive electrode precursor ($M_1$) is measured. Then, the positive electrode active material layer with which one side or both sides of the positive electrode current collector was coated is removed therefrom by using a spatula, brush, bristles, etc. The weight of the remaining positive electrode current collector ($M_2$) is measured, and the weight ratio of the alkali metal compound ($A_3$) is calculated by the following equation:

$$A_3 = (M_0 - M_1)/(M_0 - M_2) \times 100$$

Subsequently, in order to calculate $A_1$ and $A_2$, a TG curve of the positive electrode active material layer obtained by removing the alkali metal compound is measured under the following conditions:

Sample pan: Platinum
Gas: Atmospheric atmosphere or compressed air
Temperature elevating rate: 0.5° C./min or less
Temperature range: 25° C. to 500° C. or higher and a melting point of lithium transition metal oxide minus 50° C. (the melting point−50° C.) or lower.

The weight at 25° C. in the obtained TG curve is defined as $M_3$, and the weight at the initial temperature at which the weight reduction rate becomes $M_3 \times 0.01$/min or less at a temperature of 500° C. or higher is defined as $M_4$.

Carbon materials are entirely oxidized and calcinated by heating at a temperature of 500° C. or lower in an oxygen-containing atmosphere (for example, the atmospheric atmosphere). The weight of the lithium transition metal oxide, on the other hand, is not reduced up to a temperature of the melting point of the lithium transition metal oxide minus 50° C., even in an oxygen-containing atmosphere.

Therefore, the lithium transition metal oxide content in the positive electrode active material layer $A_2$ can be calculated by the following equation.

$$A_2 = (M_4/M_3) \times \{1 - (M_0 - M_1)/(M_0 - M_2)\} \times 100$$

Further, the carbon material content in the positive electrode active material layer $A_1$ can be calculated by the following equation.

$$A_1 = \{(M_3 - M_4)/M_3\} \times \{1 - (M_0 - M_1)/(M_0 - M_2)\} \times 100$$

Incidentally, when a plurality of alkali metal compounds are contained in the positive electrode active material layer; when oxides such as $M_2O$, hydroxides such as MOH, halides such as MF or MCl, oxalates such as $M_2(CO_2)_2$, carboxylates such as RCOOM wherein in the formula, R is H, an alkyl group, or an aryl group, where in the above formulae, M is one or more selected from the group consisting of Na, K, Rb, and Cs, are contained in addition to the alkali metal compound; and when the positive electrode active material layer contains one or more selected from the group consisting of $BeCO_3$, $MgCO_3$, $CaCO_3$, $SrCO_3$, and $BaCO_3$, the total amount thereof is calculated as the amount of alkali metal compound.

When the positive electrode active material layer contains a conductive material, a binder, a thickener, etc., the total amount of the carbon material and these materials is calculated as $A_1$.

<Identification Method of Alkali Metal in Positive Electrode>

The alkali metal compound contained in the positive electrode can be identified by, for example, the following method. When identifying an alkali metal compound, a plurality of analysis methods described below is preferably combined for the identification.

When the alkali metal compound cannot be identified by the prescribed analysis methods, solid-state $^7$Li-NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning Calorimetry), etc., may be used as an alternative analysis method to identify the alkali metal compound.

[Scanning Electron Microscope-Energy Dispersive X-Ray Analysis (SEM-EDX)]

When the positive electrode active material layer does not contain the lithium transition metal oxide as the positive electrode active material, the alkali metal compound and positive electrode active material can be discriminated by oxygen mapping with an SEM-EDX image of the positive electrode surface measured at an observational magnification of 1000 to 4000×. The SEM-EDX image can be measured, for example, with an acceleration voltage of 10 kV, an emission current of 10 μA and a measuring pixel count of 256×256 pixels, and a number of scans of 50. In order to prevent electrification of the sample, the sample may be surface treated with gold, platinum, osmium, etc., by a method such as vacuum vapor deposition or sputtering, etc. For the SEM-EDX image measuring conditions, preferably the luminance and contrast are adjusted so that the brightness has no pixel reaching the maximum luminance in the mapping image, and the mean value of the brightness is a luminance in the range of 40% to 60% of the maximum luminance. In the obtained oxygen mapping, particles containing bright sections, binarized based on the mean value of brightness, for at least 50% of the area were considered to be alkali metal compounds.

[Microscopic Raman Spectroscopy]

The alkali metal compound and the positive electrode active material can be discriminated by Raman imaging of the carbonate ion on the positive electrode surface measured at an observational magnification of 1000 to 4000×. The measuring conditions may be, for example, an excitation light of 532 nm, an excitation light intensity of 1%, 50× long working of objective lens, a diffraction grating of 1800 gr/mm, point scanning as the mapping system (slit: 65 mm, binning: 5 pix), a 1 mm step, an exposure time per point of 3 seconds, a number of scans of 1, and with a noise filter. For the measured Raman spectrum, a straight baseline is set in the range of 1071 to 1104 $cm^{-1}$, a value positive from the baseline is considered a carbonate ion peak, the area is calculated, and the frequency is estimated, but the frequency of the noise component is subtracted from the carbonate ion frequency distribution of the carbonate ion peak that is approximated by a Gaussian function.

[X-Ray Photoelectron Spectroscopy (XPS)]

The electronic state of the positive electrode precursor can be analyzed by XPS to discriminate the bonded state of the compound contained in the positive electrode precursor. The measuring conditions may be, for example, monochromatized AlKα as the X-ray source, an X-ray beam diameter of 100 μmφ (25 W, 15 kV), narrow scan for path energy (58.70 eV), with charge neutralization, narrow scan for sweeping: 10 times (carbon, oxygen), 20 times (fluorine), 30 times (phosphorus), 40 times (alkali metal), and 50 times (silicon), narrow scan for energy step: 0.25 eV. The surface of the positive electrode is preferably cleaned by sputtering before XPS measurement. As the sputtering conditions, cleaning of the positive electrode surface may be carried out, for example, with an acceleration voltage of 1.0 kV, and 1 minute in a range of 2 mm×2 mm (1.25 nm/min in terms of $SiO_2$). In the obtained XPS spectrum, the following assignments may be made: For Li1s bond energy, peaks of 50 to 54 eV as $LiO_2$ or Li—C bond, and peaks of 55 to 60 eV as LiF, $Li_2CO_3$, and $Li_xPO_yF_z$, wherein in the formula, x, y and z are integers of 1 to 6; for C1s bond energy, a peak of 285 eV as C—C bond, a peak of 286 eV as C—O bond, a peak of 288 eV as COO, and peaks of 290 to 292 eV as $CO_3^{2-}$ and C—F bond; for O1s bond energy, a peak of 527 to 530 eV as $O^{2-}$ ($Li_2O$), peaks of 531 to 532 eV as CO, $CO_3$, OH, $PO_x$, wherein in the formula, x is an integer of 1 to 4, and $SiO_x$, wherein in the formula, x is an integer of 1 to 4, and peaks of 533 eV as C—O, and $SiO_x$, wherein in the formula, x is an integer of 1 to 4, for F1s bond energy, a peak of 685 eV as LiF, and peaks of 687 eV as C—F bond, $Li_xPO_yF_z$, wherein in the formula, x, y and z are integers of 1 to 6, and $PF_6^-$, for P2p bond energy, peaks of 133 eV as $PO_x$, wherein in the formula, x is an integer of 1 to 4, and peaks of 134 to 136 eV as $PF_x$, wherein in the formula, x is an integer of 1 to 6, and for Si2p bond energy, peaks of 99 eV as Si and silicide, and peaks of 101 to 107 eV as $Si_xO_y$, wherein in the formula, x and y are any integers. When peaks overlap in the obtained spectrum, the spectrum is preferably assigned upon separating the peaks with the assumption of a Gaussian function or Lorentz function. The alkali metal compound that is present can be identified based on the obtained results of measuring the electronic state, and the existing element ratio.

[Ion Chromatography]

Anion species eluted in water can be identified by analyzing the distilled water washing fluid of the positive electrode by ion chromatography. The columns used may be an ion-exchange type, ion exclusion type and reversed-phase ion pair type. The detector used may be an electric conductance detector, ultraviolet-visible absorption intensity detector, electrochemical detector, etc., and a suppressor system with a suppressor installed before the detector, or a non-suppressor system without installation of a suppressor by using a solution with low electric conductance as the eluent, may be used. Moreover, the measurement can also be carried out by combining a mass spectrometer or a charged particle detector with a detector.

The sample holding time is the same for each ion species component if the conditions such as the column, eluent, etc., used are fixed, while the size of the peak response differs for each ion species but is proportional to the concentration. By premeasuring a standard solution of known concentration with ensured traceability, it is possible to analyze the ion species components qualitatively and quantitatively.

[Quantification Method of Alkali Metal Element ICP-MS]

The positive electrode precursor is acid-decomposed with a strong acid such as concentrated nitric acid, concentrated hydrochloric acid, and aqua regia, and the obtained solution is diluted with pure water to an acid concentration of 2% to 3%. As for acid decomposition, the positive electrode precursor can be decomposed by heating and pressurizing as appropriate. The obtained diluent is analyzed by ICP-MS. A known amount of elements as an internal standard is preferably added in this case. When the alkali metal element to be measured exceeds the upper limit concentration for measurement, the diluent is preferably further diluted while maintaining the acid concentration. With respect to the obtained measurement results, each element can be quantified based on a calibration curve preliminarily prepared by using a standard solution for chemical analysis.

<Measurement of Residual Solvent Amount>

The amount of residual solvent in the positive electrode active material layer is a value obtained by the following method. The positive electrode precursor and the current collector are cut into 80 mm×80 mm, they are weighted by using an electronic balance, and the obtained measured values are recorded as a weight $W_1$ (g) of the precursor and a weight $W_2$ (g) of the collector, respectively. Then, using a heat-drying moisture meter, the surface is heat-dried at a temperature of 170° C. for 5 minutes. When the both sides are coated with the positive electrode active material layer, the back surface side is also heat-dried at a temperature of 170° C. for 5 minutes. The positive electrode precursor after heat drying is transferred to an electronic balance, and weight $W_3$ (g) with an elapse of 10 seconds after completion of heat drying is recorded. The amount of residual solvent is calculated by the following formula.

$$\text{Amount of residual solvent} = \{(W_1-W_3)/(W_1-W_2)\} \times 100(\%)$$

The method for measuring the amount of residual solvent in the negative electrode active material layer is also carried out in the same manner.

<Characteristics Evaluation of Non-Aqueous Alkali Metal Electricity Storage Element>

[Electrostatic Capacitance]

As used herein, the electrostatic capacitance F (F) refers to a value obtained by the following method:

First, a cell corresponding to the non-aqueous alkali metal electricity storage element was charged with a constant current charge at a current value of 20 C until reaching 4.0V in a thermostatic bath set to 25° C., and then charged with application of a constant voltage of 4.0 V for a total of 30 minutes. Subsequently, the capacitance obtained when it was discharged with a constant current at a current value of 2 C down to 2.0 V, refers to Q, and by using the obtained Q, $F=Q/(4.0-2.0)$ was calculated as electrostatic capacitance F.

[Electrical Energy]

Throughout the present description, the electrical energy E (Wh) is the value obtained by the following method:

By using the electrostatic capacitance F (F) as calculated according to the aforementioned method, the electrical energy E can be calculated by $F \times \{(4.0^2-2.0^2)\}/2/3600$.

[Volume]

The volume of the non-aqueous alkali metal electricity storage element is not particularly prescribed, but it refers to the volume of the portion of the electrode laminated body or electrode wound body in which the region where the positive electrode active material layer and negative electrode active material layer are stacked, is housed by the casing.

For example, in the case of an electrode laminated body or electrode wound body housed with a laminate film, the region of the electrode laminated body or electrode wound body where the positive electrode active material layer and negative electrode active material layer are present, is housed in a cup-shaped laminate film. The volume ($V_1$) of the non-aqueous alkali metal electricity storage element is calculated by $V_1=l_1 \times w_1 \times t_1$, by using the outer length ($l_1$) and outer width ($w_1$) of the cup-shaped portion, and the thickness ($t_1$) of the non-aqueous alkali metal electricity storage element including the laminate film.

In the case of an electrode laminated body or electrode wound body housed in a rectilinear metal can, the volume of the outer dimensions of the metal can is simply used as the volume of the non-aqueous alkali metal electricity storage element. Namely, the volume ($V_2$) of the non-aqueous alkali metal electricity storage element is calculated by $V_2=l_2 \times w_2 \times t_2$, based on the outer length ($l_2$) and outer width ($w_2$), and outer thickness ($t_2$), of the rectilinear metal can.

Moreover, even in the case of an electrode wound body housed in a cylindrical metal can, the volume of the outer dimensions of the metal can is used as the volume of the non-aqueous alkali metal electricity storage element. Namely, the volume ($V_3$) of the non-aqueous alkali metal electricity storage element is calculated by $V_3=3.14 \times r \times r \times l_3$, using the outer radius (r) and outer length ($l_3$) of the bottom face or top face of the cylindrical metal can.

[Energy Density]

As used herein, energy density refers to the value obtained from the formula $E/V_1$ (Wh/L) by using electrical energy E and volume $V_i$ (wherein, $V_i=V_1$, $V_2$ or $V_3$).

The energy density is preferably 15 or greater, more preferably 18 or greater and still more preferably 20 or greater from the viewpoint of producing adequate charging capacity and discharging capacity. If the energy density is equal to or greater than the aforementioned lower limit value, an electricity storage element can be obtained that has superior volumetric energy density. Consequently, in the case of using an electricity storage system using the electricity storage element by combining with an automobile engine, for example, the electricity storage system can be installed in a limited confined space within the automobile, which thereby makes this preferable.

[Room Temperature Discharge Internal Resistance]

In the present description, room temperature discharge internal resistance Ra ($\Omega$) refers to the value obtained according to the method indicated below:

First, a cell corresponding to the non-aqueous alkali metal electricity storage element is charged with a constant current at a current value of 20 C until reaching 4.0 V in a thermostatic chamber set to 25° C., and subsequently charged with a constant voltage by applying a constant voltage of 4.0 V for a total of 30 minutes. Continuing, it is discharged with a constant current at a current value of 20 C down to 2.0 V to obtain a discharging curve (time vs. voltage). The room temperature discharge internal resistance is the value calculated from equations consisting of voltage drop $\Delta E=4.0-Eo$, and $Ra=\Delta E/(20\ C\ (current\ value\ A))$ when the voltage at a discharge time=0 seconds, obtained by extrapolating by linear approximation from the voltages at discharge times of 2 seconds and 4 seconds in the discharging curve, is defined as Eo.

Ra·F ($\Omega \cdot F$) that is a product of Ra·and F is preferably 3.0 or less, more preferably 2.6 or less and still more preferably 2.4 or less from the viewpoint of producing sufficient charging capacity and discharging capacity with respect to large current. If Ra·F is equal to or less than the aforementioned upper limit value, a non-aqueous alkali metal electricity storage element can be obtained that has superior input/output characteristics. Consequently, when an electricity storage system using the non-aqueous alkali metal electricity storage element is combined with a highly efficient engine, etc., the electricity storage system is able to adequately withstand high loads applied to the non-aqueous alkali metal electricity storage element, which thereby makes this preferable.

[Lowered Temperature Discharge Internal Resistance]

In the present description, lowered temperature discharge internal resistance Rb ($\Omega$) refers to the value obtained according to the method indicated below.

First, a cell corresponding to the non-aqueous alkali metal electricity storage element is allowed to stand for 2 hours in a thermostatic chamber set to −30° C. Subsequently, while holding the temperature of the thermostatic chamber at −30° C., the cell is charged with a constant current at a current value of 1.0 C up to 4.0 V, and then charged with a constant voltage for a total of 2 hours by applying a constant voltage of 4.0 V. Continuing, it is discharged with a constant current discharge at a current value of 10 C down to 2.0 V to obtain a discharging curve (time vs. voltage). The lowered temperature discharge internal resistance is the value calculated from equations consisting of voltage drop $\Delta E=4.0-Eo$, and $Rb=\Delta E/(10\ C\ (current\ value\ A))$ when the voltage at a discharge time=0 seconds, obtained by extrapolating by linear approximation from the voltages at discharge times of 2 seconds and 4 seconds in the discharging curve, is defined as Eo.

Rb·F ($\Omega \cdot F$) that is a product of Rb·and F is preferably 30 or less, more preferably 26 or less and still more preferably 22 or less from the viewpoint of producing sufficient charging capacity and discharging capacity under the lowered temperature environment of −30° C. If Rb·F is equal to or less than the aforementioned upper limit value, a non-aqueous alkali metal electricity storage element can be obtained that has superior input/output characteristics such a lowered temperature environment. Consequently, it is possible to obtain an electricity storage element that can impart sufficient electric power for driving a motor when starting an engine of an automobile and motorbike under the lowered temperature environment.

[Elevated Temperature and High Voltage Float Test]

In the present description, the amount of gas generated during an elevated temperature storage test and the ratio of the increase in room temperature discharge internal resistance after an elevated temperature storage test are measured according to the methods indicated below:

First, a cell corresponding to the non-aqueous alkali metal electricity storage element is charged with a constant current at a current value of 20 C until reaching 4.2 V in a thermostatic chamber set to 85° C., and then charged with a constant voltage for 300 hours by applying a constant voltage of 4.2 V. A cell volume prior to the start of storage Va and a cell volume after carrying out the test for 300 hours Vb are measured according to the Archimedes method. Vb−Va is taken as the amount of gas generated in the elevated temperature and high voltage float test.

When the resistance value of the cell following the aforementioned elevated temperature and high voltage float test obtained by using the same measurement method as that used for measuring the room temperature discharge internal resistance, is defined as a room temperature discharge internal resistance after the elevated temperature storage test Rd, the ratio of the increase in room temperature discharge internal resistance after the storage test for 300 hours to the room temperature discharge internal resistance prior to the start of the test Ra is determined according to Rd/Ra.

Rd/Ra is preferably 3.0 or less, more preferably 2.0 or less, and still more preferably 1.5 or less from the viewpoint of exhibiting sufficient charging capacity and discharging capacity for a large current when exposed to an elevated temperature environment for a long time. When Rd/Ra is equal to or less than the above upper limit, excellent output characteristics can stably be obtained for a long period of time, which leads to longevity of the element.

The amount of gas generated in the elevated temperature and high voltage float test, as the value of the gas generated measured at 25° C., is preferably $30 \times 10^{-3}$ cm$^3$/F or less, more preferably $20 \times 10^{-3}$ cm$^3$/F or less, and still more preferably $15 \times 10^{-3}$ cm$^3$/F or less, from the viewpoint of preventing decreases in the element characteristics caused by generated gas. If the amount of gas generated under the aforementioned conditions is equal to or less than the aforementioned upper limit value, there is no risk of swelling of the cell due to generation of gas even in the case of a device being exposed to elevated temperatures for a long period of time. Consequently, an electricity storage element can be obtained that has satisfactory stability and durability.

[Ratio of Increase in Room Temperature Discharge Internal Resistance after Elevated Temperature and High Load Charge/Discharge Cycle Test]

Throughout the present description, the ratio of the increase in room temperature discharge internal resistance after the elevated temperature and high-load charge/discharge cycle test is measured by the following method:

First, in a thermostatic bath set to 60° C., a cell corresponding to the non-aqueous alkali metal electricity storage element is charged with a constant current at the 300 C current value until 4.1 V is reached, and then discharged with a constant current at the 300 C current value until 1.9 V is reached. The charge/discharge step is repeated 60,000 times followed by measurement of room temperature discharge internal resistances before the start of the test and after completion of the test, and when the room temperature discharge internal resistance before the start of the test is Ra (Ω) and the room temperature discharge internal resistance after completion of the test is Re (Ω), the ratio of the increase in resistance after the high-load charge/discharge cycle test to that before the test is calculated by Re/Ra.

Incidentally, Re/Ra is preferably 3.0 or less, more preferably 2.0 or less, and still more preferably 1.5 or less from the viewpoint of exhibiting sufficient charging capacity and discharging capacity for a large current when exposed to an elevated temperature environment for a long time. When Re/Ra is equal to or less than the upper limit, excellent output characteristics can stably be obtained for a long period of time, which leads to longevity of the element.

[Capacitance Retention Ratio after Elevated Temperature and High Load Charge/Discharge Cycle Test]

Throughout the present description, the capacitance retention ratio after the high load charge/discharge cycle test is measured by the following method:

First, in a thermostatic bath set to 60° C., a cell corresponding to the non-aqueous alkali metal electricity storage element is charged with a constant current at the 300 C current value until 4.1 V is reached, and then discharged with a constant current at the 300 C current value until 1.9 V is reached. The charge/discharge step is repeated 60,000 times. Subsequently, when the capacitance obtained by employing the same method as in the case of the aforementioned electrostatic capacitance, is an electrostatic capacitance after the elevated temperature and high-load charge/discharge cycle test (Fe), the capacitance retention ratio of the capacitance after the elevated temperature and high-load charge/discharge cycle test to the capacitance before the elevated temperature and high-load charge/discharge cycle test is calculated by Fe/F.

Incidentally, Fe/F is preferably 0.5 or greater, more preferably 0.8 or greater, and still more preferably 0.95 or greater from the viewpoint of outputting sufficient capacity when an electricity storage element is subjected to the charge/discharge for a long time. Fe/F being equal to or greater than the above lower limit leads to longevity of the element, which is preferred.

[Ratio of Increase in Room Temperature Discharge Internal Resistance after Elevated Temperature and High Load Charge/Discharge Cycle Test]

The ratio of the increase in room temperature discharge internal resistance after the elevated temperature and high load charge/discharge cycle test is measured by the following method:

First, in a thermostatic bath set to 60° C., a cell corresponding to the non-aqueous alkali metal electricity storage element is charged with a constant current at the 300 C current value until 4.05 V is reached, and then discharged with a constant current at the 300 C current value until 1.95 V is reached. The charge/discharge step is repeated 60,000 times followed by measurement of room temperature discharge internal resistances before the start of the test and after completion of the test, and when the room temperature discharge internal resistance before the start of the test is Ra (Ω) and the room temperature discharge internal resistance after completion of the test is Re (Ω), the ratio of the increase in resistance after the high load charge/discharge cycle test to that before the test is calculated by Re/Ra.

Re/Ra is preferably 3.0 or less, more preferably 2.0 or less, and still more preferably 1.5 or less from the viewpoint of exhibiting sufficient charging capacity and discharging capacity for a large current when exposed to an elevated temperature environment for a long time. When Re/Ra is equal to or less than the above upper limit, excellent output characteristics can stably be obtained for a long period of time, which leads to longevity of the element.

[Miro Short Circuit Inspection Test]

In the present description, the occurrence of micro short circuit in the non-aqueous alkali metal electricity storage element is determined by the following method.

First, the cell voltage is adjusted to 4.0 V by the method in which the cell is discharged with a constant current value of 1 C until 2.5 V is reached, and then is charged with a constant current value of 1 C until 4.0 V is reached followed by a constant voltage charge at 4.0 V for 1 hour. Subsequently, in a thermostatic bath set at 45° C., the electrode body is allowed to stand for one week in a state of being pressurized at a pressure of 100 kPa, and when the voltage drops to 3.8 V or less, it is determined to be occurrence of micro short-circuit. By heating and pressurization, a non-aqueous alkali metal electricity storage element causing a micro short circuit can be detected with high sensitivity.

The non-aqueous alkali metal electricity storage element described above has excellent initial input/output characteristics, excellent elevated temperature and high load charge/discharge cycle characteristics, and excellent elevated temperature storage durability. Thus, it can be suitably used in automobiles, for example, in the field of hybrid drive system in combination of internal combustion engines or fuel cells, motors, and the electricity storage elements, and can be further used in an instantaneous power peak assist application, etc.

EXAMPLES

Hereinafter, the invention will now be explained in greater detail by using Examples and Comparative Examples, with the understanding that the invention is not limited thereto.

<<Production of Non-Aqueous Lithium Electricity Storage Element in First Embodiment>>

Non-aqueous lithium electricity storage elements each that was one embodiment of the non-aqueous alkali metal storage elements was fabricated below.

<Production of Positive Electrode Precursor>

[Preparation of Activated Carbon 1-1]

A carbide was obtained by subjecting pulverized coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/h while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., pulverization was carried out for 1 hour with a ball mill to obtain activated carbon 1-1.

Measurement of mean particle diameter of this activated carbon 1-1 by using a laser diffraction-type particle size distribution measurement apparatus (SALD-2000J) manufactured by Shimadzu Corp. yielded a value of 5.5 μm. Moreover, the fine pore size distribution of activated carbon 1-1 was measured by using a fine pore size distribution measurement apparatus (AUTOSORB-1 AS-1-MP) manufactured by Yuasa Ionics Co., Ltd. As a result, the BET specific surface area was 2,360 m$^2$/g, mesopore volume ($V_1$) was 0.52 cm$^3$/g, micropore volume ($V_2$) was 0.88 cm$^3$/g, and $V_1/V_2$=0.59.

[Preparation of Activated Carbon 1-2]

A carbide having a mean particle diameter of 7 μm was obtained by carrying out carbonization treatment on a phenol resin for 2 hours at 600° C. in a calcination furnace in a nitrogen atmosphere followed by pulverizing with a ball mill and classification. KOH was mixed with this carbide at a weight ratio of 1:5 followed by activating by heating for 1 hour at 800° C. in the calcination furnace in a nitrogen atmosphere. The activated carbon was taken out, washed by stirring for 1 hour in dilute hydrochloric acid adjusted to 2 mol/L, and washed by boiling in distilled water until the pH stabilized between 5 and 6 and then dried to obtain activated carbon 1-2.

Measurement of mean particle diameter of this activated carbon 1-2 by using a laser diffraction-type particle size distribution measurement apparatus (SALD-2000J) manufactured by Shimadzu Corp. yielded a value of 7.0 μm. Moreover, fine pore size distribution of activated carbon 1-2 was measured by using a fine pore size distribution measurement apparatus (AUTOSORB-1 AS-1-MP) manufactured by Yuasa Ionics Co., Ltd. As a result, the BET specific surface area was 3,627 m$^2$/g, mesopore volume ($V_1$) was 1.50 cm$^3$/g, micropore volume ($V_2$) was 2.28 cm$^3$/g, and $V_1/V_2$=0.66.

<Production of Positive Electrode Precursor>

[Production of Positive Electrode Precursor 1-1]

A positive electrode precursor was produced by using activated carbon 1-1 as the positive electrode active material.

58.0 parts by weight of activated carbon 1-1, 32.0 parts by weight of lithium carbonate, 4.0 parts by weight of acetylene black, 3.5 parts by weight of acrylic latex, 1.5 parts by weight of CMC (carboxymethyl cellulose), and 1.0 part by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 1-1.

The viscosity (ηb) and TI value of the resulting positive electrode coating solution 1-1 were measured by using the TVE-35H E-type viscometer manufactured by Toki Sangyo Co., Ltd. As a result, viscosity (ηb) was 2,030 mPa·s and the TI value was 4.2. Moreover, dispersity of the resulting positive electrode coating solution 1-1 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 1-1 under conditions of a coating speed of 1 m/s by using a double-sided die coater manufactured by Toray Engineering Co., Ltd. and the coating film was dried to obtain a positive electrode precursor 1-1. The resulting positive electrode precursor 1-1 was pressed under conditions of a pressure of 6 kN/cm and pressed surface temperature of 25° C. by using a roll press. The total film thickness of the positive electrode precursor 1-1 was measured at ten arbitrary locations of the positive electrode precursor 1-1 by using the GS-551 Linear Gauge Sensor film thickness gauge manufactured by Ono Sokki Co., Ltd. The film thickness of the positive electrode active material layer of positive electrode precursor 1-1 was 61 μm per one side.

Incidentally, the positive electrode precursor was produced and stored in a general environment where the dew point and illuminance were not controlled.

[Production of Positive Electrode Precursor 1-2]

A positive electrode precursor was produced by using activated carbon 1-1 as the positive electrode active material.

42.0 parts by weight of activated carbon 1-1, 14.0 parts by weight of LiFePO$_4$ having an average particle diameter of 3.5 μm as a lithium transition metal oxide, 32.0 parts by weight of lithium carbonate, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 1-2.

The viscosity (ηb) and TI value of the resulting positive electrode coating solution 1-2 were measured by using the TVE-35H E-type viscometer manufactured by Toki Sangyo Co., Ltd. As a result, viscosity (ηb) was 2,330 mPa·s and the TI value was 4.5. Moreover, dispersity of the resulting positive electrode coating solution 1-2 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 1-2 under conditions of a coating speed of 1 m/s by using a double-sided die coater manufactured by Toray Engineering Co., Ltd. and the coating film was dried to obtain a positive electrode precursor 1-2. The resulting positive electrode precursor 1-2 was pressed under conditions of a pressure of 6 kN/cm and pressed surface temperature of 25° C. by using a roll press. The total film thickness of the positive electrode precursor 1-2 was measured at ten arbitrary locations of the positive electrode precursor 1-2 by using the GS-551 Linear Gauge Sensor film thickness gauge manufactured by Ono Sokki Co., Ltd. The film thickness of the positive electrode active material layer of positive electrode precursor 1-2 was 48 μm per one side.

Incidentally, the positive electrode precursor was produced and stored in a general environment where the dew point and illuminance were not controlled.

[Production of Positive Electrode Precursor 1-3]

A positive electrode precursor was produced by using activated carbon 1-1 as the positive electrode active material.

90.0 parts by weight of activated carbon 1-1, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone)

were mixed with distilled water so that the weight ratio of the solid content was 35.0%, followed by dispersing under conditions of a peripheral velocity of 10 m/s for 2 minutes by using the FILMIX® thin film rotating-type high-speed mixer manufactured by Primix Corp. to obtain a positive electrode coating solution 1-3. The viscosity (ηb) and TI value of the resulting positive electrode coating solution 1-3 were measured by using the TVE-35H E-type viscometer manufactured by Toki Sangyo Co., Ltd. As a result, viscosity (ηb) was 2,150 mPa·s and the TI value was 5.2. Moreover, dispersity of the resulting positive electrode coating solution 1-3 was measured by using a particle gauge manufactured by Yoshimitsu Seiki Co., Ltd. As a result, dispersity was 25 μm.

Both sides of an aluminum foil having a thickness of 15 μm was coated with the positive electrode coating solution 1-3 under conditions of a coating speed of 1 m/s by using a double-sided die coater manufactured by Toray Engineering Co., Ltd. and the coating film was dried to obtain a positive electrode precursor 1-3. The resulting positive electrode precursor 1-3 was pressed under conditions of a pressure of 6 kN/cm and pressed surface temperature of 25° C. by using a roll press. The total film thickness of the positive electrode precursor 1-3 was measured at ten arbitrary locations of the positive electrode precursor 1-3 by using the GS-551 Linear Gauge Sensor film thickness gauge manufactured by Ono Sokki Co., Ltd. The film thickness of the positive electrode active material layer of positive electrode precursor 1-3 was 67 μm per one side.

Incidentally, the positive electrode precursor was produced and stored in a general environment where the dew point and illuminance were not controlled.

[Production of Positive Electrode Precursor 1-4]

A positive electrode precursor was produced by using activated carbon 1-1 as the positive electrode active material.

60.0 parts by weight of activated carbon 1-1, 30.0 parts by weight of LiFePO$_4$ having an average particle diameter of 3.5 μm as a lithium transition metal oxide, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 38.0%, followed by dispersing under conditions of a peripheral velocity of 10 m/s for 2 minutes by using the FILMIX® thin film rotating-type high-speed mixer manufactured by Primix Corp. to obtain a positive electrode coating solution 1-4.

The viscosity (ηb) and TI value of the resulting positive electrode coating solution 1-4 were measured by using the TVE-35H E-type viscometer manufactured by Toki Sangyo Co., Ltd. As a result, viscosity (ηb) was 2,020 mPa·s and the TI value was 5.6. Moreover, dispersity of the resulting positive electrode coating solution 1-4 was measured by using a particle gauge manufactured by Yoshimitsu Seiki Co., Ltd. As a result, dispersity was 23 μm.

Both sides of an aluminum foil having a thickness of 15 μm was coated with the positive electrode coating solution 1-4 under conditions of a coating speed of 1 m/s by using a double-sided die coater manufactured by Toray Engineering Co., Ltd. and the coating film was dried to obtain a positive electrode precursor 1-4. The resulting positive electrode precursor 1-4 was pressed under conditions of a pressure of 6 kN/cm and pressed surface temperature of 25° C. by using a roll press. The total film thickness of the positive electrode precursor 1-4 was measured at ten arbitrary locations of the positive electrode precursor 1-4 by using the GS-551 Linear Gauge Sensor film thickness gauge manufactured by Ono Sokki Co., Ltd. The film thickness of the positive electrode active material layer of positive electrode precursor 1-4 was 57 μm per one side.

Incidentally, the positive electrode precursor was produced and stored in a general environment where the dew point and illuminance were not controlled.

[Production of Positive Electrode Precursor 1-5]

A positive electrode precursor was produced by using activated carbon 1-1 as the positive electrode active material and lithium hydroxide as an alkali metal carbonate. 58.0 parts by weight of activated carbon 1-1, 32.0 parts by weight of lithium hydroxide, 4.0 parts by weight of Ketjen black, 1.0 parts by weight of PVP (polyvinylpyrrolidone), 5.0 parts by weight of PVDF (polyvinylidene fluoride) were mixed with NMP (N-methylpyrrolidone) to obtain a mixture. The obtained mixture was dispersed under conditions of a peripheral velocity of 17 m/s by using the FILMIX® thin film rotating-type high-speed mixer manufactured by Primix Corp. to obtain a positive electrode coating solution 1-5.

The viscosity (ηb) and TI value of the resulting positive electrode coating solution 1-5 were measured by using the TVE-35H E-type viscometer manufactured by Toki Sangyo Co., Ltd. As a result, viscosity (ηb) was 2,750 mPa·s and the TI value was 4.6. Moreover, dispersity of the resulting positive electrode coating solution 1-5 was measured by using a particle gauge manufactured by Yoshimitsu Seiki Co., Ltd. As a result, dispersity was 23 μm.

Both sides of an aluminum foil having a thickness of 15 μm was coated with the positive electrode coating solution 1-5 under conditions of a coating speed of 1 m/s by using a double-sided die coater manufactured by Toray Engineering Co., Ltd. and the coating film was dried to obtain a positive electrode precursor 1-5. The resulting positive electrode precursor 1-5 was pressed under conditions of a pressure of 6 kN/cm and pressed surface temperature of 25° C. by using a roll press. The total film thickness of the positive electrode precursor 1-5 was measured at ten arbitrary locations of the positive electrode precursor 1-5 by using the GS-551 Linear Gauge Sensor film thickness gauge manufactured by Ono Sokki Co., Ltd. The film thickness of the positive electrode active material layer of positive electrode precursor 1-5 was 62 μm per one side.

Incidentally, the production and storage of the positive electrode precursor were all carried out in a dry environment (dew point of −50° C.).

[Production of Positive Electrode Precursor 1-6]

A positive electrode precursor was produced by using activated carbon 1-1 as the positive electrode active material and lithium hydroxide as an alkali metal carbonate. 58.0 parts by weight of activated carbon 1-1, 32.0 parts by weight of lithium hydroxide, 4.0 parts by weight of Ketjen black, 1.0 parts by weight of PVP (polyvinylpyrrolidone), 5.0 parts by weight of PVDF (polyvinylidene fluoride) were mixed with NMP (N-methylpyrrolidone) to obtain a mixture. The obtained mixture was dispersed under conditions of a peripheral velocity of 17 m/s by using the FILMIX® thin film rotating-type high-speed mixer manufactured by Primix Corp. to obtain a positive electrode coating solution 1-6.

The viscosity (ηb) and TI value of the resulting positive electrode coating solution 1-6 were measured by using the TVE-35H E-type viscometer manufactured by Toki Sangyo Co., Ltd. As a result, viscosity (ηb) was 2,750 mPa·s and the TI value was 4.6. Moreover, dispersity of the resulting positive electrode coating solution 1-6 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 1-6 under conditions of a coating speed of 1 m/s by using a double-sided die coater manufactured by Toray Engineering Co., Ltd. and the coating film was dried to obtain a positive electrode precursor 1-6. The resulting positive electrode precursor 1-6 was pressed under conditions of a pressure of 6 kN/cm and pressed surface temperature of 25° C. by using a roll press. The total film thickness of the positive electrode precursor 1-6 was measured at ten arbitrary locations of the positive electrode precursor 1-6 by using the GS-551 Linear Gauge Sensor film thickness gauge manufactured by Ono Sokki Co., Ltd. The film thickness of the positive electrode active material layer of positive electrode precursor 1-6 was 61 μm per one side.

Incidentally, the positive electrode precursor was produced and stored in a general environment where the dew point and illuminance were not controlled.

[Production of Positive Electrode Precursor 1-7]

A positive electrode precursor was produced by using activated carbon 1-1 as the positive electrode active material and lithium hydroxide as an alkali metal carbonate. 58.0 parts by weight of activated carbon 1-1, 32.0 parts by weight of lithium hydroxide, 4.0 parts by weight of Ketjen black, 1.0 parts by weight of PVP (polyvinylpyrrolidone), 5.0 parts by weight of PVDF (polyvinylidene fluoride) were mixed with NMP (N-methylpyrrolidone) to obtain a mixture. The obtained mixture was dispersed under conditions of a peripheral velocity of 17 m/s by using the FILMIX® thin film rotating-type high-speed mixer manufactured by Primix Corp. to obtain a positive electrode coating solution 1-7.

The viscosity (ηb) and TI value of the resulting positive electrode coating solution 1-7 were measured by using the TVE-35H E-type viscometer manufactured by Toki Sangyo Co., Ltd. As a result, viscosity (ηb) was 2,720 mPa·s and the TI value was 4.2. Moreover, dispersity of the resulting positive electrode coating solution 1-7 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 1-7 under conditions of a coating speed of 1 m/s by using a double-sided die coater manufactured by Toray Engineering Co., Ltd. and the coating film was dried to obtain a positive electrode precursor 1-7. The resulting positive electrode precursor 1-7 was pressed under conditions of a pressure of 6 kN/cm and pressed surface temperature of 25° C. by using a roll press. The total film thickness of the positive electrode precursor 1-7 was measured at ten arbitrary locations of the positive electrode precursor 1-7 by using the GS-551 Linear Gauge Sensor film thickness gauge manufactured by Ono Sokki Co., Ltd. The film thickness of the positive electrode active material layer of positive electrode precursor 1-7 was 60 μm per one side.

Incidentally, the production and storage of the positive electrode precursor were all carried out in a dry environment (dew point of −50° C.) and under light-shielding conditions.

[Production of Positive Electrode Precursor 1-8]

A positive electrode precursor was produced by using activated carbon 1-1 as the positive electrode active material and lithium hydroxide as an alkali metal carbonate. 58.0 parts by weight of activated carbon 1-1, 32.0 parts by weight of lithium hydroxide, 4.0 parts by weight of Ketjen black, 1.0 parts by weight of PVP (polyvinylpyrrolidone), 5.0 parts by weight of PVDF (polyvinylidene fluoride) were mixed with NMP (N-methylpyrrolidone) to obtain a mixture. The obtained mixture was dispersed under conditions of a peripheral velocity of 17 m/s by using the FILMIX® thin film rotating-type high-speed mixer manufactured by Primix Corp. to obtain a positive electrode coating solution 1-8.

The viscosity (ηb) and TI value of the resulting positive electrode coating solution 1-8 were measured by using the TVE-35H E-type viscometer manufactured by Toki Sangyo Co., Ltd. As a result, viscosity (ηb) was 2,760 mPa·s and the TI value was 4.5. Moreover, dispersity of the resulting positive electrode coating solution 1-8 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 1-8 under conditions of a coating speed of 1 m/s by using a double-sided die coater manufactured by Toray Engineering Co., Ltd. and the coating film was dried to obtain a positive electrode precursor 1-8. The resulting positive electrode precursor 1-8 was pressed under conditions of a pressure of 6 kN/cm and pressed surface temperature of 25° C. by using a roll press. The total film thickness of the positive electrode precursor 1-8 was measured at ten arbitrary locations of the positive electrode precursor 1-8 by using the GS-551 Linear Gauge Sensor film thickness gauge manufactured by Ono Sokki Co., Ltd. The film thickness of the positive electrode active material layer of positive electrode precursor 1-8 was 64 μm per one side.

Incidentally, the positive electrode precursor was produced and stored in a general environment where the dew point and illuminance were not controlled.

<Production of Negative Electrode>

[Production of Negative Electrode 1-1]

83 parts by weight of artificial graphite having a mean particle size of 4.5 μm, 4 parts by weight of composite carbon material, and 9 parts by weight of acetylene black were dry-blended in a powder state with a planetary mixer, and then 2 parts by weight of styrene-butadiene copolymer and an aqueous solution of CMC (carboxymethyl cellulose) were added thereto to disperse the mixture while gradually lowering the solid content. Finally, CMC was added so as to be 2 parts by weight, and water was added to the mixed solution so that the weight ratio of the solid content was 39% to obtain a negative electrode coating solution.

The viscosity (ηb) and TI value of the resulting negative electrode coating solution were measured by using the TVE-35H E-type viscometer manufactured by Toki Sangyo Co., Ltd. As a result, viscosity (ηb) was 3,221 mPa·s and the TI value was 2.1.

Both sides of an electrolytic copper foil having a thickness of 10 μm was coated with the negative electrode coating solution under conditions of a coating speed of 1 m/s by using a die coater manufactured by Toray Engineering Co., Ltd., and the coating film was dried at a drying temperature of 60° C. to obtain negative electrode 1-1. The resulting negative electrode 1-1 was pressed under conditions of a pressure of 5 kN/cm and pressed surface temperature of 25° C. using a roll press. The total film thickness of negative electrode 1-1 was measured at ten arbitrary locations of negative electrode 1-1 by using the GS-551 Linear Gauge Sensor film thickness gauge manufactured by Ono Sokki Co., Ltd. The film thickness of the negative electrode active material layer of negative electrode 1-1 was 30 μm per one side.

<Preparation of Non-Aqueous Electrolytic Solution 1>

By using a mixed solvent of ethylene carbonate (EC), dimethyl carbonate (DMC), and methyl ethyl carbonate (EMC) at a ratio (volume ratio) of 34:44:22, electrolyte salts respectively consisting of $LiN(SO_2F)_2$ and $LiPF_6$ at a concentration ratio of 25:75 (molar ratio) and a total concentration of $LiN(SO_2F)_2$ and $LiPF_6$ of 1.2 mol/L, in an entire non-aqueous electrolytic solution, were dissolved into the mixed solvent to obtain the non-aqueous electrolytic solution.

The concentrations of $LiN(SO_2F)_2$ and $LiPF_6$ in the prepared nonaqueous electrolytic solution were 0.3 mol/L and 0.9 mol/L, respectively.

Examples 1-1 and 1-2

[Production of Non-Aqueous Lithium Electricity Storage Element]

As the positive electrode precursor, positive electrode precursor 1-1 was used in Example 1-1, and positive electrode precursor 1-2 was used in Example 1-2.

[Secondary Drying of Electrodes]

The positive electrode precursor was dried by infrared heating at a temperature of 80° C. for 5 minutes, and wound up by roll-to-roll with a winding tension of 0.8 N/mm.

[Assembly Step]

The resulting positive electrode precursor (double-sided) was cut into 20 sheets of a size of 10 cm×10 cm (100 cm$^2$) for the positive electrode active material layer. Subsequently, negative electrode 1-1 was cut into 21 sheets such that a size of the negative electrode active material layer was 10.1 cm×10.1 cm (102 cm$^2$), and 40 sheets of polyethylene separator (thickness 10 μm, manufactured by Asahi Kasei Kabushiki Kaisha) with a size of 10.3 cm×10.3 cm (106 cm$^2$) were prepared. The positive electrode precursors and the negative electrodes were laminated with the separators interposed therebetween in the order of the positive electrode precursor, the separator, and the negative electrode so that the outermost layer became the negative electrode 1-1 and the positive electrode active material layer and the negative electrode active material layer faced each other, to obtain an electrode laminate. The positive electrode terminal and the negative electrode terminal were ultrasonically welded to the obtained electrode laminate, placed in a container made of an aluminum laminate packaging material, and three sides including the electrode terminal portion were sealed by heat sealing.

[Pressurization Step]

Pressure was applied by sandwiching the aluminum laminate packaging material between a pair of metal plates (height 150 mm×width 150 mm×thickness 5 mm) from the outside thereof and screwing the four corners of the metal plates. The pressure measured by using the surface pressure distribution measurement system I-SCAN (manufactured by Nitta Corporation) and the I-SCAN100 sensor (measuring surface dimensions: 112 mm×112 mm) was 0.08 kgf/cm$^2$ as the restraining pressure.

[Solution Injection●Impregnation●Sealing Steps]

The electrode laminate housed in an aluminum laminate packaging material was placed in a decompression chamber in a dry air environment at a temperature of 25° C. and dew point of −40° C. or lower, the pressure was reduced from normal pressure to −100 kPa, and then approximately 80 g of the aforementioned non-aqueous electrolytic solution 1 with a solution temperature of 25° C. was injected. Subsequently, the pressure was returned to atmospheric pressure, and the electrode laminate was allowed to stand undisturbed for 60 minutes. Subsequently, the non-aqueous lithium electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

[Repressurization Step]

The pressure of the non-aqueous lithium electricity storage element precursor after solution injection was increased to 1.2 kgf/cm$^2$ by further tightening the screws of the metal plates restraining the electricity storage element precursor.

[Lithium Doping Step]

The resulting non-aqueous lithium electricity storage element precursor was charged with a constant current at a current value of 6 Å until the voltage reached 4.5 V in an environment at 45° C. by using a charge and discharge apparatus (ACD-10APS(01)) manufactured by Asuka Denshi K.K., and initial charge was then carried out according to a procedure consisting of continuing constant voltage charge at 4.5 V for 1 hour to dope the negative electrode with lithium. The total time for lithium doping was 2 hours.

[Charge/Discharge Cycle Step]

The non-aqueous lithium electricity storage element precursor after the lithium doping was placed in an environment of 50° C. while maintaining the pressurization force of 1.2 kgf/cm$^2$ (1) After carrying out constant current charge at 10.0 Å until the voltage reached 4.3 V, constant voltage charge at 4.3 V was carried out for 5 minutes.

(2) After carrying out constant current discharge at 10.0 Å until the voltage reached 2.0 V, constant voltage discharge at 2.0 V was carried out for 5 minutes.

Regarding (1) and (2) as one cycle, 5 cycles in total were carried out.

[Elevated Temperature Aging Step]

(1) High Voltage Storage Step: The non-aqueous lithium electricity storage element precursor after the charge/discharge cycle was discharged with a constant current at 10.0 Å in an environment at 25° C. until the voltage reached 4.2 V, while maintaining the pressurization force of 1.2 kgf/cm$^2$, and then the voltage was adjusted to 4.2 V by carrying out constant current charge at 4.2 V for 30 minutes. Continuing, the non-aqueous lithium electricity storage element precursor was stored for 10 hours in a thermostatic chamber at 60° C.

[Gas Venting●Sealing Steps]

A portion of the aluminum laminate packaging material of the non-aqueous lithium electricity storage element precursor after the aging, was opened in a dry air environment at a temperature of 25° C. and dew point of −40° C. Continuing, the aforementioned non-aqueous lithium electricity storage element precursor was placed in a decompression chamber, and after reducing pressure from atmospheric pressure to −80 kPa over the course of 3 minutes by using a diaphragm pump (N816.3KT.45.18) manufactured by KNF Japan Co., Ltd., pressure was returned to atmospheric pressure over the course of 3 minutes, and this step was repeated a total of three times. Subsequently, the non-aqueous lithium electricity storage element precursor was placed in a reduced-pressure sealing machine and pressure was reduced to −90 kPa followed by sealing for 10 seconds at 200° C. and pressure of 0.1 MPa to seal the aluminum laminate packaging material.

From the step described above, the non-aqueous lithium electricity storage element was completed.

[Evaluation of Electricity Storage Element]

[Measurement of Electrostatic Capacitance]

Constant current charge was carried out on the electricity storage element obtained until the voltage reached 4.0 V at a current value of 20 C by using a charge and discharge apparatus (5 V, 360 A) manufactured by Fujitsu Telecom Networks Ltd. in a thermostatic chamber set to a temperature of 25° C., followed by carrying out constant voltage charge for 30 minutes in total by applying a constant voltage of 4.0 V. With the capacitance during constant current discharge down to 2.0 V at a current value of 2 C, as Q, electrostatic capacitance F of Example 1-1 determined according to F=Q/(4.0-2.0), yielded a value of 1,500 F.

[Determination of Ra·F]

The electricity storage element obtained was charged up to 4.0 V with a constant current at a current value of 20 C by using a charge and discharge apparatus (5 V, 360 A) manufactured by Fujitsu Telecom Networks Ltd. in a thermostatic chamber at 25° C., followed by carrying out constant voltage charge for 30 minutes by applying a constant voltage of 4.0 V and carrying out constant current discharge down to 2.0 V at a current value of 20 C to obtain a discharging curve (time vs. voltage). Room temperature discharge internal resistance Ra was determined according to voltage drop ΔE=4.0−Eo, and Ra=ΔE/(20 C (current value A)) when the voltage at a discharge time=0 seconds, obtained by extrapolating by linear approximation from the voltage values at discharge times of 2 seconds and 4 seconds in the discharging curve, was defined as Eo.

The product Ra·F of electrostatic capacitance F and room temperature discharge internal resistance Ra of Example 1-1 was 1.83 ΩF.

[Ratio of Increase in Resistance after Elevated Temperature and High Load Charge/Discharge Cycle Test]

In a thermostatic bath set to 60° C., the electricity storage element obtained was charged with a constant current at the 300 C current value until 4.1 V was reached by using a charge and discharge apparatus (5 V, 360 A) manufactured by Fujitsu Telecom Networks Ltd., and then discharged with a constant current at the 300 C current value until 1.9 V was reached. The charge/discharge step was repeated 60,000 times. After the high load charge/discharge cycle test, the resistance after the high-load charge/discharge cycle test Re was determined in the same manner as in the aforementioned [Determination of Ra·F]. The ratio Re/Ra calculated by dividing this Re (Ω) by internal resistance Ra (Ω) before the high load charge/discharge cycle test obtained in the aforementioned [Determination of Ra·F] was 1.18 for Example 1-1, and Re/Ra was 1.19 for Example 1-2.

[Micro Short Circuit Inspection Step]

When 100 non-aqueous lithium electricity storage elements were fabricated and the aforementioned micro short circuit inspection test was carried out, the number of micro short circuits was 1 in Example 1-1. Therefore, the micro short circuit ratio of Example 1-1 was 1%. The results of Example 1-2 in the above evaluation are shown in Table 1-1.

Examples 1-3 to 1-58

Non-aqueous lithium electricity storage elements each was produced and evaluated in the same manner as in Example 1-1 except that the type of positive electrode precursor, the type of alkali metal compound, the pressure applied to the non-aqueous lithium electricity storage element precursor in the repressurization step after the solution injection and impregnation, the temperature of non-aqueous lithium electricity storage element precursor, the C rate upon constant current (cc) charge in the doping step, the voltage upon constant voltage (cv) charge, and time for cv charge, in the doping step were set as shown in Table 1-1, Table 1-2, Table 1-3 or Table 1-5. The results are shown in Table 1-1, Table 1-2, Table 1-3 or Table 1-5.

Comparative Examples 1-1 and 1-2

The type of positive electrode precursor was changed as shown in Table 1-4, and the secondary drying of the electrode was not carried out.

Next, the assembly step was carried out in the same manner as in Example 1-1.

The pressurization step was carried out in the same manner as in Example 1-1.

Further, in the solution injection, impregnation, and sealing steps, the electrode laminate housed in an aluminum laminate packaging material was placed in a decompression chamber in a dry air environment at a temperature of 25° C. and dew point of −40° C. or lower, however, approximately 80 g of the aforementioned non-aqueous electrolytic solution 1 was injected at normal pressure. Subsequently, the electrode laminate was allowed to stand undisturbed for 60 minutes while maintaining normal pressure. Subsequently, the non-aqueous lithium electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

In the repressurization step, the metal plates restraining the non-aqueous lithium electricity storage element precursor after the solution injection were removed to adjust the pressure to 0 kgf/cm².

In the lithium doping step, the resulting non-aqueous lithium electricity storage element precursor was charged with a constant current at a current value of 0.1 Å until the voltage reached 4.1 V in an environment at 25° C. by using a charge and discharge apparatus (ACD-10APS(01)) manufactured by Asuka Denshi K.K., and initial charge was then carried out according to a procedure consisting of continuing constant voltage charge at 4.1 V for 1 hour to dope the negative electrode with lithium. The total time for lithium doping was 9 hours.

As the charge/discharge cycle steps of Comparative Examples 1-1 and 1-2, the non-aqueous lithium electricity storage element precursor after doping was placed in an environment of 25° C.

(1) After carrying out constant current charge at 10.0 Å until the voltage reached 3.7 V, constant voltage charge at 3.7 V was carried out for 5 minutes.

(2) After carrying out constant current discharge at 10.0 Å until the voltage reached 1.4 V, constant voltage discharge at 1.4 V was carried out for 5 minutes.

Regarding (1) and (2) as one cycle, 5 cycles in total were carried out.

The details of the aging steps of Comparative Examples 1-1 and 1-2 are as follows:

(1) High Voltage Step: The non-aqueous lithium electricity storage element precursor after the chare/discharge cycle step was discharged with a constant current at 10.0 Å in an environment at 25° C. until the voltage reached 4.0 V, while maintaining the pressurization force of 0 kgf/cm², the voltage was adjusted to 4.0 V by carrying out constant current charge at 4.0 V for 30 minutes. Continuing, the non-aqueous lithium electricity storage element precursor was stored for 10 hours in a thermostatic chamber at 60° C.

(2) Low Voltage Step: It was not carried out.

The gas venting●sealing step and the subsequent steps were carried out in the same manner as in Example 1-1 to produce a non-aqueous lithium electricity storage element, and the resulting non-aqueous lithium electricity storage element was evaluated in the same manner as in Example 1-1. The results are shown in Table 4.

Comparative Examples 1-3 to 1-9, Comparative Examples 1-11 to 1-15 and 1-19 to 1-21

Non-aqueous alkali metal electricity storage elements each was produced in the same manner as in Example 1-1 and evaluated in the same manner as in Example 1-1 for the subsequent evaluations except that the type of positive electrode precursor, the pressure applied to the non-aqueous alkali metal electricity storage element precursor in the repressurization step after the solution injection and impregnation, the temperature of non-aqueous alkali metal electricity storage element precursor, the C rate upon cc charge, the voltage upon cv charge, and time for cv charge, in the doping step were set as shown in Table 1-4 and Table 1-5. The results are shown in Tables 1-4 and 1-5.

Comparative Example 1-10 and Comparative Example 1-16

[Production of Non-Aqueous Alkali Metal Electricity Storage Element]

Non-aqueous lithium electricity storage elements each was produced in the same manner as in Example 1-1, and the obtained non-aqueous lithium electricity storage element was evaluated in the same manner as in Example 1-1 except that the type of positive electrode precursor was changed as shown in Table 1-4 or Table 1-5, and the assembly step and lithium doping step were changed as described below. The results are shown in Table 1-4 or Table 1-5.

[Assembly Step]

The assembly step was carried out in the same manner as in Example 1-1 except that the positive electrode precursor and the negative electrode in which a metallic lithium foil corresponding to 350 mAh/g per unit weight of the negative electrode active material was adhered to the surface of the negative electrode active material layer of negative electrode 1, were used.

[Lithium Doping Step]

In the lithium doping step, the non-aqueous lithium electricity storage element precursor was stored in a thermostatic bath at an environmental temperature of 45° C. for 72 hours to ionize the metallic lithium and to dope negative electrode 1.

Comparative Example 1-17 and Comparative Example 1-18

[Production of Non-Aqueous Alkali Metal Electricity Storage Element]

Non-aqueous lithium electricity storage elements each was produced in the same manner as in Example 1-1, and the obtained non-aqueous lithium electricity storage element was evaluated in the same manner as in Example 1-1 except that the type of positive electrode precursor was changed as shown in Table 1-4 or Table 1-5, and the assembly step was changed as described below. The results are shown in Table 1-4 or Table 1-5.

[Assembly Step]

The assembly step was carried out in the same manner as in Example 1-1 except that the positive electrode precursor and the negative electrode in which a metallic lithium foil corresponding to 350 mAh/g per unit weight of the negative electrode active material was adhered to the surface of the negative electrode active material layer of negative electrode 1, were used.

TABLE 1-1

| Examples | Positive electrode precursor | Negative electrode | Non-aqueous electrolytic solution | Alkali metal compound | Pressurization conditions Repressurization after solution injection and impregnation (kgf/cm$^2$) | Doping conditions Cell temperature (° C.) | C rate upon cc charge | Voltage upon cv charge (V) | Time for cv charge (hr) |
|---|---|---|---|---|---|---|---|---|---|
| 1-1 | 1-1 | 1-1 | 1 | Lithium carbonate | 1.2 | 45 | 7.2 | 4.50 | 1 |
| 1-2 | 1-2 | 1-1 | 1 | Lithium carbonate | 1.2 | 45 | 7.2 | 4.50 | 1 |
| 1-3 | 1-1 | 1-1 | 1 | Lithium carbonate | 2.0 | 45 | 7.2 | 4.50 | 1 |
| 1-4 | 1-1 | 1-1 | 1 | Lithium carbonate | 5.3 | 45 | 7.2 | 4.50 | 1 |
| 1-5 | 1-1 | 1-1 | 1 | Lithium carbonate | 7.2 | 45 | 7.2 | 4.50 | 1 |
| 1-6 | 1-1 | 1-1 | 1 | Lithium carbonate | 9.8 | 45 | 7.2 | 4.50 | 1 |
| 1-7 | 1-1 | 1-1 | 1 | Lithium carbonate | 10.3 | 45 | 7.2 | 4.50 | 1 |
| 1-8 | 1-1 | 1-1 | 1 | Lithium carbonate | 24.2 | 45 | 7.2 | 4.50 | 1 |
| 1-9 | 1-1 | 1-1 | 1 | Lithium carbonate | 70.3 | 45 | 7.2 | 4.50 | 1 |
| 1-10 | 1-1 | 1-1 | 1 | Lithium carbonate | 99.4 | 45 | 7.2 | 4.50 | 1 |
| 1-11 | 1-1 | 1-1 | 1 | Lithium carbonate | 100.4 | 45 | 7.2 | 4.50 | 1 |
| 1-12 | 1-1 | 1-1 | 1 | Lithium carbonate | 349.1 | 45 | 7.2 | 4.50 | 1 |
| 1-13 | 1-1 | 1-1 | 1 | Lithium carbonate | 678.2 | 45 | 7.2 | 4.50 | 1 |
| 1-14 | 1-1 | 1-1 | 1 | Lithium carbonate | 998.3 | 45 | 7.2 | 4.50 | 1 |
| 1-16 | 1-1 | 1-1 | 1 | Lithium carbonate | 0.9 | 45 | 7.2 | 4.50 | 1 |
| 1-17 | 1-1 | 1-1 | 1 | Lithium carbonate | 0.6 | 45 | 7.2 | 4.50 | 1 |
| 1-18 | 1-1 | 1-1 | 1 | Lithium carbonate | 0.5 | 45 | 7.2 | 4.50 | 1 |
| 1-19 | 1-1 | 1-1 | 1 | Lithium carbonate | 0.1 | 45 | 7.2 | 4.50 | 1 |

TABLE 1-1-continued

| | | Initial characteristics | | | | |
|---|---|---|---|---|---|---|
| Examples | Micro short circuit ratio (%) | Discharging capacitance Q (mAh) | Electrostatic capacitance F (F) | Room temperature discharge internal resistance (mΩ) | Ra · F (ΩF) | High load charge/discharge cycle test Re/Ra |
| 1-1 | 1 | 833 | 1500 | 1.22 | 1.83 | 1.18 |
| 1-2 | 2 | 865 | 1556 | 1.24 | 1.93 | 1.19 |
| 1-3 | 2 | 834 | 1501 | 1.24 | 1.86 | 1.22 |
| 1-4 | 4 | 841 | 1514 | 1.23 | 1.86 | 1.24 |
| 1-5 | 3 | 842 | 1516 | 1.21 | 1.83 | 1.20 |
| 1-6 | 3 | 835 | 1503 | 1.25 | 1.88 | 1.25 |
| 1-7 | 10 | 841 | 1514 | 1.25 | 1.89 | 1.19 |
| 1-8 | 9 | 845 | 1521 | 1.22 | 1.86 | 1.17 |
| 1-9 | 11 | 839 | 1510 | 1.20 | 1.81 | 1.18 |
| 1-10 | 12 | 842 | 1516 | 1.22 | 1.85 | 1.15 |
| 1-11 | 18 | 833 | 1499 | 1.21 | 1.81 | 1.28 |
| 1-12 | 17 | 832 | 1498 | 1.24 | 1.86 | 1.30 |
| 1-13 | 17 | 837 | 1507 | 1.20 | 1.81 | 1.33 |
| 1-14 | 19 | 839 | 1510 | 1.21 | 1.83 | 1.32 |
| 1-16 | 9 | 812 | 1462 | 1.32 | 1.93 | 1.32 |
| 1-17 | 8 | 815 | 1467 | 1.35 | 1.98 | 1.33 |
| 1-18 | 10 | 812 | 1462 | 1.37 | 2.00 | 1.31 |
| 1-19 | 12 | 819 | 1474 | 1.41 | 2.08 | 1.32 |

TABLE 1-2

| Examples | Positive electrode precursor | Negative electrode | Non-aqueous electrolytic solution | Alkali metal compound | Pressurization conditions Repressurization after solution injection and impregnation (kgf/cm²) | Cell temperature (° C.) | C rate upon cc charge | Voltage upon cv charge (V) | Time for cv charge (hr) |
|---|---|---|---|---|---|---|---|---|---|
| 1-20 | 1-1 | 1-1 | 1 | Lithium carbonate | 1.2 | 30 | 7.2 | 4.50 | 1 |
| 1-21 | 1-1 | 1-1 | 1 | Lithium carbonate | 1.2 | 35 | 7.2 | 4.50 | 1 |
| 1-22 | 1-1 | 1-1 | 1 | Lithium carbonate | 1.2 | 40 | 7.2 | 4.50 | 1 |
| 1-23 | 1-1 | 1-1 | 1 | Lithium carbonate | 1.2 | 50 | 7.2 | 4.50 | 1 |
| 1-24 | 1-1 | 1-1 | 1 | Lithium carbonate | 1.2 | 55 | 7.2 | 4.50 | 1 |
| 1-25 | 1-1 | 1-1 | 1 | Lithium carbonate | 1.2 | 65 | 7.2 | 4.50 | 1 |
| 1-58 | 1-1 | 1-1 | 1 | Lithium carbonate | 1.2 | 70 | 7.2 | 4.50 | 1 |
| 1-26 | 1-1 | 1-1 | 1 | Lithium carbonate | 1.2 | 45 | 1.0 | 4.50 | 1 |
| 1-27 | 1-1 | 1-1 | 1 | Lithium carbonate | 1.2 | 45 | 10.0 | 4.50 | 1 |
| 1-28 | 1-1 | 1-1 | 1 | Lithium carbonate | 1.2 | 45 | 18.7 | 4.50 | 1 |
| 1-29 | 1-1 | 1-1 | 1 | Lithium carbonate | 1.2 | 45 | 29.7 | 4.50 | 1 |
| 1-30 | 1-1 | 1-1 | 1 | Lithium carbonate | 1.2 | 45 | 30.4 | 4.50 | 1 |
| 1-31 | 1-1 | 1-1 | 1 | Lithium carbonate | 1.2 | 45 | 60.2 | 4.50 | 1 |
| 1-32 | 1-1 | 1-1 | 1 | Lithium carbonate | 1.2 | 45 | 99.6 | 4.50 | 1 |

| | | Initial characteristics | | | | |
|---|---|---|---|---|---|---|
| Examples | Micro short circuit ratio (%) | Discharging capacitance Q (mAh) | Electrostatic capacitance F (F) | Room temperature discharge internal resistance (mΩ) | Ra · F (ΩF) | High load charge/discharge cycle test Re/Ra |
| 1-20 | 4 | 811 | 1460 | 1.37 | 2.00 | 1.38 |
| 1-21 | 4 | 835 | 1503 | 1.24 | 1.86 | 1.33 |
| 1-22 | 3 | 833 | 1499 | 1.22 | 1.83 | 1.25 |
| 1-23 | 3 | 838 | 1508 | 1.25 | 1.89 | 1.22 |
| 1-24 | 2 | 834 | 1501 | 1.28 | 1.92 | 1.31 |
| 1-25 | 10 | 825 | 1485 | 1.41 | 2.09 | 1.40 |
| 1-58 | 13 | 822 | 1480 | 1.48 | 2.19 | 1.46 |
| 1-26 | 1 | 844 | 1519 | 1.32 | 2.01 | 1.21 |
| 1-27 | 2 | 836 | 1505 | 1.23 | 1.85 | 1.23 |
| 1-28 | 2 | 836 | 1505 | 1.24 | 1.87 | 1.24 |
| 1-29 | 3 | 834 | 1501 | 1.25 | 1.88 | 1.22 |
| 1-30 | 7 | 812 | 1462 | 1.31 | 1.91 | 1.34 |
| 1-31 | 8 | 811 | 1460 | 1.33 | 1.94 | 1.31 |
| 1-32 | 10 | 809 | 1456 | 1.46 | 2.13 | 1.35 |

TABLE 1-3

| Examples | Positive electrode precursor | Negative electrode | Non-aqueous electrolytic solution | Alkali metal compound | Pressurization conditions Repressurization after solution injection and impregnation (kgf/cm²) | Doping conditions Cell temperature (° C.) | C rate upon cc charge | Voltage upon cv charge (V) | Time for cv charge (hr) |
|---|---|---|---|---|---|---|---|---|---|
| 1-33 | 1-1 | 1-1 | 1 | Lithium carbonate | 1.2 | 45 | 7.2 | 4.40 | 1 |
| 1-34 | 1-1 | 1-1 | 1 | Lithium carbonate | 1.2 | 45 | 7.2 | 4.30 | 1 |
| 1-35 | 1-1 | 1-1 | 1 | Lithium carbonate | 1.2 | 45 | 7.2 | 4.20 | 1 |
| 1-36 | 1-1 | 1-1 | 1 | Lithium carbonate | 1.2 | 45 | 7.2 | 4.65 | 1 |
| 1-37 | 1-1 | 1-1 | 1 | Lithium carbonate | 1.2 | 45 | 7.2 | 4.80 | 1 |
| 1-38 | 1-1 | 1-1 | 1 | Lithium carbonate | 1.2 | 45 | 7.2 | 4.82 | 1 |
| 1-39 | 1-1 | 1-1 | 1 | Lithium carbonate | 1.2 | 45 | 7.2 | 4.50 | 0.23 |
| 1-40 | 1-1 | 1-1 | 1 | Lithium carbonate | 1.2 | 45 | 7.2 | 4.50 | 0.25 |
| 1-41 | 1-1 | 1-1 | 1 | Lithium carbonate | 1.2 | 45 | 7.2 | 4.50 | 0.49 |
| 1-42 | 1-1 | 1-1 | 1 | Lithium carbonate | 1.2 | 45 | 7.2 | 4.50 | 0.51 |
| 1-43 | 1-1 | 1-1 | 1 | Lithium carbonate | 1.2 | 45 | 7.2 | 4.50 | 2 |
| 1-44 | 1-1 | 1-1 | 1 | Lithium carbonate | 1.2 | 45 | 7.2 | 4.50 | 3.9 |
| 1-45 | 1-1 | 1-1 | 1 | Lithium carbonate | 1.2 | 45 | 7.2 | 4.50 | 4.1 |
| 1-46 | 1-1 | 1-1 | 1 | Lithium carbonate | 1.2 | 45 | 7.2 | 4.50 | 10 |
| 1-47 | 1-1 | 1-1 | 1 | Lithium carbonate | 1.2 | 45 | 7.2 | 4.50 | 20 |
| 1-48 | 1-1 | 1-1 | 1 | Lithium carbonate | 1.2 | 45 | 7.2 | 4.50 | 23.9 |
| 1-49 | 1-1 | 1-1 | 1 | Lithium carbonate | 1.2 | 45 | 7.2 | 4.50 | 24.1 |

| Examples | Micro short circuit ratio (%) | Initial characteristics Discharging capacitance Q (mAh) | Electrostatic capacitance F (F) | Room temperature discharge internal resistance (mΩ) | Ra · F (ΩF) | High load charge/discharge cycle test Re/Ra |
|---|---|---|---|---|---|---|
| 1-33 | 3 | 824 | 1483 | 1.30 | 1.93 | 1.26 |
| 1-34 | 5 | 819 | 1474 | 1.37 | 2.02 | 1.31 |
| 1-35 | 8 | 811 | 1460 | 1.33 | 1.94 | 1.35 |
| 1-36 | 3 | 834 | 1501 | 1.34 | 2.01 | 1.21 |
| 1-37 | 4 | 843 | 1517 | 1.31 | 1.99 | 1.24 |
| 1-38 | 15 | 815 | 1467 | 1.40 | 2.05 | 1.35 |
| 1-39 | 5 | 801 | 1442 | 1.42 | 2.05 | 1.33 |
| 1-40 | 5 | 822 | 1480 | 1.45 | 2.15 | 1.32 |
| 1-41 | 4 | 824 | 1483 | 1.43 | 2.12 | 1.31 |
| 1-42 | 2 | 834 | 1501 | 1.21 | 1.82 | 1.24 |
| 1-43 | 1 | 841 | 1514 | 1.23 | 1.86 | 1.21 |
| 1-44 | 2 | 833 | 1499 | 1.27 | 1.90 | 1.22 |
| 1-45 | 8 | 812 | 1462 | 1.34 | 1.96 | 1.31 |
| 1-46 | 9 | 819 | 1474 | 1.34 | 1.98 | 1.35 |
| 1-47 | 7 | 811 | 1460 | 1.32 | 1.93 | 1.38 |
| 1-48 | 8 | 809 | 1456 | 1.41 | 2.05 | 1.39 |
| 1-49 | 14 | 810 | 1458 | 1.44 | 2.10 | 1.45 |

TABLE 1-4

| Comparative Examples | Positive electrode precursor | Negative electrode | Non-aqueous electrolytic solution | Alkali metal compound | Pressurization conditions Repressurization after solution injection and impregnation (kgf/cm²) | Doping conditions Cell temperature (° C.) | C rate upon cc charge | Voltage upon cv charge (V) | Time for cv charge (hr) |
|---|---|---|---|---|---|---|---|---|---|
| 1-1 | 1-1 | 1-1 | 1 | Lithium carbonate | 0 | 25 (no heating) | 0.1 | 4.10 | 1 |
| 1-2 | 1-2 | 1-1 | 1 | Lithium carbonate | 0 | 25 (no heating) | 0.1 | 4.10 | 1 |
| 1-3 | 1-1 | 1-1 | 1 | Lithium carbonate | 1.2 | 45 | 7.2 | 4.18 | 1 |
| 1-4 | 1-1 | 1-1 | 1 | Lithium carbonate | 1.2 | 45 | 0.9 | 4.50 | 1 |
| 1-5 | 1-1 | 1-1 | 1 | Lithium carbonate | 1.2 | 45 | 100.2 | 4.50 | 1 |
| 1-6 | 1-1 | 1-1 | 1 | Lithium carbonate | 1.2 | 45 | 0.9 | 4.18 | 1 |
| 1-7 | 1-1 | 1-1 | 1 | Lithium carbonate | 1.2 | 45 | 100.2 | 4.18 | 1 |
| 1-8 | 1-1 | 1-1 | 1 | Lithium carbonate | 0 | 45 | 7.2 | 4.50 | 1 |
| 1-9 | 1-1 | 1-1 | 1 | Lithium carbonate | 1.2 | 25 | 7.2 | 4.50 | 1 |

TABLE 1-4-continued

| | | | | | (no heating) | | | | |
|---|---|---|---|---|---|---|---|---|---|
| 1-10 | 1-3 | 1-1 | 1 | None | — | — | — | — | — |
| 1-17 | 1-3 | 1-1 | 1 | None | 1.2 | 45 | 7.2 | 4.50 | 1 |
| 1-19 | 1-1 | 1-1 | 1 | Lithium carbonate | 1100.8 | 45 | 7.2 | 4.50 | 1 |
| 1-20 | 1-1 | 1-1 | 1 | Lithium carbonate | 1100.8 | 75 | 7.2 | 4.50 | 1 |
| 1-21 | 1-1 | 1-1 | 1 | Lithium carbonate | 1003.2 | 45 | 7.2 | 4.50 | 1 |

| | | | Initial characteristics | | | | |
|---|---|---|---|---|---|---|---|
| Comparative Examples | Micro short circuit ratio (%) | Discharging capacitance Q (mAh) | Electrostatic capacitance F (F) | Room temperature discharge internal resistance (mΩ) | Ra · F (ΩF) | High load charge/discharge cycle test Re/Ra |
| 1-1 | 85 | 663 | 1193 | 6.04 | 7.20 | 7.80 |
| 1-2 | 89 | 678 | 1221 | 6.06 | 7.40 | 7.68 |
| 1-3 | 32 | 721 | 1298 | 1.94 | 2.52 | 3.54 |
| 1-4 | 35 | 783 | 1409 | 1.72 | 2.42 | 3.21 |
| 1-5 | 54 | 773 | 1391 | 1.83 | 2.55 | 3.34 |
| 1-6 | 45 | 728 | 1310 | 2.06 | 2.70 | 3.44 |
| 1-7 | 55 | 702 | 1264 | 2.16 | 2.73 | 3.87 |
| 1-8 | 52 | 734 | 1321 | 1.94 | 2.56 | 3.21 |
| 1-9 | 51 | 754 | 1357 | 1.85 | 2.51 | 3.65 |
| 1-10 | 83 | 698 | 1256 | 3.23 | 4.06 | 4.55 |
| 1-17 | 82 | 690 | 1242 | 3.33 | 4.14 | 4.65 |
| 1-19 | 88 | 836 | 1505 | 3.63 | 5.46 | 7.72 |
| 1-20 | 53 | 745 | 1341 | 2.83 | 3.80 | 3.55 |
| 1-21 | 23 | 841 | 1514 | 1.43 | 2.16 | 1.44 |

TABLE 1-5-1

| Examples | Positive electrode precursor | Negative electrode | Non-aqueous electrolytic solution | Alkali metal compound | Pressurization conditions Repressurization after solution injection and impregnation (kgf/cm²) | Doping conditions | | | |
|---|---|---|---|---|---|---|---|---|---|
| | | | | | | Cell temperature (° C.) | C rate upon cc charge | Voltage upon cv charge (V) | Time for cv charge (hr) |
| 1-50 | 1-2 | 1-1 | 1 | Lithium carbonate | 1.2 | 45 | 7.2 | 4.50 | 1 |
| 1-51 | 1-2 | 1-1 | 1 | Lithium carbonate | 1.2 | 45 | 7.2 | 4.21 | 1 |
| 1-52 | 1-2 | 1-1 | 1 | Lithium carbonate | 1.2 | 45 | 1.0 | 4.50 | 1 |
| 1-53 | 1-2 | 1-1 | 1 | Lithium carbonate | 1.2 | 45 | 99.8 | 4.50 | 1 |
| 1-54 | 1-5 | 1-1 | 1 | Lithium hydroxide | 1.2 | 45 | 7.2 | 4.50 | 1 |
| 1-55 | 1-6 | 1-1 | 1 | Lithium hydroxide | 1.2 | 45 | 7.2 | 4.50 | 1 |
| 1-56 | 1-7 | 1-1 | 1 | Lithium oxide | 1.2 | 45 | 7.2 | 4.50 | 1 |
| 1-57 | 1-8 | 1-1 | 1 | Lithium oxide | 1.2 | 45 | 7.2 | 4.50 | 1 |

| Examples | Micro short circuit ratio (%) | Discharging capacitance Q (mAh) | Electrostatic capacitance F (F) | Room temperature discharge internal resistance (mΩ) | Ra · F (ΩF) | High load charge/discharge cycle test Re/Ra |
|---|---|---|---|---|---|---|
| 1-50 | 3 | 864 | 1555 | 1.25 | 1.94 | 1.31 |
| 1-51 | 5 | 832 | 1498 | 1.34 | 2.01 | 1.43 |
| 1-52 | 4 | 873 | 1571 | 1.28 | 2.01 | 1.36 |
| 1-53 | 5 | 871 | 1568 | 1.30 | 2.04 | 1.41 |
| 1-54 | 2 | 830 | 1494 | 1.23 | 1.84 | 1.19 |
| 1-55 | 3 | 452 | 814 | 1.92 | 1.56 | 2.50 |
| 1-56 | 2 | 831 | 1496 | 1.24 | 1.85 | 1.20 |
| 1-57 | 3 | 455 | 819 | 1.89 | 1.55 | 2.47 |

TABLE 1-5-2

| Comparative Examples | Positive electrode precursor | Negative electrode | Non-aqueous electrolytic solution | Alkali metal compound | Pressurization conditions Repressurization after solution injection and impregnation (kgf/cm$^2$) | Doping conditions | | | |
|---|---|---|---|---|---|---|---|---|---|
| | | | | | | Cell temperature (° C.) | C rate upon cc charge | Voltage upon cv charge (V) | Time for cv charge (hr) |
| 1-11 | 1-2 | 1-1 | 1 | Lithium carbonate | 1.2 | 45 | 7.2 | 4.18 | 1 |
| 1-12 | 1-2 | 1-1 | 1 | Lithium carbonate | 1.2 | 45 | 0.9 | 4.50 | 1 |
| 1-13 | 1-2 | 1-1 | 1 | Lithium carbonate | 1.2 | 45 | 100.2 | 4.50 | 1 |
| 1-14 | 1-2 | 1-1 | 1 | Lithium carbonate | 0 | 45 | 7.2 | 4.50 | 1 |
| 1-15 | 1-2 | 1-1 | 1 | Lithium carbonate | 1.2 | 25 (no heating) | 7.2 | 4.50 | 1 |
| 1-16 | 1-4 | 1-1 | 1 | None | — | — | — | — | — |
| 1-18 | 1-4 | 1-1 | 1 | None | 1.2 | 45 | 7.2 | 4.50 | 1 |

| Comparative Examples | Initial characteristics | | | | | |
|---|---|---|---|---|---|---|
| | Micro short circuit ratio (%) | Discharging capacitance Q (mAh) | Electrostatic capacitance F (F) | Room temperature discharge internal resistance (mΩ) | Ra · F (ΩF) | High load charge/discharge cycle test Re/Ra |
| 1-11 | 35 | 732 | 1318 | 2.28 | 3.00 | 3.55 |
| 1-12 | 43 | 742 | 1336 | 1.83 | 2.44 | 3.47 |
| 1-13 | 55 | 753 | 1355 | 1.94 | 2.63 | 3.23 |
| 1-14 | 53 | 721 | 1298 | 1.87 | 2.43 | 3.12 |
| 1-15 | 49 | 722 | 1300 | 1.91 | 2.48 | 3.48 |
| 1-16 | 88 | 688 | 1238 | 5.02 | 6.22 | 4.24 |
| 1-18 | 86 | 678 | 1220 | 5.08 | 6.20 | 4.28 |

According to the Examples described above, it has been verified that the method for producing the non-aqueous alkali metal electricity storage element and the precursor thereof according to the present embodiment inhibits a micro short circuit upon production of the electricity storage element, and enables to produce the non-aqueous alkali metal electricity storage element having excellent input/output characteristics and durability against a high load charge/discharge cycle at elevated temperatures.

<<Production of Non-Aqueous Lithium Electricity Storage Element in Second Embodiment>>

Non-aqueous lithium electricity storage elements each that was one embodiment of the non-aqueous alkali metal storage element was fabricated below.

<Production of Positive Electrode Precursor>
[Preparation of Activated Carbon 2-1]

A carbide was obtained by subjecting pulverized coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/h while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., pulverization was carried out for 1 hour with a ball mill to obtain activated carbon 2-1.

Measurement of mean particle diameter of this activated carbon 2-1 by using a laser diffraction-type particle size distribution measurement apparatus (SALD-2000J) manufactured by Shimadzu Corp. yielded a value of 5.5 μm. Moreover, fine pore size distribution of activated carbon 2-1 was measured by using a fine pore size distribution measurement apparatus (AUTOSORB-1 AS-1-MP) manufactured by Yuasa Ionics Co., Ltd. As a result, BET specific surface area was 2,360 m$^2$/g, mesopore volume ($V_1$) was 0.52 cm$^3$/g, micropore volume ($V_2$) was 0.88 cm$^3$/g, and $V_1/V_2$=0.59.

[Preparation of Activated Carbon 2-2]

A carbide having a mean particle diameter of 7 μm was obtained by carrying out carbonization treatment on a phenol resin for 2 hours at 600° C. in a calcination furnace in a nitrogen atmosphere followed by pulverizing with a ball mill and classification. KOH was mixed with this carbide at a weight ratio of 1:5 followed by activating by heating for 1 hour at 800° C. in the calcination furnace in a nitrogen atmosphere. The activated carbon was taken out, washed by stirring for 1 hour in dilute hydrochloric acid adjusted to 2 mol/L, and washed by boiling in distilled water until the pH stabilized between 5 and 6 and then dried to obtain activated carbon 2-2.

Measurement of mean particle diameter of this activated carbon 2-2 by using a laser diffraction-type particle size distribution measurement apparatus (SALD-2000J) manufactured by Shimadzu Corp. yielded a value of 7.0 μm. Moreover, fine pore size distribution of activated carbon 1-1 was measured by using a fine pore size distribution measurement apparatus (AUTOSORB-1 AS-1-MP) manufactured by Yuasa Ionics Co., Ltd. As a result, BET specific surface area was 3,627 m$^2$/g, mesopore volume ($V_1$) was 1.50 cm$^3$/g, micropore volume ($V_2$) was 2.28 cm$^3$/g, and $V_1/V_2$=0.66.

<Production of Positive Electrode Precursor>
[Production of Positive Electrode Precursor 2-1]

A positive electrode precursor was produced by using activated carbon 2-1 as the positive electrode active material.

58.0 parts by weight of activated carbon 2-1, 32.0 parts by weight of lithium carbonate, 4.0 parts by weight of acetylene black, 3.5 parts by weight of acrylic latex, 1.5 parts by weight of CMC (carboxymethyl cellulose), and 1.0 part by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 2-1.

The viscosity ($\eta$b) and TI value of the resulting positive electrode coating solution 2-1 were measured by using the TVE-35H E-type viscometer manufactured by Toki Sangyo Co., Ltd. As a result, viscosity ($\eta$b) was 2,030 mPa·s and the TI value was 4.2. Moreover, dispersity of the resulting positive electrode coating solution 2-1 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 2-1 under conditions of a coating speed of 1 m/s by using a double-sided die coater manufactured by Toray Engineering Co., Ltd. and the coating film was dried to obtain a positive electrode precursor 2-1. The resulting positive electrode precursor 2-1 was pressed under conditions of a pressure of 6 kN/cm and pressed surface temperature of 25° C. by using a roll press. The total film thickness of the positive electrode precursor 2-1 was measured at ten arbitrary locations of the positive electrode precursor 2-1 by using the GS-551 Linear Gauge Sensor film thickness gauge manufactured by Ono Sokki Co., Ltd. The film thickness of the positive electrode active material layer of positive electrode precursor 2-1 was 61 μm per one side. Incidentally, the positive electrode precursor was produced and stored in a general environment where the dew point and illuminance were not controlled.

[Production of Positive Electrode Precursor 2-2]

A positive electrode precursor was produced by using activated carbon 2-1 as the positive electrode active material.

42.0 parts by weight of activated carbon 2-1, 14.0 parts by weight of LiFePO$_4$ having an average particle diameter of 3.5 μm as a lithium transition metal oxide, 32.0 parts by weight of lithium carbonate, 4.0 parts by weight of acetylene black, 3.5 parts by weight of acrylic latex, 1.5 parts by weight of CMC (carboxymethyl cellulose), and 1.0 part by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 2-2.

The viscosity ($\eta$b) and TI value of the resulting positive electrode coating solution 2-2 were measured by using the TVE-35H E-type viscometer manufactured by Toki Sangyo Co., Ltd. As a result, viscosity ($\eta$b) was 2,330 mPa·s and the TI value was 4.5. Moreover, dispersity of the resulting positive electrode coating solution 2-2 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 2-2 under conditions of a coating speed of 1 m/s by using a double-sided die coater manufactured by Toray Engineering Co., Ltd. and the coating film was dried to obtain a positive electrode precursor 2-2. The resulting positive electrode precursor 2-2 was pressed under conditions of a pressure of 6 kN/cm and pressed surface temperature of 25° C. by using a roll press. The total film thickness of the positive electrode precursor 2-2 was measured at ten arbitrary locations of the positive electrode precursor 2-2 by using the GS-551 Linear Gauge Sensor film thickness gauge manufactured by Ono Sokki Co., Ltd. The film thickness of the positive electrode active material layer of positive electrode precursor 2-2 was 48 μm per one side. Incidentally, the positive electrode precursor was produced and stored in a general environment where the dew point and illuminance were not controlled.

[Production of Positive Electrode Precursor 2-3]

A positive electrode precursor was produced by using activated carbon 2-1 as the positive electrode active material.

90.0 parts by weight of activated carbon 2-1, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 35.0%, followed by dispersing under conditions of a peripheral velocity of 10 m/s for 2 minutes by using the FILMIX® thin film rotating-type high-speed mixer manufactured by Primix Corp. to obtain a positive electrode coating solution 2-3.

The viscosity ($\eta$b) and TI value of the resulting positive electrode coating solution 2-3 were measured by using the TVE-35H E-type viscometer manufactured by Toki Sangyo Co., Ltd. As a result, viscosity ($\eta$b) was 2,150 mPa·s and the TI value was 5.2. Moreover, dispersity of the resulting positive electrode coating solution 2-3 was measured by using a particle gauge manufactured by Yoshimitsu Seiki Co., Ltd. As a result, dispersity was 25 μm.

Both sides of an aluminum foil having a thickness of 15 μm was coated with the positive electrode coating solution 2-3 under conditions of a coating speed of 1 m/s by using a double-sided die coater manufactured by Toray Engineering Co., Ltd. and the coating film was dried to obtain a positive electrode precursor 2-3. The resulting positive electrode precursor 2-3 was pressed under conditions of a pressure of 6 kN/cm and pressed surface temperature of 25° C. by using a roll press. The total film thickness of the positive electrode precursor 2-3 was measured at ten arbitrary locations of the positive electrode precursor 2-3 by using the GS-551 Linear Gauge Sensor film thickness gauge manufactured by Ono Sokki Co., Ltd. The film thickness of the positive electrode active material layer of positive electrode precursor 2-3 was 67 μm per one side.

[Production of Positive Electrode Precursor 2-4]

A positive electrode precursor was produced by using activated carbon 2-1 as the positive electrode active material.

60.0 parts by weight of activated carbon 2-1, 30.0 parts by weight of LiFePO$_4$ having an average particle diameter of 3.5 μm as a lithium transition metal oxide, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 38.0%, followed by dispersing under conditions of a peripheral velocity of 10 m/s for 2 minutes by using the FILMIX® thin film rotating-type high-speed mixer manufactured by Primix Corp. to obtain a positive electrode coating solution 2-4.

The viscosity ($\eta$b) and TI value of the resulting positive electrode coating solution 2-4 were measured by using the TVE-35H E-type viscometer manufactured by Toki Sangyo Co., Ltd. As a result, viscosity (ηb) was 2,020 mPa·s and the TI value was 5.6. Moreover, dispersity of the resulting positive electrode coating solution 2-4 was measured by using a particle gauge manufactured by Yoshimitsu Seiki Co., Ltd. As a result, dispersity was 23 μm.

Both sides of an aluminum foil having a thickness of 15 μm was coated with the positive electrode coating solution 2-4 under conditions of a coating speed of 1 m/s by using a double-sided die coater manufactured by Toray Engineering Co., Ltd. and the coating film was dried to obtain a positive electrode precursor 2-4. The resulting positive electrode precursor 2-4 was pressed under conditions of a pressure of 6 kN/cm and pressed surface temperature of 25° C. by using a roll press. The total film thickness of the positive electrode precursor 2-4 was measured at ten arbitrary locations of the positive electrode precursor 2-4 by using the GS-551 Linear Gauge Sensor film thickness gauge manufactured by Ono Sokki Co., Ltd. The film thickness of the positive electrode active material layer of positive electrode precursor 2-4 was 57 m per one side. Incidentally, the positive electrode precursor was produced and stored in a general environment where the dew point and illuminance were not controlled.

<Production of Negative Electrode>

[Production of Negative Electrode 2-1]

83 parts by weight of artificial graphite having a mean particle size of 4.5 μm, 4 parts by weight of composite carbon material, and 9 parts by weight of acetylene black were dry-blended in a powder state with a planetary mixer, and then 2 parts by weight of styrene-butadiene copolymer and an aqueous solution of CMC (carboxymethyl cellulose) were added thereto to disperse the mixture while gradually lowering the solid content. Finally, CMC was added so as to be 2 parts by weight, and water was added to the mixed solution so that the weight ratio of the solid content was 39% to obtain a negative electrode coating solution.

The viscosity (ηb) and TI value of the resulting negative electrode coating solution were measured by using the TVE-35H E-type viscometer manufactured by Toki Sangyo Co., Ltd. As a result, viscosity (ηb) was 3,221 mPa·s and the TI value was 2.1.

Both sides of an electrolytic copper foil having a thickness of 10 μm was coated with the negative electrode coating solution under conditions of a coating speed of 1 m/s by using a die coater manufactured by Toray Engineering Co., Ltd., and the coating film was dried at a drying temperature of 60° C. to obtain negative electrode 2-1. The resulting negative electrode 2-1 was pressed under conditions of a pressure of 5 kN/cm and pressed surface temperature of 25° C. using a roll press. The total film thickness of the negative electrode 2-1 was measured at ten arbitrary locations of the negative electrode 2-1 by using the GS-551 Linear Gauge Sensor film thickness gauge manufactured by Ono Sokki Co., Ltd. The film thickness of the negative electrode active material layer of negative electrode 2-1 was 30 μm per one side.

<Preparation of Non-Aqueous Electrolytic Solution>

By using a mixed solvent of ethylene carbonate (EC), dimethyl carbonate (DMC), and methyl ethyl carbonate (EMC) at a ratio (volume ratio) of 34:44:22, electrolyte salts respectively consisting of $LiN(SO_2F)_2$ and $LiPF_6$ at a concentration ratio of 25:75 (molar ratio) and a total concentration of $LiN(SO_2F)_2$ and $LiPF_6$ of 1.2 mol/L, in an entire non-aqueous electrolytic solution, were dissolved into the mixed solvent to obtain the non-aqueous electrolytic solution.

The concentrations of $LiN(SO_2F)_2$ and $LiPF_6$ in the prepared nonaqueous electrolytic solution were 0.3 mol/L and 0.9 mol/L, respectively.

Examples 2-1 and 2-2

[Production of Non-Aqueous Lithium Electricity Storage Element]

As the positive electrode precursor, positive electrode precursor 2-1 was used in Example 2-1, and positive electrode precursor 2-2 was used in Example 2-2.

[Secondary Drying of Electrodes]

The positive electrode precursor was dried by infrared heating at a temperature of 80° C. for 5 minutes, and wound up by roll-to-roll with a winding tension of 0.8 N/mm.

[Assembly Step]

The resulting positive electrode precursor (double-sided) was cut into 20 sheets such that a size of the positive electrode active material layer was 10 cm×10 cm (100 cm$^2$). Subsequently, negative electrode 2-1 was cut into 21 sheets such that of a size of the negative electrode active material layer was 10.1 cm×10.1 cm (102 cm$^2$), and 40 sheets of polyethylene separators (thickness 10 μm, manufactured by Asahi Kasei Kabushiki Kaisha) with a size of 10.3 cm×10.3 cm (106 cm$^2$) were prepared. The positive electrode precursors and the negative electrodes were laminated with the separators interposed therebetween in the order of the positive electrode precursor, the separator, and the negative electrode so that the outermost layer became the negative electrode 2-1 and the positive electrode active material layer and the negative electrode active material layer faced each other, to obtain an electrode laminate. The positive electrode terminal and the negative electrode terminal were ultrasonically welded to the obtained electrode laminate, placed in a container made of an aluminum laminate packaging material, and three sides including the electrode terminal portion were sealed by heat sealing.

[Pressurization Step]

Pressure was applied by sandwiching the aluminum laminate packaging material between a pair of metal plates (height 150 mm×width 150 mm×thickness 5 mm) from the outside thereof and screwing the four corners of the metal plates. The pressure measured by using the surface pressure distribution measurement system I-SCAN (manufactured by Nitta Corporation) and the I-SCAN100 sensor (measurement surface dimensions: 112 mm×112 mm) was 0.08 kgf/cm$^2$ as the restraining pressure.

[Solution Injection●Impregnation●Sealing Steps]

The electrode laminate housed in an aluminum laminate packaging material was placed in a decompression chamber in a dry air environment at a temperature of 25° C. and dew point of −40° C. or lower, the pressure was reduced from normal pressure to −100 kPa, and then approximately 80 g of the aforementioned non-aqueous electrolytic solution with a solution temperature of 25° C. was injected. Subsequently, the pressure was returned to atmospheric pressure, and the electrode laminate was allowed to stand undisturbed for 60 minutes. Subsequently, the non-aqueous lithium electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

[Repressurization Step]

The pressure of the non-aqueous lithium electricity storage element precursor after solution injection was increased to 1.2 kgf/cm² by further tightening the screws of the metal plates restraining the electricity storage element precursor.
[Lithium Doping Step]

The resulting non-aqueous lithium electricity storage element precursor was charged with a constant current at a current value of 6 Å until the voltage reached 4.5 V in an environment at 45° C. by using a charge and discharge apparatus (ACD-10APS(01)) manufactured by Asuka Denshi K.K., and initial charge was then carried out according to a procedure consisting of continuing constant voltage charge at 4.5 V for 1 hour to dope the negative electrode with lithium. The total time for lithium doping was 2 hours.
[Charge/Discharge Cycle Step]

The non-aqueous lithium electricity storage element precursor after the doping was placed in an environment of 50° C. while maintaining the pressurization force of 1.2 kgf/cm².

(1) After carrying out constant current charge at 10.0 Å until the voltage reached 4.3 V, constant voltage charge at 4.3 V was carried out for 5 minutes.

(2) After carrying out constant current discharge at 10.0 Å until the voltage reached 2.0 V, constant voltage discharge at 2.0 V was carried out for 5 minutes.

Regarding (1) and (2) as one cycle, 5 cycles in total were carried out.
[Elevated Temperature Aging Step]

(1) High Voltage Storage Step: The non-aqueous lithium electricity storage element precursor after the charge/discharge cycle was discharged with a constant current at 10.0 Å in an environment at 25° C. until the voltage reached 4.2 V, while maintaining the pressurization force of 1.2 kgf/cm², and then the voltage was adjusted to 4.2 V by carrying out constant current charge at 4.2 V for 30 minutes. Continuing, the non-aqueous lithium electricity storage element precursor was stored for 10 hours in a thermostatic chamber at 60° C.

(2) Low Voltage Storage Step: The non-aqueous lithium electricity storage element precursor after the high voltage storage step was discharged with a constant current at 10.0 Å in an environment at 25° C. until the voltage reached 2.0 V, while maintaining the pressurization force of 1.2 kgf/cm², the voltage was adjusted to 2.0 V by carrying out constant current charge at 2.0 V for 30 minutes. Continuing, the non-aqueous lithium electricity storage element precursor was stored for 10 hours in a thermostatic chamber at 60° C.
[Gas Venting●Sealing Steps]

A portion of the aluminum laminate packaging material of the non-aqueous lithium electricity storage element precursor after the aging, was opened in a dry air environment at a temperature of 25° C. and dew point of −40° C. Continuing, the aforementioned non-aqueous lithium electricity storage element precursor was placed in a decompression chamber, and after reducing pressure from atmospheric pressure to −80 kPa over the course of 3 minutes by using a diaphragm pump (N816.3KT.45.18) manufactured by KNF Japan Co., Ltd., pressure was returned to atmospheric pressure over the course of 3 minutes, and this step was repeated a total of three times. Subsequently, the non-aqueous lithium electricity storage element precursor was placed in a reduced-pressure sealing machine and pressure was reduced to −90 kPa followed by sealing for 10 seconds at 200° C. and pressure of 0.1 MPa to seal the aluminum laminate packaging material.

From the step described above, the non-aqueous lithium electricity storage element was completed.

<Evaluation of Electricity Storage Element>
[Measurement of Electrostatic Capacitance]

Constant current charge was carried out on the electricity storage element obtained until the voltage reached 4.0 V at a current value of 20 C by using a charge and discharge apparatus (5 V, 360 A) manufactured by Fujitsu Telecom Networks Ltd. in a thermostatic chamber set to a temperature of 25° C., followed by carrying out constant voltage charge for 30 minutes in total by applying a constant voltage of 4.0 V. With the capacitance during constant current discharge down to 2.0 V at a current value of 2 C, as Q, electrostatic capacitance F of Example 2-1 determined according to F=Q/(4.0-2.0), yielded a value of 1,500 F.
[Determination of Ra·F]

The electricity storage element obtained was charged up to 4.0 V with a constant current at a current value of 20 C by using a charge and discharge apparatus (5 V, 360 A) manufactured by Fujitsu Telecom Networks Ltd. in a thermostatic chamber set to 25° C., followed by carrying out constant voltage charge for 30 minutes by applying a constant voltage of 4.0 V and carrying out constant current discharge down to 2.0 V at a current value of 20 C to obtain a discharging curve (time vs. voltage). Room temperature discharge internal resistance Ra was determined according to voltage drop $\Delta E=4.0-Eo$, and $Ra=\Delta E/(20\ C$ (current value A)) when the voltage at a discharge time of 0 seconds, obtained by extrapolating by linear approximation from the voltage values at discharge times of 2 seconds and 4 seconds in the discharging curve, was defined as Eo.

The product Ra·F of electrostatic capacitance F and room temperature discharge internal resistance Ra of Example 2-1 was 1.83 ΩF.
[Ratio of Increase in Resistance after Elevated Temperature and High Load Charge/Discharge Cycle Test]

In a thermostatic bath set to 60° C., the electricity storage element obtained was charged with a constant current at the 300 C current value until 4.1 V was reached, and then discharged with a constant current at the 300 C current value until 1.9 V was reached. The charge/discharge step was repeated 60,000 times. After the high-load charge/discharge cycle test, the resistance Re after the high load charge/discharge cycle test was determined in the same manner as in the aforementioned [Determination of Ra·F]. The ratio Re/Ra calculated by dividing this Re (Ω) by internal resistance Ra (Ω) before the high load charge/discharge cycle test obtained in the aforementioned [Determination of Ra·F] was 1.18 for Example 2-1, and Re/Ra was 1.19 for Example 2-2.
[Capacitance Retention Ratio after Elevated Temperature and High Load Charge/Discharge Cycle Test]

In a thermostatic bath set to 60° C., the electricity storage element obtained was charged with a constant current at the 300 C current value until 4.1 V was reached, and then discharged with a constant current at the 300 C current value until 1.9 V was reached. The charge/discharge step was repeated 60,000 times. Capacitance after the high-load charge/discharge cycle test Fe, was calculated. The ratio Fe/F calculated by dividing this Fe by the electrostatic capacitance F before the high load charge/discharge cycle test obtained in the aforementioned calculation of the electrostatic capacitance was 0.98 for Example 2-1.
[Micro Short Circuit Inspection Step]

When 100 non-aqueous lithium electricity storage elements were fabricated and the aforementioned micro short circuit inspection test was carried out, the number of micro short circuits was 1 in Example 2-1. Therefore, the micro short-circuit ratio of Example 2-1 was 1%. Moreover, the results of Example 2-2 in the above evaluation are shown in Table 2-1.

[Gas Volume After Elevated Temperature and High Voltage Float Test]

In a thermostatic bath set to 85° C., the electricity storage element obtained was charged with a constant current at the 20 C current value until 4.2 V was reached by using a charge and discharge apparatus (5 V, 360 A) manufactured by Fujitsu Telecom Networks Ltd., and subsequently a constant voltage charge by applying the constant voltage of 4.2 V was carried out for 300 hours in total. A cell volume prior to the start of the test Va and a cell volume after the start of the test Vb were measured according to the Archimedes method, and the gas generation volume of Example 2-1 obtained by Vb-Va was $7.10 \times 10^{-3}$ cm$^3$/F.

Moreover, the results of Example 2-2 in the aforementioned evaluation are shown in Table 2-1.

Examples 2-3 to 2-20, and 2-23 to 2-27

Non-aqueous lithium electricity storage elements each was produced and evaluated in the same manner as in Example 2-1 except that the positive electrode precursor, pressure upon the solution injection, temperature of non-aqueous electrolytic solution, and the pressurization force upon the solution injection were changed as shown in Table 2-1 to Table 2-3. The results are shown in Table 2-1 to Table 2-3.

Example 2-21

A non-aqueous lithium electricity storage element was produced and evaluated in the same manner as in Example 2-1 except that the solution injection●impregnation steps●the sealing step were carried out by the method to be described below. The results are shown in Table 2-3.

[Solution Injection●Impregnation●Sealing Steps]

The electrode laminate housed in an aluminum laminate packaging material was placed in a decompression chamber in a dry air environment at a temperature of 25° C. and dew point of −40° C. or lower, the pressure was reduced from normal pressure to −100 kPa, and then approximately 80 g of the aforementioned non-aqueous electrolytic solution with a solution temperature of 25° C. was injected. Subsequently, the pressure was reduced to −60.00 kPa from atmospheric pressure with the casing being open, again returned to atmospheric pressure, and the electrode laminate was allowed to stand undisturbed for 60 minutes. Subsequently, the non-aqueous lithium electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

Example 2-22

A non-aqueous lithium electricity storage element was produced and evaluated in the same manner as in Example 2-1 except that the solution injection●impregnation steps●the sealing step were carried out by the method to be described below. The results are shown in Table 2-3.

[Solution Injection●Impregnation●Sealing Steps]

The electrode laminate housed in an aluminum laminate packaging material was placed in a pressure reduction chamber in a dry air environment at a temperature of 25° C. and dew point of −40° C. or lower, the pressure was reduced from normal pressure to −100 kPa, and then approximately 80 g of the aforementioned non-aqueous electrolytic solution with a solution temperature of 25° C. was injected. Subsequently, the pressure was reduced to −100.00 kPa from atmospheric pressure with the casing being open, again returned to atmospheric pressure, and the electrode laminate was allowed to stand undisturbed for 60 minutes. Subsequently, the non-aqueous lithium electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

Comparative Examples 2-1 and 2-2

The type of positive electrode precursor was changed as shown in Table 2-3, and the secondary drying of the electrode was not carried out.

Next, the assembly step was carried out in the same manner as in Example 2-1.

The pressurization step was carried out in the same manner as in Example 2-1.

Further, in the solution injection, impregnation, and sealing steps, the electrode laminate housed in an aluminum laminate packaging material was placed in a decompression chamber in a dry air environment at a temperature of 25° C. and dew point of −40° C. or lower, however, approximately 80 g of the aforementioned non-aqueous electrolytic solution was injected at normal pressure. Subsequently, the electrode laminate was allowed to stand undisturbed for 60 minutes while maintaining normal pressure. Subsequently, the non-aqueous lithium electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

In the repressurization step, the metal plates restraining the non-aqueous lithium electricity storage element precursor after the solution injection were removed to adjust the pressure to 0 kgf/cm$^2$ In the lithium doping step, the resulting non-aqueous lithium electricity storage element precursor was charged with a constant current at a current value of 0.1 Å until the voltage reached 4.1 V in an environment at 25° C. by using a charge and discharge apparatus (ACD-10APS(01)) manufactured by Asuka Denshi K.K., and initial charge was then carried out according to a procedure consisting of continuing constant voltage charge at 4.1 V for 1 hour to dope the negative electrode with lithium. The total time for lithium doping was 9 hours.

As the charge/discharge cycle step of Comparative Examples 2-1 and 2-2, the non-aqueous lithium electricity storage element precursors after doping each was placed in an environment of 25° C.

(1) After carrying out constant current charge at 10.0 Å until the voltage reached 3.7 V, constant voltage charge at 3.7 V was carried out for 5 minutes.

(2) After carrying out constant current discharge at 10.0 Å until the voltage reached 1.4 V, constant voltage discharge at 1.4 V was carried out for 5 minutes.

Regarding (1) and (2) as one cycle, 5 cycles in total were carried out.

The details of the aging step of Comparative Examples 2-1 and 2-2 are as follows:

(1) High Voltage Step: The non-aqueous lithium electricity storage element precursor after the chare/discharge cycle step was discharged with a constant current at 10.0 Å in an environment at 25° C. until the voltage reached 4.0 V, while maintaining the pressurization force of 0 kgf/cm$^2$, the voltage was adjusted to 4.0 V by carrying out constant current charge at 4.0 V for 30 minutes. Continuing, the non-aqueous lithium electricity storage element precursor was stored for 10 hours in a thermostatic chamber at 60° C.

(2) Low Voltage Step: It was not carried out.

The gas venting●sealing steps and the subsequent steps were carried out in the same manner as in Example 2-1 to produce a non-aqueous lithium electricity storage element, and the obtained non-aqueous lithium electricity storage element was evaluated in the same manner as in Example 2-1. The results are shown in Table 2-3

Comparative Examples 2-7 and 2-8

[Production of Non-Aqueous Lithium Electricity Storage Element]

Non-aqueous lithium electricity storage elements each was produced in the same manner as in Example 2-1 and the obtained non-aqueous lithium electricity storage element was evaluated in the same manner as in Example 2-1 except that the assembly step and lithium doping step were changed as described below, and the type of positive electrode precursor and the process conditions were changed as shown in Table 2-3. The results are shown in Table 2-3.

[Assembly Step]

The assembly step was carried out in the same manner as in Example 2-1 except that the positive electrode precursor and the negative electrode in which a metallic lithium foil corresponding to 350 mAh/g per unit weight of the negative electrode active material was adhered to the surface of the negative electrode active material layer of negative electrode 2-1, were used.

[Lithium Doping Step]

In the lithium doping step, the non-aqueous lithium electricity storage element precursor was stored in a thermostatic bath at an environmental temperature of 45° C. for 72 hours to ionize the metallic lithium and to dope negative electrode 2-1.

TABLE 2-1

| | Positive electrode precursor | Alkali metal compound | Pressure upon solution injection (based on atmospheric pressure) [kPa] | Solution temperature [° C.] | Pressurization upon solution injection [kgf/cm$^2$] |
|---|---|---|---|---|---|
| Example 2-1 | 2-1 | Lithium carbonate | −100.00 | 25 | 0.08 |
| Example 2-2 | 2-2 | Lithium carbonate | −100.00 | 25 | 0.08 |
| Example 2-3 | 2-1 | Lithium carbonate | −15.00 | 25 | 0.08 |
| Example 2-4 | 2-1 | Lithium carbonate | −50.00 | 25 | 0.08 |
| Example 2-5 | 2-1 | Lithium carbonate | −100.05 | 25 | 0.08 |
| Example 2-6 | 2-1 | Lithium carbonate | −101.30 | 25 | 0.08 |
| Example 2-7 | 2-1 | Lithium carbonate | −101.32 | 25 | 0.08 |
| Example 2-8 | 2-1 | Lithium carbonate | −100.00 | 15 | 0.08 |
| Example 2-9 | 2-1 | Lithium carbonate | −100.00 | 35 | 0.08 |
| Example 2-10 | 2-1 | Lithium carbonate | −100.00 | 45 | 0.08 |

| | Pressure upon re-depressurization after solution injection step [kPa] | Micro short circuit (%) | Initial characteristics | | | Elevated temperature and high voltage float gas volume (×10$^{-3}$ cm$^3$/F) |
| | | | Electrostatic capacitance F (F) | Room temperature discharge internal resistance (mΩ) | Ra · F (ΩF) | |
|---|---|---|---|---|---|---|
| Example 2-1 | None | 1 | 1500 | 1.22 | 1.83 | 7.10 |
| Example 2-2 | None | 2 | 1556 | 1.24 | 1.93 | 6.20 |
| Example 2-3 | None | 10 | 1480 | 1.33 | 1.97 | 20.00 |
| Example 2-4 | None | 4 | 1503 | 1.28 | 1.92 | 9.80 |
| Example 2-5 | None | 1 | 1510 | 1.40 | 2.11 | 15.20 |
| Example 2-6 | None | 2 | 1512 | 1.60 | 2.42 | 14.70 |
| Example 2-7 | None | 2 | 1515 | 1.75 | 2.65 | 24.60 |
| Example 2-8 | None | 8 | 1490 | 1.90 | 2.83 | 17.80 |
| Example 2-9 | None | 1 | 1510 | 1.27 | 1.92 | 14.30 |
| Example 2-10 | None | 2 | 1512 | 1.68 | 2.54 | 20.50 |

TABLE 2-2

| | Positive electrode precursor | Alkali metal compound | Pressure upon solution injection (based on atmospheric pressure) [kPa] | Solution temperature [° C.] | Pressurization upon solution injection [kgf/cm$^2$] |
|---|---|---|---|---|---|
| Example 2-11 | 2-1 | Lithium carbonate | −100.00 | 25 | 0.05 |
| Example 2-12 | 2-1 | Lithium carbonate | −100.00 | 25 | 1 |
| Example 2-13 | 2-1 | Lithium carbonate | −100.00 | 25 | 10 |
| Example 2-14 | 2-1 | Lithium carbonate | −100.00 | 25 | 100 |
| Example 2-15 | 2-1 | Lithium carbonate | −100.00 | 25 | 450 |
| Example 2-16 | 2-2 | Lithium carbonate | −15.00 | 25 | 0.08 |
| Example 2-17 | 2-2 | Lithium carbonate | −50.00 | 25 | 0.08 |
| Example 2-18 | 2-2 | Lithium carbonate | −100.05 | 25 | 0.08 |

TABLE 2-2-continued

| | | | | | |
|---|---|---|---|---|---|
| Example 2-19 | 2-2 | Lithium carbonate | −101.30 | 25 | 0.08 |
| Example 2-20 | 2-2 | Lithium carbonate | −101.32 | 25 | 0.08 |

| | Pressure upon re-depressurization after solution injection step [kPa] | Micro short circuit (%) | Initial characteristics | | | Elevated temperature and high voltage float gas volume (×10$^{-3}$ cm$^3$/F) |
|---|---|---|---|---|---|---|
| | | | Electrostatic capacitance F (F) | Room temperature discharge internal resistance (mΩ) | Ra · F (ΩF) | |
| Example 2-11 | None | 2 | 1515 | 1.56 | 2.36 | 9.50 |
| Example 2-12 | None | 4 | 1490 | 1.75 | 2.61 | 11.80 |
| Example 2-13 | None | 7 | 1470 | 1.90 | 2.79 | 14.50 |
| Example 2-14 | None | 16 | 1430 | 2.25 | 3.22 | 22.90 |
| Example 2-15 | None | 22 | 1410 | 2.76 | 3.89 | 28.50 |
| Example 2-16 | None | 13 | 1522 | 1.39 | 1.97 | 15.50 |
| Example 2-17 | None | 4 | 1518 | 1.31 | 1.97 | 8.70 |
| Example 2-18 | None | 3 | 1589 | 1.46 | 2.11 | 12.30 |
| Example 2-19 | None | 5 | 1595 | 1.70 | 2.42 | 13.10 |
| Example 2-20 | None | 5 | 1600 | 1.90 | 2.65 | 19.80 |

Table 2-3

| | Positive electrode precursor | Alkali metal compound | Pressure upon solution injection (based on atmospheric pressure) [kPa] | Solution temperature [° C.] | Pressurization upon solution injection [kgf/cm$^2$] |
|---|---|---|---|---|---|
| Example 2-21 | 2-1 | Lithium carbonate | −100.00 | 25 | 0.08 |
| Example 2-22 | 2-1 | Lithium carbonate | −100.00 | 25 | 0.08 |
| Example 2-23 | 2-1 | Lithium carbonate | −4 | 25 | 0.08 |
| Example 2-24 | 2-1 | Lithium carbonate | −101.325 | 25 | 0.08 |
| Example 2-25 | 2-2 | Lithium carbonate | −4 | 25 | 0.08 |
| Example 2-26 | 2-2 | Lithium carbonate | −101.325 | 25 | 0.08 |
| Example 2-27 | 2-1 | Lithium carbonate | −100.00 | 25 | 0 |
| Comparative Example 2-1 | 2-1 | Lithium carbonate | 0 | 25 | 0.08 |
| Comparative Example 2-2 | 2-2 | Lithium carbonate | 0 | 25 | 0.08 |
| Comparative Example 2-7 | 2-3 | None | −100.00 | 25 | 0.08 |
| Comparative Example 2-8 | 2-4 | None | −100.00 | 25 | 0.08 |

| | Pressure upon re-depressurization after solution injection step [kPa] | Micro short-circuit (%) | Initial characteristics | | | Elevated temperature and high voltage float gas volume (×10$^{-3}$ cm$^3$/F) |
|---|---|---|---|---|---|---|
| | | | Electrostatic capacitance F (F) | Room temperature discharge internal resistance (mΩ) | Ra · F (ΩF) | |
| Example 2-21 | −60.00 | 1 | 1495 | 1.25 | 1.87 | 8.40 |
| Example 2-22 | −100.00 | 1 | 1504 | 1.43 | 2.15 | 12.30 |
| Example 2-23 | None | 61 | 1300 | 3.22 | 4.19 | 52.40 |
| Example 2-24 | None | 53 | 1250 | 4.00 | 5.00 | 40.40 |
| Example 2-25 | None | 66 | 1340 | 3.36 | 4.50 | 40.20 |
| Example 2-26 | None | 61 | 1290 | 4.24 | 5.47 | 34.20 |
| Example 2-27 | None | 15 | 1480 | 2.34 | 3.46 | 23.30 |
| Comparative Example 2-1 | None | 85 | 1193 | 6.04 | 7.20 | 103.30 |
| Comparative Example 2-2 | None | 89 | 1221 | 6.06 | 7.40 | 101.50 |
| Comparative Example 2-7 | None | 88 | 1238 | 5.02 | 6.22 | 120.50 |
| Comparative Example 2-8 | None | 94 | 1330 | 5.54 | 7.37 | 108.50 |

According to the Examples describe above, it has been verified that the method for producing the non-aqueous alkali metal electricity storage element and the precursor thereof according to the present embodiment inhibits the micro short circuit of the non-aqueous alkali metal electricity storage element precursor using the alkali metal compound for the positive electrode precursor, inhibits the micro short circuit that occurs in the non-aqueous alkali metal electricity storage element, and enables to achieve the excellent input/output characteristics and the elevated temperature durability of the non-aqueous alkali metal electricity storage element.

<<Production of Non-Aqueous Lithium Electricity Storage Element in Third Embodiment>>

Non-aqueous lithium electricity storage elements each that was one embodiment of the non-aqueous alkali metal electricity storage element, was produced.

<Production of Positive Electrode Precursor>

[Preparation of Activated Carbon 3-1]

A carbide was obtained by subjecting pulverized coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/h while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., pulverization was carried out for 1 hour with a ball mill to obtain activated carbon 3-1.

Measurement of mean particle diameter of this activated carbon 3-1 by using a laser diffraction-type particle size distribution measurement apparatus (SALD-2000J) manufactured by Shimadzu Corp. yielded a value of 5.5 μm. Moreover, fine pore size distribution of activated carbon 3-1 was measured by using a fine pore size distribution measurement apparatus (AUTOSORB-1 AS-1-MP) manufactured by Yuasa Ionics Co., Ltd. As a result, BET specific surface area was 2,360 $m^2/g$, mesopore volume ($V_1$) was 0.52 $cm^3/g$, micropore volume ($V_2$) was 0.88 $cm^3/g$, and $V_1/V_2=0.59$.

[Preparation of Activated Carbon 3-2]

A carbide having a mean particle diameter of 7 μm was obtained by carrying out carbonization treatment on a phenol resin for 2 hours at 600° C. in a calcination furnace in a nitrogen atmosphere followed by pulverizing with a ball mill and classification. KOH was mixed with this carbide at a weight ratio of 1:5 followed by activating by heating for 1 hour at 800° C. in the calcination furnace in a nitrogen atmosphere. The activated carbon was taken out, washed by stirring for 1 hour in dilute hydrochloric acid adjusted to 2 mol/L, and washed by boiling in distilled water until the pH stabilized between 5 and 6 and then dried to obtain activated carbon 3-2.

Measurement of mean particle diameter of this activated carbon 3-2 by using a laser diffraction-type particle size distribution measurement apparatus (SALD-2000J) manufactured by Shimadzu Corp. yielded a value of 7.0 μm. Moreover, fine pore size distribution of activated carbon 3-2 was measured by using a fine pore size distribution measurement apparatus (AUTOSORB-1 AS-1-MP) manufactured by Yuasa Ionics Co., Ltd. As a result, BET specific surface area was 3,627 $m^2/g$, mesopore volume ($V_1$) was 1.50 $cm^3/g$, micropore volume ($V_2$) was 2.28 $cm^3/g$, and $V_1/V_2=0.66$.

[Production of Positive Electrode Precursor 3-1]

A positive electrode precursor was produced by using activated carbon 3-1 as the positive electrode active material.

58.0 parts by weight of activated carbon 3-1, 32.0 parts by weight of lithium carbonate, 4.0 parts by weight of acetylene black, 3.5 parts by weight of acrylic latex, 1.5 parts by weight of CMC (carboxymethyl cellulose), and 1.0 part by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 3-1.

The viscosity (ηb) and TI value of the resulting positive electrode coating solution 3-1 were measured by using the TVE-35H E-type viscometer manufactured by Toki Sangyo Co., Ltd. As a result, viscosity (ηb) was 2,030 mPa·s and the TI value was 4.2. Moreover, dispersity of the resulting positive electrode coating solution 3-1 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 3-1 under conditions of a coating speed of 1 m/s by using a double-sided die coater manufactured by Toray Engineering Co., Ltd. and the coating film was dried to obtain a positive electrode precursor 3-1. The resulting positive electrode precursor 3-1 was pressed under conditions of a pressure of 6 kN/cm and pressed surface temperature of 25° C. by using a roll press. The total film thickness of the positive electrode precursor 3-1 was measured at ten arbitrary locations of the positive electrode precursor 3-1 by using the GS-551 Linear Gauge Sensor film thickness gauge manufactured by Ono Sokki Co., Ltd. The film thickness of the positive electrode active material layer of positive electrode precursor 3-1 was 61 μm per one side. Incidentally, the positive electrode precursor was produced and stored in a general environment where the dew point and illuminance were not controlled.

[Production of Positive Electrode Precursor 3-2]

A positive electrode precursor was produced by using activated carbon 3-1 as the positive electrode active material.

42.0 parts by weight of activated carbon 3-1, 14.0 parts by weight of LiFePO$_4$ having an average particle diameter of 3.5 μm as a lithium transition metal oxide, 32.0 parts by weight of lithium carbonate, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 3-2.

The viscosity (ηb) and TI value of the resulting positive electrode coating solution 3-2 were measured by using the TVE-35H E-type viscometer manufactured by Toki Sangyo Co., Ltd. As a result, viscosity (ηb) was 2,330 mPa·s and the TI value was 4.5. Moreover, dispersity of the resulting positive electrode coating solution 3-2 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 3-2 under conditions of a coating speed of 1 m/s by using a double-sided die coater manufactured by Toray Engineering Co., Ltd. and the coating film was dried to obtain a positive electrode precursor 3-2. The resulting positive electrode precursor 3-2 was pressed under conditions of a pressure of 6 kN/cm and pressed surface temperature of 25° C. by using a roll press. The total film thickness of the positive electrode precursor 3-2 was measured at ten arbitrary locations of the positive electrode precursor 3-2 by using the GS-551 Linear Gauge Sensor film thickness gauge manufactured by Ono Sokki Co., Ltd. The film thickness of the positive electrode active material layer of positive electrode precursor 3-2 was 48 μm per one side. Incidentally, the positive electrode precursor was produced and stored in a general environment where the dew point and illuminance were not controlled.

[Production of Positive Electrode Precursor 3-3]

A positive electrode precursor was produced by using activated carbon 3-1 as the positive electrode active material.

90.0 parts by weight of activated carbon 3-1, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 35.0%, followed by dispersing under conditions of a peripheral velocity of 10 m/s for 2 minutes by using the FILMIX® thin film rotating-type high-speed mixer manufactured by Primix Corp. to obtain a positive electrode coating solution 3-3.

The viscosity (ηb) and TI value of the resulting positive electrode coating solution 3-3 were measured by using the TVE-35H E-type viscometer manufactured by Toki Sangyo Co., Ltd. As a result, viscosity (ηb) was 2,150 mPa·s and the TI value was 5.2. Moreover, dispersity of the resulting positive electrode coating solution 3-3 was measured by using a particle gauge manufactured by Yoshimitsu Seiki Co., Ltd. As a result, dispersity was 25 μm.

Both sides of an aluminum foil having a thickness of 15 μm was coated with the positive electrode coating solution 3-3 under conditions of a coating speed of 1 m/s by using a double-sided die coater manufactured by Toray Engineering Co., Ltd. and the coating film was dried to obtain a positive electrode precursor 3-3. The resulting positive electrode precursor 3-3 was pressed under conditions of a pressure of 6 kN/cm and pressed surface temperature of 25° C. by using a roll press. The total film thickness of the positive electrode precursor 3-3 was measured at ten arbitrary locations of the positive electrode precursor 3-3 by using the GS-551 Linear Gauge Sensor film thickness gauge manufactured by Ono Sokki Co., Ltd. The film thickness of the positive electrode active material layer of positive electrode precursor 3-3 was 67 μm per one side. Incidentally, the positive electrode precursor was produced and stored in a general environment where the dew point and illuminance were not controlled.

[Production of Positive Electrode Precursor 3-4]

A positive electrode precursor was produced by using activated carbon 3-1 as the positive electrode active material.

60.0 parts by weight of activated carbon 3-1, 30.0 parts by weight of $LiFePO_4$ having an average particle diameter of 3.5 μm as a lithium transition metal oxide, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 38.0%, followed by dispersing under conditions of a peripheral velocity of 10 m/s for 2 minutes by using the FILMIX® thin film rotating-type high-speed mixer manufactured by Primix Corp. to obtain a positive electrode coating solution 3-4.

The viscosity (ηb) and TI value of the resulting positive electrode coating solution 3-4 were measured by using the TVE-35H E-type viscometer manufactured by Toki Sangyo Co., Ltd. As a result, viscosity (ηb) was 2,020 mPa·s and the TI value was 5.6. Moreover, dispersity of the resulting positive electrode coating solution 3-4 was measured by using a particle gauge manufactured by Yoshimitsu Seiki Co., Ltd. As a result, dispersity was 23 μm.

Both sides of an aluminum foil having a thickness of 15 μm was coated with the positive electrode coating solution 3-4 under conditions of a coating speed of 1 m/s by using a double-sided die coater manufactured by Toray Engineering Co., Ltd. and the coating film was dried to obtain a positive electrode precursor 3-4. The resulting positive electrode precursor 3-4 was pressed under conditions of a pressure of 6 kN/cm and pressed surface temperature of 25° C. by using a roll press. The total film thickness of the positive electrode precursor 3-4 was measured at ten arbitrary locations of the positive electrode precursor 3-4 by using the GS-551 Linear Gauge Sensor film thickness gauge manufactured by Ono Sokki Co., Ltd. The film thickness of the positive electrode active material layer of positive electrode precursor 3-4 was 57 μm per one side. Incidentally, the positive electrode precursor was produced and stored in a general environment where the dew point and illuminance were not controlled.

[Production of Positive Electrode Precursor 3-5]

A positive electrode precursor was produced by using activated carbon 3-1 as the positive electrode active material.

90.0 parts by weight of activated carbon 3-1, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 35.0%, followed by dispersing under conditions of a peripheral velocity of 10 m/s for 2 minutes by using the FILMIX® thin film rotating-type high-speed mixer manufactured by Primix Corp. to obtain a positive electrode coating solution 3-5.

The viscosity (ηb) and TI value of the resulting positive electrode coating solution 3-5 were measured by using the TVE-35H E-type viscometer manufactured by Toki Sangyo Co., Ltd. Moreover, dispersity of the resulting positive electrode coating solution 3-5 was measured by using a particle gauge manufactured by Yoshimitsu Seiki Co., Ltd.

Both sides of an aluminum foil having a thickness of 15 μm was coated with the positive electrode coating solution 3-5 under conditions of a coating speed of 1 m/s by using a double-sided die coater manufactured by Toray Engineering Co., Ltd. and the coating film was dried to obtain a positive electrode precursor 3-5. The resulting positive electrode precursor 3-5 was pressed under conditions of a pressure of 6 kN/cm and pressed surface temperature of 25° C. by using a roll press. The total film thickness of the positive electrode precursor 3-5 was measured at ten arbitrary locations of the positive electrode precursor 3-5 by using the GS-551 Linear Gauge Sensor film thickness gauge manufactured by Ono Sokki Co., Ltd. Incidentally, the positive electrode precursor was produced in an environment where the dew point was −40° C.

[Production of Positive Electrode Precursor 3-6]

A positive electrode precursor was produced by using activated carbon 3-1 as the positive electrode active material.

60.0 parts by weight of activated carbon 3-1, 30.0 parts by weight of $LiFePO_4$ having an average particle diameter of 3.5 µm as a lithium transition metal oxide, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 38.0%, followed by dispersing under conditions of a peripheral velocity of 10 m/s for 2 minutes by using the FILMIX® thin film rotating-type high-speed mixer manufactured by Primix Corp. to obtain a positive electrode coating solution 3-6.

The viscosity (ηb) and TI value of the resulting positive electrode coating solution 3-6 were measured by using the TVE-35H E-type viscometer manufactured by Toki Sangyo Co., Ltd. Moreover, dispersity of the resulting positive electrode coating solution 3-6 was measured by using a particle gauge manufactured by Yoshimitsu Seiki Co., Ltd.

Both sides of an aluminum foil having a thickness of 15 µm was coated with the positive electrode coating solution 3-6 under conditions of a coating speed of 1 m/s by using a double-sided die coater manufactured by Toray Engineering Co., Ltd. and the coating film was dried to obtain a positive electrode precursor 3-6. The resulting positive electrode precursor 3-6 was pressed under conditions of a pressure of 6 kN/cm and pressed surface temperature of 25° C. by using a roll press. The total film thickness of the positive electrode precursor 3-6 was measured at ten arbitrary locations of the positive electrode precursor 3-6 by using the GS-551 Linear Gauge Sensor film thickness gauge manufactured by Ono Sokki Co., Ltd. Incidentally, the positive electrode precursor was produced in an environment where the dew point was −40° C.

<Production of Negative Electrode>
[Production of Negative Electrode 3-1]

83 parts by weight of artificial graphite having a mean particle size of 4.5 µm, 4 parts by weight of composite carbon material, and 9 parts by weight of acetylene black were dry-blended in a powder state with a planetary mixer, and then 2 parts by weight of styrene-butadiene copolymer and an aqueous solution of CMC (carboxymethyl cellulose) were added thereto to disperse the mixture while gradually lowering the solid content. Finally, CMC was added so as to be 2 parts by weight, and water was added to the mixed solution so that the weight ratio of the solid content was 39% to obtain a negative electrode coating solution.

The viscosity (ηb) and TI value of the resulting negative electrode coating solution were measured by using the TVE-35H E-type viscometer manufactured by Toki Sangyo Co., Ltd. As a result, viscosity (ηb) was 3,221 mPa·s and the TI value was 2.1.

Both sides of an electrolytic copper foil having a thickness of 10 µm was coated with the negative electrode coating solution under conditions of a coating speed of 1 m/s by using a die coater manufactured by Toray Engineering Co., Ltd., and the coating film was dried at a drying temperature of 60° C. to obtain negative electrode 3-1. The resulting negative electrode 3-1 was pressed under conditions of a pressure of 5 kN/cm and pressed surface temperature of 25° C. using a roll press. The total film thickness of the negative electrode 3-1 was measured at ten arbitrary locations of the negative electrode 3-1 by using the GS-551 Linear Gauge Sensor film thickness gauge manufactured by Ono Sokki Co., Ltd. The film thickness of the negative electrode active material layer of negative electrode 3-1 was 30 µm per one side.

<Preparation of Non-Aqueous Electrolytic Solution>

By using a mixed solvent of ethylene carbonate (EC), dimethyl carbonate (DMC), and methyl ethyl carbonate (EMC) at a ratio (volume ratio) of 34:44:22, electrolyte salts respectively consisting of $LiN(SO_2F)_2$ and $LiPF_6$ at a concentration ratio of 25:75 (molar ratio) and a total concentration of $LiN(SO_2F)_2$ and $LiPF_6$ of 1.2 mol/L, in an entire non-aqueous electrolytic solution, were dissolved into the mixed solvent to obtain the non-aqueous electrolytic solution. The concentrations of $LiN(SO_2F)_2$ and $LiPF_6$ in the prepared nonaqueous electrolytic solution were 0.3 mol/L and 0.9 mol/L, respectively.

Examples 3-1 and 3-2

As the positive electrode precursor, positive electrode precursor 3-1 was used in Example 3-1, and positive electrode precursor 3-2 was used in Example 3-2.

[Secondary Drying of Electrodes]

The positive electrode precursor was dried by infrared heating at a temperature of 80° C. for 5 minutes, and wound up by roll-to-roll with a winding tension of 0.8 N/mm.

[Assembly Step]

The positive electrode precursor (double-sided) was cut into 20 sheets such that each positive electrode active material layer had a size of 10 cm×10 cm (100 cm²). Subsequently, negative electrode 3-1 was cut into 21 sheets such that each negative electrode active material layer had a size of 10.1 cm×10.1 cm (102 cm²), and 40 sheets of polyethylene separator (thickness 10 µm, manufactured by Asahi Kasei Kabushiki Kaisha) with a size of 10.3 cm×10.3 cm (106 cm²) were prepared. The positive electrode precursors and the negative electrodes were laminated with the separators interposed therebetween in the order of the positive electrode precursor, the separator, and the negative electrode so that the outermost layer became the negative electrode 3-1 and the positive electrode active material layer and the negative electrode active material layer faced each other, to obtain an electrode laminate. The positive electrode terminal and the negative electrode terminal were ultrasonically welded to the obtained electrode laminate, placed in a container made of an aluminum laminate packaging material, and three sides including the electrode terminal portion were sealed by heat sealing.

[Pressurization Step]

Pressure was applied by sandwiching the aluminum laminate packaging material between a pair of metal plates (height 150 mm×width 150 mm×thickness 5 mm) from the outside thereof and screwing the four corners of the metal plates. The pressure measured by using the surface pressure distribution measurement system I-SCAN (manufactured by Nitta Corporation) and the I-SCAN100 sensor (measurement surface dimensions: 112 mm×112 mm) was 0.08 kgf/cm² as the restraining pressure.

[Solution Injection, Impregnation, Sealing Steps]

The electrode laminate housed in an aluminum laminate packaging material was placed in a decompression chamber in a dry air environment at a temperature of 25° C. and dew point of −40° C. or lower, the pressure was reduced from normal pressure to −100 kPa, and then approximately 80 g of the aforementioned non-aqueous electrolytic solution with a solution temperature of 25° C. was injected. Subsequently, the pressure was returned to atmospheric pressure, and the electrode laminate was allowed to stand undisturbed for 60 minutes. Subsequently, the non-aqueous lithium electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

[Repressurization Step]

The pressure of the non-aqueous lithium electricity storage element precursor after solution injection was increased to 1.2 kgf/cm² by further tightening the screws of the metal plates restraining the electricity storage element precursor.

[Lithium Doping Step]

The resulting non-aqueous lithium electricity storage element precursor was charged with a constant current at a current value of 6 Å until the voltage reached 4.5 V in an environment at 45° C. by using a charge and discharge apparatus (ACD-10APS(01))) manufactured by Asuka Denshi K.K., and initial charge was then carried out according to a procedure consisting of continuing constant voltage charge at 4.5 V for 1 hour to dope the negative electrode with lithium. The total time for lithium doping was 2 hours.

[Charge/Discharge Cycle Step]

The non-aqueous lithium electricity storage element precursor after the doping was placed in an environment of 50° C. while maintaining the pressurization force of 1.2 kgf/cm²

(1) After carrying out constant current charge at 10.0 Å until the voltage reached 4.3 V, constant voltage charge at 4.3 V was carried out for 5 minutes.

(2) After carrying out constant current discharge at 10.0 Å until the voltage reached 2.0 V, constant voltage discharge at 2.0 V was carried out for 5 minutes.

Regarding (1) and (2) as one cycle, 5 cycles in total were carried out.

[Elevated Temperature Aging Step]

The following (1) and (2) were carried out.

(1) High Voltage Storage Step: The non-aqueous alkali metal electricity storage element precursor after the charge/discharge cycle step was discharged with a constant current at 10.0 Å in an environment at 25° C. until the voltage reached 4.2 V, while maintaining the pressurization force of 1.2 kgf/cm², the voltage was adjusted to 4.2 V by carrying out constant current charge at 4.2 V for 30 minutes. Continuing, the non-aqueous lithium electricity storage element precursor was stored for 10 hours in a thermostatic chamber at 60° C.

(2) Low Voltage Storage Step: The non-aqueous alkali metal electricity storage element precursor after the high voltage storage step was discharged with a constant current at 10.0 Å in an environment at 25° C. until the voltage reached 2.0 V, while maintaining the pressurization force of 1.2 kgf/cm², the voltage was adjusted to 2.0 V by carrying out constant current charge at 2.0 V for 30 minutes. Continuing, the non-aqueous lithium electricity storage element precursor was stored for 10 hours in a thermostatic chamber at 60° C.

[Gas Venting and Sealing Steps]

A portion of the aluminum laminate packaging material of the non-aqueous lithium electricity storage element precursor after the aging, was opened in a dry air environment at a temperature of 25° C. and dew point of −40° C. Continuing, the non-aqueous lithium electricity storage element precursor was placed in a decompression chamber, and after reducing pressure from atmospheric pressure to −80 kPa over the course of 3 minutes by using a diaphragm pump (N816.3KT.45.18) manufactured by KNF Japan Co., Ltd., pressure was returned to atmospheric pressure over the course of 3 minutes, and this step was repeated a total of three times. Subsequently, the non-aqueous lithium electricity storage element precursor was placed in a decompression chamber and pressure was reduced to −90 kPa followed by sealing for 10 seconds at 200° C. and pressure of 0.1 MPa to seal the aluminum laminate packaging material.

From the step described above, the non-aqueous lithium electricity storage element was completed.

[Evaluation of Electricity Storage Element]
[Measurement of Electrostatic Capacitance]

Constant current charge was carried out on the electricity storage element obtained until the voltage reached 4.0 V at a current value of 20 C by using a charge and discharge apparatus (5 V, 360 A) manufactured by Fujitsu Telecom Networks Ltd. in a thermostatic chamber set to a temperature of 25° C., followed by carrying out constant voltage charge for 30 minutes in total by applying a constant voltage of 4.0 V. With the capacitance during constant current discharge down to 2.0 V at a current value of 2 C, as Q, electrostatic capacitance F was calculated according to $F=Q/(4.0-2.0)$.

[Determination of Ra·F]

The electricity storage element obtained was charged up to 4.0 V with a constant current at a current value of 20 C by using a charge and discharge apparatus (5 V, 360 A) manufactured by Fujitsu Telecom Networks Ltd. in a thermostatic chamber at 25° C., followed by carrying out constant voltage charge for 30 minutes by applying a constant voltage of 4.0 V and next carrying out constant current discharge down to 2.0 V at a current value of 20 C to obtain a discharging curve (time vs. voltage). Room temperature discharge internal resistance Ra was determined according to voltage drop $\Delta E=4.0-E_o$, and $Ra=\Delta E/(20\ C\ (current\ value\ A))$ when the voltage at a discharge time of 0 seconds, obtained by extrapolating by linear approximation from the voltage values at discharge times of 2 seconds and 4 seconds in the discharging curve, was defined as $E_o$.

The product Ra·F of electrostatic capacitance F and room temperature discharge internal resistance Ra of Example 3-1 was 1.83 ΩF.

[Ratio of Increase in Resistance after Elevated Temperature and High Load Charge/Discharge Cycle Test]

In a thermostatic bath set to 60° C., the electricity storage element obtained was charged with a constant current at the 300 C current value until 4.1 V was reached, and then discharged with a constant current at the 300 C current value until 1.9 V was reached. The charge/discharge step was repeated 60,000 times. After the high load charge/discharge cycle test, the resistance after the high load charge/discharge cycle test Re was determined in the same manner as in the aforementioned [Determination of Ra·F]. The ratio Re/Ra calculated by dividing this Re (Ω) by internal resistance before the high load charge/discharge cycle test obtained in the aforementioned [Determination of Ra·F] Ra (Ω) for Example 3-1 was 1.18.

[Micro Short Circuit Inspection Step]

When 100 non-aqueous lithium electricity storage elements were fabricated and the aforementioned micro short circuit inspection test was carried out, the number of micro short circuits was 1. Therefore, the micro short-circuit ratio of Example 3-1 was 1%.

[Gas Volume After Elevated Temperature and High Voltage Float Test]

In a thermostatic bath set to 85° C., the electricity storage element obtained was charged with a constant current at the 20 C current value until 4.2 V was reached by using a charge and discharge apparatus (5 V, 360 A) manufactured by Fujitsu Telecom Networks Ltd., and subsequently a constant voltage charge applying the constant voltage of 4.2 V was carried out for 300 hours in total. A cell volume prior to the start of the test Va and a cell volume after the start of the test Vb were measured according to the Archimedes method, and the gas generation volume of Example 3-1 obtained by Vb-Va was $7.10 \times 10^{-3}$ cm$^3$/F.

Moreover, the results of Example 3-2 in the aforementioned evaluation are shown in Table 3-1.

Examples 3-3 to 3-61, and 3-64 to 3-87

Non-aqueous alkali metal electricity storage elements each was produced and subsequently evaluated in the same manner as in Example 3-1 except that the positive electrode precursor, temperature, upper limit voltage, lower limit voltage, cycle times, of the charge/discharge cycle step, and the pressurization force upon the charge/discharge cycle step were changed as shown in Tables 3-1 to 3-4. The results are shown in Tables 3-1 to 3-4.

The pressurization force in the charge/discharge cycle step was set by appropriately adjusting the pressurization force after the doping.

Examples 3-62 and 3-63

Non-aqueous alkali metal electricity storage elements each was produced and subsequently evaluated in the same manner as in Example 3-1 except that the type of positive electrode precursor was changed, and the charge/discharge cycle step was not carried out. The results are shown in Table 3-4.

Comparative Examples 3-1 and 3-2

The type of positive electrode precursor was changed as shown in Table 3-5, and the secondary drying of the electrode was not carried out.

Next, the assembly step was carried out in the same manner as in Example 3-1.

The pressurization step was carried out in the same manner as in Example 3-1.

Further, in the solution injection, impregnation, and sealing steps, the electrode laminate housed in an aluminum laminate packaging material was placed in a decompression chamber in a dry air environment at a temperature of 25° C. and dew point of −40° C. or lower, and approximately 80 g of the aforementioned non-aqueous electrolytic solution was injected at normal pressure. Subsequently, the electrode laminate was allowed to stand undisturbed for 60 minutes while maintaining normal pressure. Subsequently, the non-aqueous alkali metal electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

In the repressurization step, the metal plates restraining the non-aqueous lithium electricity storage element precursor after the solution injection were removed to adjust the pressure to 0 kgf/cm$^2$.

In the lithium doping step, the resulting non-aqueous lithium electricity storage element precursor was charged with a constant current at a current value of 0.1 Å until the voltage reached 4.1 V in an environment at 25° C. by using a charge and discharge apparatus (ACD-10APS(01)) manufactured by Asuka Denshi K.K., and initial charge was then carried out according to a procedure consisting of continuing constant voltage charge at 4.1 V for 1 hour to dope the negative electrode with lithium. The total time for lithium doping was 9 hours.

As the charge/discharge cycle step, the non-aqueous alkali metal electricity storage element precursor after doping was placed in an environment of 25° C.

(1) After carrying out constant current charge at 10.0 Å until the voltage reached 3.7 V, constant voltage charge at 3.7 V was carried out for 5 minutes.

(2) After carrying out constant current discharge at 10.0 Å until the voltage reached 1.4 V, constant voltage discharge at 1.4 V was carried out for 5 minutes.

Regarding (1) and (2) as one cycle, 5 cycles in total were carried out.

The elevated temperature aging step was carried out as following (1) and (2).

(1) High Voltage Step: The non-aqueous alkali metal electricity storage element precursor after the chare/discharge cycle step was discharged with a constant current at 10.0 Å in an environment at 25° C. until the voltage reached 4.0 V, while maintaining the pressurization force of 0 kgf/cm$^2$, the voltage was adjusted to 4.0 V by carrying out constant current charge at 4.0 V for 30 minutes. Continuing, the non-aqueous lithium electricity storage element precursor was stored for 10 hours in a thermostatic chamber at 60° C.

(2) Low Voltage Step; It was not carried out.

The steps subsequent to the gas venting●sealing steps were carried out in the same manner as in Example 3-1 to produce a non-aqueous alkali metal electricity storage element, and the subsequent evaluation was carried out in the same manner as in Example 3-1. The results are shown in Table 3-5.

Comparative Examples 3-29 to 3-44

[Production of Non-Aqueous Alkali Metal Electricity Storage Element]

Non-aqueous alkali metal electricity storage elements each was produced, and the subsequent evaluation was carried out in the same manner as in Example 3-1 except that the assembly step and lithium doping step were changed as described below, and the type of positive electrode precursor was changed and the method of the charge/discharge cycle step was carried out, as shown in Table 3-5. The results are shown in Table 3-5.

[Assembly Step]

The assembly step was carried out in the same manner as in Example 3-1 except that the positive electrode precursor and the negative electrode in which a metallic lithium foil corresponding to 350 mAh/g per unit weight of the negative electrode active material was adhered to the surface of the negative electrode active material layer of negative electrode 3-1, were used.

[Lithium Doping Step]

In the lithium doping step, the non-aqueous alkali metal electricity storage element precursor was stored in a thermostatic bath at an environmental temperature of 45° C. for 72 hours to ionize the metallic lithium and to dope negative electrode 3-1.

According to the examples describe above, it has been verified that the method of the present embodiment inhibits the micro short circuit that occurred in the non-aqueous alkali metal electricity storage element by using the alkali metal compound other than the positive electrode active material for the positive electrode precursor, and can achieve the low resistance and satisfactory elevated temperature durability.

TABLE 3-1

| | | | | | | | | Evaluation results of non-aqueous alkali metal electricity storage element | | |
| --- | --- | --- | --- | --- | --- | --- | --- | --- | --- | --- |
| | | | Charge/discharge cycle step | | | | | Miro | Elevated temperature high load | Elevated temperature and high voltage |
| Examples | Positive electrode precursor | Temperature (° C.) | Upper limit voltage (V) | Lower limit voltage (V) | Number of cycles (times) | Pressurization (kgf/cm$^2$) | Ra · F (ΩF) | short circuit (%) | cycle Re/Ra (—) | float gas volume (×10$^{-3}$ cm$^3$/F) |
| 3-1 | 3-1 | 50 | 4.30 | 2.00 | 5 | 1.2 | 1.83 | 1 | 1.18 | 7.1 |
| 3-2 | 3-2 | 50 | 4.30 | 2.00 | 5 | 1.2 | 1.93 | 2 | 1.19 | 6.2 |
| 3-3 | 3-1 | 30 | 4.30 | 2.00 | 5 | 1.2 | 1.80 | 3 | 1.51 | 7.6 |
| 3-4 | 3-1 | 35 | 4.30 | 2.00 | 5 | 1.2 | 1.66 | 2 | 1.21 | 8.1 |
| 3-5 | 3-1 | 40 | 4.30 | 2.00 | 5 | 1.2 | 1.71 | 1 | 1.18 | 6.4 |
| 3-6 | 3-1 | 45 | 4.30 | 2.00 | 5 | 1.2 | 1.79 | 2 | 1.17 | 7.2 |
| 3-7 | 3-1 | 60 | 4.30 | 2.00 | 5 | 1.2 | 2.02 | 3 | 1.16 | 6.1 |
| 3-8 | 3-1 | 70 | 4.30 | 2.00 | 5 | 1.2 | 2.29 | 2 | 1.19 | 7.9 |
| 3-9 | 3-1 | 75 | 4.30 | 2.00 | 5 | 1.2 | 2.33 | 3 | 1.18 | 6.8 |
| 3-10 | 3-1 | 80 | 4.30 | 2.00 | 5 | 1.2 | 2.55 | 1 | 1.17 | 6.4 |
| 3-11 | 3-1 | 85 | 4.30 | 2.00 | 5 | 1.2 | 2.58 | 2 | 1.19 | 7.1 |
| 3-12 | 3-1 | 90 | 4.30 | 2.00 | 5 | 1.2 | 2.87 | 5 | 1.17 | 6.8 |
| 3-13 | 3-1 | 100 | 4.30 | 2.00 | 5 | 1.2 | 2.90 | 4 | 1.18 | 7.0 |
| 3-14 | 3-1 | 50 | 3.80 | 2.00 | 5 | 1.2 | 1.78 | 3 | 2.34 | 6.5 |
| 3-15 | 3-1 | 50 | 3.90 | 2.00 | 5 | 1.2 | 1.80 | 2 | 2.32 | 7.2 |
| 3-16 | 3-1 | 50 | 4.00 | 2.00 | 5 | 1.2 | 1.81 | 4 | 1.61 | 7.4 |
| 3-17 | 3-1 | 50 | 4.10 | 2.00 | 5 | 1.2 | 1.79 | 3 | 1.33 | 6.9 |
| 3-18 | 3-1 | 50 | 4.20 | 2.00 | 5 | 1.2 | 1.82 | 1 | 1.28 | 7.0 |
| 3-19 | 3-1 | 50 | 4.40 | 2.00 | 5 | 1.2 | 1.86 | 2 | 1.22 | 6.6 |
| 3-20 | 3-1 | 50 | 4.50 | 2.00 | 5 | 1.2 | 1.91 | 3 | 1.18 | 6.8 |

TABLE 3-2

| | | | | | | | | Evaluation results of non-aqueous alkali metal electricity storage element | | |
| --- | --- | --- | --- | --- | --- | --- | --- | --- | --- | --- |
| | | | Charge/discharge cycle step | | | | | Miro | Elevated temperature high load | Elevated temperature and high voltage |
| Examples | Positive electrode precursor | Temperature (° C.) | Upper limit voltage (V) | Lower limit voltage (V) | Number of cycles (times) | Pressurization (kgf/cm$^2$) | Ra · F (ΩF) | short circuit (%) | cycle Re/Ra (—) | float gas volume (×10$^{-3}$ cm$^3$/F) |
| 3-21 | 3-1 | 50 | 4.60 | 2.00 | 5 | 1.2 | 2.34 | 4 | 1.19 | 7.2 |
| 3-22 | 3-1 | 50 | 4.70 | 2.00 | 5 | 1.2 | 2.56 | 3 | 1.20 | 7.4 |
| 3-23 | 3-1 | 50 | 4.80 | 2.00 | 5 | 1.2 | 2.89 | 2 | 1.21 | 6.7 |
| 3-24 | 3-1 | 50 | 4.30 | 1.50 | 5 | 1.2 | 1.78 | 1 | 2.44 | 6.4 |
| 3-25 | 3-1 | 50 | 4.30 | 1.55 | 5 | 1.2 | 1.79 | 2 | 2.42 | 6.8 |
| 3-26 | 3-1 | 50 | 4.30 | 1.60 | 5 | 1.2 | 1.81 | 3 | 1.81 | 7.1 |
| 3-27 | 3-1 | 50 | 4.30 | 1.65 | 5 | 1.2 | 1.81 | 2 | 1.79 | 7.3 |
| 3-28 | 3-1 | 50 | 4.30 | 1.70 | 5 | 1.2 | 1.80 | 2 | 1.32 | 6.9 |
| 3-29 | 3-1 | 50 | 4.30 | 1.80 | 5 | 1.2 | 1.77 | 2 | 1.25 | 6.8 |
| 3-30 | 3-1 | 50 | 4.30 | 1.90 | 5 | 1.2 | 1.82 | 2 | 1.21 | 7.2 |
| 3-31 | 3-1 | 50 | 4.30 | 2.10 | 5 | 1.2 | 1.76 | 3 | 1.19 | 7.1 |
| 3-32 | 3-1 | 50 | 4.30 | 2.30 | 5 | 1.2 | 1.82 | 1 | 1.18 | 7.4 |
| 3-33 | 3-1 | 50 | 4.30 | 2.60 | 5 | 1.2 | 1.80 | 1 | 1.17 | 6.8 |
| 3-34 | 3-1 | 50 | 4.30 | 3.10 | 5 | 1.2 | 1.79 | 4 | 1.18 | 6.9 |
| 3-35 | 3-1 | 50 | 4.30 | 3.30 | 5 | 1.2 | 1.81 | 3 | 1.19 | 7.1 |
| 3-36 | 3-1 | 50 | 4.30 | 3.35 | 5 | 1.2 | 1.79 | 3 | 1.74 | 7.2 |
| 3-37 | 3-1 | 50 | 4.30 | 3.40 | 5 | 1.2 | 1.76 | 2 | 1.72 | 6.8 |
| 3-38 | 3-1 | 50 | 4.30 | 3.45 | 5 | 1.2 | 1.81 | 1 | 2.42 | 6.8 |
| 3-39 | 3-1 | 50 | 4.30 | 3.50 | 5 | 1.2 | 1.79 | 3 | 2.38 | 7.5 |
| 3-40 | 3-2 | 50 | 4.30 | 2.00 | 1 | 1.2 | 1.88 | 4 | 2.75 | 6.5 |

TABLE 3-3

| | | Charge/discharge cycle step | | | | | | Evaluation results of non-aqueous alkali metal electricity storage element | | |
|---|---|---|---|---|---|---|---|---|---|---|
| Examples | Positive electrode precursor | Temperature (° C.) | Upper limit voltage (V) | Lower limit voltage (V) | Number of cycles (times) | Pressurization (kgf/cm$^2$) | Ra · F (ΩF) | Miro short circuit (%) | Elevated temperature high load cycle Re/Ra (—) | Elevated temperature and high voltage float gas volume (×10$^{-3}$ cm$^3$/F) |
| 3-41 | 3-2 | 50 | 4.30 | 2.00 | 2 | 1.2 | 1.90 | 3 | 1.65 | 7.8 |
| 3-42 | 3-2 | 50 | 4.30 | 2.00 | 4 | 1.2 | 1.91 | 2 | 1.17 | 7.4 |
| 3-43 | 3-2 | 50 | 4.30 | 2.00 | 8 | 1.2 | 1.94 | 1 | 1.18 | 6.9 |
| 3-44 | 3-2 | 50 | 4.30 | 2.00 | 9 | 1.2 | 2.44 | 1 | 1.19 | 7.2 |
| 3-45 | 3-2 | 50 | 4.30 | 2.00 | 10 | 1.2 | 2.48 | 2 | 1.21 | 7.3 |
| 3-46 | 3-2 | 50 | 4.30 | 2.00 | 11 | 1.2 | 2.83 | 1 | 1.19 | 6.8 |
| 3-47 | 3-2 | 50 | 4.30 | 2.00 | 15 | 1.2 | 2.81 | 1 | 1.17 | 6.9 |
| 3-48 | 3-2 | 50 | 4.30 | 2.00 | 100 | 1.2 | 2.82 | 2 | 1.20 | 7.1 |
| 3-49 | 3-1 | 50 | 4.30 | 2.00 | 5 | 0.05 | 1.74 | 5 | 2.56 | 7.0 |
| 3-50 | 3-1 | 50 | 4.30 | 2.00 | 5 | 0.1 | 1.78 | 4 | 1.82 | 7.8 |
| 3-51 | 3-1 | 50 | 4.30 | 2.00 | 5 | 0.25 | 1.81 | 3 | 1.81 | 7.4 |
| 3-52 | 3-1 | 50 | 4.30 | 2.00 | 5 | 0.5 | 1.79 | 4 | 1.45 | 6.9 |
| 3-53 | 3-1 | 50 | 4.30 | 2.00 | 5 | 0.75 | 1.83 | 2 | 1.43 | 7.2 |
| 3-54 | 3-1 | 50 | 4.30 | 2.00 | 5 | 1 | 1.81 | 3 | 1.21 | 7.5 |
| 3-55 | 3-1 | 50 | 4.30 | 2.00 | 5 | 5 | 1.79 | 4 | 1.20 | 7.1 |
| 3-56 | 3-1 | 50 | 4.30 | 2.00 | 5 | 10 | 1.78 | 1 | 1.19 | 6.8 |
| 3-57 | 3-1 | 50 | 4.30 | 2.00 | 5 | 50 | 1.76 | 2 | 1.34 | 6.9 |
| 3-58 | 3-1 | 50 | 4.30 | 2.00 | 5 | 100 | 1.72 | 1 | 1.38 | 7.2 |
| 3-59 | 3-1 | 50 | 4.30 | 2.00 | 5 | 500 | 1.70 | 1 | 1.79 | 7.4 |
| 3-60 | 3-1 | 50 | 4.30 | 2.00 | 5 | 1000 | 1.74 | 1 | 1.82 | 7.8 |
| 3-61 | 3-1 | 50 | 4.30 | 2.00 | 5 | 2000 | 2.61 | 1 | 2.31 | 8.0 |

TABLE 3-4-1

| | | Charge/discharge cycle step | | | | | | Evaluation results of non-aqueous alkali metal electricity storage element | | |
|---|---|---|---|---|---|---|---|---|---|---|
| Examples | Positive electrode precursor | Temperature (° C.) | Upper limit voltage (V) | Lower limit voltage (V) | Number of cycles (times) | Pressurization (kgf/cm$^2$) | Ra · F (ΩF) | Miro short circuit (%) | Elevated temperature high load cycle Re/Ra (—) | Elevated temperature and high voltage float gas volume (×10$^{-3}$ cm$^3$/F) |
| 3-62 | 3-1 | Without charge/discharge cycle step | | | | | 1.70 | 46 | 5.31 | 33.4 |
| 3-63 | 3-2 | Without charge/discharge cycle step | | | | | 1.72 | 48 | 5.28 | 35.1 |
| 3-64 | 3-1 | 25 | 4.30 | 2.00 | 5 | 1.2 | 1.70 | 45 | 5.11 | 36.2 |
| 3-65 | 3-1 | 105 | 4.30 | 2.00 | 5 | 1.2 | 4.50 | 51 | 1.33 | 34.9 |
| 3-66 | 3-2 | 25 | 4.30 | 2.00 | 5 | 1.2 | 1.72 | 43 | 5.22 | 37.2 |
| 3-67 | 3-2 | 105 | 4.30 | 2.00 | 5 | 1.2 | 5.10 | 55 | 1.34 | 34.2 |
| 3-68 | 3-1 | 50 | 3.70 | 2.00 | 5 | 1.2 | 2.11 | 53 | 5.33 | 35.1 |
| 3-69 | 3-1 | 50 | 4.90 | 2.00 | 5 | 1.2 | 4.97 | 52 | 1.23 | 32.6 |
| 3-70 | 3-2 | 50 | 3.70 | 2.00 | 5 | 1.2 | 2.20 | 48 | 5.39 | 33.1 |
| 3-71 | 3-2 | 50 | 4.90 | 2.00 | 5 | 1.2 | 5.11 | 55 | 1.21 | 34.5 |
| 3-72 | 3-1 | 50 | 4.30 | 1.40 | 5 | 1.2 | 2.11 | 55 | 4.98 | 33.8 |
| 3-73 | 3-1 | 50 | 4.30 | 3.60 | 5 | 1.2 | 2.01 | 57 | 5.03 | 37.2 |
| 3-74 | 3-2 | 50 | 4.30 | 1.40 | 5 | 1.2 | 2.07 | 44 | 4.99 | 35.2 |
| 3-75 | 3-2 | 50 | 4.30 | 3.60 | 5 | 1.2 | 2.06 | 46 | 5.05 | 36.5 |
| 3-76 | 3-1 | 25 | 3.70 | 2.00 | 5 | 1.2 | 1.72 | 49 | 5.19 | 35.7 |
| 3-77 | 3-1 | 105 | 3.70 | 2.00 | 5 | 1.2 | 4.98 | 47 | 5.17 | 37.1 |
| 3-78 | 3-1 | 25 | 4.90 | 2.00 | 5 | 1.2 | 5.11 | 52 | 5.21 | 33.9 |
| 3-79 | 3-1 | 105 | 4.90 | 2.00 | 5 | 1.2 | 5.02 | 53 | 1.52 | 34.1 |
| 3-80 | 3-1 | 25 | 4.30 | 1.40 | 5 | 1.2 | 1.75 | 50 | 5.22 | 36.1 |
| 3-81 | 3-1 | 105 | 4.30 | 1.40 | 5 | 1.2 | 5.00 | 47 | 5.18 | 37.2 |
| 3-82 | 3-1 | 25 | 4.30 | 3.60 | 5 | 1.2 | 1.77 | 48 | 5.20 | 35.9 |

TABLE 3-4-2

| | | Charge/discharge cycle step | | | | | | Miro | Elevated temperature high load | Elevated temperature and high voltage |
|---|---|---|---|---|---|---|---|---|---|---|
| Examples | Positive electrode precursor | Temperature (° C.) | Upper limit voltage (V) | Lower limit voltage (V) | Number of cycles (times) | Pressurization (kgf/cm$^2$) | Ra · F (ΩF) | short circuit (%) | cycle Re/Ra (—) | float gas volume (×10$^{-3}$ cm$^3$/F) |
| 3-83 | 3-1 | 105 | 4.30 | 3.60 | 5 | 1.2 | 4.89 | 46 | 5.19 | 37.2 |
| 3-84 | 3-1 | 50 | 3.70 | 1.40 | 5 | 1.2 | 1.73 | 51 | 5.25 | 35.8 |
| 3-85 | 3-1 | 50 | 4.90 | 1.40 | 5 | 1.2 | 5.03 | 49 | 5.19 | 32.8 |
| 3-86 | 3-1 | 50 | 3.70 | 3.60 | 5 | 1.2 | 1.78 | 45 | 5.22 | 34.1 |
| 3-87 | 3-1 | 50 | 4.90 | 3.60 | 5 | 1.2 | 4.92 | 47 | 5.24 | 35.8 |

TABLE 3-5

| | | Charge/discharge cycle step | | | | | | Miro | Elevated temperature high load | Elevated temperature and high voltage |
|---|---|---|---|---|---|---|---|---|---|---|
| Comparative Examples | Positive electrode precursor | Temperature (° C.) | Upper limit voltage (V) | Lower limit voltage (V) | Number of cycles (times) | Pressurization (kgf/cm$^2$) | Ra · F (ΩF) | short circuit (%) | cycle Re/Ra (—) | float gas volume (×10$^{-3}$ cm$^3$/F) |
| 3-1 | 3-1 | 25 | 3.7 | 1.4 | 5 | 0 | 7.20 | 85 | 7.80 | 103.3 |
| 3-2 | 3-2 | 25 | 3.7 | 1.4 | 5 | 0 | 7.40 | 89 | 7.68 | 101.5 |
| 3-29 | 3-3 | 50 | 4.30 | 2.00 | 5 | 1.2 | 3.19 | 75 | 5.11 | 52.3 |
| 3-30 | 3-4 | 50 | 4.30 | 2.00 | 5 | 1.2 | 3.10 | 78 | 5.17 | 51.3 |
| 3-31 | 3-3 | Without charge/discharge cycle step | | | | | 3.09 | 79 | 5.23 | 50.9 |
| 3-32 | 3-4 | Without charge/discharge cycle step | | | | | 3.13 | 77 | 5.24 | 52.6 |
| 3-33 | 3-3 | 25 | 4.30 | 2.00 | 5 | 1.2 | 3.11 | 74 | 5.06 | 52.3 |
| 3-34 | 3-3 | 105 | 4.30 | 2.00 | 5 | 1.2 | 5.58 | 77 | 5.07 | 51.9 |
| 3-35 | 3-4 | 25 | 4.30 | 2.00 | 5 | 1.2 | 3.13 | 73 | 5.05 | 50.2 |
| 3-36 | 3-4 | 105 | 4.30 | 2.00 | 5 | 1.2 | 5.54 | 76 | 5.12 | 52.3 |
| 3-37 | 3-3 | 50 | 3.70 | 2.00 | 5 | 1.2 | 3.20 | 74 | 5.21 | 51.8 |
| 3-38 | 3-3 | 50 | 5.00 | 2.00 | 5 | 1.2 | 5.63 | 75 | 5.08 | 51.4 |
| 3-39 | 3-4 | 50 | 3.70 | 2.00 | 5 | 1.2 | 3.21 | 77 | 5.11 | 50.9 |
| 3-40 | 3-4 | 50 | 5.00 | 2.00 | 5 | 1.2 | 5.64 | 77 | 5.13 | 51.2 |
| 3-41 | 3-5 | 50 | 4.30 | 2.00 | 5 | 1.2 | 3.21 | 34 | 5.12 | 25.0 |
| 3-42 | 3-6 | 50 | 4.30 | 2.00 | 5 | 1.2 | 3.12 | 37 | 5.19 | 25.8 |
| 3-43 | 3-5 | Without charge/discharge cycle step | | | | | 3.11 | 38 | 5.22 | 25.7 |
| 3-44 | 3-6 | Without charge/discharge cycle step | | | | | 3.15 | 37 | 5.25 | 25.3 |

<<Production of Non-Aqueous Lithium Electricity Storage Element in Fourth Aspect>>

The present invention will be specifically described by way of Examples and Comparative Examples below, however, the present invention is not limited thereto.

<<Production of Non-Aqueous Lithium Electricity Storage Element>>

Non-aqueous lithium electricity storage elements each that was one embodiment of the non-aqueous alkali metal electricity storage element, was produced below.

<Production of Positive Electrode Precursor>

[Preparation of Activated Carbon 4-1]

A carbide was obtained by subjecting pulverized coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/h while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., pulverization was carried out for 1 hour with a ball mill to obtain activated carbon 4-1.

Measurement of mean particle diameter of this activated carbon 4-1 by using a laser diffraction-type particle size distribution measurement apparatus (SALD-2000J) manufactured by Shimadzu Corp. yielded a value of 5.5 μm. Moreover, fine pore size distribution of activated carbon 4-1 was measured by using a fine pore size distribution measurement apparatus (AUTOSORB-1 AS-1-MP) manufactured by Yuasa Ionics Co., Ltd. As a result, BET specific surface area was 2,360 m$^2$/g, mesopore volume ($V_1$) was 0.52 cm$^3$/g, micropore volume ($V_2$) was 0.88 cm$^3$/g, and $V_1/V_2$=0.59.

[Preparation of Activated Carbon 4-2]

A carbide having a mean particle diameter of 7 μm was obtained by carrying out carbonization treatment on a phenol resin for 2 hours at 600° C. in a calcination furnace in a nitrogen atmosphere followed by pulverizing with a ball mill and classification. KOH was mixed with this carbide at a weight ratio of 1:5 followed by activating by heating for 1 hour at 800° C. in the calcination furnace in a nitrogen atmosphere. The activated carbon was taken out, washed by stirring for 1 hour in dilute hydrochloric acid adjusted to 2 mol/L, and washed by boiling in distilled water until the pH stabilized between 5 and 6 and then dried to obtain activated carbon 4-2.

Measurement of mean particle diameter of this activated carbon 4-2 by using a laser diffraction-type particle size distribution measurement apparatus (SALD-2000J) manufactured by Shimadzu Corp. yielded a value of 7.0 μm. Moreover, fine pore size distribution of activated carbon 4-2 was measured by using a fine pore size distribution measurement apparatus (AUTOSORB-1 AS-1-MP) manufactured by Yuasa Ionics Co., Ltd. As a result, BET specific surface area was 3,627 m$^2$/g, mesopore volume ($V_1$) was 1.50 cm$^3$/g, micropore volume ($V_2$) was 2.28 cm$^3$/g, and $V_1/V_2$=0.66.

[Production of Positive Electrode Precursor 4-1]

A positive electrode precursor was produced by using activated carbon 4-1 as the positive electrode active material.

58.0 parts by weight of activated carbon 4-1, 32.0 parts by weight of lithium carbonate, 4.0 parts by weight of acetylene black, 3.5 parts by weight of acrylic latex, 1.5 parts by weight of CMC (carboxymethyl cellulose), and 1.0 part by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 4-1.

The viscosity (ηb) and TI value of the resulting positive electrode coating solution 4-1 were measured by using the TVE-35H E-type viscometer manufactured by Toki Sangyo Co., Ltd. As a result, viscosity (ηb) was 2,030 mPa·s and the TI value was 4.2. Moreover, dispersity of the resulting positive electrode coating solution 4-1 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 4-1 under conditions of a coating speed of 1 m/s by using a double-sided die coater manufactured by Toray Engineering Co., Ltd. and the coating film was dried to obtain a positive electrode precursor 4-1. The resulting positive electrode precursor 4-1 was pressed under conditions of a pressure of 6 kN/cm and pressed surface temperature of 25° C. by using a roll press. The total film thickness of the positive electrode precursor 4-1 was measured at ten arbitrary locations of the positive electrode precursor 4-1 by using the GS-551 Linear Gauge Sensor film thickness gauge manufactured by Ono Sokki Co., Ltd. The film thickness of the positive electrode active material layer of positive electrode precursor 4-1 was 61 μm per one side. Incidentally, the positive electrode precursor was produced and stored in a general environment where the dew point and illuminance were not controlled.

[Production of Positive Electrode Precursor 4-2]

A positive electrode precursor was produced by using activated carbon 4-1 as the positive electrode active material.

42.0 parts by weight of activated carbon 4-1, 14.0 parts by weight of LiFePO$_4$ having an average particle diameter of 3.5 μm as a lithium transition metal oxide, 32.0 parts by weight of lithium carbonate, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 4-2.

The viscosity (ηb) and TI value of the resulting positive electrode coating solution 4-2 were measured by using the TVE-35H E-type viscometer manufactured by Toki Sangyo Co., Ltd. As a result, viscosity (ηb) was 2,330 mPa·s and the TI value was 4.5. Moreover, dispersity of the resulting positive electrode coating solution 4-2 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 4-2 under conditions of a coating speed of 1 m/s by using a double-sided die coater manufactured by Toray Engineering Co., Ltd. and the coating film was dried to obtain a positive electrode precursor 4-2. The resulting positive electrode precursor 4-2 was pressed under conditions of a pressure of 6 kN/cm and pressed surface temperature of 25° C. by using a roll press. The total film thickness of the positive electrode precursor 4-2 was measured at ten arbitrary locations of the positive electrode precursor 4-2 by using the GS-551 Linear Gauge Sensor film thickness gauge manufactured by Ono Sokki Co., Ltd. The film thickness of the positive electrode active material layer of positive electrode precursor 4-2 was 48 μm per one side. Incidentally, the positive electrode precursor was produced and stored in a general environment where the dew point and illuminance were not controlled.

[Production of Positive Electrode Precursor 4-3]

A positive electrode precursor was produced by using activated carbon 4-1 as the positive electrode active material.

90.0 parts by weight of activated carbon 4-1, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 35.0%, followed by dispersing under conditions of a peripheral velocity of 10 m/s for 2 minutes by using the FILMIX® thin film rotating-type high-speed mixer manufactured by Primix Corp. to obtain a positive electrode coating solution 4-3.

The viscosity (ηb) and TI value of the resulting positive electrode coating solution 4-3 were measured by using the TVE-35H E-type viscometer manufactured by Toki Sangyo Co., Ltd. As a result, viscosity (ηb) was 2,150 mPa·s and the TI value was 5.2. Moreover, dispersity of the resulting positive electrode coating solution 4-3 was measured by using a particle gauge manufactured by Yoshimitsu Seiki Co., Ltd. As a result, dispersity was 25 μm.

Both sides of an aluminum foil having a thickness of 15 μm was coated with the positive electrode coating solution 4-3 under conditions of a coating speed of 1 m/s by using a double-sided die coater manufactured by Toray Engineering Co., Ltd. and the coating film was dried to obtain a positive electrode precursor 4-3. The resulting positive electrode precursor 4-3 was pressed under conditions of a pressure of 6 kN/cm and pressed surface temperature of 25° C. by using a roll press. The total film thickness of the positive electrode precursor 4-3 was measured at ten arbitrary locations of the positive electrode precursor 4-3 by using the GS-551 Linear Gauge Sensor film thickness gauge manufactured by Ono Sokki Co., Ltd. The film thickness of the positive electrode active material layer of positive electrode precursor 4-3 was 67 μm per one side. Incidentally, the positive electrode precursor was produced and stored in a general environment where the dew point and illuminance were not controlled.

[Production of Positive Electrode Precursor 4-4]

A positive electrode precursor was produced by using activated carbon 4-1 as the positive electrode active material.

60.0 parts by weight of activated carbon 4-1, 30.0 parts by weight of $LiFePO_4$ having an average particle diameter of 3.5 μm as a lithium transition metal oxide, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 38.0%, followed by dispersing under conditions of a peripheral velocity of 10 m/s for 2 minutes by using the FILMIX® thin film rotating-type high-speed mixer manufactured by Primix Corp. to obtain a positive electrode coating solution 4-4.

The viscosity (ηb) and TI value of the resulting positive electrode coating solution 4-4 were measured by using the TVE-35H E-type viscometer manufactured by Toki Sangyo Co., Ltd. As a result, viscosity (ηb) was 2,020 mPa·s and the TI value was 5.6. Moreover, dispersity of the resulting positive electrode coating solution 4-4 was measured by using a particle gauge manufactured by Yoshimitsu Seiki Co., Ltd. As a result, dispersity was 23 μm.

Both sides of an aluminum foil having a thickness of 15 μm was coated with the positive electrode coating solution 4-4 under conditions of a coating speed of 1 m/s by using a double-sided die coater manufactured by Toray Engineering Co., Ltd. and the coating film was dried to obtain a positive electrode precursor 4-4. The resulting positive electrode precursor 4-4 was pressed under conditions of a pressure of 6 kN/cm and pressed surface temperature of 25° C. by using a roll press. The total film thickness of the positive electrode precursor 4-4 was measured at ten arbitrary locations of the positive electrode precursor 4-4 by using the GS-551 Linear Gauge Sensor film thickness gauge manufactured by Ono Sokki Co., Ltd. The film thickness of the positive electrode active material layer of positive electrode precursor 4-4 was 57 μm per one side. Incidentally, the positive electrode precursor was produced and stored in a general environment where the dew point and illuminance were not controlled.

[Production of Positive Electrode Precursor 4-5]

A positive electrode precursor was produced by using activated carbon 4-1 as the positive electrode active material.

90.0 parts by weight of activated carbon 4-1, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 35.0%, followed by dispersing under conditions of a peripheral velocity of 10 m/s for 2 minutes by using the FILMIX® thin film rotating-type high-speed mixer manufactured by Primix Corp. to obtain a positive electrode coating solution 4-5.

The viscosity (ηb) and TI value of the resulting positive electrode coating solution 4-5 were measured by using the TVE-35H E-type viscometer manufactured by Toki Sangyo Co., Ltd. Moreover, dispersity of the resulting positive electrode coating solution 4-5 was measured by using a particle gauge manufactured by Yoshimitsu Seiki Co., Ltd.

Both sides of an aluminum foil having a thickness of 15 μm was coated with the positive electrode coating solution 4-5 under conditions of a coating speed of 1 m/s by using a double-sided die coater manufactured by Toray Engineering Co., Ltd. and the coating film was dried to obtain a positive electrode precursor 4-5. The resulting positive electrode precursor 4-5 was pressed under conditions of a pressure of 6 kN/cm and pressed surface temperature of 25° C. by using a roll press. The total film thickness of the positive electrode precursor 4-5 was measured at ten arbitrary locations of the positive electrode precursor 4-5 by using the GS-551 Linear Gauge Sensor film thickness gauge manufactured by Ono Sokki Co., Ltd. Incidentally, the positive electrode precursor was produced in an environment where the dew point was −40° C.

[Production of Positive Electrode Precursor 4-6]

A positive electrode precursor was produced by using activated carbon 4-1 as the positive electrode active material.

60.0 parts by weight of activated carbon 4-1, 30.0 parts by weight of $LiFePO_4$ having an average particle diameter of 3.5 μm as a lithium transition metal oxide, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 38.0%, followed by dispersing under conditions of a peripheral velocity of 10 m/s for 2 minutes by using the FILMIX® thin film rotating-type high-speed mixer manufactured by Primix Corp. to obtain a positive electrode coating solution 4-6.

The viscosity (ηb) and TI value of the resulting positive electrode coating solution 4-6 were measured by using the TVE-35H E-type viscometer manufactured by Toki Sangyo Co., Ltd. Moreover, dispersity of the resulting positive electrode coating solution 4-6 was measured by using a particle gauge manufactured by Yoshimitsu Seiki Co., Ltd.

Both sides of an aluminum foil having a thickness of 15 μm was coated with the positive electrode coating solution 4-6 under conditions of a coating speed of 1 m/s by using a double-sided die coater manufactured by Toray Engineering Co., Ltd. and the coating film was dried to obtain a positive electrode precursor 4-6. The resulting positive electrode precursor 4-6 was pressed under conditions of a pressure of 6 kN/cm and pressed surface temperature of 25° C. by using a roll press. The total film thickness of the positive electrode precursor 4-6 was measured at ten arbitrary locations of the positive electrode precursor 4-6 by using the GS-551 Linear Gauge Sensor film thickness gauge manufactured by Ono Sokki Co., Ltd. Incidentally, the positive electrode precursor was produced in an environment where the dew point was −40° C.

<Production of Negative Electrode>

[Production of Negative Electrode 4-1]

83 parts by weight of artificial graphite having a mean particle size of 4.5 μm, 4 parts by weight of composite carbon material, and 9 parts by weight of acetylene black were dry-blended in a powder state with a planetary mixer, and then 2 parts by weight of styrene-butadiene copolymer and an aqueous solution of CMC (carboxymethyl cellulose) were added thereto to disperse the mixture while gradually lowering the solid content. Finally, CMC was added so as to be 2 parts by weight, and water was added to the mixed solution so that the weight ratio of the solid content was 39% to obtain a negative electrode coating solution.

The viscosity (ηb) and TI value of the resulting negative electrode coating solution were measured by using the TVE-35H E-type viscometer manufactured by Toki Sangyo Co., Ltd. As a result, viscosity (ηb) was 3,221 mPa·s and the TI value was 2.1.

Both sides of an electrolytic copper foil having a thickness of 10 μm was coated with the negative electrode coating solution under conditions of a coating speed of 1 m/s by using a die coater manufactured by Toray Engineering Co., Ltd., and the coating film was dried at a drying temperature of 60° C. to obtain negative electrode 4-1. It was pressed under conditions of a pressure of 5 kN/cm and pressed surface temperature of 25° C. using a roll press. The total film thickness of the pressed negative electrode 4-1 was measured at ten arbitrary locations of the negative electrode 4-1 by using the GS-551 Linear Gauge Sensor film thickness gauge manufactured by Ono Sokki Co., Ltd. The film thickness of the negative electrode active material layer of negative electrode 4-1 was 30 μm per one side.

<Preparation of Non-Aqueous Electrolytic Solution>

By using a mixed solvent of ethylene carbonate (EC), dimethyl carbonate (DMC), and methyl ethyl carbonate (EMC) at a ratio (volume ratio) of 34:44:22, electrolyte salts respectively consisting of $LiN(SO_2F)_2$ and $LiPF_6$ at a concentration ratio of 25:75 (molar ratio) and a total concentration of $LiN(SO_2F)_2$ and $LiPF_6$ of 1.2 mol/L, in an entire non-aqueous electrolytic solution, were dissolved into the mixed solvent to obtain the non-aqueous electrolytic solution.

The concentrations of $LiN(SO_2F)_2$ and $LiPF_6$ in the prepared nonaqueous electrolytic solution were 0.3 mol/L and 0.9 mol/L, respectively.

Examples 4-1 and 4-2

As the positive electrode precursor, positive electrode precursor 4-1 was used in Example 4-1, and positive electrode precursor 4-2 was used in Example 4-2.

[Secondary Drying of Electrodes]

The positive electrode precursor was dried by infrared heating at a temperature of 80° C. for 5 minutes, and wound up by roll-to-roll with a winding tension of 0.8 N/mm.

[Assembly Step]

The positive electrode precursor (double-sided) was cut into 20 sheets such that each positive electrode active material layer had a size of 10 cm×10 cm (100 cm$^2$). Subsequently, negative electrode 4-1 was cut into 21 sheets such that each negative electrode active material layer had a size of 10.1 cm×10.1 cm (102 cm$^2$), and 40 sheets of polyethylene separator (thickness 10 μm, manufactured by Asahi Kasei Kabushiki Kaisha) with a size of 10.3 cm×10.3 cm (106 cm$^2$) were prepared. The positive electrode precursors and the negative electrodes were laminated with the separators interposed therebetween in the order of the positive electrode precursor, the separator, and the negative electrode so that the outermost layer became the negative electrode 4-1 and the positive electrode active material layer and the negative electrode active material layer faced each other, to obtain an electrode laminate. The positive electrode terminal and the negative electrode terminal were ultrasonically welded to the obtained electrode laminate and placed in a container made of an aluminum laminate packaging material, and three sides including the electrode terminal portion were sealed by heat sealing.

[Pressurization Step]

Pressure was applied by sandwiching the aluminum laminate packaging material between a pair of metal plates (height 150 mm×width 150 mm×thickness 5 mm) from the outside thereof and screwing the four corners of the metal plates. The pressure measured by using the surface pressure distribution measurement system I-SCAN (manufactured by Nitta Corporation) and the I-SCAN100 sensor (measurement surface dimensions: 112 mm×112 mm) was 0.08 kgf/cm$^2$ as the restraining pressure.

[Solution Injection, Impregnation, Sealing Steps]

The electrode laminate housed in an aluminum laminate packaging material was placed in a decompression chamber in a dry air environment at a temperature of 25° C. and dew point of −40° C. or lower, the pressure was reduced from normal pressure to −100 kPa, and then approximately 80 g of the aforementioned non-aqueous electrolytic solution with a solution temperature of 25° C. was injected. Subsequently, the pressure was returned to atmospheric pressure, and the electrode laminate was allowed to stand undisturbed for 60 minutes. Subsequently, the non-aqueous lithium electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

[Repressurization Step]

The pressure of the non-aqueous lithium electricity storage element precursor after solution injection was increased to 1.2 kgf/cm$^2$ by further tightening the screws of the metal plates restraining the electricity storage element precursor.

[Lithium Doping Step]

The resulting non-aqueous lithium electricity storage element precursor was charged with a constant current at a current value of 6 Å until the voltage reached 4.5 V in an environment at 45° C. by using a charge and discharge apparatus (ACD-10APS(01))) manufactured by Asuka Denshi K.K., and initial charge was then carried out according to a procedure consisting of continuing constant voltage charge at 4.5 V for 1 hour to dope the negative electrode with lithium. The total time for lithium doping was 2 hours.

[Charge/Discharge Cycle Step]

The non-aqueous lithium electricity storage element precursor after the doping was placed in an environment of 50° C. while maintaining the pressurization force of 1.2 kgf/cm$^2$ (1) After carrying out constant current charge at 10.0 Å until the voltage reached 4.3 V, constant voltage charge at 4.3 V was carried out for 5 minutes.

(2) After carrying out constant current discharge at 10.0 Å until the voltage reached 2.0 V, constant voltage discharge at 2.0 V was carried out for 5 minutes.

Regarding (1) and (2) as one cycle, 5 cycles in total were carried out.

[Elevated Temperature Aging Step]

The following (1) and (2) were carried out.

(1) High Voltage Storage Step: The non-aqueous alkali metal electricity storage element precursor after the charge/discharge step was discharged with a constant current at 10.0 Å in an environment at 25° C. until the voltage reached 4.2 V, while maintaining the pressurization force of 1.2 kgf/cm$^2$, and the voltage was adjusted to 4.2 V by carrying out constant current charge at 4.2 V for 30 minutes. Continuing, the non-aqueous lithium electricity storage element precursor was stored for 10 hours in a thermostatic chamber at 60° C.

(2) Low Voltage Storage Step: The non-aqueous alkali metal electricity storage element precursor after the high voltage storage step was discharged with a constant current at 10.0 Å in an environment at 25° C. until the voltage reached 2.0 V, while maintaining the pressurization force of 1.2 kgf/cm², and the voltage was adjusted to 2.0 V by carrying out constant current charge at 2.0 V for 30 minutes. Continuing, the non-aqueous lithium electricity storage element precursor was stored for 10 hours in a thermostatic chamber at 60° C.

[Gas Venting and Sealing Steps]

A portion of the aluminum laminate packaging material of the non-aqueous lithium electricity storage element precursor after the aging, was opened in a dry air environment at a temperature of 25° C. and dew point of −40° C. Continuing, the aforementioned non-aqueous lithium electricity storage element precursor was placed in a decompression chamber, and after reducing pressure from atmospheric pressure to −80 kPa over the course of 3 minutes by using a diaphragm pump (N816.3KT.45.18) manufactured by KNF Japan Co., Ltd., pressure was returned to atmospheric pressure over the course of 3 minutes, and this step was repeated a total of three times. Subsequently, the non-aqueous lithium electricity storage element precursor was placed in a reduced-pressure sealing machine and pressure was reduced to −90 kPa followed by sealing for 10 seconds at 200° C. and pressure of 0.1 MPa to seal the aluminum laminate packaging material.

From the step described above, the non-aqueous lithium electricity storage element was completed.

[Evaluation of Electricity Storage Element]
[Measurement of Electrostatic Capacitance Constant current charge was carried out on the electricity storage element obtained until the voltage reached 4.0 V at a current value of 20 C by using a charge and discharge apparatus (5 V, 360 A) manufactured by Fujitsu Telecom Networks Ltd. in a thermostatic chamber set to a temperature of 25° C., followed by carrying out constant voltage charge for 30 minutes in total by applying a constant voltage of 4.0 V. With the capacitance during constant current discharge down to 2.0 V at a current value of 2 C, as Q, electrostatic capacitance F was calculated according to F=Q/(4.0-2.0).

[Determination of Ra·F]

The electricity storage element obtained was charged up to 4.0 V with a constant current at a current value of 20 C by using a charge and discharge apparatus (5 V, 360 A) manufactured by Fujitsu Telecom Networks Ltd. in a thermostatic chamber at 25° C., followed by carrying out constant voltage charge for 30 minutes in total by applying a constant voltage of 4.0 V and carrying out constant current discharge down to 2.0 V at a current value of 20 C to obtain a discharging curve (time vs. voltage). Room temperature discharge internal resistance Ra was determined according to voltage drop ΔE=4.0−Eo, and Ra=ΔE/(20 C (current value A)) when the voltage at a discharge time of 0 seconds, obtained by extrapolating by linear approximation from the voltage values at discharge times of 2 seconds and 4 seconds in the discharging curve, was defined as Eo.

The product Ra·F of electrostatic capacitance F and room temperature discharge internal resistance Ra of Example 4-1 was 1.83 ΩF.

[Ratio of Increase in Resistance after Elevated Temperature and High Load Charge/Discharge Cycle Test]

In a thermostatic bath set to 60° C., the electricity storage element obtained was charged with a constant current at the 300 C current value until 4.1 V was reached, and then discharged with a constant current at the 300 C current value until 1.9 V was reached. The charge/discharge step was repeated 60,000 times. After the high load charge/discharge cycle test, the resistance after the high load charge/discharge cycle test Re was determined in the same manner as in the aforementioned [Determination of Ra·F]. The ratio Re/Ra calculated by dividing this Re (Ω) by internal resistance before the high load charge/discharge cycle test Ra (Ω) obtained in the aforementioned [Determination of Ra·F] for Example 4-1 was 1.18.

[Capacitance Retention Ratio after High Load Charge/Discharge Cycle Test]

In a thermostatic bath set to 60° C., the electricity storage element obtained was charged with a constant current at the 300 C current value until 4.1 V was reached, and then discharged with a constant current at the 300 C current value until 1.9 V was reached. The charge/discharge step was repeated 60,000 times. Capacitance Fe after the high load charge/discharge cycle test was calculated. The ratio Fe/F calculated by dividing this Fe by the electrostatic capacitance before the high load charge/discharge cycle test F obtained in the aforementioned determination of electrostatic capacitance was 0.98 for Example 4-1.

[Micro Short Circuit Inspection Step]

When 100 non-aqueous lithium electricity storage elements were fabricated and the aforementioned micro short circuit inspection test was carried out, the number of micro short-circuits was 1% in Example 4-1.

[Gas Volume After Elevated Temperature and High Voltage Float Test]

In a thermostatic bath set to 85° C., the electricity storage element obtained was charged with a constant current at the 20 C current value until 4.2 V was reached by using a charge and discharge apparatus (5 V, 360 A) manufactured by Fujitsu Telecom Networks Ltd., and subsequently a constant voltage charge applying the constant voltage of 4.2 V was carried out for 300 hours in total. A cell volume prior to the start of the test Va and a cell volume after the start of the test Vb were measured according to the Archimedes method, and the gas generation volume of Example 4-1 obtained by Vb-Va was $7.1 \times 10^{-3}$ cm³/F.

Moreover, the results of Example 4-2 in the aforementioned evaluation are shown in Table 4-1.

Examples 4-3 to 4-92 and 4-95 to 4-106

Non-aqueous alkali metal electricity storage elements each was produced and subsequent evaluation was carried out, in the same manner as in Example 4-1 except that the positive electrode precursor and the conditions of the elevated temperature aging step were changed as shown in Table 4-1 to Table 4-7. The results are shown in Table 4-1 to Table 4-7. The pressurization force in the elevated temperature aging step was set by appropriately adjusting the pressurization force after the charge/discharge cycle step.

Examples 4-93 and 4-94

The type of the positive electrode precursors each was selected as shown in Table 4-7.

Non-aqueous lithium electricity storage elements each was produced in the same manner as in Example 4-1 and subsequent evaluation was carried out in the same manner as in Example 4-1 except that the elevated temperature aging step was changed as follows. The results are shown in Table 4-7.

[Elevated Temperature Aging Step]

(1) High Voltage Storage Step: The non-aqueous alkali metal electricity storage element precursor after the charge/discharge cycle step was charged with a constant current at 10.0 Å in a thermostatic chamber at 60° C. until the voltage reached 4.0 V, while maintaining the pressurization force of 1.2 kgf/cm², and then the constant current charge was carried out at 4.0 V for 10 hours.

(2) Low Voltage Storage Step: It was not carried out.

Comparative Examples 4-1 and 4-2

The type of positive electrode precursors each was changed as shown in Table 4-8, and the secondary drying of the electrode was not carried out.

Next, the assembly step was carried out in the same manner as in Example 4-1.

The pressurization step was carried out in the same manner as in Example 4-1.

Further, in the solution injection, impregnation, and sealing steps, the electrode laminate housed in an aluminum laminate packaging material was placed in a decompression chamber in a dry air environment at a temperature of 25° C. and dew point of −40° C. or lower, and approximately 80 g of the aforementioned non-aqueous electrolytic solution was injected at normal pressure. Subsequently, the electrode laminate was allowed to stand undisturbed for 60 minutes while maintaining normal pressure. Subsequently, the non-aqueous alkali metal electricity storage element precursor was placed in a reduced-pressure sealing machine and sealed for 10 seconds at 180° C. and pressure of 0.1 MPa while reducing the pressure in the machine to −95 kPa, to seal the aluminum laminate packaging material.

In the repressurization step, the metal plates restraining the non-aqueous lithium electricity storage element precursor after the solution injection were removed to adjust the pressure to 0 kgf/cm².

In the lithium doping step, the resulting non-aqueous lithium electricity storage element precursor was charged with a constant current at a current value of 0.1 Å until the voltage reached 4.1 V in an environment at 25° C. by using a charge and discharge apparatus (ACD-10APS(01)) manufactured by Asuka Denshi K.K., and initial charge was then carried out according to a procedure consisting of continuing constant voltage charge at 4.1 V for 1 hour to dope the negative electrode with lithium. The total time for lithium doping was 9 hours.

As the charge/discharge cycle step, the non-aqueous alkali metal electricity storage element precursor after doping was placed in an environment of 25° C.

(1) After carrying out constant current charge at 10.0 Å until the voltage reached 3.7 V, constant voltage charge at 3.7 V was carried out for 5 minutes.

(2) After carrying out constant current discharge at 10.0 Å until the voltage reached 1.4 V, constant voltage discharge at 1.4 V was carried out for 5 minutes.

Regarding (1) and (2) as one cycle, 5 cycles in total were carried out.

The elevated temperature aging step was carried out as following (1) and (2).

(1) High Voltage Step: The non-aqueous alkali metal electricity storage element precursor after the chare/discharge cycle step was discharged with a constant current at 10.0 Å in an environment at 25° C. until the voltage reached 4.0 V, while maintaining the pressurization force of 0 kgf/cm², and the voltage was adjusted to 4.0 V by carrying out constant current charge at 4.0 V for 30 minutes. Continuing, the non-aqueous lithium electricity storage element precursor was stored for 10 hours in a thermostatic chamber at 60° C.

(2) Low Voltage Step; It was not carried out.

The step following the gas venting●sealing steps were carried out in the same manner as in Example 4-1 to produce a non-aqueous alkali metal electricity storage element, and the subsequent evaluation was carried out in the same manner as in Example 4-1. The results are shown in Table 4-7

Comparative Examples 4-19 to 4-34

[Production of Non-Aqueous Alkali Metal Electricity Storage Element]

Non-aqueous alkali metal electricity storage elements each was produced in the same manner as in Example 4-1 and the subsequent evaluation was carried out in the same manner as in Example 4-1 except that the assembly step and lithium doping step were changed by the method described below, and the type of positive electrode precursor and the method of the elevated temperature aging step were changed as shown in Table 4-8. The results are shown in Table 4-8.

[Assembly Step]

The assembly step was carried out in the same manner as in Example 4-1 except that the positive electrode precursor and the negative electrode in which a metallic lithium foil corresponding to 350 mAh/g per unit weight of the negative electrode active material was adhered to the surface of the negative electrode active material layer of negative electrode 4-1, were used.

[Lithium Doping Step]

In the lithium doping step, the non-aqueous alkali metal electricity storage element precursor was stored in a thermostatic bath at an environmental temperature of 45° C. for 72 hours to ionize the metallic lithium and to dope negative electrode 4-1.

According to the examples describe above, it has been verified that the method of the present embodiment inhibits the micro short circuit that occurred in the non-aqueous alkali metal electricity storage element by using the alkali metal compound other than the positive electrode active material for the positive electrode precursor and can achieve the low resistance and satisfactory elevated temperature durability.

TABLE 4-1

| | | Elevated temperature aging step | | | | | | | |
|---|---|---|---|---|---|---|---|---|---|
| | | High voltage storage step | | | | Low voltage storage step | | | |
| Examples | Positive electrode precursor | Temperature (° C.) | Voltage (V) | Time (h) | Method | Temperature (° C.) | Voltage (V) | Time (h) | Pressurization (kgf/cm²) |
| 4-1 | 4-1 | 60 | 4.20 | 10 | Storage | 60 | 2.00 | 10 | 1.2 |
| 4-2 | 4-2 | 60 | 4.20 | 10 | Storage | 60 | 2.00 | 10 | 1.2 |
| 4-3 | 4-1 | 45 | 4.20 | 10 | Storage | The step was not carried out. | | | 1.2 |
| 4-4 | 4-1 | 50 | 4.20 | 10 | Storage | The step was not carried out. | | | 1.2 |
| 4-5 | 4-1 | 55 | 4.20 | 10 | Storage | The step was not carried out. | | | 1.2 |
| 4-6 | 4-1 | 65 | 4.20 | 10 | Storage | The step was not carried out. | | | 1.2 |

TABLE 4-1-continued

| | | | | | | | |
|---|---|---|---|---|---|---|---|
| 4-7 | 4-1 | 70 | 4.20 | 10 | Storage | The step was not carried out. | 1.2 |
| 4-8 | 4-1 | 75 | 4.20 | 10 | Storage | The step was not carried out. | 1.2 |
| 4-9 | 4-1 | 80 | 4.20 | 10 | Storage | The step was not carried out. | 1.2 |
| 4-10 | 4-1 | 85 | 4.20 | 10 | Storage | The step was not carried out. | 1.2 |
| 4-11 | 4-1 | 90 | 4.20 | 10 | Storage | The step was not carried out. | 1.2 |
| 4-12 | 4-1 | 100 | 4.20 | 10 | Storage | The step was not carried out. | 1.2 |
| 4-13 | 4-1 | 60 | 4.03 | 10 | Storage | The step was not carried out. | 1.2 |
| 4-14 | 4-1 | 60 | 4.05 | 10 | Storage | The step was not carried out. | 1.2 |
| 4-15 | 4-1 | 60 | 4.10 | 10 | Storage | The step was not carried out. | 1.2 |

| | | Evaluation results of non-aqueous alkali metal electricity storage element | | | |
|---|---|---|---|---|---|
| Examples | Rf·F ($\Omega$F) | Micro short circuit (%) | Elevated temperature and high load cycle Re/Ra (—) | Elevated temperature and high load cycle Fe/F (—) | Elevated temperature and high voltage float gas volume ($\times 10^{-3}$ cm$^3$/F) |
| 4-1 | 1.83 | 1 | 1.18 | 0.98 | 7.1 |
| 4-2 | 1.93 | 2 | 1.19 | 0.99 | 6.2 |
| 4-3 | 1.87 | 2 | 2.63 | 0.41 | 7.2 |
| 4-4 | 2.03 | 3 | 1.80 | 0.47 | 7.8 |
| 4-5 | 2.03 | 4 | 1.33 | 0.47 | 7.4 |
| 4-6 | 1.79 | 1 | 1.21 | 0.42 | 6.8 |
| 4-7 | 2.02 | 3 | 1.21 | 0.42 | 7.5 |
| 4-8 | 1.83 | 4 | 1.39 | 0.41 | 6.0 |
| 4-9 | 2.47 | 1 | 1.15 | 0.42 | 6.2 |
| 4-10 | 2.49 | 2 | 1.40 | 0.48 | 6.1 |
| 4-11 | 2.88 | 2 | 1.20 | 0.48 | 6.3 |
| 4-12 | 2.86 | 1 | 1.18 | 0.44 | 6.2 |
| 4-13 | 1.81 | 3 | 2.57 | 0.43 | 6.1 |
| 4-14 | 1.83 | 3 | 1.63 | 0.47 | 6.6 |
| 4-15 | 1.87 | 1 | 1.13 | 0.45 | 7.2 |

TABLE 4-2

| | | Elevated temperature aging step | | | | | | |
|---|---|---|---|---|---|---|---|---|
| | Positive | High voltage storage step | | | | Low voltage storage step | | |
| Examples | electrode precursor | Temperature (° C.) | Voltage (V) | Time (h) | Method | Temperature (° C.) | Voltage (V) | Time (h) | Pressurization (kgf/cm$^2$) |
| 4-16 | 4-1 | 60 | 4.15 | 10 | Storage | The step was not carried out. | | | 1.2 |
| 4-17 | 4-1 | 60 | 4.30 | 10 | Storage | The step was not carried out. | | | 1.2 |
| 4-18 | 4-1 | 60 | 4.40 | 10 | Storage | The step was not carried out. | | | 1.2 |
| 4-19 | 4-1 | 60 | 4.50 | 10 | Storage | The step was not carried out. | | | 1.2 |
| 4-20 | 4-1 | 60 | 4.65 | 10 | Storage | The step was not carried out. | | | 1.2 |
| 4-21 | 4-1 | 60 | 4.80 | 10 | Storage | The step was not carried out. | | | 1.2 |
| 4-22 | 4-1 | 60 | 4.90 | 10 | Storage | The step was not carried out. | | | 1.2 |
| 4-23 | 4-1 | 60 | 5.00 | 10 | Storage | The step was not carried out. | | | 1.2 |
| 4-24 | 4-1 | 60 | 4.20 | 0.17 | Storage | The step was not carried out. | | | 1.2 |
| 4-25 | 4-1 | 60 | 4.20 | 0.25 | Storage | The step was not carried out. | | | 1.2 |
| 4-26 | 4-1 | 60 | 4.20 | 0.35 | Storage | The step was not carried out. | | | 1.2 |
| 4-27 | 4-1 | 60 | 4.20 | 0.50 | Storage | The step was not carried out. | | | 1.2 |
| 4-28 | 4-1 | 60 | 4.20 | 0.75 | Storage | The step was not carried out. | | | 1.2 |
| 4-29 | 4-1 | 60 | 4.20 | 1 | Storage | The step was not carried out. | | | 1.2 |
| 4-30 | 4-1 | 60 | 4.20 | 5 | Storage | The step was not carried out. | | | 1.2 |

| | | Evaluation results of non-aqueous alkali metal electricity storage element | | | |
|---|---|---|---|---|---|
| Examples | Rf·F ($\Omega$F) | Micro short circuit (%) | Elevated temperature and high load cycle Re/Ra (—) | Elevated temperature and high load cycle Fe/F (—) | Elevated temperature and high voltage float gas volume ($\times 10^{-3}$ cm$^3$/F) |
| 4-16 | 1.76 | 2 | 1.31 | 0.42 | 7.2 |
| 4-17 | 1.73 | 3 | 1.17 | 0.47 | 6.3 |
| 4-18 | 1.90 | 1 | 1.39 | 0.44 | 7.9 |
| 4-19 | 2.03 | 4 | 1.33 | 0.40 | 6.8 |

TABLE 4-2-continued

| | | | | | |
|---|---|---|---|---|---|
| 4-20 | 2.52 | 3 | 1.11 | 0.41 | 7.6 |
| 4-21 | 2.45 | 2 | 1.25 | 0.49 | 7.8 |
| 4-22 | 2.86 | 3 | 1.27 | 0.49 | 6.3 |
| 4-23 | 2.71 | 2 | 1.33 | 0.48 | 7.7 |
| 4-24 | 1.78 | 1 | 3.11 | 0.40 | 7.6 |
| 4-25 | 1.82 | 2 | 2.48 | 0.46 | 7.9 |
| 4-26 | 1.76 | 4 | 2.69 | 0.50 | 7.1 |
| 4-27 | 2.09 | 3 | 1.62 | 0.44 | 6.5 |
| 4-28 | 1.93 | 1 | 1.59 | 0.44 | 7.7 |
| 4-29 | 2.05 | 2 | 1.18 | 0.45 | 7.2 |
| 4-30 | 1.96 | 3 | 1.37 | 0.49 | 6.3 |

TABLE 4-3

| | | Elevated temperature aging step | | | | | | |
|---|---|---|---|---|---|---|---|---|
| | | High voltage storage step | | | | Low voltage storage step | | |
| Examples | Positive electrode precursor | Temperature (° C.) | Voltage (V) | Time (h) | Method | Temperature (° C.) | Voltage (V) | Time (h) | Pressurization (kgf/cm$^2$) |
| 4-31 | 4-1 | 60 | 4.20 | 20 | Storage | The step was not carried out. | | | 1.2 |
| 4-32 | 4-1 | 60 | 4.20 | 50 | Storage | The step was not carried out. | | | 1.2 |
| 4-33 | 4-1 | 60 | 4.20 | 75 | Storage | The step was not carried out. | | | 1.2 |
| 4-34 | 4-1 | 60 | 4.20 | 100 | Storage | The step was not carried out. | | | 1.2 |
| 4-35 | 4-1 | 60 | 4.20 | 200 | Storage | The step was not carried out. | | | 1.2 |
| 4-36 | 4-1 | 60 | 4.20 | 340 | Storage | The step was not carried out. | | | 1.2 |
| 4-37 | 4-1 | 60 | 4.20 | 400 | Storage | The step was not carried out. | | | 1.2 |
| 4-38 | 4-2 | 60 | 4.20 | 10 | Storage | 40 | 2.00 | 10 | 1.2 |
| 4-39 | 4-2 | 60 | 4.20 | 10 | Storage | 45 | 2.00 | 10 | 1.2 |
| 4-40 | 4-2 | 60 | 4.20 | 10 | Storage | 50 | 2.00 | 10 | 1.2 |
| 4-41 | 4-2 | 60 | 4.20 | 10 | Storage | 55 | 2.00 | 10 | 1.2 |
| 4-42 | 4-2 | 60 | 4.20 | 10 | Storage | 65 | 2.00 | 10 | 1.2 |
| 4-43 | 4-2 | 60 | 4.20 | 10 | Storage | 75 | 2.00 | 10 | 1.2 |
| 4-44 | 4-2 | 60 | 4.20 | 10 | Storage | 80 | 2.00 | 10 | 1.2 |
| 4-45 | 4-2 | 60 | 4.20 | 10 | Storage | 85 | 2.00 | 10 | 1.2 |

| | Evaluation results of non-aqueous alkali metal electricity storage element | | | | |
|---|---|---|---|---|---|
| Examples | Rf · F (ΩF) | Micro short circuit (%) | Elevated temperature and high load cycle Re/Ra (—) | Elevated temperature and high load cycle Fe/F (—) | Elevated temperature and high voltage float gas volume (×10$^{-3}$ cm$^3$/F) |
| 4-31 | 1.71 | 1 | 1.17 | 0.41 | 7.4 |
| 4-32 | 1.99 | 1 | 1.26 | 0.44 | 7.1 |
| 4-33 | 2.58 | 3 | 1.11 | 0.50 | 7.4 |
| 4-34 | 2.53 | 1 | 1.10 | 0.48 | 6.1 |
| 4-35 | 2.70 | 2 | 1.36 | 0.41 | 6.5 |
| 4-36 | 2.89 | 3 | 1.36 | 0.45 | 6.6 |
| 4-37 | 3.11 | 2 | 1.23 | 0.43 | 7.5 |
| 4-38 | 1.76 | 4 | 1.36 | 0.43 | 6.8 |
| 4-39 | 2.03 | 3 | 1.33 | 0.73 | 7.0 |
| 4-40 | 2.00 | 1 | 1.12 | 0.85 | 7.2 |
| 4-41 | 1.90 | 4 | 1.34 | 0.99 | 7.9 |
| 4-42 | 1.73 | 1 | 1.26 | 0.98 | 6.8 |
| 4-43 | 1.95 | 4 | 1.32 | 0.99 | 6.8 |
| 4-44 | 2.45 | 1 | 1.10 | 0.98 | 6.6 |
| 4-45 | 2.53 | 3 | 1.26 | 0.98 | 6.2 |

TABLE 4-4

| Examples | Positive electrode precursor | Elevated temperature aging step ||||||| Pressurization (kgf/cm²) |
| | | High voltage storage step |||| Low voltage storage step ||| |
| | | Temperature (° C.) | Voltage (V) | Time (h) | Method | Temperature (° C.) | Voltage (V) | Time (h) | |
|---|---|---|---|---|---|---|---|---|---|
| 4-46 | 4-2 | 60 | 4.20 | 10 | Storage | 90 | 2.00 | 10 | 1.2 |
| 4-47 | 4-2 | 60 | 4.20 | 10 | Storage | 100 | 2.00 | 10 | 1.2 |
| 4-48 | 4-2 | 60 | 4.20 | 10 | Storage | 105 | 2.00 | 10 | 1.2 |
| 4-49 | 4-1 | 60 | 4.20 | 10 | Storage | 60 | 1.40 | 10 | 1.2 |
| 4-50 | 4-1 | 60 | 4.20 | 10 | Storage | 60 | 1.50 | 10 | 1.2 |
| 4-51 | 4-1 | 60 | 4.20 | 10 | Storage | 60 | 1.55 | 10 | 1.2 |
| 4-52 | 4-1 | 60 | 4.20 | 10 | Storage | 60 | 1.60 | 10 | 1.2 |
| 4-53 | 4-1 | 60 | 4.20 | 10 | Storage | 60 | 1.65 | 10 | 1.2 |
| 4-54 | 4-1 | 60 | 4.20 | 10 | Storage | 60 | 1.70 | 10 | 1.2 |
| 4-55 | 4-1 | 60 | 4.20 | 10 | Storage | 60 | 1.80 | 10 | 1.2 |
| 4-56 | 4-1 | 60 | 4.20 | 10 | Storage | 60 | 2.10 | 10 | 1.2 |
| 4-57 | 4-1 | 60 | 4.20 | 10 | Storage | 60 | 2.30 | 10 | 1.2 |
| 4-58 | 4-1 | 60 | 4.20 | 10 | Storage | 60 | 2.50 | 10 | 1.2 |
| 4-59 | 4-1 | 60 | 4.20 | 10 | Storage | 60 | 2.60 | 10 | 1.2 |
| 4-60 | 4-1 | 60 | 4.20 | 10 | Storage | 60 | 2.70 | 10 | 1.2 |

| Examples | Evaluation results of non-aqueous alkali metal electricity storage element |||||
| | Rf·F (ΩF) | Micro short circuit (%) | Elevated temperature and high load cycle Re/Ra (—) | Elevated temperature and high load cycle Fe/F (—) | Elevated temperature and high voltage float gas volume (×10⁻³ cm³/F) |
|---|---|---|---|---|---|
| 4-46 | 2.85 | 3 | 1.36 | 0.99 | 6.9 |
| 4-47 | 2.63 | 2 | 1.35 | 0.98 | 6.3 |
| 4-48 | 3.15 | 3 | 1.29 | 0.97 | 7.2 |
| 4-49 | 3.12 | 2 | 1.24 | 0.98 | 7.0 |
| 4-50 | 2.71 | 4 | 1.11 | 0.95 | 7.6 |
| 4-51 | 2.94 | 1 | 1.10 | 0.95 | 6.3 |
| 4-52 | 2.56 | 3 | 1.13 | 0.95 | 6.0 |
| 4-53 | 2.44 | 2 | 1.19 | 0.97 | 7.9 |
| 4-54 | 1.94 | 3 | 1.31 | 0.96 | 6.3 |
| 4-55 | 2.09 | 2 | 1.12 | 0.99 | 7.1 |
| 4-56 | 1.88 | 1 | 1.12 | 1.00 | 7.3 |
| 4-57 | 1.83 | 2 | 1.23 | 0.99 | 7.1 |
| 4-58 | 1.91 | 4 | 1.18 | 1.00 | 6.6 |
| 4-59 | 2.48 | 1 | 1.39 | 0.89 | 7.1 |
| 4-60 | 2.42 | 1 | 1.14 | 0.88 | 7.2 |

TABLE 4-5

| Examples | Positive electrode precursor | Elevated temperature aging step ||||||| Pressurization (kgf/cm²) |
| | | High voltage storage step |||| Low voltage storage step ||| |
| | | Temperature (° C.) | Voltage (V) | Time (h) | Method | Temperature (° C.) | Voltage (V) | Time (h) | |
|---|---|---|---|---|---|---|---|---|---|
| 4-61 | 4-1 | 60 | 4.20 | 10 | Storage | 60 | 2.75 | 10 | 1.2 |
| 4-62 | 4-1 | 60 | 4.20 | 10 | Storage | 60 | 2.80 | 10 | 1.2 |
| 4-63 | 4-1 | 60 | 4.20 | 10 | Storage | 60 | 3.00 | 10 | 1.2 |
| 4-64 | 4-2 | 60 | 4.20 | 10 | Storage | The step was not carried out. ||| 1.2 |
| 4-65 | 4-2 | 60 | 4.20 | 10 | Storage | 60 | 2.00 | 0.17 | 1.2 |
| 4-66 | 4-2 | 60 | 4.20 | 10 | Storage | 60 | 2.00 | 0.25 | 1.2 |
| 4-67 | 4-2 | 60 | 4.20 | 10 | Storage | 60 | 2.00 | 0.35 | 1.2 |
| 4-68 | 4-2 | 60 | 4.20 | 10 | Storage | 60 | 2.00 | 0.50 | 1.2 |
| 4-69 | 4-2 | 60 | 4.20 | 10 | Storage | 60 | 2.00 | 0.75 | 1.2 |
| 4-70 | 4-2 | 60 | 4.20 | 10 | Storage | 60 | 2.00 | 1 | 1.2 |
| 4-71 | 4-2 | 60 | 4.20 | 10 | Storage | 60 | 2.00 | 10 | 1.2 |
| 4-72 | 4-2 | 60 | 4.20 | 10 | Storage | 60 | 2.00 | 50 | 1.2 |
| 4-73 | 4-2 | 60 | 4.20 | 10 | Storage | 60 | 2.00 | 75 | 1.2 |
| 4-74 | 4-2 | 60 | 4.20 | 10 | Storage | 60 | 2.00 | 100 | 1.2 |
| 4-75 | 4-2 | 60 | 4.20 | 10 | Storage | 60 | 2.00 | 200 | 1.2 |

TABLE 4-5-continued

| | | | Evaluation results of non-aqueous alkali metal electricity storage element | | |
|---|---|---|---|---|---|
| Examples | Rf · F (ΩF) | Micro short circuit (%) | Elevated temperature and high load cycle Re/Ra (—) | Elevated temperature and high load cycle Fe/F (—) | Elevated temperature and high voltage float gas volume (×10$^{-3}$ cm$^3$/F) |
| 4-61 | 2.81 | 3 | 1.38 | 0.73 | 6.5 |
| 4-62 | 2.88 | 4 | 1.23 | 0.74 | 6.4 |
| 4-63 | 3.08 | 1 | 1.24 | 0.45 | 6.8 |
| 4-64 | 1.73 | 3 | 1.15 | 0.44 | 7.5 |
| 4-65 | 1.87 | 2 | 1.28 | 0.49 | 8.0 |
| 4-66 | 2.05 | 2 | 1.38 | 0.63 | 6.9 |
| 4-67 | 2.08 | 1 | 1.11 | 0.72 | 6.2 |
| 4-68 | 1.71 | 2 | 1.39 | 0.91 | 6.7 |
| 4-69 | 1.95 | 1 | 1.38 | 0.91 | 6.9 |
| 4-70 | 1.74 | 4 | 1.36 | 0.96 | 7.6 |
| 4-71 | 1.97 | 3 | 1.26 | 0.97 | 6.2 |
| 4-72 | 1.96 | 2 | 1.14 | 0.96 | 7.6 |
| 4-73 | 2.55 | 3 | 1.14 | 0.97 | 6.2 |
| 4-74 | 2.46 | 1 | 1.30 | 0.99 | 6.7 |
| 4-75 | 2.88 | 2 | 1.10 | 0.95 | 7.2 |

TABLE 4-6

| | | Elevated temperature aging step | | | | | | |
|---|---|---|---|---|---|---|---|---|
| | Positive | High voltage storage step | | | | Low voltage storage step | | |
| Examples | electrode precursor | Temperature (° C.) | Voltage (V) | Time (h) | Method | Temperature (° C.) | Voltage (V) | Time (h) | Pressurization (kgf/cm$^2$) |
| 4-76 | 4-2 | 60 | 4.20 | 10 | Storage | 60 | 2.00 | 340 | 1.2 |
| 4-77 | 4-2 | 60 | 4.20 | 10 | Storage | 60 | 2.00 | 400 | 1.2 |
| 4-78 | 4-1 | 60 | 4.20 | 10 | Storage | 60 | 2.00 | 10 | 0.05 |
| 4-79 | 4-1 | 60 | 4.20 | 10 | Storage | 60 | 2.00 | 10 | 0.1 |
| 4-80 | 4-1 | 60 | 4.20 | 10 | Storage | 60 | 2.00 | 10 | 0.25 |
| 4-81 | 4-1 | 60 | 4.20 | 10 | Storage | 60 | 2.00 | 10 | 0.5 |
| 4-82 | 4-1 | 60 | 4.20 | 10 | Storage | 60 | 2.00 | 10 | 0.75 |
| 4-83 | 4-1 | 60 | 4.20 | 10 | Storage | 60 | 2.00 | 10 | 1 |
| 4-84 | 4-1 | 60 | 4.20 | 10 | Storage | 60 | 2.00 | 10 | 5 |
| 4-85 | 4-1 | 60 | 4.20 | 10 | Storage | 60 | 2.00 | 10 | 10 |
| 4-86 | 4-1 | 60 | 4.20 | 10 | Storage | 60 | 2.00 | 10 | 50 |
| 4-87 | 4-1 | 60 | 4.20 | 10 | Storage | 60 | 2.00 | 10 | 100 |
| 4-88 | 4-1 | 60 | 4.20 | 10 | Storage | 60 | 2.00 | 10 | 500 |
| 4-89 | 4-1 | 60 | 4.20 | 10 | Storage | 60 | 2.00 | 10 | 1000 |
| 4-90 | 4-1 | 60 | 4.20 | 10 | Storage | 60 | 2.00 | 10 | 2000 |

| | | | Evaluation results of non-aqueous alkali metal electricity storage element | | |
|---|---|---|---|---|---|
| Examples | Rf · F (ΩF) | Micro short circuit (%) | Elevated temperature and high load cycle Re/Ra (—) | Elevated temperature and high load cycle Fe/F (—) | Elevated temperature and high voltage float gas volume (×10$^{-3}$ cm$^3$/F) |
| 4-76 | 3.00 | 4 | 1.19 | 0.97 | 7.5 |
| 4-77 | 5.09 | 3 | 1.29 | 1.00 | 6.7 |
| 4-78 | 1.91 | 1 | 3.09 | 0.43 | 7.5 |
| 4-79 | 2.09 | 2 | 2.65 | 0.68 | 6.9 |
| 4-80 | 2.05 | 3 | 2.46 | 0.66 | 6.0 |
| 4-81 | 1.82 | 4 | 1.61 | 0.87 | 6.2 |
| 4-82 | 1.87 | 2 | 1.68 | 0.88 | 7.3 |

TABLE 4-6-continued

| | | | | | |
|---|---|---|---|---|---|
| 4-83 | 2.07 | 1 | 1.32 | 1.00 | 6.8 |
| 4-84 | 1.81 | 2 | 1.39 | 0.97 | 6.7 |
| 4-85 | 1.97 | 4 | 1.25 | 1.00 | 7.7 |
| 4-86 | 1.84 | 1 | 1.73 | 0.99 | 7.2 |
| 4-87 | 2.08 | 3 | 1.55 | 0.84 | 7.1 |
| 4-88 | 1.70 | 2 | 2.74 | 0.67 | 6.3 |
| 4-89 | 2.06 | 4 | 2.67 | 0.62 | 6.9 |
| 4-90 | 2.00 | 1 | 3.13 | 0.46 | 7.5 |

TABLE 4-7

| | | Elevated temperature aging step | | | | | | |
|---|---|---|---|---|---|---|---|---|
| | Positive | High voltage storage step | | | | Low voltage storage step | | |
| Examples | electrode precursor | Temperature (° C.) | Voltage (V) | Time (h) | Method | Temperature (° C.) | Voltage (V) | Time (h) | Pressurization (kgf/cm$^2$) |
| 4-91 | 4-1 | | | | The steps were not carried out. | | | | |
| 4-92 | 4-2 | | | | The steps were not carried out. | | | | |
| 4-93 | 4-1 | 60 | 4.00 | 10 | Constant voltage charge | The step was not carried out. | | | 1.2 |
| 4-94 | 4-2 | 60 | 4.00 | 10 | Constant voltage charge | The step was not carried out. | | | 1.2 |
| 4-95 | 4-1 | 35 | 4.20 | 10 | Storage | The step was not carried out. | | | 1.2 |
| 4-96 | 4-1 | 105 | 4.20 | 10 | Storage | The step was not carried out. | | | 1.2 |
| 4-97 | 4-2 | 35 | 4.20 | 10 | Storage | The step was not carried out. | | | 1.2 |
| 4-98 | 4-2 | 105 | 4.20 | 10 | Storage | The step was not carried out. | | | 1.2 |
| 4-99 | 4-1 | 60 | 4.00 | 10 | Storage | The step was not carried out. | | | 1.2 |
| 4-100 | 4-1 | 60 | 5.20 | 10 | Storage | The step was not carried out. | | | 1.2 |
| 4-101 | 4-2 | 60 | 4.00 | 10 | Storage | The step was not carried out. | | | 1.2 |
| 4-102 | 4-2 | 60 | 5.20 | 10 | Storage | The step was not carried out. | | | 1.2 |
| 4-103 | 4-1 | 35 | 4.00 | 10 | Storage | The step was not carried out. | | | 1.2 |
| 4-104 | 4-1 | 105 | 4.00 | 10 | Storage | The step was not carried out. | | | 1.2 |
| 4-105 | 4-1 | 35 | 5.20 | 10 | Storage | The step was not carried out. | | | 1.2 |
| 4-106 | 4-1 | 105 | 5.20 | 10 | Storage | The step was not carried out. | | | 1.2 |

| | Evaluation results of non-aqueous alkali metal electricity storage element | | | | |
|---|---|---|---|---|---|
| Examples | Rf · F (ΩF) | Micro short circuit (%) | Elevated temperature and high load cycle Re/Ra (—) | Elevated temperature and high load cycle Fe/F (—) | Elevated temperature and high voltage float gas volume (×10$^{-3}$ cm$^3$/F) |
| 4-91 | 2.10 | 49 | 5.23 | 0.42 | 36.6 |
| 4-92 | 2.04 | 45 | 5.43 | 0.45 | 35.4 |
| 4-93 | 1.92 | 55 | 5.13 | 0.48 | 35.7 |
| 4-94 | 1.80 | 47 | 5.03 | 0.43 | 32.4 |
| 4-95 | 1.82 | 58 | 5.11 | 0.46 | 37.5 |
| 4-96 | 4.92 | 48 | 1.19 | 0.48 | 33.1 |
| 4-97 | 1.79 | 47 | 5.23 | 0.48 | 32.6 |
| 4-98 | 5.01 | 52 | 1.27 | 0.46 | 37.8 |
| 4-99 | 1.87 | 48 | 5.15 | 0.43 | 35.4 |
| 4-100 | 5.12 | 43 | 1.23 | 0.46 | 35.3 |
| 4-101 | 1.89 | 51 | 5.18 | 0.47 | 35.4 |
| 4-102 | 5.04 | 49 | 1.31 | 0.46 | 36.6 |
| 4-103 | 1.94 | 44 | 5.21 | 0.44 | 35.4 |
| 4-104 | 5.22 | 52 | 5.14 | 0.49 | 34.4 |
| 4-105 | 5.18 | 48 | 5.18 | 0.40 | 34.6 |
| 4-106 | 5.19 | 56 | 1.46 | 0.43 | 32.4 |

TABLE 4-8

| Comparative Examples | Positive electrode precursor | Elevated temperature aging step ||||||| Pressurization (kgf/cm²) |
| | | High voltage storage step |||| Low voltage storage step ||| |
| | | Temperature (° C.) | Voltage (V) | Time (h) | Method | Temperature (° C.) | Voltage (V) | Time (h) | |
|---|---|---|---|---|---|---|---|---|---|
| 4-1 | 4-1 | 60 | 4.00 | 10 | Storage | The step was not carried out. ||| 0 |
| 4-2 | 4-2 | 60 | 4.00 | 10 | Storage | The step was not carried out. ||| 0 |
| 4-19 | 4-3 | 60 | 4.20 | 10 | Storage | The step was not carried out. ||| 1.2 |
| 4-20 | 4-4 | 60 | 4.20 | 10 | Storage | The step was not carried out. ||| 1.2 |
| 4-21 | 4-3 | The steps were not carried out. |||||||| |
| 4-22 | 4-4 | The steps were not carried out. |||||||| |
| 4-23 | 4-3 | 35 | 4.20 | 10 | Storage | The step was not carried out. ||| 1.2 |
| 4-24 | 4-3 | 105 | 4.20 | 10 | Storage | The step was not carried out. ||| 1.2 |
| 4-25 | 4-4 | 35 | 4.20 | 10 | Storage | The step was not carried out. ||| 1.2 |
| 4-26 | 4-4 | 105 | 4.20 | 10 | Storage | The step was not carried out. ||| 1.2 |
| 4-27 | 4-3 | 60 | 4.00 | 10 | Storage | The step was not carried out. ||| 1.2 |
| 4-28 | 4-3 | 60 | 5.20 | 10 | Storage | The step was not carried out. ||| 1.2 |
| 4-29 | 4-4 | 60 | 4.00 | 10 | Storage | The step was not carried out. ||| 1.2 |
| 4-30 | 4-4 | 60 | 5.20 | 10 | Storage | The step was not carried out. ||| 1.2 |
| 4-31 | 4-5 | 60 | 4.20 | 10 | Storage | The step was not carried out. ||| 1.2 |
| 4-33 | 4-5 | The steps were not carried out. |||||||| |
| 4-34 | 4-6 | The steps were not carried out. |||||||| |

| Comparative Examples | Evaluation results of non-aqueous alkali metal electricity storage element |||||
| | Rf · F (ΩF) | Micro short circuit (%) | Elevated temperature and high load cycle Re/Ra (—) | Elevated temperature and high load cycle Fe/F (—) | Elevated temperature and high voltage float gas volume (×10⁻³ cm³/F) |
|---|---|---|---|---|---|
| 4-1 | 7.20 | 85 | 7.80 | 0.13 | 103.3 |
| 4-2 | 7.40 | 89 | 7.68 | 0.11 | 101.5 |
| 4-19 | 3.17 | 76 | 5.08 | 0.45 | 50.4 |
| 4-20 | 3.12 | 73 | 5.21 | 0.40 | 52.3 |
| 4-21 | 3.13 | 74 | 5.15 | 0.44 | 51.0 |
| 4-22 | 3.19 | 77 | 5.23 | 0.42 | 51.5 |
| 4-23 | 3.07 | 78 | 5.13 | 0.43 | 52.1 |
| 4-24 | 5.03 | 75 | 5.16 | 0.47 | 50.4 |
| 4-25 | 3.04 | 78 | 5.28 | 0.46 | 53.2 |
| 4-26 | 5.04 | 75 | 5.14 | 0.44 | 52.5 |
| 4-27 | 3.10 | 73 | 5.10 | 0.48 | 50.8 |
| 4-28 | 5.12 | 76 | 5.19 | 0.42 | 54.0 |
| 4-29 | 3.12 | 77 | 5.22 | 0.47 | 50.3 |
| 4-30 | 5.15 | 74 | 5.15 | 0.49 | 49.7 |
| 4-31 | 3.12 | 37 | 5.11 | 0.47 | 25.1 |
| 4-33 | 3.15 | 34 | 5.16 | 0.43 | 25.4 |
| 4-34 | 3.18 | 36 | 5.22 | 0.44 | 26.0 |

<<Production of Non-Aqueous Lithium Electricity Storage Element in Fifth Aspect>>
<<Production of Non-Aqueous Lithium Electricity Storage Element>>

Non-aqueous lithium electricity storage elements each that was one aspect of the non-aqueous lithium electricity storage element was fabricated below.
<Production of Positive Electrode Precursor>
[Preparation of Activated Carbon 5-1]

A carbide was obtained by subjecting pulverized coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/h while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., pulverization was carried out for 1 hour with a ball mill to obtain activated carbon 5-1.

Measurement of mean particle diameter of this activated carbon 5-1 by using a laser diffraction-type particle size distribution measurement apparatus (SALD-2000J) manufactured by Shimadzu Corp. yielded a value of 5.5 μm. Moreover, fine pore size distribution of activated carbon 5-1 was measured by using a fine pore size distribution measurement apparatus (AUTOSORB-1 AS-1-MP) manufactured by Yuasa Ionics Co., Ltd. As a result, BET specific surface area was 2,360 m²/g, mesopore volume ($V_1$) was 0.52 cm³/g, micropore volume ($V_2$) was 0.88 cm³/g, and $V_1/V_2$=0.59.

[Preparation of Activated Carbon 5-2]

A carbide having a mean particle diameter of 7 μm was obtained by carrying out carbonization treatment on a phenol resin for 2 hours at 600° C. in a calcination furnace in a nitrogen atmosphere followed by pulverizing with a ball mill and classification. KOH was mixed with this carbide at a weight ratio of 1:5 followed by activating by heating for 1 hour at 800° C. in the calcination furnace in a nitrogen atmosphere. The activated carbon was taken out, washed by stirring for 1 hour in dilute hydrochloric acid adjusted to 2 mol/L, and washed by boiling in distilled water until the pH stabilized between 5 and 6 and then dried to obtain activated carbon 5-2.

Measurement of mean particle diameter of this activated carbon 5-2 by using a laser diffraction-type particle size distribution measurement apparatus (SALD-2000J) manufactured by Shimadzu Corp. yielded a value of 7.0 μm. Moreover, fine pore size distribution of activated carbon 5-2 was measured by using a fine pore size distribution measurement apparatus (AUTOSORB-1 AS-1-MP) manufactured by Yuasa Ionics Co., Ltd. As a result, BET specific surface area was 3,627 m$^2$/g, mesopore volume ($V_1$) was 1.50 cm$^3$/g, micropore volume ($V_2$) was 2.28 cm$^3$/g, and $V_1/V_2$=0.66.

[Production of Positive Electrode Precursor 5-1]

A positive electrode precursor was produced by using activated carbon 5-1 as the positive electrode active material.

58.0 parts by weight of activated carbon 5-1, 32.0 parts by weight of lithium carbonate, 4.0 parts by weight of acetylene black, 3.5 parts by weight of acrylic latex, 1.5 parts by weight of CMC (carboxymethyl cellulose), and 1.0 part by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 5-1.

The viscosity (ηb) and TI value of the resulting positive electrode coating solution 5-1 were measured by using the TVE-35H E-type viscometer manufactured by Toki Sangyo Co., Ltd. As a result, viscosity (ηb) was 2,030 mPa·s and the TI value was 4.2. Moreover, dispersity of the resulting positive electrode coating solution 5-1 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 5-1 under conditions of a coating speed of 1 m/s by using a double-sided die coater manufactured by Toray Engineering Co., Ltd. and the coating film was dried to obtain a positive electrode precursor 5-1. The resulting positive electrode precursor 5-1 was pressed under conditions of a pressure of 6 kN/cm and pressed surface temperature of 25° C. by using a roll press. The total film thickness of the positive electrode precursor 5-1 was measured at ten arbitrary locations of the positive electrode precursor 5-1 by using the GS-551 Linear Gauge Sensor film thickness gauge manufactured by Ono Sokki Co., Ltd. The film thickness of the positive electrode active material layer of positive electrode precursor 5-1 was 61 μm per one side. Incidentally, the positive electrode precursor was produced and stored in a general environment where the dew point and illuminance were not controlled.

[Production of Positive Electrode Precursor 5-2]

A positive electrode precursor was produced by using activated carbon 5-1 as the positive electrode active material.

42.0 parts by weight of activated carbon 5-1, 14.0 parts by weight of LiFePO$_4$ having an average particle diameter of 3.5 μm as a lithium transition metal oxide, 32.0 parts by weight of lithium carbonate, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 43.0%, followed by dispersing under conditions of a peripheral velocity of 10 m/s for 2 minutes by using the FILMIX® thin film rotating-type high-speed mixer manufactured by Primix Corp. to obtain a positive electrode coating solution 5-2.

The viscosity (ηb) and TI value of the resulting positive electrode coating solution 5-2 were measured by using the TVE-35H E-type viscometer manufactured by Toki Sangyo Co., Ltd. As a result, viscosity (ηb) was 2,330 mPa·s and the TI value was 4.5. Moreover, dispersity of the resulting positive electrode coating solution 5-2 was measured by using a particle gauge manufactured by Yoshimitsu Seiki Co., Ltd. As a result, dispersity was 22 μm.

Both sides of an aluminum foil having a thickness of 15 μm was coated with the positive electrode coating solution 5-2 under conditions of a coating speed of 1 m/s by using a double-sided die coater manufactured by Toray Engineering Co., Ltd. and the coating film was dried to obtain a positive electrode precursor 5-2. The resulting positive electrode precursor 5-2 was pressed under conditions of a pressure of 6 kN/cm and pressed surface temperature of 25° C. by using a roll press. The total film thickness of the positive electrode precursor 5-2 was measured at ten arbitrary locations of the positive electrode precursor 5-2 by using the GS-551 Linear Gauge Sensor film thickness gauge manufactured by Ono Sokki Co., Ltd. The film thickness of the positive electrode active material layer of positive electrode precursor 5-2 was 48 μm per one side. Incidentally, the positive electrode precursor was produced and stored in a general environment where the dew point and illuminance were not controlled.

[Production of Positive Electrode Precursor 5-3]

A positive electrode precursor was produced by using activated carbon 5-1 as the positive electrode active material.

90.0 parts by weight of activated carbon 5-1, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 35.0%, followed by dispersing under conditions of a peripheral velocity of 10 m/s for 2 minutes by using the FILMIX® thin film rotating-type high-speed mixer manufactured by Primix Corp. to obtain a positive electrode coating solution 5-3.

The viscosity (ηb) and TI value of the resulting positive electrode coating solution 5-3 were measured by using the TVE-35H E-type viscometer manufactured by Toki Sangyo Co., Ltd. As a result, viscosity (ηb) was 2,150 mPa·s and the TI value was 5.2. Moreover, dispersity of the resulting positive electrode coating solution 5-3 was measured by using a particle gauge manufactured by Yoshimitsu Seiki Co., Ltd. As a result, dispersity was 25 μm.

Both sides of an aluminum foil having a thickness of 15 μm was coated with the positive electrode coating solution 5-3 under conditions of a coating speed of 1 m/s by using a double-sided die coater manufactured by Toray Engineering Co., Ltd. and the coating film was dried to obtain a positive electrode precursor 5-3. The resulting positive electrode precursor 5-3 was pressed under conditions of a pressure of 6 kN/cm and pressed surface temperature of 25° C. by using a roll press. The total film thickness of the positive electrode precursor 5-3 was measured at ten arbitrary locations of the positive electrode precursor 5-3 by using the GS-551 Linear Gauge Sensor film thickness gauge manufactured by Ono Sokki Co., Ltd. The film thickness of the positive electrode active material layer of positive electrode precursor 5-3 was 67 μm per one side. Incidentally, the positive electrode precursor was produced and stored in a general environment where the dew point and illuminance were not controlled.

[Production of Positive Electrode Precursor 5-4]

A positive electrode precursor was produced by using activated carbon 5-1 as the positive electrode active material.

60.0 parts by weight of activated carbon 5-1, 30.0 parts by weight of $LiFePO_4$ having an average particle diameter of 3.5 μm as a lithium transition metal oxide, 4.0 parts by weight of acetylene black, 3.5 parts by weight of acrylic latex, 1.5 parts by weight of CMC (carboxymethyl cellulose), and 1.0 parts by weight of PVP (polyvinylpyrrolidone) were mixed with distilled water so that the weight ratio of the solid content was 38.0%, followed by dispersing under conditions of a peripheral velocity of 10 m/s for 2 minutes by using the FILMIX® thin film rotating-type high-speed mixer manufactured by Primix Corp. to obtain a positive electrode coating solution 5-4.

The viscosity (ηb) and TI value of the resulting positive electrode coating solution 5-4 were measured by using the TVE-35H E-type viscometer manufactured by Toki Sangyo Co., Ltd. As a result, viscosity (ηb) was 2,020 mPa·s and the TI value was 5.6. Moreover, dispersity of the resulting positive electrode coating solution 5-4 was measured by using a particle gauge manufactured by Yoshimitsu Seiki Co., Ltd. As a result, dispersity was 23 μm.

Both sides of an aluminum foil having a thickness of 15 μm was coated with the positive electrode coating solution 5-4 under conditions of a coating speed of 1 m/s by using a double-sided die coater manufactured by Toray Engineering Co., Ltd. and the coating film was dried to obtain a positive electrode precursor 5-4. The resulting positive electrode precursor 5-4 was pressed under conditions of a pressure of 6 kN/cm and pressed surface temperature of 25° C. by using a roll press. The total film thickness of the positive electrode precursor 5-4 was measured at ten arbitrary locations of the positive electrode precursor 5-4 by using the GS-551 Linear Gauge Sensor film thickness gauge manufactured by Ono Sokki Co., Ltd. The film thickness of the positive electrode active material layer of positive electrode precursor 5-4 was 57 μm per one side. Incidentally, the positive electrode precursor was produced and stored in a general environment where the dew point and illuminance were not controlled.

<Production of Negative Electrode>

[Production of Negative Electrode 5-1]

83 parts by weight of artificial graphite having a mean particle size of 4.5 μm, 4 parts by weight of composite carbon material, and 9 parts by weight of acetylene black were dry-blended in a powder state with a planetary mixer, and then 2 parts by weight of styrene-butadiene copolymer and an aqueous solution of CMC (carboxymethyl cellulose) were added thereto to disperse the mixture while gradually lowering the solid content. Finally, CMC was added so as to be 2 parts by weight, and water was added to the mixed solution so that the weight ratio of the solid content was 39% to obtain a negative electrode coating solution.

The viscosity (ηb) and TI value of the resulting negative electrode coating solution were measured by using the TVE-35H E-type viscometer manufactured by Toki Sangyo Co., Ltd. As a result, viscosity (ηb) was 3,221 mPa·s and the TI value was 2.1.

Both sides of an electrolytic copper foil having a thickness of 10 μm was coated with the negative electrode coating solution under conditions of a coating speed of 1 m/s by using a die coater manufactured by Toray Engineering Co., Ltd., and the coating film was dried at a drying temperature of 60° C. to obtain negative electrode 5-1. The resulting negative electrode 5-1 was pressed under conditions of a pressure of 5 kN/cm and pressed surface temperature of 25° C. using a roll press. The total film thickness of the negative electrode 5-1 was measured at ten arbitrary locations of the negative electrode 5-1 by using the GS-551 Linear Gauge Sensor film thickness gauge manufactured by Ono Sokki Co., Ltd. The film thickness of the negative electrode active material layer of negative electrode 5-1 was 30 μm per one side.

<Preparation of Non-Aqueous Electrolytic Solution>

By using a mixed solvent of ethylene carbonate (EC), dimethyl carbonate (DMC), and methyl ethyl carbonate (EMC) at a ratio (volume ratio) of 34:44:22, electrolyte salts respectively consisting of $LiN(SO_2F)_2$ and $LiPF_6$ at a concentration ratio of 25:75 (molar ratio) and a total concentration of $LiN(SO_2F)_2$ and $LiPF_6$ of 1.2 mol/L, in an entire non-aqueous electrolytic solution, were dissolved into the mixed solvent to obtain the non-aqueous electrolytic solution.

The concentrations of $LiN(SO_2F)_2$ and $LiPF_6$ in the prepared nonaqueous electrolytic solution were 0.3 mol/L and 0.9 mol/L, respectively.

Examples 5-1 and 5-2

[Production of Non-Aqueous Lithium Electricity Storage Element]

As the positive electrode precursor, positive electrode precursor 5-1 was used in Example 5-1, and positive electrode precursor 5-2 was used in Example 5-2.

[Secondary Drying of Electrodes]

For both Example 5-1 and Example 5-2 each, the positive electrode precursor was dried by infrared heating at a temperature of 80° C. for 5 minutes, and wound up by roll-to-roll with a winding tension of 0.8 N/mm.

[Amount of Residual Solvent]

The amounts of residual solvents of the positive electrode precursors in both Example 5-1 and Example 5-2 were 0.2% by weight.

[Assembly Step]

The resulting positive electrode precursor (double-sided) was cut into 20 sheets such that the positive electrode active material layers had a size of 10 cm×10 cm (100 cm²). Subsequently, negative electrode 5-1 was cut into 21 sheets such that a size of the negative electrode active material layer was 10.1 cm×10.1 cm (102 cm²), and 40 sheets of polyethylene separator (thickness 10 μm, manufactured by Asahi Kasei Kabushiki Kaisha) with a size of 10.3 cm×10.3 cm (106 cm²) were prepared. The positive electrode precursors and the negative electrodes were laminated with the separators interposed therebetween in the order of the positive electrode precursor, the separator, and the negative electrode so that the outermost layer became the negative electrode 5-1 and the positive electrode active material layer and the negative electrode active material layer faced each other, to obtain an electrode laminate. The positive electrode terminal and the negative electrode terminal were ultrasonically welded to the obtained electrode laminate and placed in a container made of an aluminum laminate packaging material, and three sides including the electrode terminal portion were sealed by heat sealing.

[Pressurization Step]

Pressure was applied by sandwiching the aluminum laminate packaging material between a pair of metal plates (height 150 mm×width 150 mm×thickness 5 mm) from the outside thereof and screwing the four corners of the metal plates. The pressure measured by using the surface pressure distribution measurement system I-SCAN (manufactured by Nitta Corporation) and the I-SCAN100 sensor (measurement surface dimensions: 112 mm×112 mm) was 0.08 kgf/cm$^2$ as the restraining pressure.

[Solution Injection●Impregnation●Sealing Steps]

The electrode laminate housed in an aluminum laminate packaging material was placed in a decompression chamber in a dry air environment at a temperature of 25° C. and dew point of −40° C. or lower, the pressure was reduced from normal pressure to −100 kPa, and then approximately 80 g of the aforementioned non-aqueous electrolytic solution with a solution temperature of 25° C. was injected. Subsequently, the pressure was returned to atmospheric pressure, and the electrode laminate was allowed to stand undisturbed for 60 minutes. Subsequently, the non-aqueous lithium electricity storage element was placed in a reduced-pressure sealing machine and sealed for 10 seconds at 180° C. and pressure of 0.1 MPa while reducing the pressure in the machine to −95 kPa, to seal the aluminum laminate packaging material.

[Repressurization Step]

The pressure of the non-aqueous lithium electricity storage element after solution injection was increased to 1.2 kgf/cm$^2$ by further tightening the screws of the metal plates restraining the electricity storage element.

[Lithium Doping Step]

The resulting non-aqueous lithium electricity storage element was charged with a constant current at a current value of 6 Å until the voltage reached 4.5 V in an environment at 45° C. by using a charge and discharge apparatus (ACD-10APS(01))) manufactured by Asuka Denshi K.K., and initial charge was then carried out according to a procedure consisting of continuing constant voltage charge at 4.5 V for 1 hour to dope the negative electrode with lithium. The total time for lithium doping was 2 hours.

[Charge/Discharge Cycle Step]

The non-aqueous lithium electricity storage element after the doping was placed in an environment of 50° C. while maintaining the pressurization force of 1.2 kgf/cm$^2$.

(1) After carrying out constant current charge at 10.0 Å until the voltage reached 4.3 V, constant voltage charge at 4.3 V was carried out for 5 minutes.

(2) After carrying out constant current discharge at 10.0 Å until the voltage reached 2.0 V, constant voltage discharge at 2.0 V was carried out for 5 minutes.

Regarding (1) and (2) as one cycle, 5 cycles in total were carried out.

[Elevated Temperature Aging Step]

(1) High Voltage Storage Step: The non-aqueous lithium electricity storage element after the charge/discharge cycle step was discharged with a constant current at 10.0 Å in an environment at 25° C. until the voltage reached 4.2 V, while maintaining the pressurization force of 1.2 kgf/cm$^2$, and then the voltage was adjusted to 4.2 V by carrying out constant current charge at 4.2 V for 30 minutes. Continuing, the non-aqueous lithium electricity storage element was stored for 10 hours in a thermostatic chamber at 60° C.

(2) Low Voltage Storage Step: The non-aqueous lithium electricity storage element after the high voltage storage step was discharged with a constant current at 10.0 Å in an environment at 25° C. until the voltage reached 2.0 V, while maintaining the pressurization force of 1.2 kgf/cm$^2$, the voltage was adjusted to 2.0 V by carrying out constant current charge at 2.0 V for 30 minutes. Continuing, the non-aqueous lithium electricity storage element was stored for 10 hours in a thermostatic chamber at 60° C.

[Gas Venting●Sealing Steps]

A portion of the aluminum laminate packaging material of the non-aqueous lithium electricity storage element after the aging, was opened in a dry air environment at a temperature of 25° C. and dew point of −40° C. Continuing, the aforementioned non-aqueous lithium electricity storage element was placed in a decompression chamber, and after reducing pressure from atmospheric pressure to −80 kPa over the course of 3 minutes by using a diaphragm pump (N816.3KT.45.18) manufactured by KNF Japan Co., Ltd., pressure was returned to atmospheric pressure over the course of 3 minutes, and this step was repeated a total of three times. Subsequently, the non-aqueous lithium electricity storage element was placed in a pressure-pressure sealing machine and pressure was reduced to −90 kPa followed by sealing for 10 seconds at 200° C. and pressure of 0.1 MPa to seal the aluminum laminate packaging material.

From the step described above, the non-aqueous lithium electricity storage element was completed.

[Evaluation of Electricity Storage Element]

[Measurement of Electrostatic Capacitance]

Constant current charge was carried out on the electricity storage element obtained until the voltage reached 4.0 V at a current value of 20 C by using a charge and discharge apparatus (5 V, 360 A) manufactured by Fujitsu Telecom Networks Ltd. in a thermostatic chamber set to a temperature of 25° C., followed by carrying out constant voltage charge for 30 minutes in total by applying a constant voltage of 4.0 V. With the capacitance during constant current discharge down to 2.0 V at a current value of 2 C, as Q, electrostatic capacitance F was determined according to F=Q/(4.0−2.0).

[Determination of Ra·F]

The electricity storage element obtained was charged up to 4.0 V with a constant current at a current value of 20 C by using a charge and discharge apparatus (5 V, 360 A) manufactured by Fujitsu Telecom Networks Ltd. in a thermostatic chamber at 25° C., followed by carrying out constant voltage charge for 30 minutes in total by applying a constant voltage of 4.0 V and carrying out constant current discharge down to 2.0 V at a current value of 20 C to obtain a discharging curve (time vs. voltage). Room-temperature discharge internal resistance Ra was determined according to voltage drop $\Delta E = 4.0 - Eo$, and $Ra = \Delta E/(20\ C\ (\text{current value A}))$ when the voltage at a discharge time of 0 seconds, obtained by extrapolating by linear approximation from the voltage values at discharge times of 2 seconds and 4 seconds in the discharging curve, was defined as Eo.

[Ratio of Increase in Resistance after Elevated Temperature and High Load Charge/Discharge Cycle Test]

In a thermostatic bath set to 60° C., the electricity storage element obtained was charged with a constant current at the 300 C current value until 4.1 V was reached by using a charge and discharge apparatus (5 V, 360 A) manufactured by Fujitsu Telecom Networks Ltd., and then discharged with a constant current at the 300 C current value until 1.9 V was reached. The charge/discharge step was repeated 60,000 times. After the high-load charge/discharge cycle test, the resistance after the high-load charge/discharge cycle test Re was determined in the same manner as in the aforementioned [Determination of Ra·F]. The ratio Re/Ra was calculated by dividing this Re (Ω) by internal resistance before the high-load charge/discharge cycle test Ra (Ω) obtained in the aforementioned [Determination of Ra·F]. Re/Ra was 1.18 for Example 5-1, and Re/Ra was 1.19 for Example 5-2.

[Micro Short Circuit Inspection Step]

When 100 non-aqueous lithium electricity storage elements were fabricated and the aforementioned micro short-circuit inspection test was carried out, the number of micro short-circuits was 1 in Example 5-1. Therefore, the micro short-circuit ratio of Example 5-1 was 1%. The micro short-circuit ratio of Example 5-2 was 2%.

Examples 5-3 to 5-62

Non-aqueous lithium electricity storage elements each was produced and subsequently evaluated in the same manner as in Example 5-1 except that the positive electrode precursor and the method of the secondary drying were changed as shown in Tables 5-1 or 5-2. The results are shown in Tables 5-1 or 5-2.

Comparative Examples 5-1 and 5-2

The type of positive electrode precursors each was changed as shown in Table 5-2, and the secondary drying of the electrode was not carried out.

Next, the assembly step was carried out in the same manner as in Example 5-1.

The pressurization step was carried out in the same manner as in Example 5-1.

In the solution injection, impregnation, and sealing steps, the electrode laminate housed in an aluminum laminate packaging material was placed in a decompression chamber in a dry air environment at a temperature of 25° C. and dew point of −40° C. or lower, and approximately 80 g of the aforementioned non-aqueous electrolytic solution was injected at normal pressure. Subsequently, the electrode laminate was allowed to stand undisturbed for 60 minutes while maintaining normal pressure. Subsequently, the non-aqueous lithium electricity storage element was placed in a reduced-pressure sealing machine and sealed for 10 seconds at 180° C. and pressure of 0.1 MPa while reducing the pressure in the machine to −95 kPa, to seal the aluminum laminate packaging material.

In the repressurization step, the metal plates restraining the non-aqueous lithium electricity storage element after the solution injection were removed to adjust the pressure to 0 kgf/cm².

In the lithium doping step, the resulting non-aqueous lithium electricity storage element was charged with a constant current at a current value of 0.1 Å until the voltage reached 4.1 V in an environment at 25° C. by using a charge and discharge apparatus (ACD-10APS(01)) manufactured by Asuka Denshi K.K., and initial charge was then carried out according to a procedure consisting of continuing constant voltage charge at 4.1 V for 1 hour to dope the negative electrode with lithium. The total time for lithium doping was 9 hours.

The charge/discharge cycle step was not carried out.

The non-aqueous lithium electricity storage element after doping was placed in an environment of 25° C.

(1) After carrying out constant current charge at 10.0 Å until the voltage reached 3.7 V, constant voltage charge at 3.7 V was carried out for 5 minutes.

(2) After carrying out constant current discharge at 10.0 Å until the voltage reached 1.4 V, constant voltage discharge at 1.4 V was carried out for 5 minutes.

Regarding (1) and (2) as one cycle, 5 cycles in total were carried out.

The elevated temperature aging step was carried out under the following conditions, as the high voltage storage step.

High Voltage Storage Step: The non-aqueous alkali metal electricity storage element was discharged with a constant current at 10.0 Å in an environment at 25° C. until the voltage reached 4.0 V, while maintaining the pressurization force of 0 kgf/cm², the voltage was adjusted to 4.0 V by carrying out constant voltage charge at 4.0 V for 30 minutes. Continuing, the non-aqueous lithium electricity storage element was stored for 10 hours in a thermostatic chamber at 60° C.

Low Voltage Storage Step; It was not carried out.

The steps following the gas venting●sealing steps were carried out in the same manner as in Example 5-1 to produce a non-aqueous lithium electricity storage element, and the subsequent evaluation was carried out in the same manner as in Example 5-1. The results are shown in Table 5-2.

Comparative Examples 5-3 to 5-6

[Production of Non-Aqueous Lithium Electricity Storage Element]

Non-aqueous lithium electricity storage elements each was produced in the same manner as in Example 5-1 and the subsequent evaluation was carried out in the same manner as in Example 5-1 except that the type of the positive electrode precursor, the assembly step and lithium doping step were changed as described below. The results are shown in Table 5-2.

[Assembly Step]

The assembly step was carried out in the same manner as in Example 5-1 except that the positive electrode precursor and the negative electrode in which a metallic lithium foil corresponding to 350 mAh/g per unit weight of the negative electrode active material was adhered to the surface of the negative electrode active material layer of negative electrode 5-1, were used.

[Lithium Doping Step]

In the lithium doping step, the non-aqueous lithium electricity storage element precursor was stored in a thermostatic bath at an environmental temperature of 45° C. for 72 hours to ionize the metallic lithium and to dope negative electrode 5-1.

TABLE 5-1-1

| No. | Positive electrode precursor | Current collector (aluminum foil form) | Vacuum heating Temperature (° C.) | Time (hr) | Degree of depressurization (Pa) | Infrared heating Temperature (° C.) |
|---|---|---|---|---|---|---|
| Example 5-1 | 5-1 | Nonporous | — | — | — | 80 |
| Example 5-2 | 5-2 | Nonporous | — | — | — | 80 |

TABLE 5-1-1-continued

| No. | Positive electrode precursor | Current collector (aluminum foil form) | Vacuum heating Temperature (° C.) | Time (hr) | Degree of depressurization (Pa) | Infrared heating Temperature (° C.) |
|---|---|---|---|---|---|---|
| Example 5-3 | 5-1 | Nonporous | 150 | 5 | 50 | — |
| Example 5-4 | 5-1 | Nonporous | — | — | — | 150 |
| Example 5-5 | 5-2 | Nonporous | 150 | 5 | 50 | — |
| Example 5-6 | 5-2 | Nonporous | — | — | — | 150 |
| Example 5-7 | 5-1 | Nonporous | 50 | 24 | 50 | — |
| Example 5-8 | 5-1 | Nonporous | 80 | 14 | 50 | — |
| Example 5-9 | 5-1 | Nonporous | 120 | 8 | 50 | — |
| Example 5-10 | 5-1 | Nonporous | 200 | 1 | 50 | — |
| Example 5-11 | 5-1 | Nonporous | — | — | — | 50 |
| Example 5-12 | 5-1 | Nonporous | — | — | — | 80 |
| Example 5-13 | 5-1 | Nonporous | — | — | — | 120 |
| Example 5-14 | 5-1 | Nonporous | — | — | — | 200 |
| Example 5-15 | 5-1 | Nonporous | 45 | 5 | 50 | — |
| Example 5-16 | 5-1 | Nonporous | 210 | 5 | 50 | — |
| Example 5-17 | 5-1 | Nonporous | 150 | 0.8 | 50 | — |
| Example 5-18 | 5-1 | Nonporous | 150 | 26 | 50 | — |
| Example 5-19 | 5-1 | Nonporous | — | — | — | 45 |

| No. | Infrared heating Time (min) | Winding tension (N/mm) | Amount of residual solvent (%) | Micro short circuit ratio (%) | Elevated temperature and high load charge/discharge cycle Re/Ra |
|---|---|---|---|---|---|
| Example 5-1 | 5 | 0.8 | 0.2 | 1 | 1.18 |
| Example 5-2 | 5 | 0.8 | 0.2 | 2 | 1.19 |
| Example 5-3 | — | — | 0.2 | 2 | 1.21 |
| Example 5-4 | 2.5 | 0.8 | 0.2 | 3 | 1.20 |
| Example 5-5 | — | — | 0.2 | 3 | 1.21 |
| Example 5-6 | 2.5 | 0.8 | 0.2 | 2 | 1.19 |
| Example 5-7 | — | — | 1.0 | 4 | 1.27 |
| Example 5-8 | — | — | 0.6 | 3 | 1.26 |
| Example 5-9 | — | — | 0.3 | 3 | 1.24 |
| Example 5-10 | — | — | 0.1 | 3 | 1.22 |
| Example 5-11 | 5 | 0.8 | 1.2 | 5 | 1.27 |
| Example 5-12 | 3.5 | 0.8 | 0.9 | 3 | 1.26 |
| Example 5-13 | 2 | 0.8 | 0.5 | 4 | 1.22 |
| Example 5-14 | 1 | 0.8 | 0.2 | 3 | 1.25 |
| Example 5-15 | — | — | 8.1 | 38 | 3.27 |
| Example 5-16 | — | — | 0.2 | 32 | 3.19 |
| Example 5-17 | — | — | 0.1 | 31 | 3.25 |
| Example 5-18 | — | — | 0.1 | 35 | 3.24 |
| Example 5-19 | 2.5 | 0.8 | 7.2 | 37 | 3.18 |

TABLE 5-1-2

| No. | Positive electrode precursor | Current collector (aluminum foil form) | Vacuum heating Temperature (° C.) | Time (hr) | Degree of depressurization (Pa) | Infrared heating Temperature (° C.) |
|---|---|---|---|---|---|---|
| Example 5-20 | 5-1 | Nonporous | | | | 210 |
| Example 5-21 | 5-1 | Nonporous | | | | 150 |
| Example 5-22 | 5-1 | Nonporous | | | | 150 |
| Example 5-23 | 5-2 | Nonporous | 50 | 24 | 50 | — |
| Example 5-24 | 5-2 | Nonporous | 80 | 14 | 50 | — |
| Example 5-25 | 5-2 | Nonporous | 120 | 8 | 50 | — |
| Example 5-26 | 5-2 | Nonporous | 200 | 1 | 50 | — |
| Example 5-27 | 5-2 | Nonporous | — | — | — | 50 |
| Example 5-28 | 5-2 | Nonporous | — | — | — | 80 |
| Example 5-29 | 5-2 | Nonporous | — | — | — | 120 |
| Example 5-30 | 5-2 | Nonporous | — | — | — | 200 |
| Example 5-31 | 5-2 | Nonporous | 45 | 5 | 50 | — |
| Example 5-32 | 5-2 | Nonporous | 210 | 5 | 50 | — |
| Example 5-33 | 5-2 | Nonporous | 150 | 26 | 50 | — |

TABLE 5-1-2-continued

| | | | | | | |
|---|---|---|---|---|---|---|
| Example 5-34 | 5-2 | Nonporous | 150 | 26 | 50 | — |
| Example 5-35 | 5-2 | Nonporous | | | | 45 |
| Example 5-36 | 5-2 | Nonporous | | | | 210 |
| Example 5-37 | 5-2 | Nonporous | | | | 150 |
| Example 5-38 | 5-2 | Nonporous | | | | 150 |

| | Infrared heating | | Amount of | Evaluation results of non-aqueous alkali metal electricity storage element | |
|---|---|---|---|---|---|
| No. | Time (min) | Winding tension (N/mm) | residual solvent (%) | Micro short circuit ratio (%) | Elevated temperature high load charge/discharge cycle Re/Ra |
| Example 5-20 | 2.5 | 0.8 | 0.2 | 31 | 3.16 |
| Example 5-21 | 0.8 | 0.8 | 2.4 | 34 | 3.24 |
| Example 5-22 | 6 | 0.8 | 0.2 | 32 | 3.37 |
| Example 5-23 | — | — | 0.9 | 4 | 1.30 |
| Example 5-24 | — | — | 0.4 | 3 | 1.29 |
| Example 5-25 | — | — | 0.2 | 3 | 1.25 |
| Example 5-26 | — | — | 0.1 | 3 | 1.26 |
| Example 5-27 | 5 | 0.8 | 1.0 | 5 | 1.29 |
| Example 5-28 | 3.5 | 0.8 | 0.8 | 3 | 1.29 |
| Example 5-29 | 2 | 0.8 | 0.4 | 4 | 1.27 |
| Example 5-30 | 1 | 0.8 | 0.1 | 3 | 1.25 |
| Example 5-31 | — | — | 8.0 | 56 | 1.62 |
| Example 5-32 | — | — | 0.2 | 59 | 1.59 |
| Example 5-33 | — | — | 0.1 | 31 | 1.58 |
| Example 5-34 | — | — | 0.2 | 35 | 1.56 |
| Example 5-35 | 2.5 | 0.8 | 7.1 | 51 | 1.57 |
| Example 5-36 | 2.5 | 0.8 | 0.1 | 54 | 1.62 |
| Example 5-37 | 0.8 | 0.8 | 2.2 | 34 | 1.65 |
| Example 5-38 | 6 | 0.8 | 0.1 | 32 | 1.60 |

TABLE 5-2-1

| No. | Positive electrode precursor | Current collector (Aluminum foil form) | Vacuum heating | | | Infrared heating Temperature (° C.) |
|---|---|---|---|---|---|---|
| | | | Temperature (° C.) | Time (hr) | Degree of depressurization (Pa) | |
| Example 5-39 | 5-1 | Nonporous | 150 | 5 | 3.00E−05 | — |
| Example 5-40 | 5-1 | Nonporous | 150 | 5 | 5.00E−01 | |
| Example 5-41 | 5-1 | Nonporous | 150 | 5 | 990 | |
| Example 5-42 | 5-1 | Nonporous | — | — | — | 150 |
| Example 5-43 | 5-1 | Nonporous | | | | 150 |
| Example 5-44 | 5-1 | Nonporous | | | | 150 |
| Example 5-45 | 5-1 | Nonporous | 150 | 5 | 7.00E−06 | — |
| Example 5-46 | 5-1 | Nonporous | 150 | 5 | 1100 | — |
| Example 5-47 | 5-1 | Nonporous | — | — | — | 150 |
| Example 5-48 | 5-1 | Nonporous | — | — | — | 150 |
| Example 5-49 | 5-2 | Nonporous | 150 | 5 | 3.00E−05 | — |
| Example 5-50 | 5-2 | Nonporous | 150 | 5 | 5.00E−01 | — |
| Example 5-51 | 5-2 | Nonporous | 150 | 5 | 990 | — |
| Example 5-52 | 5-2 | Nonporous | — | — | — | 150 |
| Example 5-53 | 5-2 | Nonporous | | | | 150 |
| Example 5-54 | 5-2 | Nonporous | — | — | — | 150 |

| | Infrared heating | | Amount of | Evaluation results of non-aqueous alkali metal electricity storage element | |
|---|---|---|---|---|---|
| No. | Time (min) | Winding tension (N/mm) | residual solvent (%) | Micro short circuit ratio (%) | Elevated temperature high load charge/discharge cycle Re/Ra |
| Example 5-39 | — | — | 0.2 | 1 | 1.25 |
| Example 5-40 | | | 0.2 | 2 | 1.24 |
| Example 5-41 | — | — | 0.2 | 4 | 1.23 |

TABLE 5-2-1-continued

| | | | | | |
|---|---|---|---|---|---|
| Example 5-42 | 2.5 | 0.06 | 0.2 | 2 | 1.21 |
| Example 5-43 | 2.5 | 0.1 | 0.2 | 2 | 1.22 |
| Example 5-44 | 2.5 | 1.5 | 0.2 | 3 | 1.25 |
| Example 5-45 | — | — | 0.2 | 32 | 1.65 |
| Example 5-46 | — | — | 1.2 | 39 | 1.64 |
| Example 5-47 | 2.5 | 0.06 | 0.2 | 31 | 1.65 |
| Example 5-48 | 2.5 | 1.5 | 0.2 | 38 | 1.65 |
| Example 5-49 | — | — | 0.2 | 3 | 1.23 |
| Example 5-50 | — | — | 0.2 | 3 | 1.25 |
| Example 5-51 | — | — | 0.2 | 5 | 1.24 |
| Example 5-52 | 2.5 | 0.06 | 0.2 | 1 | 1.22 |
| Example 5-53 | 2.5 | 0.1 | 0.2 | 2 | 1.25 |
| Example 5-54 | 2.5 | 1.5 | 0.2 | 4 | 1.26 |

TABLE 5-2-2

| No. | Positive electrode precursor | Current collector (Aluminum foil form) | Vacuum heating | | | Infrared heating | | Winding tension (N/mm) |
|---|---|---|---|---|---|---|---|---|
| | | | Temperature (° C.) | Time (hr) | Degree of depressurization (Pa) | Temperature (° C.) | Time (min) | |
| Example 5-55 | 5-2 | Nonporous | 150 | 5 | 7.00E−06 | — | — | — |
| Example 5-56 | 5-2 | Nonporous | 150 | 5 | 1100 | — | — | — |
| Example 5-57 | 5-2 | Nonporous | — | — | — | 150 | 2.5 | 0.06 |
| Example 5-58 | 5-2 | Nonporous | — | — | — | 150 | 2.5 | 1.5 |
| Example 5-59 | 5-1 | Perforated | 150 | 5 | 50 | — | — | — |
| Example 5-60 | 5-1 | Perforated | — | — | — | 150 | 2.5 | 0.8 |
| Example 5-61 | 5-2 | Perforated | 150 | 5 | 50 | — | — | — |
| Example 5-62 | 5-2 | Perforated | — | — | — | 150 | 2.5 | 0.8 |
| Comparative Example 5-1 | 5-1 | Nonporous | No heating (without secondary drying) | | | | | |
| Comparative Example 5-2 | 5-2 | Nonporous | No heating (without secondary drying) | | | | | |
| Comparative Example 5-3 | 5-3 | Nonporous | 150 | 5 | 50 | — | — | — |
| Comparative Example 5-4 | 5-3 | Nonporous | — | — | — | 150 | 2.5 | 0.8 |
| Comparative Example 5-5 | 5-4 | Nonporous | 150 | 5 | 50 | — | — | — |
| Comparative Example 5-6 | 5-4 | Nonporous | — | — | — | 150 | 2.5 | 0.8 |

| No. | Amount of residual solvent (%) | Micro short circuit ratio (%) | Elevated temperature high load charge/discharge cycle Re/Ra |
|---|---|---|---|
| Example 5-55 | 0.2 | 36 | 1.57 |
| Example 5-56 | 1.2 | 33 | 1.58 |
| Example 5-57 | 0.2 | 38 | 1.59 |
| Example 5-58 | 0.2 | 39 | 1.57 |
| Example 5-59 | 8.0 | 34 | 3.16 |
| Example 5-60 | 7.1 | 32 | 3.27 |
| Example 5-61 | 7.6 | 35 | 3.27 |
| Example 5-62 | 7.1 | 31 | 3.18 |
| Comparative Example 5-1 | 10.0 | 85 | 7.80 |
| Comparative Example 5-2 | 10.0 | 89 | 7.68 |
| Comparative Example 5-3 | 1.3 | 72 | 5.47 |
| Comparative Example 5-4 | 0.9 | 73 | 5.29 |
| Comparative Example 5-5 | 1.1 | 76 | 5.27 |
| Comparative Example 5-6 | 1.3 | 79 | 5.17 |

According to the examples describe above, it has been verified that the method of the present embodiment inhibits the micro short circuit that occurred in the non-aqueous alkali metal electricity storage element by using the alkali metal compound for the positive electrode precursor, reduces the resistance, and enhances the elevated temperature durability.

<<Production of Non-Aqueous Lithium Electricity Storage Element in Sixth Aspect>>
<<Production of Non-Aqueous Lithium Electricity Storage Element>>

Non-aqueous lithium electricity storage elements each that was one aspect of the non-aqueous lithium electricity storage element was fabricated below.

<Production of Positive Electrode Precursor>
[Preparation of Activated Carbon 6-1]

A carbide was obtained by subjecting pulverized coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/h while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., pulverization was carried out for 1 hour with a ball mill to obtain activated carbon 6-1.

Measurement of mean particle diameter of this activated carbon 6-1 by using a laser diffraction-type particle size distribution measurement apparatus (SALD-2000J) manufactured by Shimadzu Corp. yielded a value of 5.5 μm. Moreover, fine pore size distribution of activated carbon 6-1 was measured by using a fine pore size distribution measurement apparatus (AUTOSORB-1 AS-1-MP) manufactured by Yuasa Ionics Co., Ltd. As a result, BET specific surface area was 2,360 $m^2$/g, mesopore volume ($V_1$) was 0.52 $cm^3$/g, micropore volume ($V_2$) was 0.88 $cm^3$/g, and $V_1/V_2$=0.59.

[Preparation of Activated Carbon 6-2]

A carbide having a mean particle diameter of 7 μm was obtained by carrying out carbonization treatment on a phenol resin for 2 hours at 600° C. in a calcination furnace in a nitrogen atmosphere followed by pulverizing with a ball mill and classification. KOH was mixed with this carbide at a weight ratio of 1:5 followed by activating by heating for 1 hour at 800° C. in the calcination furnace in a nitrogen atmosphere. The activated carbon was taken out, washed by stirring for 1 hour in dilute hydrochloric acid adjusted to 2 mol/L, and washed by boiling in distilled water until the pH stabilized between 5 and 6 and then dried to obtain activated carbon 6-2.

Measurement of mean particle diameter of this activated carbon 6-2 by using a laser diffraction-type particle size distribution measurement apparatus (SALD-2000J) manufactured by Shimadzu Corp. yielded a value of 7.0 μm. Moreover, fine pore size distribution of activated carbon 6-2 was measured by using a fine pore size distribution measurement apparatus (AUTOSORB-1 AS-1-MP) manufactured by Yuasa Ionics Co., Ltd. As a result, BET specific surface area was 3,627 $m^2$/g, mesopore volume ($V_1$) was 1.50 $cm^3$/g, micropore volume ($V_2$) was 2.28 $cm^3$/g, and $V_1/V_2$=0.66.

[Production of Positive Electrode Precursor 6-1]

A positive electrode precursor was produced by using activated carbon 6-1 as the positive electrode active material and lithium carbonate as the alkali metal carbonate. 55.5 parts by weight of activated carbon 6-1, 32.0 parts by weight of lithium carbonate, 3.0 parts by weight of Ketjen black, 1.5 part by weight of PVP (polyvinylpyrrolidone), 8.0 parts by weight of PVDF (polyvinylidene difluoride), and a mixed solvent of NMP (N-methylpyrrolidone) and pure water, the weight ratio of which is 99:1, were mixed to obtain a mixture, followed by dispersing under conditions of a peripheral velocity of 17 m/s by using the FILMIX® thin film rotating-type high-speed mixer manufactured by Primix Corp. to obtain a positive electrode coating solution 6-1.

The viscosity (ηb) and TI value of the resulting positive electrode coating solution 6-1 were measured by using the TVE-35H E-type viscometer manufactured by Toki Sangyo Co., Ltd. As a result, viscosity (ηb) was 2,850 mPa·s and the TI value was 4.4. Moreover, dispersity of the resulting positive electrode coating solution 6-1 was measured by using a particle gauge manufactured by Yoshimitsu Seiki Co., Ltd. As a result, dispersity was 31 μm.

One side of an aluminum foil having a thickness of 15 μm was coated with the positive electrode coating solution 6-1 under conditions of a coating speed of 1 m/s by using an automatic coating apparatus (PI-1210) having an applicator with a clearance of 150 μm, manufactured by Tester Sangyo Co., Ltd., and the coated foil was subjected to the first drying to obtain positive electrode precursor 6-1. The resulting positive electrode precursor 6-1 was pressed under conditions of a pressure of 6 kN/cm and pressed surface temperature of 25° C. by using a roll press. The film thickness of the obtained positive electrode precursor 6-1 was determined by subtracting the thickness of the aluminum foil from the average thickness value of the positive electrode precursor 6-1 measured at ten arbitrary locations using the GS-551 Linear Gauge Sensor film thickness gauge manufactured by Ono Sokki Co., Ltd. As a result, the film thickness of the positive electrode active material layer was 52 μm per side. Incidentally, the positive electrode precursor was produced and stored in a general environment where the dew point and illuminance were not controlled.

[Production of Positive Electrode Precursor 6-2]

A positive electrode precursor was produced by using activated carbon 6-1 as the positive electrode active material and lithium carbonate as the alkali metal carbonate.

41.5 parts by weight of activated carbon 6-1, 13.5 parts by weight of $LiFePO_4$ having an average particle diameter of 3.5 μm as a lithium transition metal oxide, 31.5 parts by weight of lithium carbonate, 4.0 parts by weight of Ketjen black, 1.5 parts by weight of PVP (polyvinylpyrrolidone), and 8.0 parts by weight of PVDF (polyvinylidene difluoride) were mixed with NMP (N-methyl-2-pyrrolidone) so that the weight ratio of the solid content was 24.5% to obtain a mixture. The resulting mixture was dispersed under conditions of a peripheral velocity of 20 m/s for 3 minutes by using the FILMIX® thin film rotating-type high-speed mixer manufactured by Primix Corp. to obtain a positive electrode coating solution 6-2.

The viscosity (ηb) and TI value of the resulting positive electrode coating solution 6-2 were measured by using the TVE-35H E-type viscometer manufactured by Toki Sangyo Co., Ltd. As a result, viscosity (ηb) was 2,690 mPa·s and the TI value was 6.6. Moreover, dispersity of the resulting positive electrode coating solution 6-2 was measured by using a particle gauge manufactured by Yoshimitsu Seiki Co., Ltd. As a result, dispersity was 23 μm.

Both sides of an aluminum foil having a thickness of 15 μm was coated with the positive electrode coating solution 6-2 under conditions of a coating speed of 1 m/s by using a double-sided die coater manufactured by Toray Engineering Co., Ltd., and the temperature of the drying oven was sequentially adjusted to 70° C., 90° C., 110° C., and 130° C. in this order, subsequently the coating film was subjected to the first drying to obtain a positive electrode precursor 6-2. The resulting positive electrode precursor 6-2 was pressed under conditions of a pressure of 6 kN/cm and pressed surface temperature of 25° C. by using a roll press machine. The total film thickness of the positive electrode precursor 6-2 was measured at ten arbitrary locations of the positive electrode precursor 6-2 by using the GS-551 Linear Gauge Sensor film thickness gauge manufactured by Ono Sokki Co., Ltd. From the results obtained, the film thickness of the positive electrode active material layer of positive electrode precursor 6-2 was 60 μm per one side.

By the aforementioned method, $A_1$, $A_2$, and $A_3$ were measured to obtain $A_1$=54.7, $A_2$=13.6, and $A_3$=31.7, respectively. Incidentally, the positive electrode precursor was produced and stored in a general environment where the dew point and illuminance were not controlled.

[Production of Positive Electrode Precursor 6-3]

A positive electrode precursor was produced by using activated carbon 6-1 as the positive electrode active material.

80.8 parts by weight of activated carbon 6-1, 6.2 parts by weight of Ketjen black, 10.0 parts by weight of PVDF (polyvinylidene difluoride), 3.0 parts by weight of PVP (polyvinylpyrrolidone) were mixed with NMP (N-methylpyrrolidone) so that the weight ratio of the solid content was 23.0% to obtain a mixture. The resulting mixture was dispersed under conditions of a peripheral velocity of 10 m/s for 2 minutes by using the FILMIX® thin film rotating-type high-speed mixer manufactured by Primix Corp. to obtain a positive electrode coating solution 6-3.

The viscosity (ηb) and TI value of the resulting positive electrode coating solution 6-3 were measured by using the TVE-35H E-type viscometer manufactured by Toki Sangyo Co., Ltd. As a result, viscosity (ηb) was 2,150 mPa·s and the TI value was 5.2. Moreover, dispersity of the resulting positive electrode coating solution 6-3 was measured by using a particle gauge manufactured by Yoshimitsu Seiki Co., Ltd. As a result, dispersity was 25 μm.

Both sides of an aluminum foil having a thickness of 15 μm was coated with the positive electrode coating solution 6-3 under conditions of a coating speed of 1 m/s by using a double-sided die coater manufactured by Toray Engineering Co., Ltd. and the coating film was dried to obtain a positive electrode precursor 6-3. The resulting positive electrode precursor 6-3 was pressed under conditions of a pressure of 6 kN/cm and pressed surface temperature of 25° C. by using a roll press. The total film thickness of the positive electrode precursor 6-3 was measured at ten arbitrary locations of the positive electrode precursor 6-3 by using the GS-551 Linear Gauge Sensor film thickness gauge manufactured by Ono Sokki Co., Ltd. From the results obtained, the film thickness of the positive electrode active material layer of positive electrode precursor 6-3 was 55 μm per one side. Incidentally, the positive electrode precursor was produced and stored in a general environment where the dew point and illuminance were not controlled.

[Production of Positive Electrode Precursor 6-4]

A positive electrode precursor was produced by using activated carbon 6-1 as the positive electrode active material.

60.0 parts by weight of activated carbon 6-1, 30.0 parts by weight of LiFePO$_4$ having an average particle diameter of 3.5 μm as a lithium transition metal oxide, 4.0 parts by weight of acetylene black, 10.0 parts by weight of PVDF (polyvinylidene difluoride), and 3.0 parts by weight of PVP (polyvinylpyrrolidone) were mixed with NMP (N-methylpyrrolidone) so that the weight ratio of the solid content was 23.0% to obtain a mixture. The obtained mixture was dispersed under conditions of a peripheral velocity of 10 m/s for 2 minutes by using the FILMIX® thin film rotating-type high-speed mixer manufactured by Primix Corp. to obtain a positive electrode coating solution 6-4.

The viscosity (ηb) and TI value of the resulting positive electrode coating solution 6-4 were measured by using the TVE-35H E-type viscometer manufactured by Toki Sangyo Co., Ltd. As a result, viscosity (ηb) was 2,020 mPa·s and the TI value was 5.6. Moreover, dispersity of the resulting positive electrode coating solution 6-4 was measured by using a particle gauge manufactured by Yoshimitsu Seiki Co., Ltd. As a result, dispersity was 23 μm.

Both sides of an aluminum foil having a thickness of 15 μm was coated with the positive electrode coating solution 6-4 under conditions of a coating speed of 1 m/s by using a double-sided die coater manufactured by Toray Engineering Co., Ltd. and the coating film was dried to obtain a positive electrode precursor 6-4. The resulting positive electrode precursor 6-4 was pressed under conditions of a pressure of 6 kN/cm and pressed surface temperature of 25° C. by using a roll press. The total film thickness of the positive electrode precursor 6-4 was measured at ten arbitrary locations of the positive electrode precursor 6-4 by using the GS-551 Linear Gauge Sensor film thickness gauge manufactured by Ono Sokki Co., Ltd. From the results obtained, the film thickness of the positive electrode active material layer of positive electrode precursor 6-4 was 57 μm per one side. Incidentally, the positive electrode precursor was produced and stored in a general environment where the dew point and illuminance were not controlled.

[Production of Positive Electrode Precursor 6-5]

A positive electrode precursor was produced by using activated carbon 6-1 as the positive electrode active material.

80.8 parts by weight of activated carbon 6-1, 6.2 parts by weight of Ketjen black, 10.0 parts by weight of PVDF (polyvinylidene difluoride), 3.0 parts by weight of PVP (polyvinylpyrrolidone) were mixed with NMP (N-methylpyrrolidone) so that the weight ratio of the solid content was 23.0% to obtain a mixture. The resulting mixture was dispersed under conditions of a peripheral velocity of 10 m/s for 2 minutes by using the FILMIX® thin film rotating-type high-speed mixer manufactured by Primix Corp. to obtain a positive electrode coating solution 6-5.

The viscosity (ηb) and TI value of the resulting positive electrode coating solution 6-5 were measured by using the TVE-35H E-type viscometer manufactured by Toki Sangyo Co., Ltd. The dispersity of the resulting positive electrode coating solution 6-5 was measured by using a particle gauge manufactured by Yoshimitsu Seiki Co., Ltd.

Both sides of an aluminum foil having a thickness of 15 μm was coated with the positive electrode coating solution 6-5 under conditions of a coating speed of 1 m/s by using a double-sided die coater manufactured by Toray Engineering Co., Ltd. and the coating film was dried to obtain a positive electrode precursor 6-5. The resulting positive electrode precursor 6-5 was pressed under conditions of a pressure of 6 kN/cm and pressed surface temperature of 25° C. by using a roll press. The total film thickness of the positive electrode precursor 6-5 was measured at ten arbitrary locations of the positive electrode precursor 6-5 by using the GS-551 Linear Gauge Sensor film thickness gauge manufactured by Ono Sokki Co., Ltd. Incidentally, the positive electrode precursor was produced in an environment where the dew point was −40° C.

[Production of Positive Electrode Precursor 6-6]

A positive electrode precursor was produced by using activated carbon 6-1 as the positive electrode active material.

60.0 parts by weight of activated carbon 6-1, 30.0 parts by weight of $LiFePO_4$ having an average particle diameter of 3.5 μm as a lithium transition metal oxide, 4.0 parts by weight of acetylene black, 10.0 parts by weight of PVDF (polyvinylidene difluoride), and 3.0 parts by weight of PVP (polyvinylpyrrolidone) were mixed with NMP (N-methylpyrrolidone) so that the weight ratio of the solid content was 23.0% to obtain a mixture. The resulting mixture was dispersed under conditions of a peripheral velocity of 10 m/s for 2 minutes by using the FILMIX® thin film rotating-type high-speed mixer manufactured by Primix Corp. to obtain a positive electrode coating solution 6-6.

The viscosity (ηb) and TI value of the resulting positive electrode coating solution 6-6 were measured by using the TVE-35H E-type viscometer manufactured by Toki Sangyo Co., Ltd. The dispersity of the resulting positive electrode coating solution 6-6 was measured by using a particle gauge manufactured by Yoshimitsu Seiki Co., Ltd.

Both sides of an aluminum foil having a thickness of 15 μm was coated with the positive electrode coating solution 6-6 under conditions of a coating speed of 1 m/s by using a double-sided die coater manufactured by Toray Engineering Co., Ltd. and the coating film was dried to obtain a positive electrode precursor 6-6. The resulting positive electrode precursor 6-6 was pressed under conditions of a pressure of 6 kN/cm and pressed surface temperature of 25° C. by using a roll press. The total film thickness of the positive electrode precursor 6-6 was measured at ten arbitrary locations of the positive electrode precursor 6-6 by using the GS-551 Linear Gauge Sensor film thickness gauge manufactured by Ono Sokki Co., Ltd. Incidentally, the positive electrode precursor was produced in an environment where the dew point was −40° C.

<Production of Negative Electrode>

[Production of Negative Electrode 6-1]

83 parts by weight of artificial graphite having a mean particle size of 4.5 μm, 4 parts by weight of composite carbon material, and 9 parts by weight of acetylene black were dry-blended in a powder state with a planetary mixer, and then 2 parts by weight of styrene-butadiene copolymer and an aqueous solution of CMC (carboxymethyl cellulose) were added thereto to disperse the mixture while gradually lowering the solid content. Finally, CMC was added so as to be 2 parts by weight, and water was added to the mixed solution so that the weight ratio of the solid content was 39% to obtain a negative electrode coating solution. The viscosity (ηb) and TI value of the resulting negative electrode coating solution were measured by using the TVE-35H E-type viscometer manufactured by Toki Sangyo Co., Ltd. As a result, viscosity (ηb) was 3,221 mPa·s and the TI value was 2.1.

Both sides of an electrolytic copper foil having a thickness of 10 μm was coated with the negative electrode coating solution under conditions of a coating speed of 1 m/s by using a die coater manufactured by Toray Engineering Co., Ltd., and the coating film was dried at a drying temperature of 60° C. to obtain negative electrode 6-1. The resulting negative electrode 6-1 was pressed under conditions of a pressure of 5 kN/cm and pressed surface temperature of 25° C. using a roll press. The total film thickness of the negative electrode 6-1 was measured at ten arbitrary locations of the negative electrode 6-1 by using the GS-551 Linear Gauge Sensor film thickness gauge manufactured by Ono Sokki Co., Ltd. The film thickness of the negative electrode active material layer of negative electrode 6-1 was 30 μm per one side.

<Preparation of Non-Aqueous Electrolytic Solution>

By using a mixed solvent of ethylene carbonate (EC), dimethyl carbonate (DMC), and methyl ethyl carbonate (EMC) at a ratio (volume ratio) of 34:44:22, electrolyte salts respectively consisting of $LiN(SO_2F)_2$ and $LiPF_6$ at a concentration ratio of 25:75 (molar ratio) and a total concentration of $LiN(SO_2F)_2$ and $LiPF_6$ of 1.2 mol/L, in an entire non-aqueous electrolytic solution, were dissolved into the mixed solvent to obtain the non-aqueous electrolytic solution. The concentrations of $LiN(SO_2F)_2$ and $LiPF_6$ in the prepared nonaqueous electrolytic solution were 0.3 mol/L and 0.9 mol/L, respectively.

Examples 6-1 and 6-2

[Production of Non-Aqueous Lithium Electricity Storage Element]

As the positive electrode precursor, positive electrode precursor 6-1 was used in Example 6-1, and positive electrode precursor 6-2 was used in Example 6-2.

[Secondary Drying of Electrodes]

Roll-to-roll drying of the positive electrode precursor by infrared heating was carried out in a drying oven filled with a gas containing nitrogen as a main component, under the conditions of a temperature of 220° C., a drying time of 2.5 minutes, and an oxygen concentration of 1,000 ppm in the drying oven. The flow velocity of the gas in the drying oven was 500 cm³/min. The positive electrode precursor taken out from the drying oven was wound up at a tension of 0.8 N/mm in a dry environment with a dew point of −45° C.

[Amount of Residual Solvent]

The amounts of residual solvent of the positive precursors for both Example 6-1 and Example 6-2 were 3.0% by weight.

[Assembly Step]

The resulting positive electrode precursor (double-sided) was cut into 20 sheets such that a size of the positive electrode active material layer was 10 cm×10 cm (100 cm²). Subsequently, negative electrode 6-1 was cut into 21 sheets such that a size of the negative electrode active material layer was 10.1 cm×10.1 cm (102 cm²) and 40 sheets of polyethylene separator (thickness 10 μm, manufactured by Asahi Kasei Kabushiki Kaisha) with a size of 10.3 cm×10.3 cm (106 cm²) were prepared. The positive electrode precursors and the negative electrodes were laminated with the separators interposed therebetween in the order of the positive electrode precursor, the separator, and the negative electrode so that the outermost layer became the negative electrode 6-1 and the positive electrode active material layer and the negative electrode active material layer faced each other, to obtain an electrode laminate. The positive electrode terminal and the negative electrode terminal were ultrasonically welded to the obtained electrode laminate and placed in a container made of an aluminum laminate packaging material, and three sides including the electrode terminal portion were sealed by heat sealing.

[Pressurization Step]

Pressure was applied by sandwiching the aluminum laminate packaging material between a pair of metal plates (height 150 mm×width 150 mm×thickness 5 mm) from the outside thereof and screwing the four corners of the metal plates. The pressure measured by using the surface pressure distribution measurement system I-SCAN (manufactured by Nitta Corporation) and the I-SCAN100 sensor (measurement surface dimensions: 112 mm×112 mm) was 0.08 kgf/cm$^2$ as the restraining pressure.

[Solution Injection●Impregnation●Sealing Steps]

The electrode laminate housed in an aluminum laminate packaging material was placed in a decompression chamber in a dry air environment at a temperature of 25° C. and dew point of −40° C. or lower, the pressure was reduced from normal pressure to −100 kPa, and then approximately 80 g of the aforementioned non-aqueous electrolytic solution with a solution temperature of 25° C. was injected. Subsequently, the pressure was returned to atmospheric pressure, and the electrode laminate was allowed to stand undisturbed for 60 minutes. Subsequently, the non-aqueous lithium electricity storage element was placed in a reduced-pressure sealing machine and sealed for 10 seconds at 180° C. and pressure of 0.1 MPa while reducing the pressure in the machine to −95 kPa, to seal the aluminum laminate packaging material.

[Repressurization Step]

The pressure of the non-aqueous lithium electricity storage element after solution injection was increased to 1.2 kgf/cm$^2$ by further tightening the screws of the metal plates restraining the electricity storage element precursor.

[Lithium Doping Step]

The resulting non-aqueous lithium electricity storage element was charged with a constant current at a current value of 6 Å until the voltage reached 4.5 V in an environment at 45° C. by using a charge and discharge apparatus (ACD-10APS(01)) manufactured by Asuka Denshi K.K., and initial charge was then carried out according to a procedure consisting of continuing constant voltage charge at 4.5 V for 1 hour to dope the negative electrode with lithium. The total time for lithium doping was 2 hours.

[Charge/Discharge Cycle Step]

The non-aqueous lithium electricity storage element after the doping was placed in an environment of 50° C. while maintaining the pressurization force of 1.2 kgf/cm$^2$.

(1) After carrying out constant current charge at 10.0 Å until the voltage reached 4.3 V, constant voltage charge at 4.3 V was carried out for 5 minutes.

(2) After carrying out constant current discharge at 10.0 Å until the voltage reached 2.0 V, constant voltage discharge at 2.0 V was carried out for 5 minutes.

Regarding (1) and (2) as one cycle, 5 cycles in total were carried out.

[Elevated Temperature Aging Step]

(1) High Voltage Storage Step: The non-aqueous lithium electricity storage element after the charge/discharge cycle step was discharged with a constant current at 10.0 Å in an environment at 25° C. until the voltage reached 4.2 V, while maintaining the pressurization force of 1.2 kgf/cm$^2$, and then the voltage was adjusted to 4.2 V by carrying out constant current charge at 4.2 V for 30 minutes. Continuing, the non-aqueous lithium electricity storage element was stored for 10 hours in a thermostatic chamber at 60° C.

(2) Low Voltage Storage Step: The non-aqueous lithium electricity storage element after the high voltage storage step was discharged with a constant current at 10.0 Å in an environment at 25° C. until the voltage reached 2.0 V, while maintaining the pressurization force of 1.2 kgf/cm$^2$, and the voltage was adjusted to 2.0 V by carrying out constant current charge at 2.0 V for 30 minutes. Continuing, the non-aqueous lithium electricity storage element was stored for 10 hours in a thermostatic chamber at 60° C.

[Gas Venting●Sealing Steps]

A portion of the aluminum laminate packaging material of the non-aqueous lithium electricity storage element after the aging, was opened in a dry air environment at a temperature of 25° C. and dew point of −40° C. Continuing, the non-aqueous lithium electricity storage element was placed in a decompression chamber, and after reducing pressure from atmospheric pressure to −80 kPa over the course of 3 minutes by using a diaphragm pump (N816.3KT.45.18) manufactured by KNF Japan Co., Ltd., pressure was returned to atmospheric pressure over the course of 3 minutes, and this step was repeated a total of three times. Subsequently, the non-aqueous lithium electricity storage element was placed in a reduced-pressure sealing machine and pressure was reduced to −90 kPa followed by sealing for 10 seconds at 200° C. and pressure of 0.1 MPa to seal the aluminum laminate packaging material.

From the step described above, the non-aqueous lithium electricity storage element was completed.

[Evaluation of Electricity Storage Element]

[Measurement of Electrostatic Capacitance]

Constant current charge was carried out on the electricity storage element obtained until the voltage reached 4.0 V at a current value of 20 C by using a charge and discharge apparatus (5 V, 360 A) manufactured by Fujitsu Telecom Networks Ltd. in a thermostatic chamber set to a temperature of 25° C., followed by carrying out constant voltage charge for 30 minutes in total by applying a constant voltage of 4.0 V. With the capacitance during constant current discharge down to 2.0 V at a current value of 2 C, as Q, electrostatic capacitance F was determined according to $F=Q/(4.0-2.0)$.

[Determination of Ra·F]

The electricity storage element obtained was charged up to 4.0 V with a constant current at a current value of 20 C by using a charge and discharge apparatus (5 V, 360 A) manufactured by Fujitsu Telecom Networks Ltd. in a thermostatic chamber at 25° C., followed by carrying out constant voltage charge for 30 minutes in total by applying a constant voltage of 4.0 V and carrying out constant current discharge down to 2.0 V at a current value of 20 C to obtain a discharging curve (time vs. voltage). Room temperature discharge internal resistance Ra was determined according to voltage drop $\Delta E=4.0-Eo$, and $Ra=\Delta E/(20\ C$ (current value A)) when the voltage at a discharge time of 0 seconds, obtained by extrapolating by linear approximation from the voltage values at discharge times of 2 seconds and 4 seconds in the discharging curve, was defined as Eo.

[Ratio of Increase in Resistance after Elevated Temperature and High Load Charge/Discharge Cycle Test]

In a thermostatic bath set to 60° C., the electricity storage element obtained was charged with a constant current at the 300 C current value until 4.1 V was reached by using a charge and discharge apparatus (5 V, 360 A) manufactured by Fujitsu Telecom Networks Ltd., and then discharged with a constant current at the 300 C current value until 1.9 V was reached. The charge/discharge step was repeated 60,000 times. After the high load charge/discharge cycle test, the resistance after the high load charge/discharge cycle test Re was determined in the same manner as in the aforementioned [Determination of Ra·F]. The ratio Re/Ra was calculated by dividing this Re ($\Omega$) by internal resistance before the high load charge/discharge cycle test Ra ($\Omega$) obtained in the aforementioned [Determination of Ra·F]. Re/Ra was 1.17 for Example 6-1, and Re/Ra was 1.18 for Example 6-2.

[Micro Short Circuit Inspection Step]

When 100 non-aqueous lithium electricity storage elements were fabricated and the aforementioned micro short circuit inspection test was carried out, the number of micro short circuits was 1 in Example 6-1. Therefore, the micro short circuit ratio of Example 6-1 was 1%. The micro short circuit ratio of Example 6-2 was 2%.

Examples 6-3 to 6-22 and 6-27 to 6-52

Non-aqueous alkali lithium electricity storage elements each was produced and subsequently evaluated in the same manner as in Example 6-1 except that the positive electrode precursor and the conditions of the drying step were changed as shown in Tables 6-1 to 6-3. The results are shown in Tables 6-1 to 6-3.

Comparative Examples 6-9 and 6-10

The type of positive electrode precursors each was changed as shown in Table 6-3, and the secondary drying of the electrode was not carried out. Next, the assembly step was carried out in the same manner as in Example 6-1.

The pressurization step was carried out in the same manner as in Example 6-1.

In the solution injection, impregnation, and sealing steps, the electrode laminate housed in an aluminum laminate packaging material was placed in a decompression chamber in a dry air environment at a temperature of 25° C. and dew point of −40° C. or lower, and approximately 80 g of the aforementioned non-aqueous electrolytic solution was injected at normal pressure. Subsequently, the electrode laminate was allowed to stand undisturbed for 60 minutes while maintaining normal pressure. Subsequently, the non-aqueous lithium electricity storage element was placed in a reduced-pressure sealing machine and sealed for 10 seconds at 180° C. and pressure of 0.1 MPa while reducing the pressure in the machine to −95 kPa, to seal the aluminum laminate packaging material.

In the repressurization step, the metal plates restraining the non-aqueous lithium electricity storage element after the solution injection were removed to adjust the pressure to 0 kgf/cm$^2$.

In the lithium doping step, the resulting non-aqueous lithium electricity storage element was charged with a constant current at a current value of 0.1 Å until the voltage reached 4.1 V in an environment at 25° C. by using a charge and discharge apparatus (ACD-10APS(01)) manufactured by Asuka Denshi K.K., and initial charge was then carried out according to a procedure consisting of continuing constant voltage charge at 4.1 V for 1 hour to dope the negative electrode with lithium. The total time for lithium doping was 9 hours.

The charge/discharge cycle step was not carried out.

The non-aqueous lithium electricity storage element after doping was placed in an environment of 25° C.

(1) After carrying out constant current charge at 10.0 Å until the voltage reached 3.7 V, constant voltage charge at 3.7 V was carried out for 5 minutes.

(2) After carrying out constant current discharge at 10.0 Å until the voltage reached 1.4 V, constant voltage discharge at 1.4 V was carried out for 5 minutes.

Regarding (1) and (2) as one cycle, 5 cycles in total were carried out.

The elevated temperature aging step was carried out under the following conditions, as the high voltage storage step.

High Voltage Storage Step: The non-aqueous alkali metal electricity storage element was discharged with a constant current at 10.0 Å in an environment at 25° C. until the voltage reached 4.0 V, while maintaining the pressurization force of 0 kgf/cm$^2$, and then the voltage was adjusted to 4.0 V by carrying out constant current charge at 4.0 V for 30 minutes. Continuing, the non-aqueous lithium electricity storage element was stored for 10 hours in a thermostatic chamber at 60° C.

Low Voltage Storage Step; It was not carried out.

The steps subsequent to the gas venting●sealing steps were carried out in the same manner as in Example 6-1 to produce a non-aqueous lithium electricity storage element, and the subsequent evaluation was carried out in the same manner as in Example 6-1. The results are shown in Table 6-3.

Comparative Examples 6-7 and 6-8, 6-11 and 6-12

[Production of Non-Aqueous Lithium Electricity Storage Element]

Non-aqueous lithium electricity storage elements each was produced in the same manner as in Example 6-1, and the subsequent evaluation was carried out in the same manner as in Example 6-1 except that the type of the positive electrode precursor and the methods of the assembly step and lithium doping step were changed as described below. The results are shown in Table 6-3.

[Assembly Step]

Non-aqueous lithium electricity storage elements were produced in the same manner as in Example 6-1 except that the positive electrode precursor and the negative electrode in which a metallic lithium foil corresponding to 350 mAh/g per unit weight of the negative electrode active material was adhered to the surface of the negative electrode active material layer of negative electrode 6-1, were used.

[Lithium Doping Step]

In the lithium doping step, the non-aqueous lithium electricity storage element precursor was stored in a thermostatic bath at an environmental temperature of 45° C. for 72 hours to ionize the metallic lithium and to dope negative electrode 6-1.

Examples 6-23 and 6-24

Non-aqueous alkali metal electricity storage elements each was produced and subsequently evaluated in the same manner as in Example 6-1 except that the perforated aluminum foil was used for the current collector of the positive electrode precursor. The results are shown in Table 6-2.

TABLE 6-1-1

| No. | Positive electrode precursor | Current collector (aluminum foil form) | Inner furnace atmosphere | Drying method | With or without winding up step and tension (N/mm) | Inner furnace temperature (° C.) | Residence time (min) |
|---|---|---|---|---|---|---|---|
| Example 6-1 | 6-1 | Nonporous | $N_2$ | Infrared ray | With the step, 0.8 | 220 | 2.5 |
| Example 6-2 | 6-2 | Nonporous | $N_2$ | Infrared ray | With the step, 0.8 | 220 | 2.5 |
| Example 6-3 | 6-1 | Nonporous | $N_2$ | Infrared ray | With the step, 0.8 | 100 | 5 |
| Example 6-4 | 6-1 | Nonporous | $N_2$ | Infrared ray | With the step, 0.8 | 160 | 4 |
| Example 6-5 | 6-1 | Nonporous | $N_2$ | Infrared ray | With the step, 0.8 | 230 | 2.5 |
| Example 6-6 | 6-1 | Nonporous | $N_2$ | Infrared ray | With the step, 0.8 | 295 | 1 |
| Example 6-7 | 6-1 | Nonporous | $N_2$ | Infrared ray | With the step, 0.8 | 100 | 1 |
| Example 6-8 | 6-1 | Nonporous | $N_2$ | Infrared ray | With the step, 0.8 | 295 | 5 |
| Example 6-9 | 6-1 | Nonporous | $N_2$ | Infrared ray | With the step, 0.8 | 90 | 5 |
| Example 6-10 | 6-1 | Nonporous | $N_2$ | Infrared ray | With the step, 0.8 | 310 | 1 |
| Example 6-11 | 6-1 | Nonporous | $N_2$ | Infrared ray | With the step, 0.8 | 230 | 6 |

| No. | Inner furnace flow (cc/min) | Inner furnace oxygen concentration (ppm) | Amount of residual solvent (%) | Micro short circuit (%) | Elevated temperature and high load charge/discharge cycle Re/Ra |
|---|---|---|---|---|---|
| Example 6-1 | 500 | 1000 | 3.0 | 1 | 1.17 |
| Example 6-2 | 500 | 1000 | 2.9 | 2 | 1.18 |
| Example 6-3 | 500 | 1000 | 9.1 | 3 | 1.19 |
| Example 6-4 | 500 | 1000 | 6.1 | 2 | 1.18 |
| Example 6-5 | 500 | 1000 | 2.6 | 4 | 1.19 |
| Example 6-6 | 500 | 1000 | 1.0 | 3 | 1.19 |
| Example 6-7 | 500 | 1000 | 7.0 | 5 | 1.19 |
| Example 6-8 | 500 | 1000 | 0.9 | 4 | 1.11 |
| Example 6-9 | 500 | 1000 | 12.0 | 31 | 2.89 |
| Example 6-10 | 500 | 1000 | 0.0 | 30 | 2.65 |
| Example 6-11 | 500 | 1000 | 2.4 | 34 | 2.78 |

TABLE 6-1-2

| No. | Positive electrode precursor | Current collector (aluminum foil form) | Inner furnace atmosphere | Drying method | With or without winding up step and tension (N/mm) | Inner furnace temperature (° C.) | Residence time (min) |
|---|---|---|---|---|---|---|---|
| Example 6-12 | 6-1 | Nonporous | $N_2$ | Infrared ray | With the step, 0.8 | 230 | 0.8 |
| Example 6-13 | 6-2 | Nonporous | $N_2$ | Infrared ray | With the step, 0.8 | 100 | 5 |
| Example 6-14 | 6-2 | Nonporous | $N_2$ | Infrared ray | With the step, 0.8 | 160 | 4 |
| Example 6-15 | 6-2 | Nonporous | $N_2$ | Infrared ray | With the step, 0.8 | 230 | 2.5 |
| Example 6-16 | 6-2 | Nonporous | $N_2$ | Infrared ray | With the step, 0.8 | 295 | 1 |
| Example 6-17 | 6-2 | Nonporous | $N_2$ | Infrared ray | With the step, 0.8 | 100 | 1 |
| Example 6-18 | 6-2 | Nonporous | $N_2$ | Infrared ray | With the step, 0.8 | 295 | 5 |
| Example 6-19 | 6-2 | Nonporous | $N_2$ | Infrared ray | With the step, 0.8 | 90 | 5 |
| Example 6-20 | 6-2 | Nonporous | $N_2$ | Infrared ray | With the step, 0.8 | 310 | 1 |
| Example 6-21 | 6-2 | Nonporous | $N_2$ | Infrared ray | With the step, 0.8 | 230 | 6 |
| Example 6-22 | 6-2 | Nonporous | $N_2$ | Infrared ray | With the step, 0.8 | 230 | 0.8 |

TABLE 6-1-2-continued

| | Conditions of secondary drying step | | | Evaluation results of non-aqueous alkali metal electricity storage element | |
|---|---|---|---|---|---|
| | | | | | Elevated temperature and high load charge/discharge cycle Re/Ra |
| No. | Inner furnace flow (cc/min) | Inner furnace oxygen concentration (ppm) | Amount of residual solvent (%) | Micro short circuit (%) | |
| Example 6-12 | 500 | 1000 | 10.0 | 35 | 2.65 |
| Example 6-13 | 500 | 1000 | 9.0 | 3 | 1.15 |
| Example 6-14 | 500 | 1000 | 6.0 | 5 | 1.17 |
| Example 6-15 | 500 | 1000 | 2.4 | 2 | 1.18 |
| Example 6-16 | 500 | 1000 | 0.9 | 6 | 1.18 |
| Example 6-17 | 500 | 1000 | 5.4 | 4 | 1.19 |
| Example 6-18 | 500 | 1000 | 0.7 | 3 | 1.12 |
| Example 6-19 | 500 | 1000 | 11.8 | 36 | 2.98 |
| Example 6-20 | 500 | 1000 | 0.0 | 36 | 2.67 |
| Example 6-21 | 500 | 1000 | 2.3 | 35 | 2.58 |
| Example 6-22 | 500 | 1000 | 9.8 | 37 | 2.47 |

TABLE 6-2-1

| | | | | Conditions of secondary drying step | | | |
|---|---|---|---|---|---|---|---|
| No. | Positive electrode precursor | Current collector (aluminum foil form) | Inner furnace atmosphere | Drying method | With or without winding up step and tension (N/mm) | Inner furnace temperature (° C.) | Residence time (min) |
| Example 6-23 | 6-1 | Perforated | $N_2$ | Infrared ray | With the step, 0.8 | 220 | 2.5 |
| Example 6-24 | 6-2 | Perforated | $N_2$ | Infrared ray | With the step, 0.8 | 220 | 2.5 |
| Example 6-27 | 6-1 | Nonporous | $N_2$ | Infrared ray | With the step, 0.8 | 220 | 2.5 |
| Example 6-28 | 6-1 | Nonporous | $N_2$ | Infrared ray | With the step, 0.8 | 220 | 2.5 |
| Example 6-29 | 6-2 | Nonporous | $N_2$ | Infrared ray | With the step, 0.8 | 220 | 2.5 |
| Example 6-30 | 6-2 | Nonporous | $N_2$ | Infrared ray | With the step, 0.8 | 220 | 2.5 |
| Example 6-31 | 6-1 | Nonporous | $N_2$ | Infrared ray | With the step, 0.8 | 220 | 2.5 |
| Example 6-32 | 6-2 | Nonporous | $N_2$ | Infrared ray | With the step, 0.8 | 220 | 2.5 |
| Example 6-33 | 6-1 | Nonporous | $N_2$ | Infrared ray | With the step, 0.8 | 220 | 2.5 |
| Example 6-34 | 6-1 | Nonporous | $N_2$ | Infrared ray | With the step, 0.8 | 220 | 2.5 |
| Example 6-35 | 6-2 | Nonporous | $N_2$ | Infrared ray | With the step, 0.8 | 220 | 2.5 |
| Example 6-36 | 6-2 | Nonporous | $N_2$ | Infrared ray | With the step, 0.8 | 220 | 2.5 |
| Example 6-37 | 6-1 | Nonporous | $N_2$ | Infrared ray | With the step, 0.8 | 220 | 2.5 |

| | Conditions of secondary drying step | | | Evaluation results of non-aqueous alkali metal electricity storage element | |
|---|---|---|---|---|---|
| | | | | | Elevated temperature and high-load charge/discharge cycle Re/Ra |
| No. | Inner furnace flow (cc/min) | Inner furnace oxygen concentration (ppm) | Amount of residual solvent (%) | Micro short circuit (%) | |
| Example 6-23 | 500 | 1000 | 11.0 | 34 | 2.97 |
| Example 6-24 | 500 | 1000 | 10.5 | 32 | 2.85 |
| Example 6-27 | 500 | 1460 | 3.0 | 5 | 1.16 |
| Example 6-28 | 500 | 50 | 3.0 | 3 | 1.14 |
| Example 6-29 | 500 | 1480 | 3.0 | 2 | 1.19 |
| Example 6-30 | 500 | 60 | 3.0 | 4 | 1.18 |
| Example 6-31 | 500 | 1540 | 3.0 | 36 | 2.97 |
| Example 6-32 | 500 | 1580 | 3.0 | 37 | 2.99 |
| Example 6-33 | 10 | 1000 | 3.0 | 3 | 1.15 |
| Example 6-34 | 1000 | 1000 | 3.0 | 3 | 1.21 |
| Example 6-35 | 10 | 1000 | 3.0 | 4 | 1.23 |
| Example 6-36 | 1000 | 1000 | 3.0 | 3 | 1.24 |
| Example 6-37 | 8 | 1000 | 9.0 | 34 | 2.98 |

TABLE 6-2-2

| No. | Positive electrode precursor | Current collector (aluminum foil form) | Inner furnace atmosphere | Drying method | With or without winding up step and tension (N/mm) | Inner furnace temperature (° C.) | Residence time (min) |
|---|---|---|---|---|---|---|---|
| Example 6-38 | 6-1 | Nonporous | $N_2$ | Infrared ray | With the step, 0.8 | 220 | 2.5 |
| Example 6-39 | 6-2 | Nonporous | $N_2$ | Infrared ray | With the step, 0.8 | 220 | 2.5 |
| Example 6-40 | 6-2 | Nonporous | $N_2$ | Infrared ray | With the step, 0.8 | 220 | 2.5 |
| Example 6-41 | 6-1 | Nonporous | $N_2$ | Infrared ray | With the step, 1.5 | 220 | 2.5 |
| Example 6-42 | 6-1 | Nonporous | $N_2$ | Infrared ray | With the step, 0.05 | 220 | 2.5 |
| Example 6-43 | 6-2 | Nonporous | $N_2$ | Infrared ray | With the step, 1.5 | 220 | 2.5 |
| Example 6-44 | 6-2 | Nonporous | $N_2$ | Infrared ray | With the step, 0.05 | 220 | 2.5 |
| Example 6-45 | 6-1 | Nonporous | $N_2$ | Infrared ray | With the step, 1.6 | 220 | 2.5 |
| Example 6-46 | 6-2 | Nonporous | $N_2$ | Infrared ray | With the step, 0.04 | 220 | 2.5 |

| No. | Inner furnace flow (cc/min) | Inner furnace oxygen concentration (ppm) | Amount of residual solvent (%) | Micro short circuit (%) | Elevated temperature and high-load charge/discharge cycle Re/Ra |
|---|---|---|---|---|---|
| Example 6-38 | 1010 | 1000 | 2.0 | 31 | 2.78 |
| Example 6-39 | 7 | 1000 | 9.0 | 30 | 2.69 |
| Example 6-40 | 1020 | 1000 | 2.0 | 38 | 2.87 |
| Example 6-41 | 500 | 1000 | 3.0 | 4 | 1.41 |
| Example 6-42 | 500 | 1000 | 3.0 | 4 | 1.38 |
| Example 6-43 | 500 | 1000 | 3.0 | 5 | 1.45 |
| Example 6-44 | 500 | 1000 | 3.0 | 4 | 1.47 |
| Example 6-45 | 500 | 1000 | 3.0 | 38 | 2.77 |
| Example 6-46 | 500 | 1000 | 3.0 | 39 | 2.87 |

TABLE 6-3

| No. | Positive electrode precursor | Current collector (aluminum foil form) | Inner furnace atmosphere | Drying method | With or without winding up step and tension (N/mm) | Inner furnace temperature (° C.) | Residence time (min) | Inner furnace flow (cc/min) |
|---|---|---|---|---|---|---|---|---|
| Example 6-47 | 6-1 | Nonporous | Air | Infrared ray | With the step, 0.8 | 220 | 2.5 | 500 |
| Example 6-48 | 6-1 | Nonporous | $N_2$ | Hot air only | With the step, 0.8 | 220 | 2.5 | 500 |
| Example 6-49 | 6-1 | Nonporous | $N_2$ | Infrared ray | Without the step | 220 | 2.5 | 500 |
| Example 6-50 | 6-2 | Nonporous | Air | Infrared ray | With the step, 0.8 | 220 | 2.5 | 500 |
| Example 6-51 | 6-2 | Nonporous | $N_2$ | Hot air only | With the step, 0.8 | 220 | 2.5 | 500 |
| Example 6-52 | 6-2 | Nonporous | $N_2$ | Infrared ray | Without the step | 220 | 2.5 | 500 |
| Comparative Example 6-7 | 6-3 | Nonporous | $N_2$ | Infrared ray | With the step, 0.8 | 220 | 2.5 | 500 |
| Comparative Example 6-8 | 6-4 | Nonporous | $N_2$ | Infrared ray | With the step, 0.8 | 220 | 2.5 | 500 |
| Comparative Example 6-9 | 6-1 | Nonporous | The secondary drying step was not carried out. | | | | | |
| Comparative Example 6-10 | 6-2 | Nonporous | The secondary drying step was not carried out. | | | | | |
| Comparative Example 6-11 | 6-5 | Nonporous | $N_2$ | Infrared ray | With the step, 0.8 | 220 | 2.5 | 500 |
| Comparative Example 6-12 | 6-6 | Nonporous | $N_2$ | Infrared ray | With the step, 0.8 | 220 | 2.5 | 500 |

TABLE 6-3-continued

| No. | Conditions of secondary drying step Inner furnace oxygen concentration (ppm) | Amount of residual solvent (%) | Micro short circuit (%) | Elevated temperature and high load charge/discharge cycle Re/Ra |
|---|---|---|---|---|
| Example 6-47 | — | 3.0 | 51 | 1.55 |
| Example 6-48 | 1000 | 3.0 | 52 | 1.56 |
| Example 6-49 | 1000 | 3.0 | 56 | 1.51 |
| Example 6-50 | — | 2.9 | 57 | 1.55 |
| Example 6-51 | 1000 | 4.0 | 51 | 1.55 |
| Example 6-52 | 1000 | 2.9 | 62 | 1.61 |
| Comparative Example 6-7 | 1000 | 4.7 | 80 | 5.31 |
| Comparative Example 6-8 | 1000 | 4.4 | 83 | 5.45 |
| Comparative Example 6-9 | The secondary drying step was not carried out. | 15.0 | 85 | 7.80 |
| Comparative Example 6-10 | | 15.0 | 89 | 7.68 |
| Comparative Example 6-11 | 1000 | 4.8 | 54 | 3.48 |
| Comparative Example 6-12 | 1000 | 4.3 | 57 | 3.75 |

According to the examples describe above, it has been verified that the method of the present embodiment inhibits the micro short circuit, reduces the resistance, and enhances the elevated temperature durability in the non-aqueous alkali metal electricity storage element by using the alkali metal compound for the positive electrode precursor.

INDUSTRIAL APPLICABILITY

The non-aqueous alkali metal electricity storage element obtained by the method for producing the non-aqueous alkali metal electricity storage element according to the present invention, inhibits a micro short circuit upon production, improves the micro short circuit ratio, and has excellent initial input/output characteristics or input/output characteristics and durability against the high load charge/discharge cycles under elevated temperatures and excellent elevated temperature and high voltage float durability, and thus, it can be used, in automobiles, for example, in the field of a hybrid drive system in combination of internal combustion engines or fuel cells, motors, and the plural electricity storage elements, and can be further used in an application of instantaneous power peak assist, etc.

The invention claimed is:
1. A method for producing a non-aqueous alkali metal electricity storage element comprising a casing, and a positive electrode, a negative electrode, a separator, and a non-aqueous electrolytic solution, housed in the casing, comprising
a housing step of housing a positive electrode precursor, the negative electrode, and the separator in the casing;
a solution injection step of injecting the non-aqueous electrolytic solution into the casing to obtain a non-aqueous alkali metal electricity storage element precursor;
a voltage application step of applying a voltage to the non-aqueous alkali metal electricity storage element precursor; and
a completion step of obtaining a non-aqueous alkali metal electricity storage element from the non-aqueous alkali metal electricity storage element precursor; wherein
the positive electrode precursor has a positive electrode current collector and a positive electrode active material layer disposed on one side or both sides of the positive electrode current collector, and the positive electrode active material layer comprises a positive electrode active material and an alkali metal compound other than the positive electrode active material,
the negative electrode has a negative electrode current collector and a negative electrode active material layer disposed on one side or both sides of the negative electrode current collector, and the negative electrode active material layer comprises a negative electrode active material that enables to intercalate and release alkali metal ions,
the non-aqueous electrolytic solution comprises the alkali metal ions,
the alkali metal compound oxidatively decomposes by the voltage application step to release the alkali metal ions into the non-aqueous electrolytic solution, and the negative electrode active material intercalates the alkali metal ions by the voltage application step, and wherein
(1) a pressurization step of pressurizing the non-aqueous alkali metal electricity storage element precursor from outside at 0.1 kgf/cm$^2$ or more and 1,000 kgf/cm$^2$ or less is carried out before the voltage application step or during the voltage application step,
(2) a heating step of heating the non-aqueous alkali metal electricity storage element precursor to adjust a temperature of the casing to 30° C. or higher and 70° C. or lower is carried out before the voltage application step or during the voltage application step,
(3) in the voltage application step, after constant current charge of the non-aqueous alkali metal electricity storage element precursor is carried out, constant voltage charge of the non-aqueous alkali metal electricity storage element precursor is carried out,

(4) a C rate of the constant current charge is 1.0 to 100.0 times as large as an electric discharging capacity (Ah) of the non-aqueous alkali metal electricity storage element after the completion step, and (5) a voltage value of the constant voltage charge is 4.20 V or more.

2. The method for producing a non-aqueous alkali metal electricity storage element according to claim 1, wherein the C rate of the constant current charge is 1 to 30 times as large as the electric discharging capacity (Ah) of the non-aqueous alkali metal electricity storage element after the completion step.

3. The method for producing a non-aqueous alkali metal electricity storage element according to claim 1, wherein the voltage value of the constant voltage charge is 4.40 V or more and 4.80 V or less.

4. The method for producing a non-aqueous alkali metal electricity storage element according to claim 1, wherein time spent for the constant voltage charge is 0.25 hours or more and 24 hours or less.

5. The method for producing a non-aqueous alkali metal electricity storage element according to claim 1, wherein the pressurization step is carried out by using a pressurizing jig, and the heating step is carried out by using a thermostatic bath.

6. The method for producing a non-aqueous alkali metal electricity storage element according to claim 1, wherein the solution injection step is carried out by adjusting an internal pressure of the casing to −5 kPa to −101.32 kPa based on the atmospheric pressure.

7. The method for producing a non-aqueous alkali metal electricity storage element according to claim 6, wherein a temperature of the non-aqueous electrolytic solution is 15ºC to 45° C. in the solution injection step.

8. The method for producing a non-aqueous alkali metal electricity storage element according to claim 6, wherein a pressure of 0.05 kgf/cm$^2$ or more to 500 kgf/cm$^2$ or less is applied to the casing from outside thereof before the solution injection step or in the solution injection step.

9. The method for producing a non-aqueous alkali metal electricity storage element according to claim 6, comprising after the solution injection step,
 (a1) a re-depressurization step of adjusting an internal pressure of the casing in an opened state to −50 kPa to −100.00 kPa based on the atmospheric pressure, and
 (a2) a restoration step of returning an internal pressure of the casing in an opened state to the atmospheric pressure.

10. The method for producing a non-aqueous alkali metal electricity storage element according to claim 6, wherein comprising
 after the solution injection step,
 a doping step of applying a voltage to the non-aqueous alkali metal electricity storage element precursor to form the positive electrode from the positive electrode precursor by decomposition of the alkali metal compound, and to dope the negative electrode with the alkali metal ions;
 an aging step of subjecting the non-aqueous alkali metal electricity storage element precursor to aging;
 a gas venting step of removing a gas from the non-aqueous alkali metal electricity storage element precursor; and
 a sealing step of sealing the non-aqueous alkali metal electricity storage element precursor.

11. The method for producing a non-aqueous alkali metal electricity storage element according to claim 1, comprising a charge/discharge cycle step of charging and discharging the non-aqueous alkali metal electricity storage element precursor, wherein
 the charge/discharge cycle step comprises steps of
 heating the non-aqueous alkali metal electricity storage element precursor to a temperature of 30° C. or higher and 100° C. or lower and
 carrying out the charge/discharge within a range of an upper limit voltage and a lower limit voltage, and wherein
 the upper limit voltage is 3.8V or more and 4.8V or less, and
 the lower limit voltage is 1.5V or more and 3.5V or less.

12. The method for producing a non-aqueous alkali metal electricity storage element according to claim 11, wherein heating the non-aqueous alkali metal electricity storage element precursor to a temperature of 35° C. or higher and 85° C. or lower in the charge/discharge cycle step.

13. The method for producing a non-aqueous alkali metal electricity storage element according to claim 11, wherein the non-aqueous alkali metal electricity storage element precursor is preliminarily pressurized from outside at a pressure of 0.1 kgf/cm$^2$ or more to 1,000 kgf/cm$^2$ or less in the charge/discharge cycle step.

14. The method for producing a non-aqueous alkali metal electricity storage element according to claim 11, wherein when charge and discharge are carried out as one cycle, the number of cycles is 1 or more and 10 or less in the chare/discharge step.

15. The method for producing a non-aqueous alkali metal electricity storage element according to claim 1, comprising an elevated temperature aging step of heating the non-aqueous alkali metal electricity storage element precursor, wherein the elevated temperature aging step comprises:
 a high voltage storage step of adjusting a voltage of the non-aqueous alkali metal electricity storage element precursor to 4.03 V or more and 5.0 V or less, and then storing the non-aqueous alkali metal electricity storage element precursor at a temperature of 45° C. or higher and 100° C. or lower.

16. The method for producing a non-aqueous alkali metal electricity storage element according to claim 15, wherein the elevated temperature aging step further comprises
 a low voltage storage step of adjusting a voltage of the non-aqueous alkali metal electricity storage element precursor to 1.5 V or more and 2.8 V or less, and then storing the non-aqueous alkali metal electricity storage element precursor at a temperature of 45° C. or higher and 100° C. or lower.

17. The method for producing a non-aqueous alkali metal electricity storage element according to claim 15, wherein the non-aqueous alkali metal electricity storage element precursor is preliminarily pressurized from outside at a pressure of 0.1 kgf/cm$^2$ or more and 1,000 kgf/cm$^2$ or less in the elevated temperature aging step.

18. The method for producing a non-aqueous alkali metal electricity storage element according to claim 1, comprising:
 a step of disposing the positive electrode active material layer on one side or both sides of the positive electrode current collector to provide the positive electrode precursor, wherein the positive electrode active material layer comprises the positive electrode active material, the alkali metal compound, a binder comprising a water-soluble polymer and a solvent, and the positive electrode active material comprises a carbon material; and a drying step of heating the positive electrode precursor by heating under reduced pressure or infrared heating to reduce an amount of the solvent in the positive electrode active material layer.

19. The method for producing a non-aqueous alkali metal electricity storage element according to claim 18, wherein
the drying step is carried out by heating the positive electrode precursor under reduced pressure, a temperature of the heating under reduced pressure is 50° C. or higher and 200° C. or lower, and
the heating time is 1 hour or longer and 24 hours or shorter.

20. The method for producing a non-aqueous alkali metal electricity storage element according to claim 18, wherein
the drying step is carried out by heating the positive electrode precursor under reduced pressure, and an atmospheric pressure in the heating under reduced pressure is 105 Pa or higher and 1,000 Pa or lower.

21. The method for producing a non-aqueous alkali metal electricity storage element according to claim 18, wherein
the drying step is carried out by infrared heating, a temperature of the infrared heating is 80° C. or higher and 200° C. or lower, and
the heating time is 1 minute or longer and 5 minutes or shorter.

22. The method for producing a non-aqueous alkali metal electricity storage element according to claim 18, wherein
the drying step is carried out by infrared heating, and
further comprising a winding step of winding up the positive electrode precursor after the infrared heating.

23. The method for producing a non-aqueous alkali metal electricity storage element according to claim 18, wherein the solvent comprises water, and the drying step is carried out so that an amount of the solvent in the positive electrode active material layer is reduced to 7.0% by weight or less based on a total weight of the positive electrode active material layer.

24. The method for producing a non-aqueous alkali metal electricity storage element according to claim 1, comprising:
a step of disposing the positive electrode active material layer on one side or both sides of the positive electrode current collector to provide the positive electrode precursor, wherein the positive electrode active material layer comprises the positive electrode active material, the alkali metal compound, a binder, and a solvent and the positive electrode active material comprises a carbon material;
a drying step of heating the positive electrode precursor by infrared rays in a drying furnace filled with a gas comprising nitrogen as a main component, to reduce an amount of the solvent in the positive electrode active material layer; and
a winding step of winding up the positive electrode precursor.

25. The method for producing a non-aqueous alkali metal electricity storage element according to claim 24, wherein
a temperature inside the drying furnace is 100° C. or higher and 300° C. or lower, and
a time for the heating is 1 minute or longer and 5 minutes or shorter.

26. The method for producing a non-aqueous alkali metal electricity storage element according to claim 24, wherein the drying furnace has an air flow therein for supplying and exhausting a gas comprising nitrogen as a main component, and a velocity of the air flow is 10 $cm^3$/min or more and 1000 $cm^3$/min or less.

27. The method for producing a non-aqueous alkali metal electricity storage element according to claim 24, wherein an oxygen concentration in the drying furnace is less than 1,500 ppm.

28. The method for producing a non-aqueous alkali metal electricity storage element according to claim 24, wherein the solvent comprises an organic solvent, and the drying step is carried out so that an amount of the solvent in the positive electrode active material layer is reduced to 0.1% by weight or more and 10% by weight or less based on a total weight of the positive electrode active material layer.

29. The method for producing a non-aqueous alkali metal electricity storage element according to claim 1, wherein the non-aqueous electrolytic solution comprises a non-aqueous solvent and an alkali metal salt.

30. The method for producing a non-aqueous alkali metal electricity storage element according to claim 1, wherein the alkali metal compound is at least one carbonate of an alkali metal selected from the group consisting of lithium carbonate, sodium carbonate and potassium carbonate; or a lithium hydroxide or a lithium oxide.

31. The method for producing a non-aqueous alkali metal electricity storage element according to claim 1, wherein the positive electrode current collector is a non-porous aluminum foil.

* * * * *